United States Patent [19]

Inuzuka et al.

[11] Patent Number: 5,043,864

[45] Date of Patent: Aug. 27, 1991

[54] IMAGE FORMING APPARATUS

[75] Inventors: Tsuneki Inuzuka, Machida; Koichi Murakami, Tokyo; Kenji Kurita, Mitaka; Hisashi Sakamaki, Yokohama, all of Japan

[73] Assignee: Canon Kabushika Kaisha, Tokyo, Japan

[21] Appl. No.: 481,809

[22] Filed: Feb. 20, 1990

Related U.S. Application Data

[60] Division of Ser. No. 161,381, Feb. 22, 1988, Pat. No. 4,926,310, which is a continuation of Ser. No. 823,284, Jan. 29, 1986, abandoned, which is a division of Ser. No. 627,723, Jul. 3, 1904, Pat. No. 4,734,739, which is a continuation of Ser. No. 483,189, Apr. 8, 1983, abandoned, which is a division of Ser. No. 329,017, Dec. 9, 1981, Pat. No. 4,392,741, which is a division of Ser. No. 68,483, Aug. 21, 1979, Pat. No. 4,315,685.

[30] Foreign Application Priority Data

| | | | |
|---|---|---|---|
| Aug. 24, 1978 | [JP] | Japan | 53-103044 |
| Aug. 24, 1978 | [JP] | Japan | 53-103048 |
| Aug. 24, 1978 | [JP] | Japan | 53-103050 |
| Aug. 31, 1978 | [JP] | Japan | 53-106736 |
| Sep. 1, 1978 | [JP] | Japan | 53-107094 |

[51] Int. Cl.⁵ .............................................. G05B 15/02

[52] U.S. Cl. .................................. 364/186; 364/146; 355/204

[58] Field of Search ........................ 364/186, 140–146, 364/525; 355/200, 206, 208, 210, 296, 310, 311, 309, 313, 314, 204, 205; 371/8.1, 9

[56] References Cited

U.S. PATENT DOCUMENTS

| | | | |
|---|---|---|---|
| 4,243,313 | 1/1981 | Masuda et al. | 355/206 |
| 4,264,188 | 4/1981 | Tomosada et al. | 355/314 |
| 4,314,754 | 2/1982 | Shimizu et al. | 355/314 |

*Primary Examiner*—Jerry Smith

*Assistant Examiner*—Paul Gordon

*Attorney, Agent, or Firm*—Fitzpatrick, Cella, Harper & Scinto

[57] ABSTRACT

An image forming apparatus includes an image forming unit for forming an image on a recording medium, a command unit for commanding image forming conditions, a first switch for connecting a power source to the apparatus, a first director for detecting an operational position of the first switch, a second switch for enabling the first switch to connect the power source to the apparatus, a second detector for detecting an operational position of the second switch, and a memory having microprograms stored therein for operatively controlling loads on the image forming unit. The operation of the image forming unit is controlled by signals derived from the first and second detectors and the microprograms.

12 Claims, 80 Drawing Sheets

| UPPER / LOWER / CASSETTE SIZE | MS901 / MS905 | MS903 / MS907 | MS904 / MS908 |
|---|---|---|---|
| A3 | 0 | 0 | 0 |
| B4 | 0 | 0 | 1 |
| U1 | 0 | 1 | 0 |
| A4 | 1 | 0 | 0 |
| B5 | 1 | 0 | 1 |
| U2 | 1 | 1 | 0 |
| NO CASSETTE WRONG POSITION | 1 | 1 | 1 |

IMAGE FORMING APPARATUS

This application is a division of application Ser. No. 07/161,381 filed Feb. 22, 1988, now U.S. Pat. No. 4,926,310, which was continuation of application Ser. No. 06/823,284 filed Jan. 28, 1986, now abandoned, which was a divisional of application Ser. No. 627,723 filed July 3, 1984, now U.S. Pat. No. 4,734,739, which was a continuation of application Ser. No. 483,189 filed Apr. 8, 1983, now abandoned, which was a divisional of application Ser. No. 329,017 filed Dec. 9, 1981, now U.S. Pat. No. 4,392,741, which was a divisional of application Ser. No. 068,483 filed Aug. 21, 1979, now U.S. Pat. No. 4,315,685.

BACKGROUND OF THE INVENTION

1. Field of the Invention

2. Description of the Prior Art

In copying machines there sometimes occurs a case in which the power source switch (main switch, door switch, etc.) is cut off before a copying cycle is completed. According to the prior art, in this case, the copying operation is immediately stopped and the copying machine is brought into its rest position at once by cutting off the power current lines to the loads which otherwise would complete the copying operation. This is common to many of the conventional copying machines hitherto known. However, such a type of copying machine has various disadvantages.

Since data of copying conditions originally set, such as the number of copy sheets, are all cancelled also by switching off during the operation of a copying cycle as mentioned above, difficulties arise at the time of restart of the stopped copying operation. This is true in particular when a number of copies should be made continuously.

If the copying operation is restarted with a copying sheet left in the mechanism and accidentally jammed, it will increase the trouble.

For a transfer type of copying machine, such an interruption of copying operation as mentioned above often makes it impossible to restart the copying operation without trouble. This is because the photosensitive drum may be left alone for a long time in the position in which the potential distribution on the drum surface is very irregular.

It is also known how to clear the copy condition data after the stop of all of the copying operations. However, since all of the copying operations are stopped, the restart of copying cannot be done smoothly. Also, clearance of all of the copy condition data prevents a problemless restart of copying operation.

In making copies, it is often wished that another original document should be urgently copied during a multiple copy operation. In this case, the multiple copy operation proceeding at that time is interrupted for the time being and the remainder of the copy making process is carried out after the urgent copy has been made. Such urgent copy is usually called "interruption copy" in the art. Interruption copy is very troublesome and time consuming. The operator has to calculate and memorize the number of copies to be made after the end of the interruption copying operation. In particular when a large number of copies have to be made as interruption copy, when the sheet size used for the interruption copying is different from that used for the previously started multiple copying, or when an interruption copying sheet is jammed in the machine, the operator is put to great annoyance.

Generally, on the operation panel of a copying machine there are provided a copy button for giving a copy start instruction, a dial for setting the number of copies wished to be made, an indicator for indicating the number of copies already made and alarm indicator tube for giving notice of occurrance of jam. A copy button and a dial constitute a switch section, and an indicator and an indicator tube constitute an indication section. These two sections are entirely different in function from each other and therefore arranged independently of one another on the operation panel. Of course, the switch section and the indication section are different from each other also in structure. These facts put a limitation to miniaturization of an operation panel. This prevents a further minimization of the copying machine.

A sequential control system has been employed in a copying machine to control operation loads necessary for processing. For this purpose, the machine contains control circuitry composed of semiconductor devices. However, such control circuitry often brings forth troubles of miscontrol due to a wrong operation and a breaking of the circuitry. Especially, when a computer is used in the control circuitry, a wrong operation of the control circuitry has a great deal of adverse effects on the whole sequences and it is very difficult to recover the copying machine operation.

Such a type of image forming apparatus is well known and widely used in which a platen on which an original is placed or an optical system including a lamp for exposing a fixed original is driven into a reciprocal movement so as to expose and scan the original and the exposed image is formed on a photosensitive medium. In such a type of apparatus there occurs the trouble that the reversal of the motion from forward to backward or from backward to forward is not done properly and the moving member runs against the end of the machine body. In this case, the precisely adjusted optical system gets disordered so that the restart of the apparatus becomes difficult.

A recent advancement in the art has made it possible to make various sizes of copies ranging from a smaller size (format B5) to a larger size (format A3) by a single copying machine. Therefore, use of rough timing to check detection of a jammed copying sheet involves a possibility of misoperation. Also, it may cause trouble to determine developing time for drum latent image on the basis of rough timing. When copy size is smaller, too much amount of toner is applied and the drum is made dirty.

Also, it is known to develope a latent image by dipping the latent image carrying surface into liquid developer or by brushing the latent image surface with a toner brush. In this case, an additional process component is required to remove excess developer. Otherwise it is impossible to improve the developing ability and to obtain good quality image. This makes the apparatus complicate.

In a copying machine of the type in which liquid developer is used, there often occurs such a trouble that when the copying machine is left standing still for a long time, the liquid developer remained on the surface of the photosensitive medium is dried and solidified. It is difficult to wipe out the solid and at the time of restart of the machine it makes the first sheet of copy dirty. Such trouble may be eliminated by carrying out a long period of thorough pre-cleaning at the time of the machine being restarted. However, thereby the copy speed is decreased considerably.

SUMMARY OF THE INVENTION

Accordingly, it is a general object of the present invention to provide an improved image forming apparatus.

Specifically, it is an object of the invention to provide an image forming apparatus which makes it easy to restart image forming after the power source is cut in again and which enables an image of high quality to be produced from the first sheet after the restart.

It is another object of the invention to improve an image forming apparatus of the type in which image forming operation such as copying operation is executed using a computer and to provide such image forming apparatus which includes control circuitry which detects the position of the power switch and issues a detection signal for controlling the indication and the sequence in an optimum manner.

It is a further object of the invention to improve an image forming apparatus of the type which includes two or more cassettes for recording medium and to provide such image forming apparatus in which selection of recording medium can be done easily, and data of selected cassette and the size thereof can be controlled in accordance with image forming cycle modes so that the operability of the apparatus can be improved.

It is still a further object of the invention to provide an image forming apparatus of the above-mentioned type in which if the apparatus is left alone for a certain time period after the issuance of instruction for image forming conditions or after the completion of an image forming cycle, then the conditions once set are automatically cleared, and instead the standard conditions are set so that the operability of the apparatus can be further improved.

It is a further object of the invention to improve an image forming apparatus of the type in which a continuous and multiple copying can be interrupted to carry out another copying with priority to the former and the remainder of the first multiple copying can be restarted after the completion of the interruption copying.

It is still a further object of the invention to provide an image forming apparatus of the above-mentioned type which is simple in structure and in which the release of interruption can be made by operating a single copy interruption switch twice and the remainder of the first copying can be carried out while interchanging copy data such as of a copying sheet used and copy magnification between the copying with lower priority and that with higher priority.

It is another object of the invention to provide an image forming apparatus which allows an easy key operation for setting image forming conditions and an easy checking on the state of the apparatus such as jamming and which includes a miniaturized operation/indication part contributable a further minification of the apparatus as a whole.

It is a further object of the invention to provide an operation/indication apparatus which can prevent the keys and indicators from being blocked by dust and the like and which can be used advantageously in the operation part of cooking apparatus such as electronic oven.

It is still another object of the invention to provide an image forming apparatus in which the control circuitry is easily restartable for controlling the image forming loads and which has a self recovery function.

It is still a further object of the invention to provide a self recovery type of control apparatus which detects the oscillation wave forms, level and other conditions of pulse signals generated from control circuitry such as a microcomputer to check the control circuitry and to check the running of the process sequences and which makes the programs run by automatic return after a cut-off of the power source to the circuitry relying on the results of the detection so as to reset the circuitry.

It is another object of the invention to provide a copying machine which assures the optimum exposure and scanning and also assures safety of the machine.

It is a further object of the invention to provide an image forming apparatus which performs detection of recording medium jam and control of developing bias at proper timing in accordance with the sizes of image formation.

It is also an object of the invention to provide an image forming apparatus which include such a developing device which operates efficiently, lessens fogging and assures a good transference of image.

It is another object of the invention to provide an image forming apparatus which can restart rapidly after left alone with the power source being on or off and which can produce always good quality images even after the occurrence of any unfavorable condition.

It is a further object of the invention to provide an image forming apparatus which allows a quick copy start so long as there is no need of minding the quality of image so much.

Other and further objects, features and advantages of the invention will appear more fully from the following description taken in connection with the accompanying drawings.

BRIEF DESCRIPTION OF THE DRAWINGS

FIGS. 4-1 and 4-2 show the exposure part of the copying machine in plan and in section respectively;

FIGS. 5-1 and 5-2 are sectional views of the developing device used in the copying machine, and FIG. 5-3 is a perspective view of the developing roller of the device;

FIGS. 8-1 and 8-2 are time charts of process modes for the copying machine;

FIGS. 11-1 to 11-6, and 11-7A and 11-7B, when combined as shown in FIG. 11-7, schematically show circuits for the AC load part shown in FIG. 7;

'FIGS. 12-1, 12-2, 12-3A and 12-3B, when combined as shown in FIG. 12-3, and FIG. 12-4 show schematically circuits of the DC control part shown in FIGS. 10A and 10B;

FIGS. 13-1 to 13-4 are schematic circuit diagrams of the DC loads shown in FIG. 7;

FIGS. 15-1 to 15-6 show a circuit for the input part shown in FIG. 7;

FIGS. 16-1 to 16-4 are operation characteristic curves of the circuits shown in FIGS. 11-5, 12-1, 12-2 and 15-5 respectively.

FIG. 17 is a graphic representation of combinations of cassette switches;

FIGS. 18-1, 18-10, 18-14, 18-16 and 18-18 are flow charts useful for understanding the operations of the machine in accordance with the present invention;

FIGS. 18-2A through 18-2E, 18-3A through 18-3D, 18-4A through 18-4D, 18-5A through 18-5C, 18-6A through 18-6C, 18-7A through 18-7C, 18-8A through 18-8D, 18-9A through 18-9C, 18-11A and 18-11B, 18-12A through 18-12C, 18-13A and 18-13B, 18-15A through 18-15D, 18-17A through 18-17C, and 18-19A through 18-19C show sequence flows useful for understanding the machine operations, when combined as shown in FIGS. 2 through 9, 11, 12, 13, 15, 17 and 19, respectively;

FIG. 19 is an exploded view of an embodiment of operation/indication apparatus;

FIGS. 20-1 and 20-2 are sectional views of the operation/indication apparatus shown in FIG. 19; and FIGS. 21-1 and 21-2 show another embodiment of operation/indication apparatus.

DESCRIPTION OF THE PREFERRED EMBODIMENTS

Figure 1:
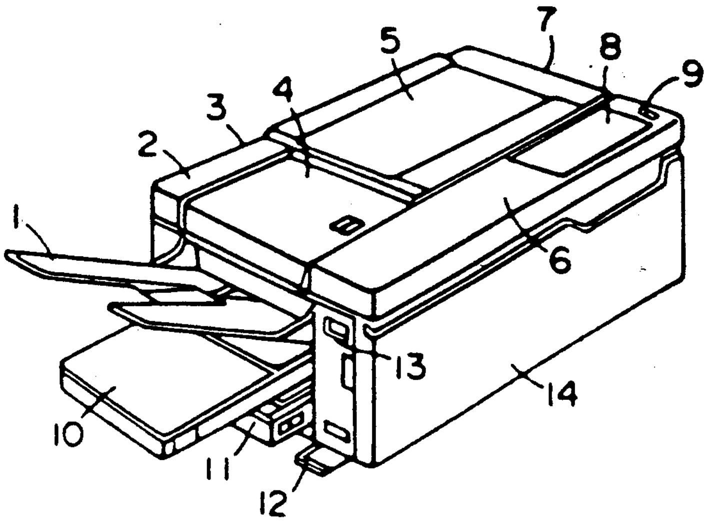
FIG. 1 is a perspective view of a copying machine to which the present invention is applicable.

Referring first to FIG. 1 showing a copying machine in which the present invention is embodied, reference numeral 1 designates a tray for receiving copied sheets, 2 a body upper cover member, and 3 is a body rear cover member. Numeral 4 denotes a left side door on the body of machine which can be opened and closed manually. Numeral 5 designates a cover member for original, numeral 6 does a cover member for operation part and numeral 7 does a right side cover member. Designated by 8 is an operation part panel and 9 a switch for power source to supply electric power to the substantial portions of the machine. Reference numerals 10 and 11 denote upper and lower cassettes containing transfer sheets which are detachable from the machine body. Numeral 12 indicates a handle for tranportation and 13 does a key counter socket. Numeral 14 designates a front door which can be also opened and closed manually.

Figure 2:
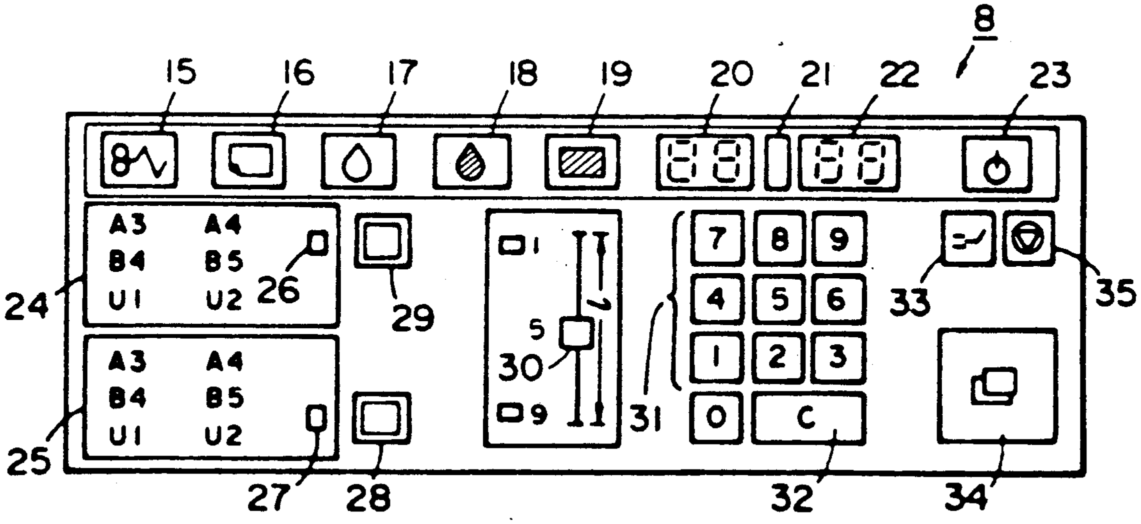
FIG. 2 is a plan view of the operation panel of the copying machine shown in FIG. 1.

FIG. 2 shows the operation part 8 in detail in a plan view. Keys 28 and 29 are used to select any one of the upper and lower cassettes. A slide lever 30 is provided to set the density of copy. The position designated by 5 is that for standard density. A set of numeral keys 31 are used to set the number of copies to be made. The number of copies once set can be cancelled by a clear key 32. Designated by 33 is an interruption key with which copying in the number previously set by the key 31 can be interrupted to excute copying for making copies in a number other than the previously set number before the completion of copying in the number previously set by the key 31. An instruction for starting copying is given by a copy key 34 and if copying operation is wished to be stopped during the course of a continuous copying operation for making the set number of copies, then it can be done by a stop key 35. Since all of these keys are of flat type touch sensors, they are very easy to operate. The pressure required to operate the copy key 34 is 90±50 gr. and that required to operate other keys is 120±50 gr. Releasing the depression allows the keys to return to their starting position.

Designated by 15–21 are warning indicators which indicate warning information coming from the machine body as pictorical symbols as illustrated in FIG. 2. Of these warning indicators the paper feeding checking indicator 15 puts on when a copying paper sheet gets jammed within the mechanism, when an original illuminating lamp abnormally puts on and when no signal is generated from a Hall generator IC located under the optical mirror rail.

The paper/cassette supply indicator 16 puts on when the cassette table then selected contains no cassette or when the cassette in the selected cassette table is empty.

The developer liquid supply indicator 17 lights up when the amount of developer liquid becomes decreased under a predetermined level.

The toner supply indicator 18 begins lighting when the concentration of toner in the developer liquid contained in the developing device is decreased up to a level under a predetermined value and there is no toner to be supplied to the developing device because of the toner bottle being empty.

The key counter checking indicator 19 becomes on when the key counter is not pluged in the socket of the machine body.

Reference numeral 23 designates a wait/copying duration indicator which functions as follows:

(1) When the temperature of the fixing heater is lower than a predetermined level at the time of the power source switch being turned on, the indicator lamp becomes flashing as "wait signal".

(2) Normally, it continues lighting from the time of the copy start key being depressed to the time of the exposure for the last copying cycle being finished, which gives the operator information of appropriate timing at which another page of the original documents is to be opened.

Designated by 20 is an indicator for indicating the number of copies to be made which can be set by using the ten keys 31. The indicator 20 indicates the set number in 7-segment. The number of copies which can be set one time is from 1 to 99. By lapse of thirty seconds after the completion of copying or by switching the clear key on, the set number is automatically returned to "01".

The indicator designated by 22 is used to indicate the count of copies already made. It indicates the count every copying starting from the commencement of copying operation then set. The count is indicated adding up to the set number of copies.

The interruption indicator designated by 21 is put on by depressing the interruption key and the light of the indicator goes out upon the completion of the interruption copying.

Cassette size indicators 24 and 25 indicate the sizes of the upper and lower cassettes respectively to give the operator a notice of the size of the cassettes set in the upper and lower shelves at the same time. Indicators 26 and 27 indicate which cassette shelf has been selected by the selection key 28 or 29.

The arrangement of the copying machine shown in FIGS. 1 and 2 and the manner of operation thereof will be described hereinafter with reference to FIG. 3.

Figure 3:
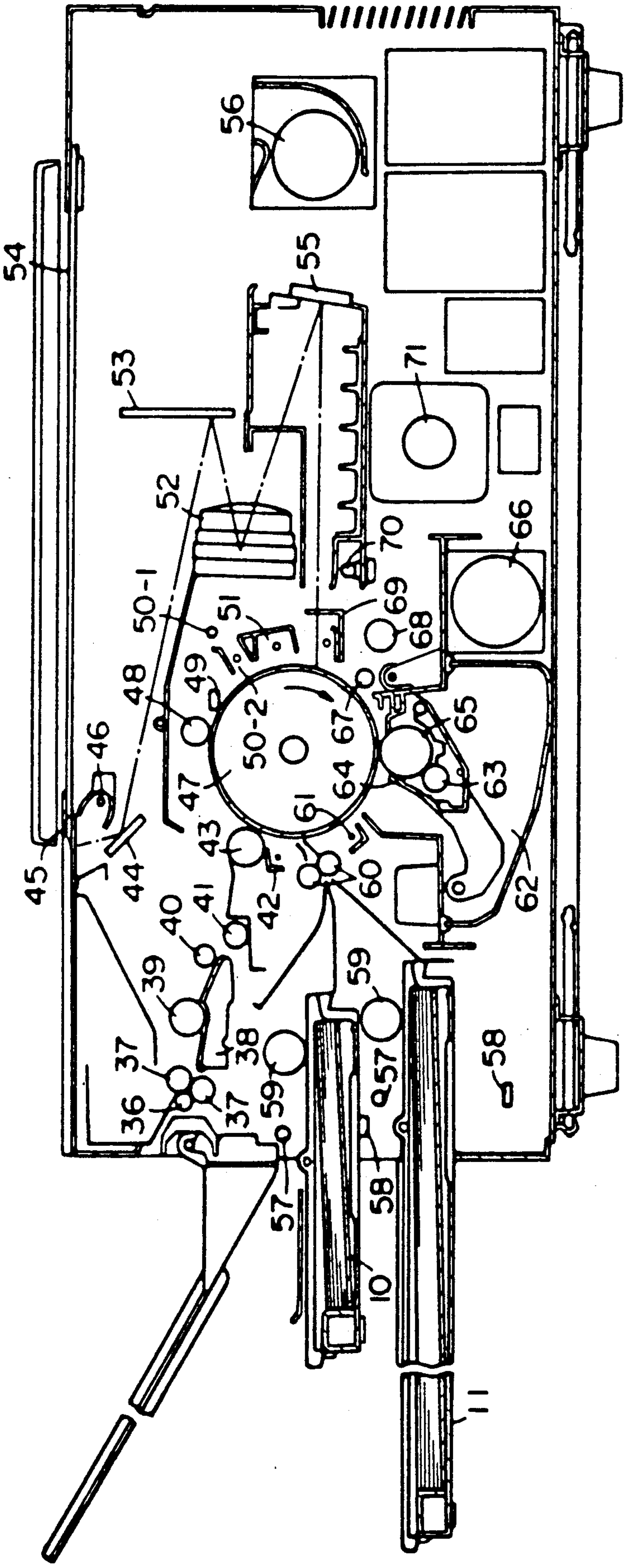
FIG. 3 is a sectional view of the copying machine shown in FIG. 1.

In FIG. 3, a drum 47 is supported rotatably on a shaft. The surface of the drum 47 is composed of three layer seamless photosensitive medium formed using CdS photoconductive elements. The drum is driven rotation in the direction of the arrow by a main motor 71 which is brought into operation by switching on the copy key.

An original is placed on an original table glass plate 54. After the drum 47 being rotated by a predetermined rotation angle, the original is illuminated by an illuminating lamp 46 integrally connected with a first scanning mirror 44. The light reflected on the original is scanned by the first scanning mirror 44 and a second scanning mirror 53. The first and second scanning mirrors are moved in the speed ratio of 1:½ to maintain the optical path length to the lens 52 constant during the scanning of original.

The reflected optical image is projected through the lens 52 and a third mirror 21 and then on the drum 47 at the exposure part.

The drum 47 is at first subjected to the action of a preexposure lamp 50 and a pre-AC charger 50-2 simultaneously to remove electric charges and then is corona charged (for example, positively) by a primary charger 51. Thereafter, the drum 47 is slit exposed at the exposure part to the above-described image illuminated by the illuminating lamp 46.

At the same time, the drum is subjected to the corona discharging action by a discharger 69 of AC or of an opposite polarity (for example, negative) to the primary one. Then, the drum is subjected to a whole surface uniform exposure by a whole surface exposure lamp 68 so as to form on the drum an electrostatic latent image of high contrast. The electrostatic latent image thus formed on the drum is liquid developed by a developing roller 65 of developing device 62 to visualize the image as a toner image. To facilitate the transference of the formed toner image, the latter is subjected to the action of a pretransferring charger 61.

On the other hand, transfer sheets contained in the upper cassette 10 or lower cassette 11 is fed into the machine by a paper feeding roller 59 and conveyed toward the photosensitive drum 47. At this time, a register roller 60 serves to feed the transfer sheet in good timing with the rotation of the drum so that at the transferring part the fore edge of the latent image and that of the transfer sheet can perfectly coinside with each other.

During the movement of the transfer sheet passing through between a transferring charger 42 and the drum 47, the toner image is transferred onto the transfer sheet from the drum.

After transferring, the transfer sheet is separated from the drum by a separation roller 43 and then conveyed to a transportation roller 41 which leads the transfer sheet to the area between a heating plate 38 and pressure rollers 40, 41. In this fixing station, the transferred toner image is fixed under the action of pressure and heat. The transfer sheet having thereon the fixed toner image is then discharged into the tray 34 by a discharge roller 37 through a sheet detection roller 36.

After transferring, the drum 47 continues rotating and enters the cleaning station in which the surface of the drum is made clean by cleaning apparatus comprising a cleaning roller 48 and an elastic blade 49. After cleaning, the drum advances for the next copying cycle.

Prior to the start of the above-described copying cycle there must be carried out some pretreatment steps. One of the pretreatment steps is to pour some amount of developer liquid onto the cleaning blade 49 while leaving the drum 47 stand still with the power source switch 9 being thrown in the circuit. This step is hereinafter referred to as "pre-wet". Pre-wet is necessary to wash out the toner sticked on and near the blade 49 and also to lubricate the contact surface between the drum 47 and the cleaning blade 49.

Another pretreatment step is to rotate the drum 47 after the pre-wet time (4 seconds) so as to erase any remaining electric charge or memory on the drum surface by using the preexposure lamp 50 and the pre-AC discharger 51 while cleaning the drum surface by the cleaning roller 48 and blade 49. This step is hereinafter referred to as "pre-rotation". This pre-rotation is necessary to keep the sensitivity of the drum at a proper level and also to form an image on a clean surface.

The duration time of pre-wet and the number of rotation for the pre-rotation automatically vary depending upon various factors as described later.

After the completion of repeated copying cycles the number of which has been set by the numeral keys 31, the drum must be rotated several rotations for post-treatment. This post-treatment step involves erasing of remaining electric charge or memory on the drum surface by AC charger 69 and cleaning the drum surface. This treatment step is hereinafter referred to as "post-rotation". This step is necessary to make the drum electrostatically and mechanically cleaned before leaving it stand.

In the shown copying machine, a standard white plate 45 is provided at one end of the original table glass plate 54. The reflected light from the white plate 45 is used to set a bias voltage for the developing roller 65.

Designated by 67 is an electrometer disposed in the vicinity of the drum to detect potential with alternate current wave obtained by rotation of a cage rotor. The detected value is compared with a predetermined reference value and the results obtained therefrom are used to make the discharge current of chargers 51, 69 and the bias voltage to the developing roller 65 optimum. The cage rotor is driven into rotation by a motor not shown.

To cool the machine there is provided a blower 56 whose operation is controlled in accordance with the process sequence.

A set of lamp 57 and CdS 58 is provided for each of the upper and lower cassettes to detect whether either of the cassettes is emptied or not.

Although not shown in the drawing, the copying machine includes a door switch which is turned on only when both of the upper and left side door 4 and the front door 14 are closed. Such a portion of power source which cannot be cut off by the power source switch 9 is cut off by turning off the door switch. Furthermore, within the body of the machine there is provided a sub-switch to cut off all of the rest of power source (central control part). The sub-switch has the same effect as a disconnection of the power source code of the copying machine from the wall outlet in the office. In the shown copying machine, the state of operation of these door switch and power source switch is used as signal necessary for control processing and is read into the control circuitry. This constitutes one of the important features of the copying machine.

OPTICAL SYSTEM

Figures 1, 4:
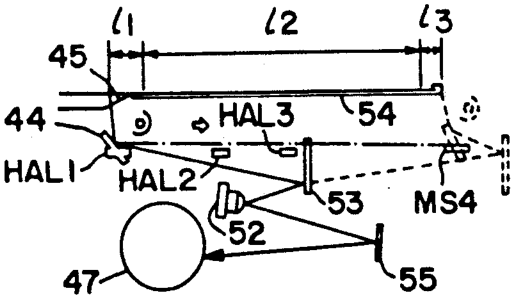
Figures 2, 4:
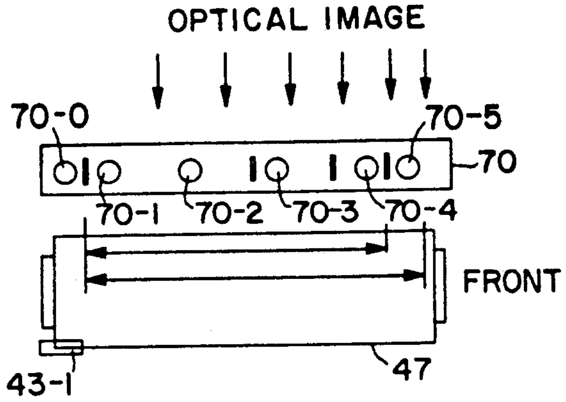

FIG. 4-1 is a partial cross-sectional view of the optical system shown in FIG. 3. The same reference numerals designate the same members. In the drawing of FIG.

4-1, $l_1$ indicates an approach run area, $l_2$ does an effective scanning area and $l_3$ does an overrun area. Normally, when the moving optical system has moved the maximum of $l_1+l_2$, one forward movement thereof comes to end and the system is reversed to its backward movement. A Hall generator element HAL1 is provided at a position corresponding to the home position of the first mirror 44 before starting. Other two Hall elements HAL2 and HAL3 are positioned in the course of forward movement path of the first mirror 44. At the end of the overrun area of the first mirror there is positioned a microswitch MS4. The first mirror moves together with a magnet mounted on the base member of the mirror. The approach of the magnet to HAL1–3 actuates them to issue a high level signal from each the Hall element. These signals generated from HAL1–3 are used to control stopping of the optical system 44, 53, operation of paper feeding roller 59, lighting of original illuminating lamp 46 and operation of register roller 60 respectively. The function of MS4 is to forcedly and preferentially stop the forward movement of the first mirror at the position when the first mirror fails to be reversed at the predetermined reversal point. This prevents the optical system from running against the end of the body of machine due to any trouble of the optical system control part. Thus, breaking of the machine can be prevented.

For three different sizes of paper sheets (format A4, B4 and A3) there must be determined three different reversal points for the optical system along length $l_2$. These reversal points are determined by counting pulses generated by the rotation of the main motor 71 after the first mirror has passed HAL2. When the number of counts reaches a value predetermined by the size of paper then used, the movement of the optical system is reversed by the control in reply to the counted number of pulses.

EXPOSURE PART

FIG. 4-2 is a plan view of a portion of machine including the blank lamp 70 shown in FIG. 3. The blank lamp 70 includes blank exposure lamps 70-1–70-5 which are put on during the rotation of the drum for time other than exposure time to erase the electric charge on the drum surface and to prevent any excess toner from adhering to the drum. Since the blank exposure lamp 70-1 illuminates such an area of the drum surface facing the potential sensor 67, the lamp is momentarily put off when the potential at dark part is measured by the potential sensor.

When copies of B-format are to be made, the blank exposure lamp 70-5 are remained lighting even during the time of the forward movement of the optical system. This is because the image area of B-format is smaller than that of A4 or A3. The non-image area of B-format is illuminated by the blank exposure lamp 70-5.

The lamp designated by 70-0 is a lamp usually called a sharp cut lamp. This lamp 70-0 illuminates such an area of the drum surface which is in contact with the separation guide plate 43-1 to perfectly erase electric charge on this area. This has an effect to prevent toner from adhering to this area which in turn prevents the separation marginal portion from being made dirty by toner. This sharp cut lamp continues lighting always during the rotation of the drum.

DEVELOPING DEVICE

The structure of developing device is described with reference to FIGS. 5-1, 5-2 and 5-3.

The developing device comprises a developing roller 65. As shown best in FIG. 5-3, the developing roller 65 is composed of a core metal roller 102, an electrically conductive sponge layer 100 and an insulating network layer 101 covering the sponge layer. The sponge layer 100 is impregnated with developing solution or developer liquid. A bias voltage is applied to the metal core roller 102 by DC power source 103. Reference numeral 105 designates a refreshing roller and 107 does a developing electrode.

The developing roller is immersed in the liquid developer during the time of stand-by. Upon the start of copying operation, the developing roller is brought into contact with the drum surface under a predetermined contact pressure and then the developing roller starts rotating counterclockwise in synchronism with the peripheral speed of the drum. At first, edge developing is effected with liquid developer standing between the subelectrode 104 and the developing roller 65 (see area a in FIG. 5-1). Next to it, close field developing is effected with liquid developer squeezed out from the sponge layer 100 of the developing roller 65 in contact with the drum surface under pressure (area b). Lastly, excess developer remained on the drum surface is absorbed into the sponge layer of the developing roller making use of restoring force of the sponge layer at the time of the developing roller being separated from the drum surface (area c).

To prevent fogging as much as possible, the bias voltage applied to the developing roller 65 is increased or decreased.

Figures 1, 5:
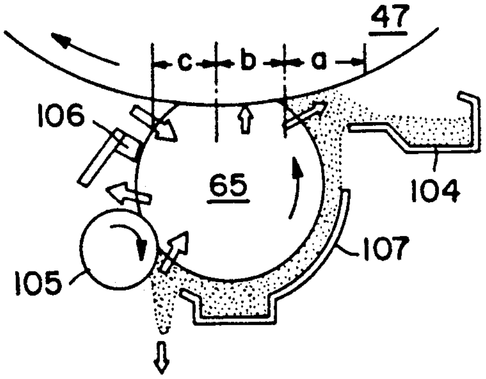
Figures 2, 5:
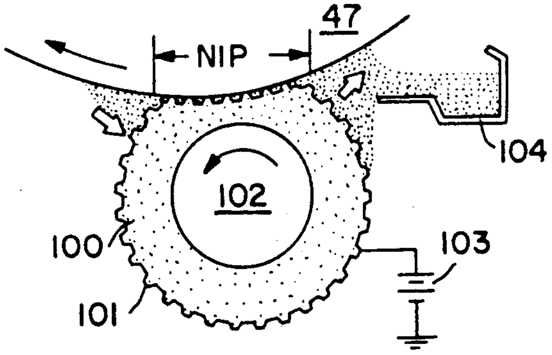
Figures 3, 5:
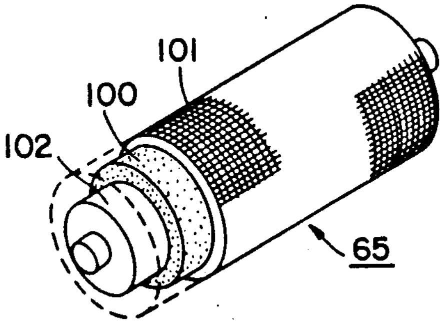

As seen best in FIG. 5-1, during the copying operation, the developing roller is contacted by both of the refreshing roller 105 and the drum under pressure in a fashion of wedge while rotating therebetween. Therefore, liquid developer is squeezed out from the sponge layer at the portion which comes into pressure contact with the drum. When the portion of developing roller leaves the drum, the sponge layer expands and absorbs excess developer liquid from the drum surface into the sponge. Further, when the portion of developing roller comes into contact with the refreshing roller 105, the used developer liquid contained in the sponge layer 100 is squeezed out therefrom and when the portion of developing roller leaves the refreshing roller it absorbs fresh developer liquid again. Since a sufficient amount of liquid developer must be present between the refreshing roller and the developing roller, there is provided the developing electrode 107. To prevent accumulation of dirts on the developing electrode, a bias voltage equal to that for the developing roller 65 is applied also to the developing electrode 107. In this manner, the developing roller repeats the cycle of squeeze-out→absorption→squeeze-out→absorption per every rotation of it.

Reference numeral 106 denotes a cleaner blade for the developing roller. Mass of toner sticked on the network of the developing roller is removed by the cleaner blade so that clogging of the mesh may be avoided and quality of copy in image sharpness may be improved.

Liquid developer in the container is pumped up to the subelectrode 104 and cleaning blade 49 at the same time by a pumping motor not shown. The developing roller 65 is brought into the position shown in the drawing only at the time of developing. For the rest of time the developing roller is in its lowered position separated from the drum surface. This has an effect to prevent any unnecessary adhesion of toner onto the drum surface and any unfavourable deformation of the sponge layer.

DRIVING SYSTEM

Figure 6:
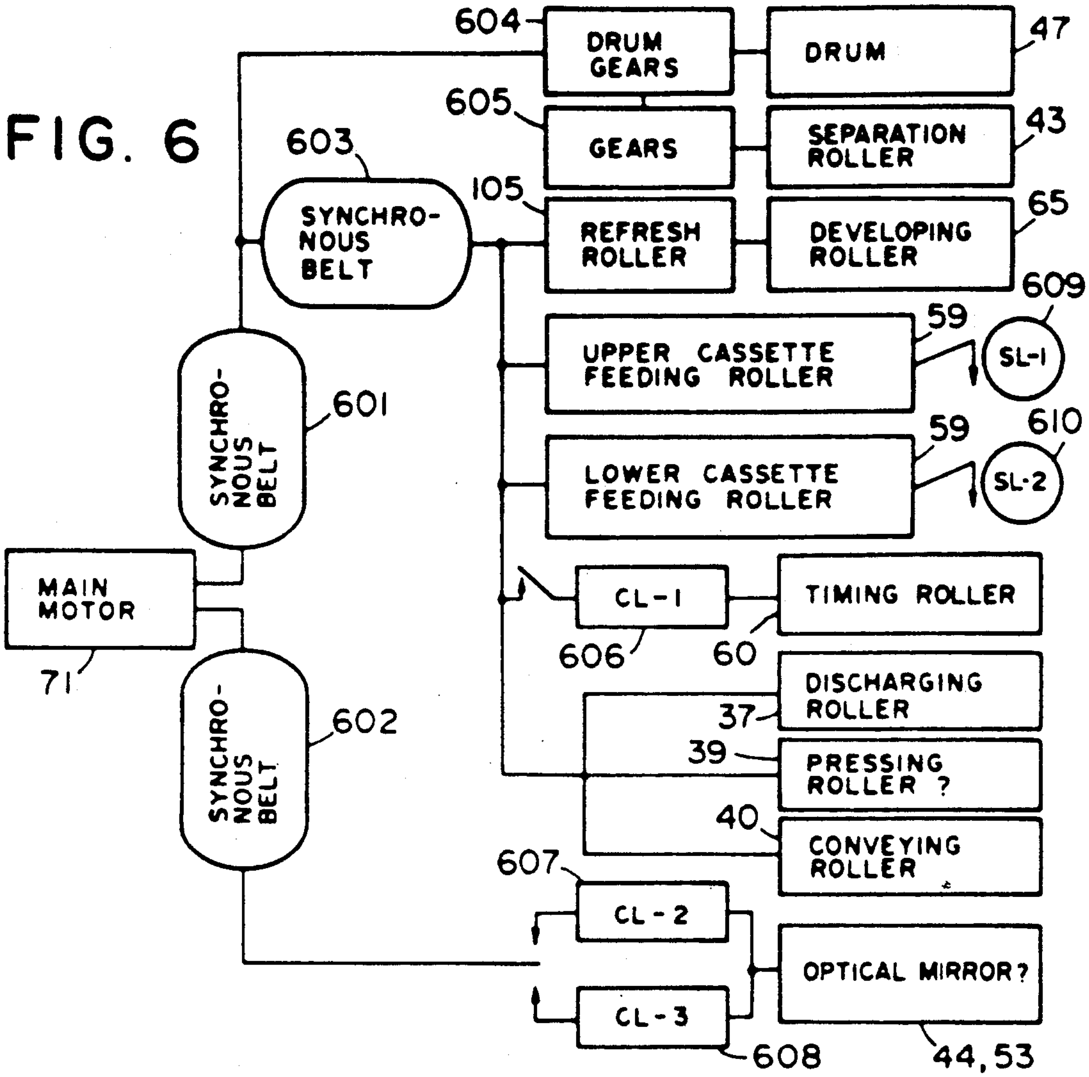
FIG. 6 is a schematic block diagram of the driving system in the copying machine.

FIG. 6 is a block diagram of power transmission regarding the driving system shown in FIG. 3. In FIG. 6, numerals of two figures are all the same as those in FIG. 3.

Synchronous belts 601–603 serve to transmit power from the main motor 71. Designated by 604 are drum gears to transmit power from the main motor to the drum 47. The separation roller 43 is driven through gears 605. Numerals 606 through 608 designate clutches. Numerals 609 and 610 indicate solenoids for lowering and lifting the upper and lower cassette feeding rollers onto and from the copying papers respectively. The feeding rollers continue rotating after the power source 9 being thrown in the circuit.

With the start of rotation of the main motor 71, the drum, separation roller and conveying mechanism are driven through the synchronous belts and gears and also the developing roller is driven into rotation through the refreshing roller. Simultaneously with the start of the main motor, a torque motor is brought into operation to lift up the developing roller to the position in which the developing roller is in contact with the drum surface under pressure.

Driving power is transmitted to the optical system from the main motor only when the forward clutch CL-1 or backward clutch CL-2 is actuated so as to move the optical system forward or backward.

When paper feeding signal is generated, the cassette feeding roller is lowered to feed the copying paper into the machine. The timing roller is driven through a timing clutch CL-3.

As will be understood from the foregoing, all the driving powers required to effect copying operation are derived from one and single main motor 71. Other driving sources provided in the machine are a torque motor for lowering and lifting the developing roller 65 (this torque motor is described hereinafter), a motor for stirring the liquid in the developing device 62 and pumping the liquid up to the blade 49 and developing electrode 104, a blower motor for exhaust and fan motors for cooling. Fan motors include the first suction fan motor for cooling the area around the fixing device and the second suction fan motor for cooling the area around the developing device. These fan motors are controlled synchronously with the blower motor.

Figure 7:
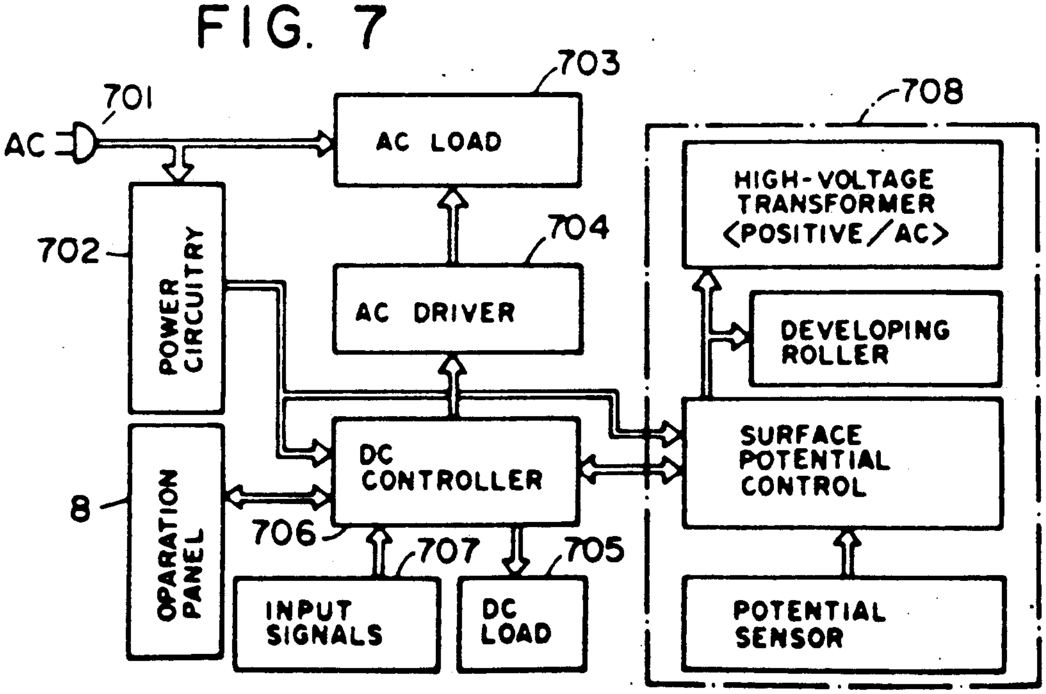
FIG. 7 is a schematic block diagram of the electric control system in the copying machine.

FIG. 7 is a block diagram of the electric control system in FIG. 3. Designated by 701 is a plug which is plugged in a wall outlet, 702 a power source circuit for supplying a stable DC voltage to the control part, 703 an AC load to the main motor and others, 704 an AC driver such as an amplifier for driving the AC load 703, 705 a DC load to clutches, solenoids etc. and 706 a DC control part for controlling the timing operations of AC load 703 and DC load 705, on-off of the indicators on the operation panel 8, operations of the automatic control system and selfchecking system and the like. The control part 706 comprises, as a CPU, a microcomputer and performs the above controlling functions while receiving, as inputs, key signals from the operation part 8, signals 707 from the position sensors (Hall generator elements, microswitches and the like) and particular signals from the surface potential control part 708.

SEQUENCES

Figures 1, 8:
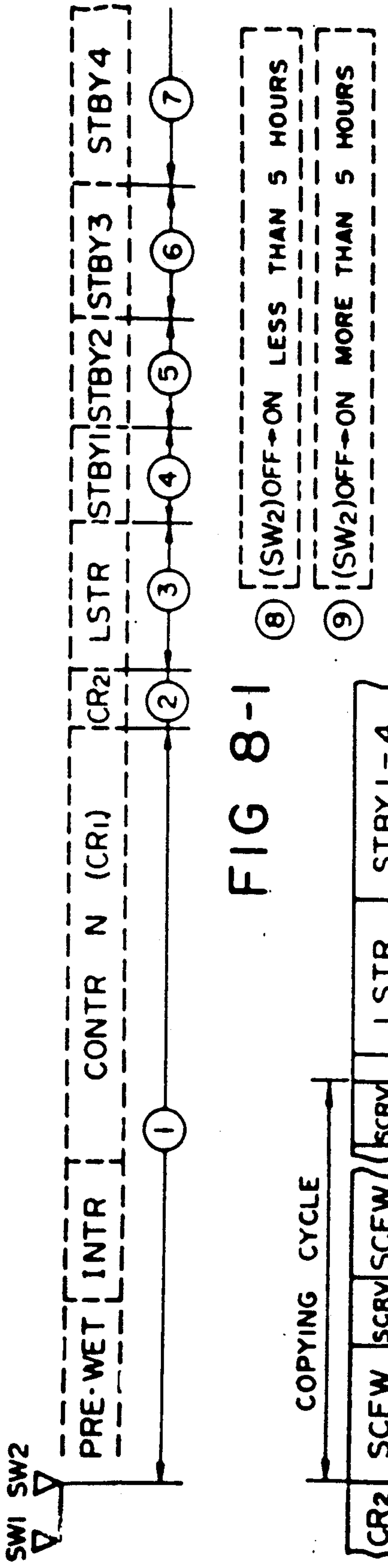
Figures 2, 8:
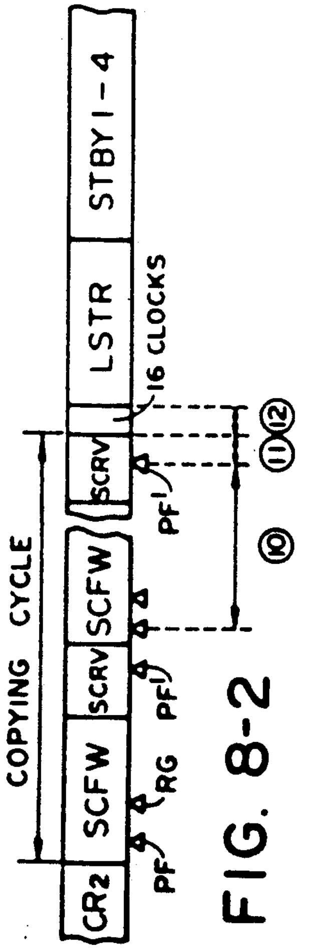

FIGS. 8-1 and 8-2 are time charts of sequence steps in the above machine.

By turning on the subswitch SW1 and the power source switch SW2, a pre-wet treatment (PWET) is carried out for about 4 seconds. Then, the drum is rotated one turn as an initial pre-rotation (INTR). After control rotations (CONTR N, 1, 2), the machine gets in the position of stand-by (STBY 1–4) through a post-rotation so long as the copying key is not turned on.

Control rotation N involves three turns of the drum at the most, during which the potential on the drum surface approaches the aimed value under the action of the surface potential control circuit (FIG. 11-7) which measures, by potential sensors, the potentials of light part $V_L$ and dark part $V_D$ alternately and controls the potentials.

Control rotation 1 ($CR_1$) involves only 0.6 revolution of the drum during which only single control is effected for potentials of both the light and dark parts.

Control rotation 2 ($CR_2$) is carried out immediately before the start of copying operation to measure the potential on the light part with the standard quantity of light from the original illuminating lamp. Depending upon the measured value, the value of bias voltage to be applied to the developing roller is determined. When a copying operation is started, this control rotation 2 must be carried out without exception. However, if there is generated no copy signal, then this control rotation 2 is mere idle rotation.

Post-rotation (LSTR) involves further 1.12 turns of the drum after completion of copying. During the post-rotation, AC charger, pre-exposure lamp, blank exposure lamp and whole surface exposure lamp are brought into operation to clean the drum surface electrostatically.

During LSTR, the electric current of AC charger is decreased to about 100 μA from the normal value of 200 μA to prevent the drum surface from being made too negative.

Necessary are 1.12 revolutions of the drum for LSTR to eliminate irregularity of electric charge removal. Since the area between positive charger 51 and AC charger 69 has a higher positive potential than other areas, removal of electric charge must be carried out twice to attain a uniform removal of charge.

STBY 1–4 means that after LSTR the drum stands still and is in the position of stand-by. Under the control of microcomputer, the position of stand-by varies from STBY1 to STBY4 with time (less than 30 sec.; less than 30 min. since power off; less than 5 hr. since power off; and more than 5 hr.). Start sequence varies depending upon the position in which STBY is when the copying start key is depressed.

When the copying start key is on (FIG. 8-2), the machine is in forward mode SCFW. In this position of the machine, the original illuminating lamp is switched on and the optical image of the original is projected on the photosensitive drum through mirrors and lens in synchronism with the peripheral speed of the drum. On the other hand, during SCFW, the movement of the copying paper is controlled by hall IC disposed along the optical rail in the manner described above. Reversal signal is produced by adding drum clock pulses coming after the issue of registration timing signal. In accordance with the cassette size used at that time, the reversal signal is issued from the microcomputer CPU.

During SCRV, that is, backward mode, the optical system is returned to its stop position at about two times higher speed than that in forward mode. In the case of continuous copy making, the original illuminating lamp 46 lights on again in reply to the signal coming from the hall element for controlling paper feeding in a backward mode.

In making the last one of the set number of copies, there is given an interval of 16 clocks (40 mm) from the arrival of the optical mirror at its home position to the beginning of LSTR. Upon the end of the interval of 16 clocks, AC charger is turned to the position of lower AC, other chargers are turned off and the developing roller is lowered for LSTR. The drum surface is made electrostatically clean.

In any of the above process modes, the copying start key may be switched on. But, depending upon the mode in which the start key is switched on, the copying operation starts in different manners which are as follows:

When the copying start key is turned on at any time point in the process mode ① shown in FIG. 8-1, all of the time modes up to control rotation 2 ($CR_2$) are always excuted and thereafter the optical system is allowed to start. Control of the surface potential is carried out four times for both of $V_L$ and $V_D$ and the level of bias voltage to be applied to the developing roller is determined by the control rotation 2 ($CR_2$).

When the start key is depressed in the mode ②, that is, during control rotation 2 ($CR_2$), the mode is transferred again to $CR_2$ and the level of bias to be applied to the developing roller is determined. Thereafter, the optical system is allowed to start.

In case that the copying start key is switched on during the post-rotation (LSTR) of mode ③, then LSTR is completed. After excuting INTR of 192 clocks (1.13 turns), the mode is transferred in $CR_2$. This is because there is need to gain a sufficient time enough to bring the developing roller into contact with the drum and to stabolize the light of the whole surface exposure lamp.

When the start key is turned on in mode ④, the pre-rotation (the same INTR as in mode ③) is carried out at once. Since only a very short time less than 30 seconds has passed since the end of the last copying, the potential control is carried out using the control value used for the last copying. No special correcting control is carried out in this case. But $CR_2$ is executed also in this case.

When the start key is switched on in mode ⑤, $CR_1$ and $CR_2$ are executed through INTR of 170 clocks. Namely, after two turns of the drum, the optical system is allowed to start. Surface potential control, that is, detection of $V_L$ and $V_D$ and correction of the values is carried out once.

When the start key is depressed in mode ⑥, the optical system is allowed to start after three rotations of the drum. Since a relatively long time has passed since the end of the last copying, surface potential control is carried out twice for both of $V_L$ and $V_D$.

When the start key is switched on in mode ⑦, there occurs the same process as in case 1.

Mode ⑧ means such case in which the machine cover is opened (MS1 and 2 are off) because of trouble of jamming during copying or in which the power switch SW2 is turned off during stand-by. In such case, if the power source switch is turned on within five hours since the power-off, then the drum is rotated three turns like ⑥. The copying start key is depressed before $CR_1$ and after the three rotations of the drum, the copying operation is allowed to start after $CR_2$. If man does not switch on the start key, the machine gets in the position of STBY through LSTR after $CR_2$.

Mode ⑨ is such case in which SW2 or MS1, 2 is switched on after a long time more than five hours has passed since the last copying. The process sequence in this case is the same as in the case of ①. If man does not push the copying start key, the mode becomes STBY through LSTR after $CR_2$.

If one turns on the power source switch SW2 and again turns on it before $CR_2$ in the case of ①, then the sequence begins with PRE-WET. If the power source switch SW2 is turned off and then turned on after LSTR, then the sequence is the same as any one of the cases ⑧ and ⑨.

When the power source switch is turned off during copying, the machine enters LSTR at once and the drum stops after LSTR.

Measurement of the above-mentioned time periods of 30 seconds, 30 minutes and 5 hours is carried out starting from the time point at which the drum stops rotating, irrespective of the stand-by and power source switches off. This time measurement is performed using the function of a long time timer working in accordance with the computer program made for the copying machine so long as the subswitch is not cut off. The above described controls are carried out in accordance with the time elasped in the timer when the start key and power source switch are reswitched on.

Mode ⑩ is the case in which the start key is switched on during the time of the optical system moving for the last copying being in any position between PF of forward movement and PF' of backward movement. In this case, the original illuminating lamp is put on at PF' in the course of optical mirror backward movement (original illuminating lamp lighting signal) and the next copying cycle can start immediately after the return of the optical mirror to its stop position. This is the same as in the case of continuous copying operation.

Mode ⑪ is such case in which the start key is switched on after the optical mirror moving backward for the last copying has already passed PF' and before it reaches the stop position. In this case, since PF' (original illuminating lamp lighting signal) has been already passed, 17 clocks are counted after the return of the optical mirror to the stop position. During the count of 17 clocks, the illumination lamp is put on and thereafter the next copying cycle is allowed to start.

Mode ⑫ is the case in which the start key is depressed during 16 clocks. In this case, the sequence proceeds at once in the same manner as in the above mode ⑪.

If man turns on the start key and the numeral keys before mode ⑩ (for the last copying), it is rejected by CPU. For the last copying, PF' does not come out as signal.

PROCESS TIMING

Figures 2, 9:
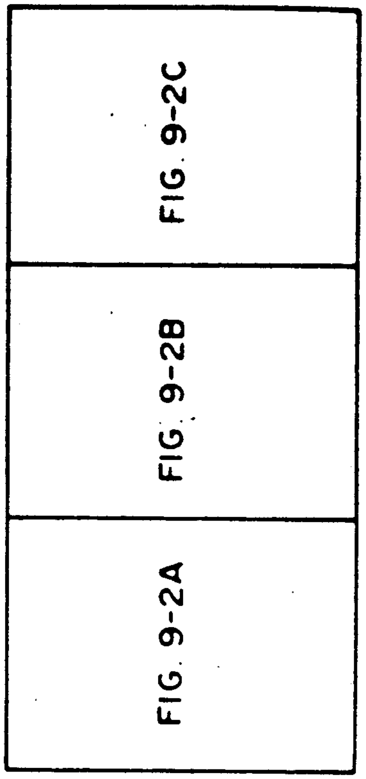
FIGS. 9-1A and 9-1B, and 9-2A, 9-2B and 9-2C are, when combined as shown in FIGS. 9-1 and 9-2, respectively, charts showing operation timing for the parts of the copying machine.
Figures 1, 9:
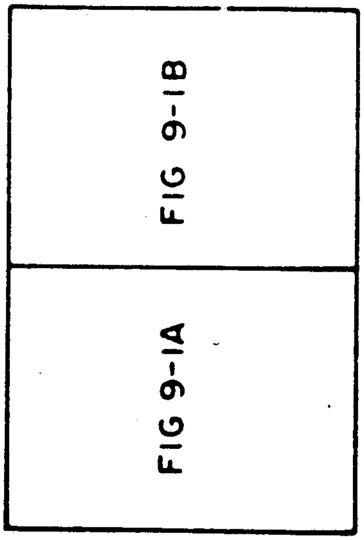
Figures 1A, 9:
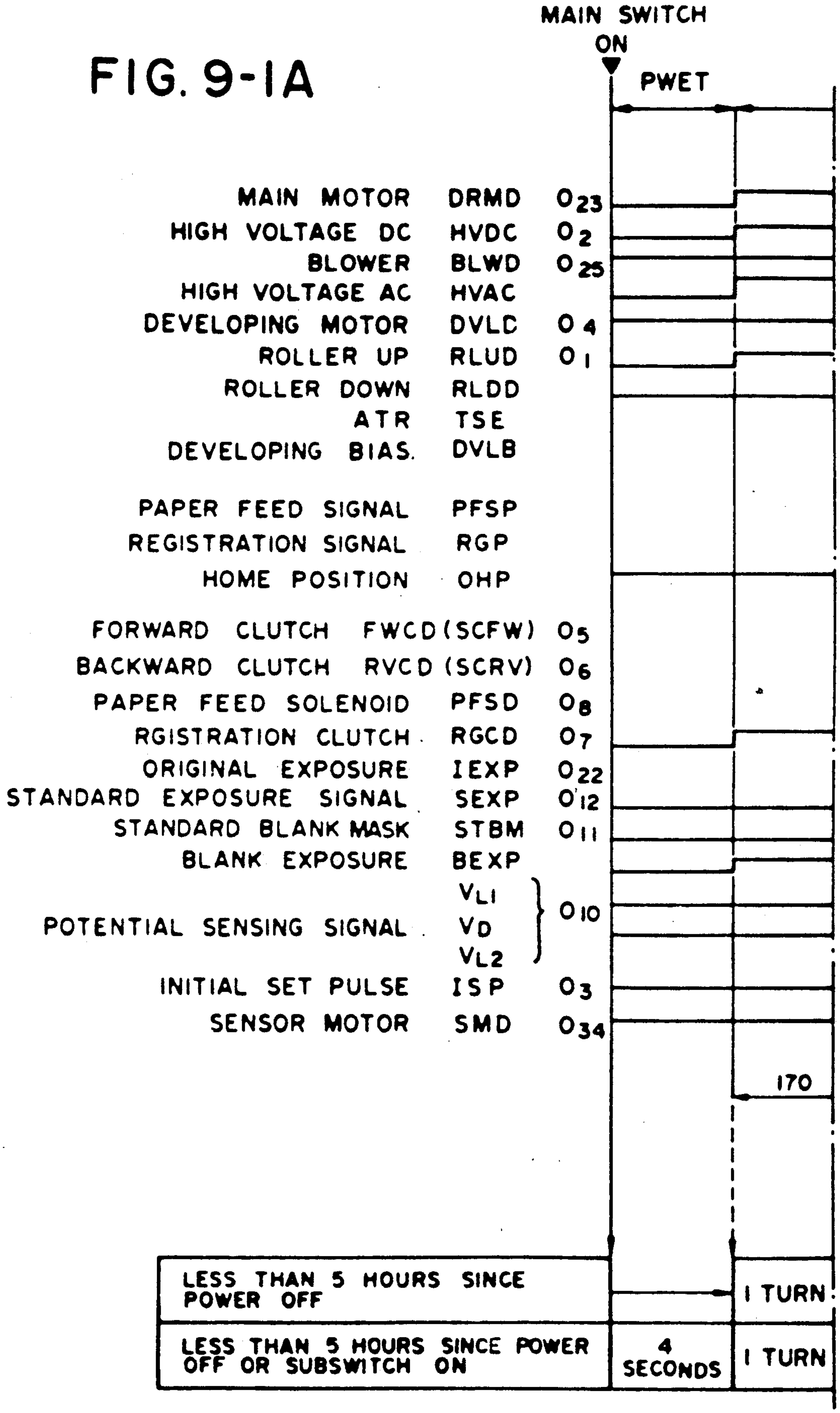
Figures 1B, 9:
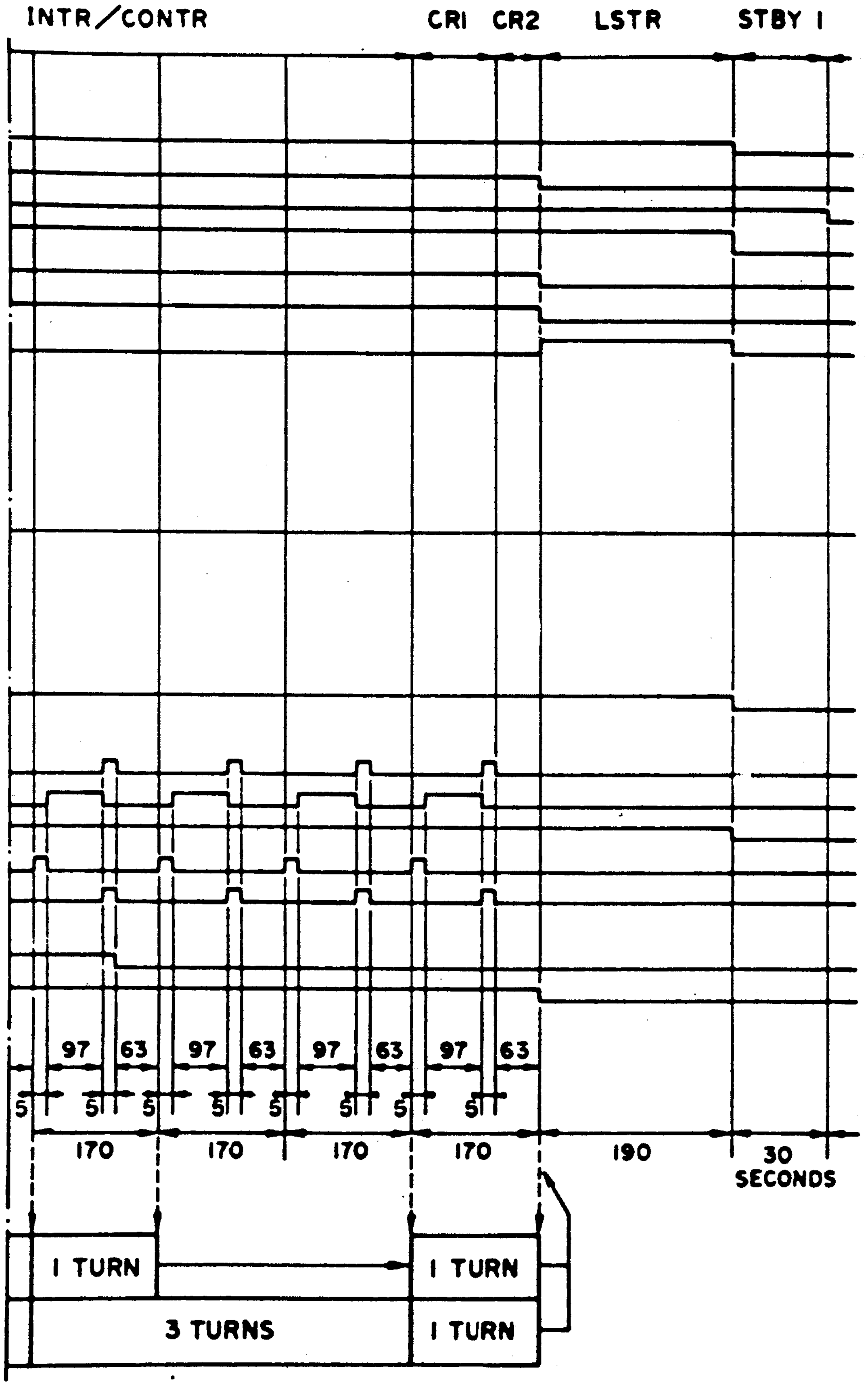

FIGS. 9-1A and 9-1B, and 9-2A, 9-2B and 9-2C are timing charts of operation for respective operation loads in the shown copying machine. Of the two timing charts, FIGS. 9-1A and 9-1B are that for the case in which the copy key is not turned on after the main switch being switched on and FIGS. 9-2A, 9-2B and 9-2C are for the case in which the copy key is turned on.

In the timing charts, DRMD stands for signal for driving the main motor, HVDC for signal used to make conductive a high voltage transformer to supply a voltage to the primary DC charger 51, pre-AC charger 50-2 and other chargers 61 and 42, HVAC for signal used to make conductive a transformer to supply a high voltage to the simultaneous AC charger 69, BLWD for signal used to drive the machine cooling blower F1 (56) and cooling fans F2 and F3, DVLD for signal used to drive the motor for stirring and pumping developer liquid, RLUD for signal used to move up and down the developing roller 65 and TSE stands for an ATR actuating signal which turns a liquid density detecting lamp on. DVLB is a signal for applying a bias voltage to the developing roller 65 and developing electrode. PF is paper feed position detecting signal coming from the Hall element HAL 2. RG indicates a registration position detecting signal coming from HAL. OHP denotes an optical system stop position detection signal coming from HAL 1. FWCD is a forward clutch turning-on signal and RVCD is a backward clutch turning-on signal. PFSD is a paper feeding solenoid actuating signal, RGCD a registration clutch actuating signal and IEXP is an original illuminating lamp turning-on signal. SEXP indicates a signal for setting the light quantity of the lamp 46 to the standard value. BEXP indicates a signal for turning on the blank lamps 70-1 through 5. STBM designates a signal for putting only the standard blank lamp 70-1 off. This signal determines the timing for detection of dark surface potential $V_D$ on the drum. $V_{L1}$, $V_D$ and $V_{L2}$ are potential sensing signals. ISP designates a pulse signal used for setting the chargers 51 and 69 to the initial voltages for stabilizing control of potentials. SMD indicates a signal for rotating the rotor of surface electrometer.

Numbers given in the timing charts are the numbers of drum pulses CL generated by the rotation of the main motor. On-off operation of the respective loads is effected by counting the number of CL by CPU. The number of pulses CL counted to change the operation of the load has been stored in ROM for every load.

All of the whole surface exposure lamp L1(68), pre-exposure lamp FL2(50-1), sharp cut lamp LA901(70-0) and blank exposure lamp LA906(70-5) (for B-format) are brought into operation in synchronism with the main motor driving signal.

During LSTR, the output of high-voltage transformer is reduced to about half of that in process. The blank exposure lamp LA906 (for A-format) and the remaining blank exposure lamps LA903-5 (70-2 to 70-4) operate in timing with BEXP signal.

The respective operations of parts of the copying machine are obvious in the timing charts and need not be further described. Symbol $0_{1-n}$ given in the timing charts indicates that signal is put out from the corresponding port of CPU in FIG. 10.

CONTROL CIRCUITRY

Figure 10A:
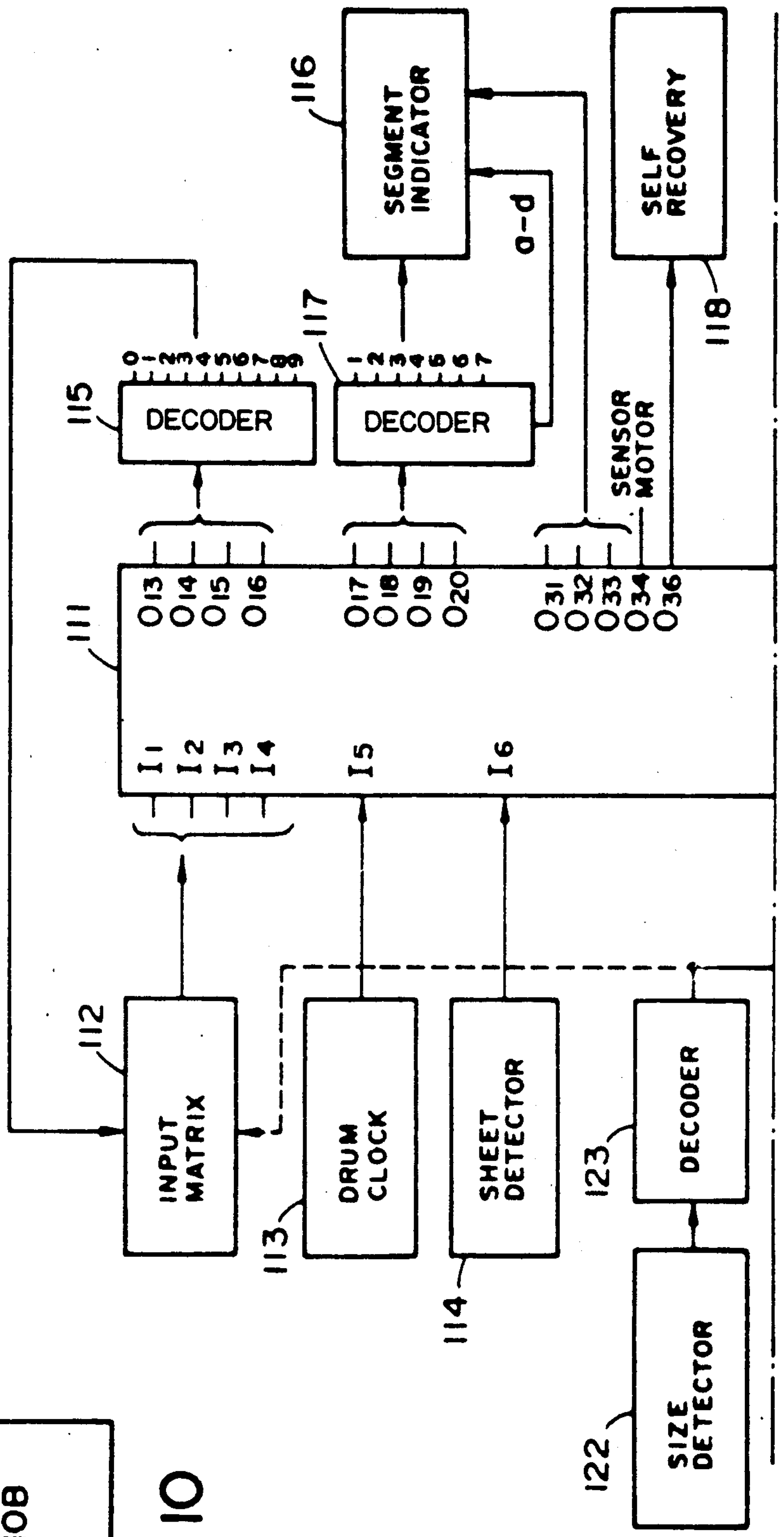
FIGS. 10A and 10B are, when combined as shown in FIG. 10, circuit block diagrams of the DC control part shown in FIG. 7.
Figure 10:
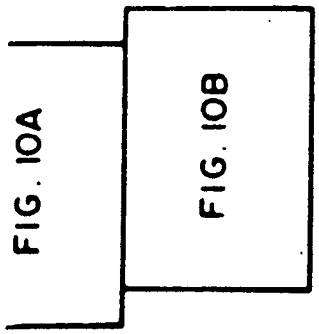

FIG. 10 is a circuit diagram of DC control part mentioned above. Designated by 111 is a central processing part CPU which receives the input signals introduced to the input terminals $I_1$ to $I_6$, processes them and issues necessary signals such as timing operation signals and indication signals from the output terminals $0_1$ to $0_{36}$. The CPU may be, for example, a one-chip semiconductor device of the computer. Numeral 112 denotes an input matrix which puts into the input ports $I_1$-$I_4$ various signals derived from the key operations at operation part and the detection operations of hall elements and the like. Numeral 115 denotes a decoder which puts out a probe signal (scanning signal) while decoding the signals from the output ports $0_{13}$-$0_{16}$. The probe signal is used to put in the input port one of input conditions at the matrix circuit 112. Designated by 113 is a pulse generator which generates a series of pulses in reply to the rotation of the main motor (drum rotation) and which puts the pulses into CPU to determine the driving timing for the respective loads.

Figures 1, 13:
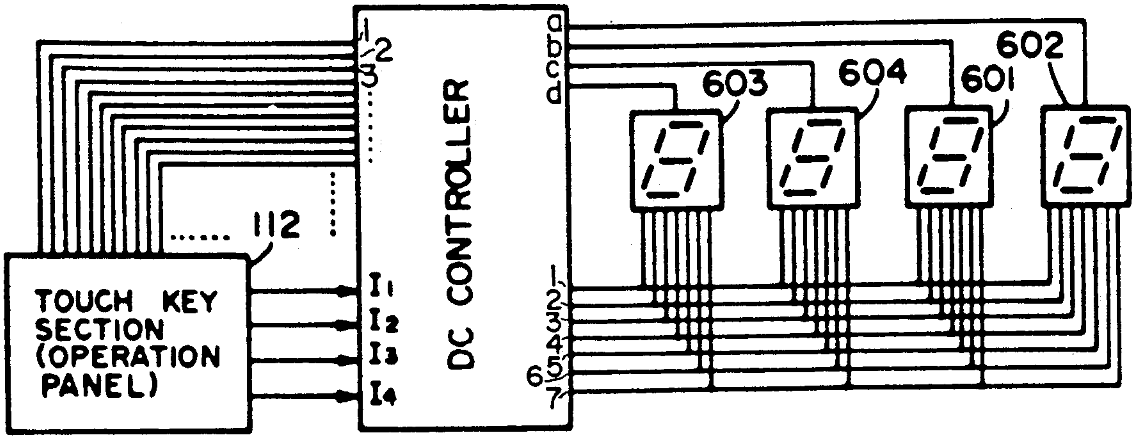
Figures 2, 13:
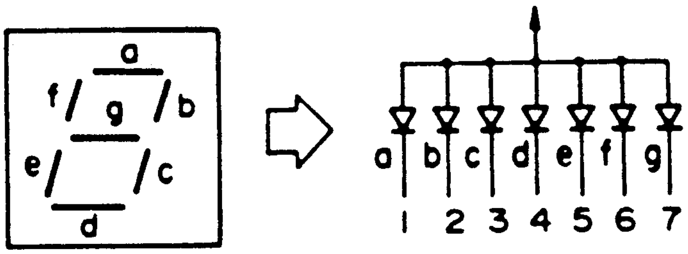
Figures 3, 13:
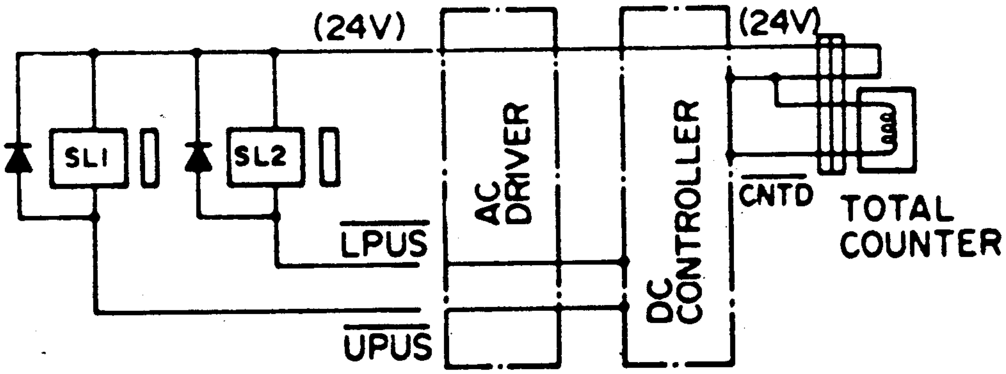
Figures 4, 13:
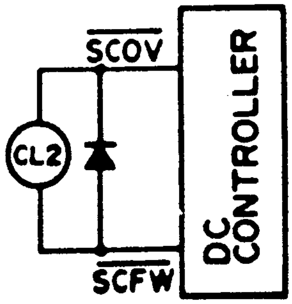

Reference numeral 114 designates a sheet detector which is actuated by the paper detection roller 36 and which puts into CPU 111 an operation signal for detecting sheet jammed. Numeral 116 indicates a 7-segment indicator (20, 22) which is connected to an indication decorder 117 to operate the segment LED of the respective digits. The decoder 117 is connected to the output ports $0_{17}$-$0_{20}$ and selects one of the segments of the indicator 116 so as to put it on according to one of the scanning signals a to d. The signals a to d are those pulses which are repeatedly put out in the direction of a→d for dynamically lighting up the indicator (FIG. 13-1). The indicator 116 is reset by the output ports $0_{31}$-$0_{33}$.

Designated by 118 is a self recovery circuit which monitors the operation of CPU 111. If it detects any abnormal operation of CPU, then it cuts off the power source to CPU and thereafter it makes the power source again automatically connected to CPU. Numeral 119 depicts an alarm indicator which operates with the output from the output ports $0_{24}$-$0_{29}$ and which indicates alarm mark such as "WAITE" on the operation panel. Numeral 120 represents a light control for controlling the light of original illuminating lamp 46 and correcting the rise of the lamp light. Numeral 121 represents a temperature control for controlling the operation of fixing heater and the temperature thereof. Numeral 122 depicts a cassette size detector and 123 does a decoder connected thereto. Numeral 124 indicates a size indicator, 125 a fan and blower actuating circuit, 126 a main motor actuating circuit, 127 an original illuminating lamp lighting circuit, 128 a cassette selection circuit, 129 a developing roller up-and-down circuit, and 130 a registration and paper feeding circuit. Numeral 131 denotes a forward and backward operation circuit, 132 a pre-exposure/whole surface exposure lamps lighting circuit, 133 a high voltage AC circuit, and 134 and 135 groups of input and output buffers.

In the copying machine, the number of sheets and the size of sheets are indicated by the indicator 116 in reply to the key input and during processing the number and indications initially indicated may be changed or maintained as necessary by the indicator. The indicator 119 gives information of conditions of the machine as alarm or the like. On-off timing of operation as shown in FIGS. 9-1A and 9-1B, and 9-2A, 9-2B and 9-2C is correctly maintained in accordance with data given by the key inputs and the fundamental timing pulses predetermined. Safety control and compensation control are suitably executed by 118, 120, 121 etc. However, it should be noted that the above-described control circuitry is only one form of various control circuits suitable for the copying machine according to the invention. Changes and modifications may be made by those skilled in the art.

When a microcomputer known in the art is used as the central processing part 111, it will contain usually therein ROM, RAM, INPUT, OUTPUT and MPU. For example, there may be used, as such a microcomputer, TMS 1200 supplied by Texas Instruments Incorporated, μCOM 43 by Nippon Electric Co., Ltd., and HMCS 45 by Hitachi Ltd.

ROM denotes a memory in which data of key input reading, indication sequences and process operation sequences have been coded and stored in the coded order. For example, the memory ROM stores the program sequences shown in the flow charts of FIG. 18—according to the binary code microprogramming system.

RAM represents a data memory which stores such data which the program memory itself possesses as well as input data such as the set number of copies to be made, the number of copies already made and the selected cassette.

INPUT designates a port for putting in key signals and detection signals. OUTPUT designates an output port for latching output signals.

MPU denotes a processing part functions as an accumulator and also as an ALU. As the accumulator, it stores temporarily data coming from the input ports and data going out to the output ports. As the ALU, it also can perform computing and logical judgement of data coming from ROM, RAM and input and output ports.

Input data are processed by executing the program sequences in ROM, taken up into ACC by particularly determined steps and advanced to the next step after logical judgement to control loads of copying operation.

Circuits for controlling the respective AC loads shown in FIG. 7 are described with reference to FIGS. 11-1 to 11-6, and 11-7A and 11-7B hereinafter.

ATMOSPHERE HEATER

Figures 1, 11:
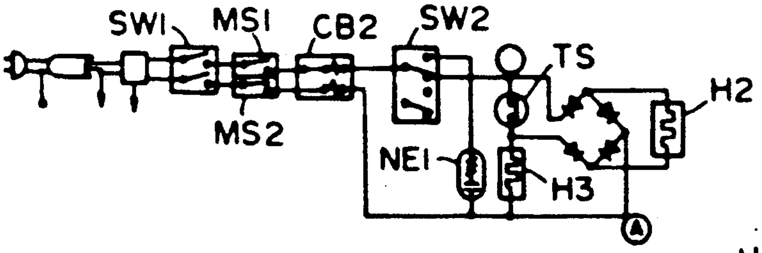
Figures 2, 11:
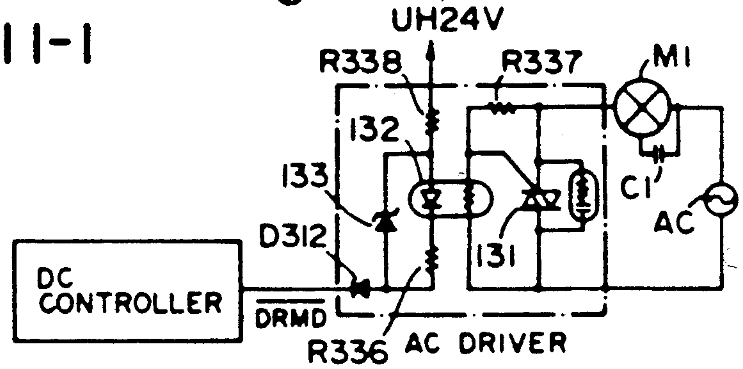
Figures 3, 11:
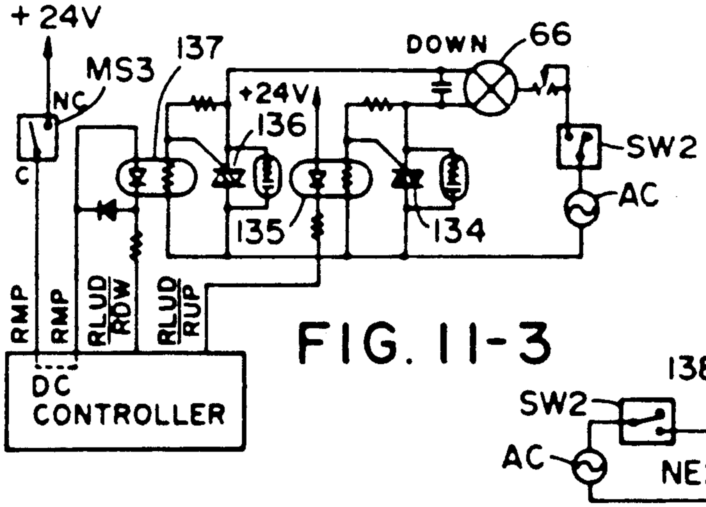
Figures 4, 11:
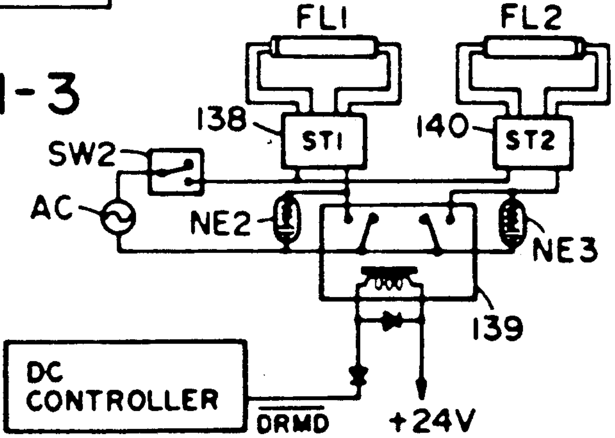
Figures 5, 11:
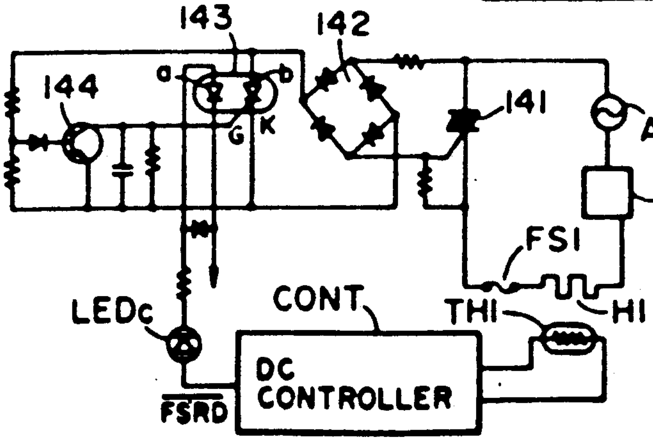
Figures 6, 11:
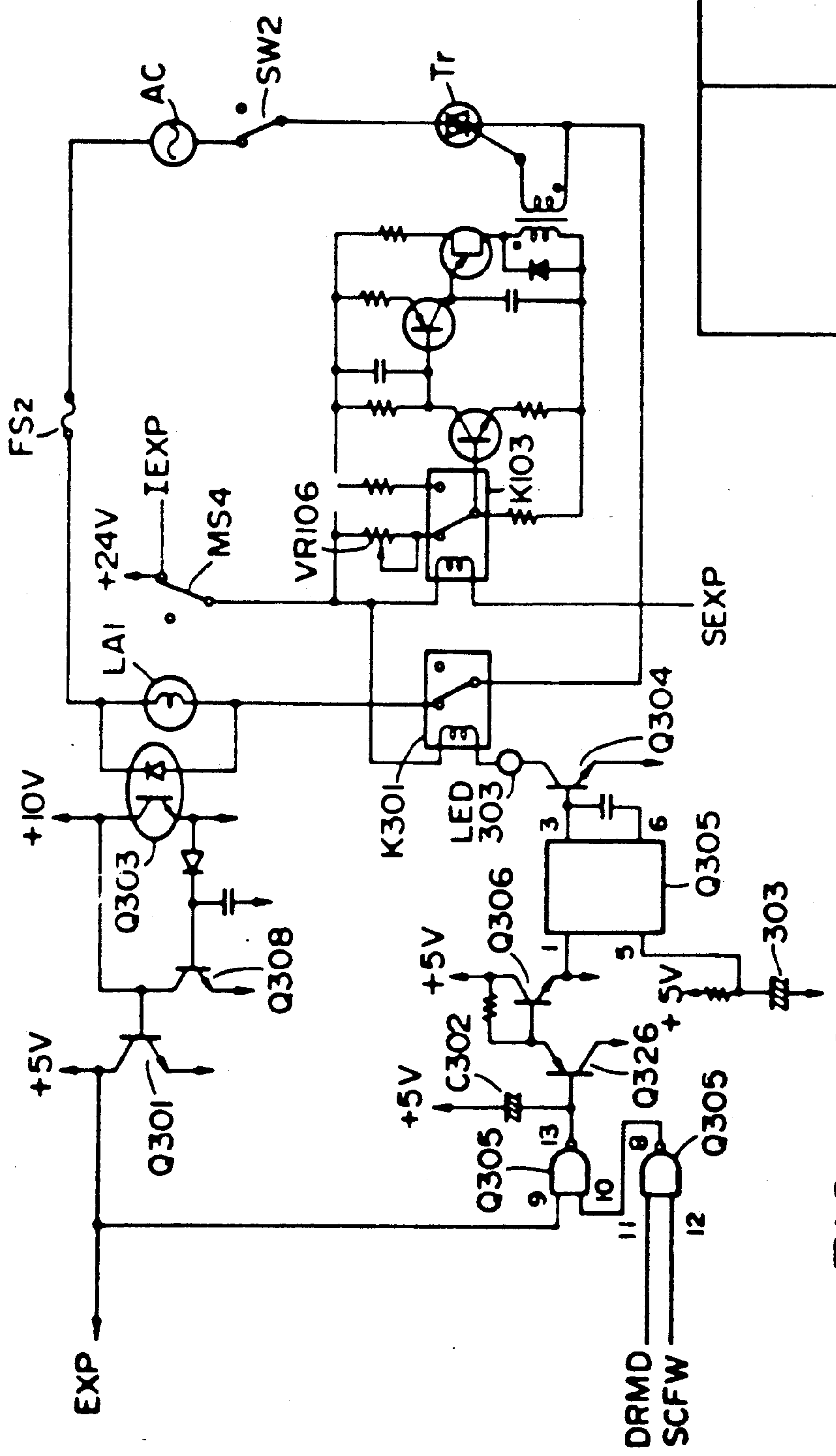
Figures 7, 11:
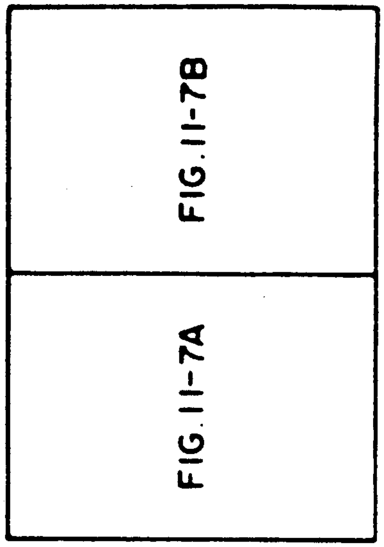

FIG. 11-1 is a circuit of atmosphere unit for preventing adverse affects of atmospheric conditions such as temperature and humidity on the characteristics of the photosensitive drum and developer. In other words, the atmosphere unit is provided to prevent adverse effects of atmosphere on the quality of image on copies obtained.

When all of subswitch SW1, door switch MS1, 2 and circuit breaker CB2 are on and the power source switch SW2 is off (in the drawing all of switches are off), and when the temperature is lower than 18° C., a full-wave rectified wave is applied to a drum heater H2 so as to turn the developing device heater on. On the contrary, when the temperature exceeds 18° C., a half-wave rectified wave is supplied so as to turn the developing device heater H3 off. As will be seen in the figure, the thermoswitch TS becomes on at the time of temperature being under 18° C. and becomes off over 18° C. In the shown embodiment, it is possible to control on-off of two different heaters in different modes to each other using a very simple circuit. NE1 indicates a neon lamp which lights on when the main switch SW is switched on.

MOTOR AND HIGH VOLTAGE TRANSFORMER

FIG. 11-2 shows a circuit for driving motors and transformers and the like.

Designated by 131 is a triac for making motor conductive and 132 a photo-coupler to trigger the triac. Reference numeral 133 represents a Zener diode for applying a constant voltage to the photo-coupler, which diode is used only when load is only the main motor.

When the output of DC controller (DRMD signal for the main motor) is "1", electric current flows into LED within the photo-coupler 132 so that LED emits light. Thereby, the resistance of CdS in the photo-coupler is reduced, which allows current to flow into the gate of the triac 131. As a result, the triac becomes conductive and, therefore, AC loads of the motor, transformer and the like get in operation. When the output from the control part is "0", there occurs an operation opposite to the above and therefore no load is brought into operation.

Similar circuits to the above are provided also for machine cooling fan FM1, heater cooling fan FM2, developer liquid cooling fan FM3, pump motor M802 and, pre-AC/pre-transfer/transfer high voltage transformer HVT1.

In the copying machine according to the present invention, the drum does not stop rotating even when the power source switch SW2(9) is switched off during the post-rotation of the drum. The power source is cut off after the drum has rotated the predetermined number of turns. Therefore, the power source of the main motor driving circuit has to be connected to a power source UH24 V (not voltage stabilized) which can not be cut off even when the power source switch is turned off. Other loads are connected to a stabilized +24 V power source. For the reason, a Zener diode 133 is interposed for the main motor.

TORQUE MOTOR

FIG. 11-3 shows a circuit of torque motor for controlling lifting and lowering of the developing lower.

Reference numeral 134 denotes a triac for rotating the torque motor 66 clockwise. Numeral 135 designates a photo-coupler to trigger triac 134. Another triac 136 rotates the torque motor counter-clockwise and it is triggered by another photo-coupler 137. RLUD indicates a control signal for moving the developing roller upward and downward. The control signal is issued from CPU 111. MS3 indicates a switch located at the position which the developing roller takes when lowered. The switch is turned off when the developing roller reaches the given lower position.

The manner of operation of the above described copying machine is as follows:

When the drum begins pre-rotation, CPU 111 makes RLUD "1", photo-coupler 135 on, triac 134 on and rotates the torque motor clockwise. The developing roller is lifted up to the position in which the developing roller comes into contact with the drum surface. During this upward movement of the developing roller, the contact of switch MS3 changes into NC.

When the developing roller gets in contact with the drum with a certain predetermined contact-pressure, the developing roller stops moving. But, the torque motor continues to be on. Thus, the torque motor slips while pressing the developing roller against the drum surface with a constant pressure. This has a good effect on developing and squeezing described above.

When the copying comes to end and the drum begins post-rotation, RLUD becomes "0" and the thyristor 135 is turned off. Instead, another thyristor 137 is turned on so that the torque motor starts rotating counter-clockwise to lower the developing roller. When the developing roller reaches its lower rest position, switch MS3 is switched off as mentioned above and shown in the drawing. Thereby, the thyristor 137 and triac 136 are turned off. Now, the torque motor stops rotating and the developing roller stands still in the position under its own weight.

If the main switch SW2 is switched off as shown in the drawing, then the developing roller will begin moving downward even when it is in the course of upward movement. The developing roller is, in this case, lowered to the position of switch MS3 by its own weight and it stops at the position. This brings forth a particular advantage in particular when the operator interrupts copying for any reason and allows it stand as it was. Since, in such case, the developing roller moves aparts from the drum surface downward as mentioned above, deformation of the developing roller caused by the contact with the drum under pressure during standing can be prevented. Also this serves to prevent the drum surface from being made dirty by the developing roller.

ATR

Detection control regarding developer liquid is described hereinunder.

A float having a magnet attached thereto is placed on the level of liquid in the developer container having a lead switch MS 802. When the liquid level lowers and therefore the float lowers under a predetermined limit, the lead switch responds to the shift of the float. A liquid empty signal LEP is delivered to the input port. This makes liquid supply indicator on the operation panel light up and the start of the next copying cycle of a repeating copying operation is stopped.

Above the developer container there is a lamp and at the bottom of the container there is placed CdS so as to detect the concentration of liquid flowing between the lamp and CdS. When the quantity of light received on CdS exceeds the first limit level predetermined, toner solution is supplied to the container in conformity with supply timing TSE (FIG. 9-2A) and the checking LED provided in the machine is put on. TSE is put out continuously for a long time during which CPU counts 388 drum pulses from the signal PF.

When the received quantity of light further exceeds the second limit level, the supply toner solution is regarded as emptied. In this case, toner supply indicator on the panel is put on and also checking LED is lighted on. It is possible to make CdS control lighting in synchronism with DVLD signal of developing device motor.

Bias voltage applied to the developing roller (metal 102) is changed in three ways. When the drum is standing still, the developing roller is connected to ground (GND) to prevent adhesion of tonner on the roller. In this time, the roller is in its lowered position and therefore the connection to ground has a significant meaning. When the drum is rotating but no copying operation is proceeding, −75 V is applied to the developing roller. This is because the first made copy is apt to get too thickened. During copying operation (DVLB in FIG. 9-2) there is applied to the developing roller a bias voltage equal to drum surface potential plus +50 V to prevent fogging. Operation timing of DVLB is changed so as to always correspond to developing operation by changing the number of clocks counted depending upon the copy size detected by a size detector as later described. The drum surface potential can be detected by probe 67 during pre-rotation in the manner previously described.

PRE-EXPOSURE/WHOLE SURFACE EXPOSURE LAMP

In FIG. 11-4, the whole surface exposure lamp FL1 and preexposure lamp FL2 are lighted on by stabilizers 138 and 140 respectively. Numeral 138 indicates a relay for actuating the stabilizers. When the power source switch SW2 is turned on and the control signal DRMD for driving the main motor is "1", the relay 139 becomes on and its contact is switched to its on side so that the lamps are lighted through the stabilizers 138 and 140. When DRMD is "0", the lamps are switched off. NE2 and 3 indicate neon lamps.

FIXING HEATER

FIG. 11-5 shows a circuit for energizing the heater provided within the fixing roller 37.

Designated by TH1 is a thermistor provided on the backside of a heating plate 38. H1 denotes a nichrome heater, FS1 a temperature fuse, 142 a triac for switching the heater H1, 142 a rectifier for all-wave rectifying AC source voltage and 143 a photo-coupler composed of photo thyristor b which becomes on when it receives light of LEDa.

Numeral 144 denotes a transistor whose collector is connected to gate G of the photo thyristor b. Numeral 145 denotes a level shifting diode, 146 a diode for preventing backflow, and FSRD a signal from the temperature control circuit which is "1" when the detected temperature is lower than 175° C. and is "0" when above 175° C. LEDc designates a light emission diode for indicating the state of the signal.

When the heater surface temperature is lower than 175° C., LED is lighted on by signal FSRD being "1" and LEDa of the photo-coupler also lights on. Thereby, gate signal of thyristor b is generated. However, if the transistor 144 is on, then the thyristor does not become on since the gate of thyristor b drops to 0 volt. When the transistor is off, the gate is cut off from 0 V line and therefore the thyristor can become on at or near 0 volt of AC sine wave (by threshold voltage of the transistor). This serves to minimize electric noise generated when the power source of the heater is switched on or off. With the thyristor 143 being turned on, current flows in the route of source AC→R321→D307-A→Q311→D307-C→R322→FS1→H1→source AC. Triac 141 becomes on and therefore the fixing heater H1 also becomes on.

Figures 1, 16:
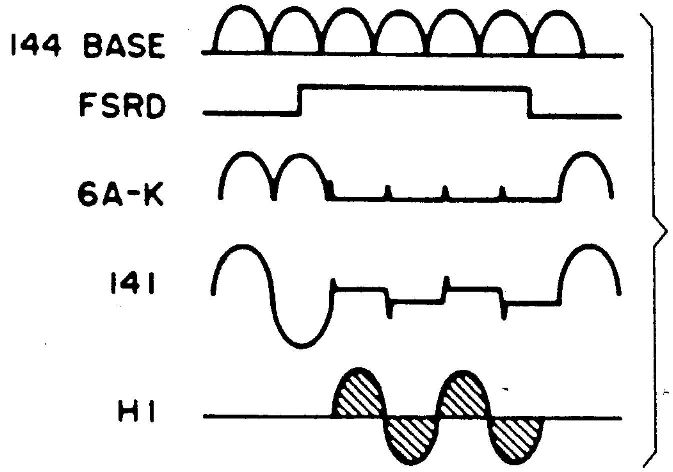
Figures 2, 16:
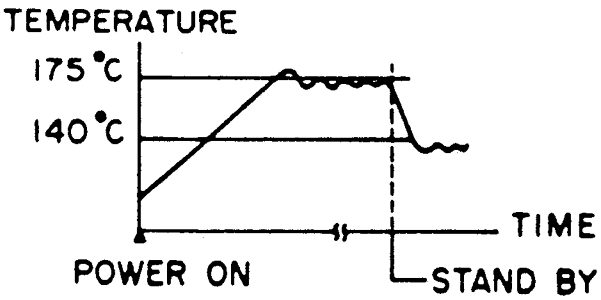
Figures 3, 16:
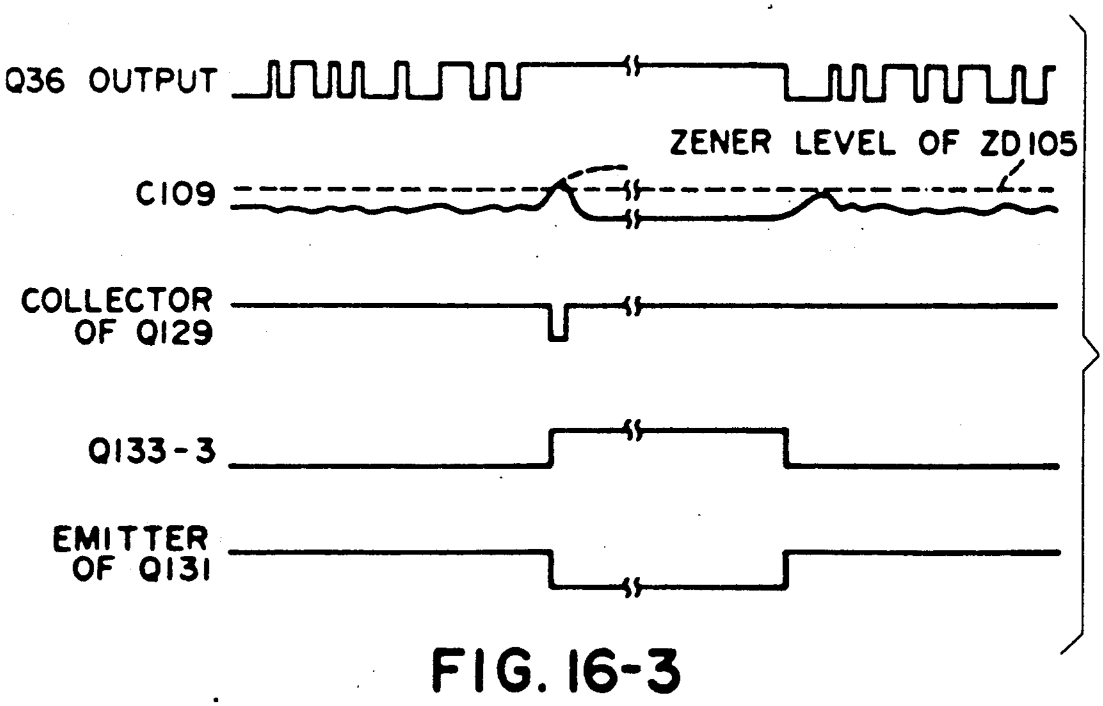

When the heater temperature is above 175° C., signal FSRD is 0. Therefore, there occurs operation proceeding in the opposite direction to the above and the heater becomes off. Characteristic curves of these operations are shown in FIG. 16-1.

Figures 1, 12:
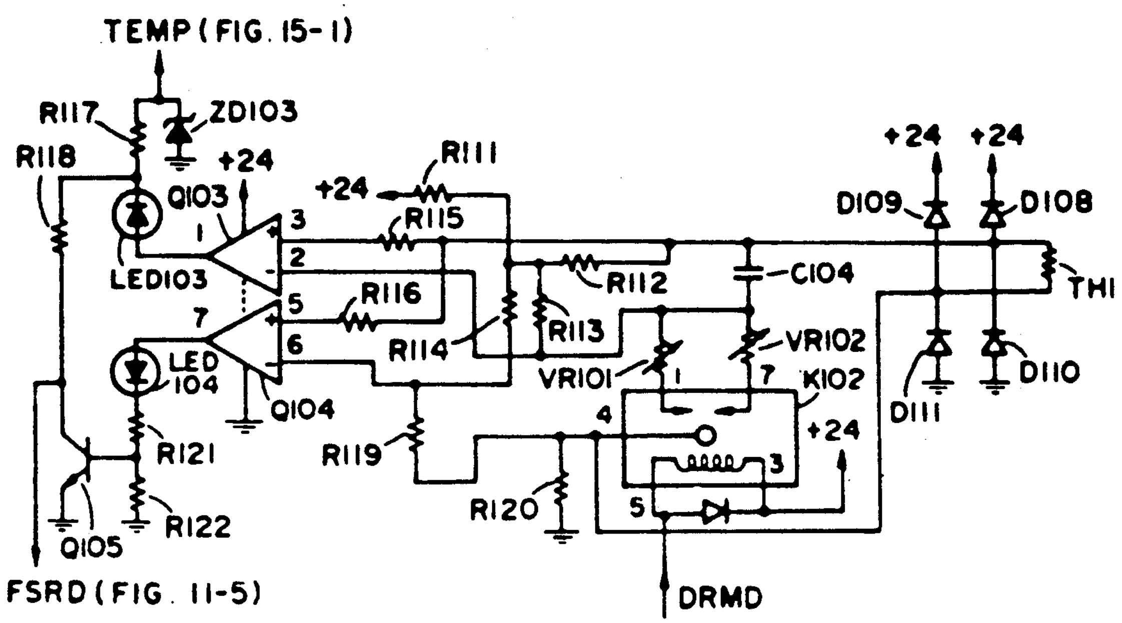
Figures 4, 12:
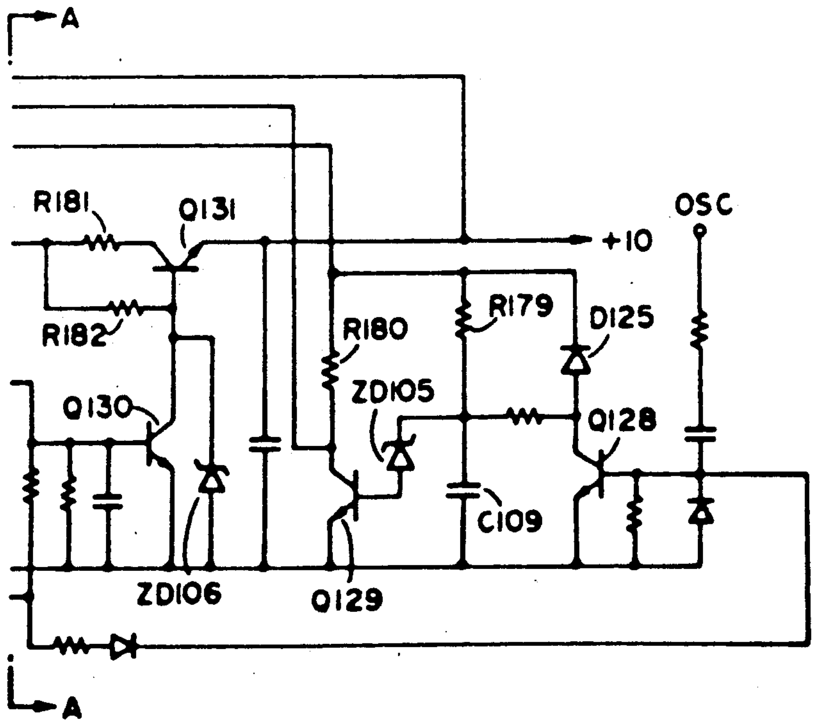
Figures 2, 12:
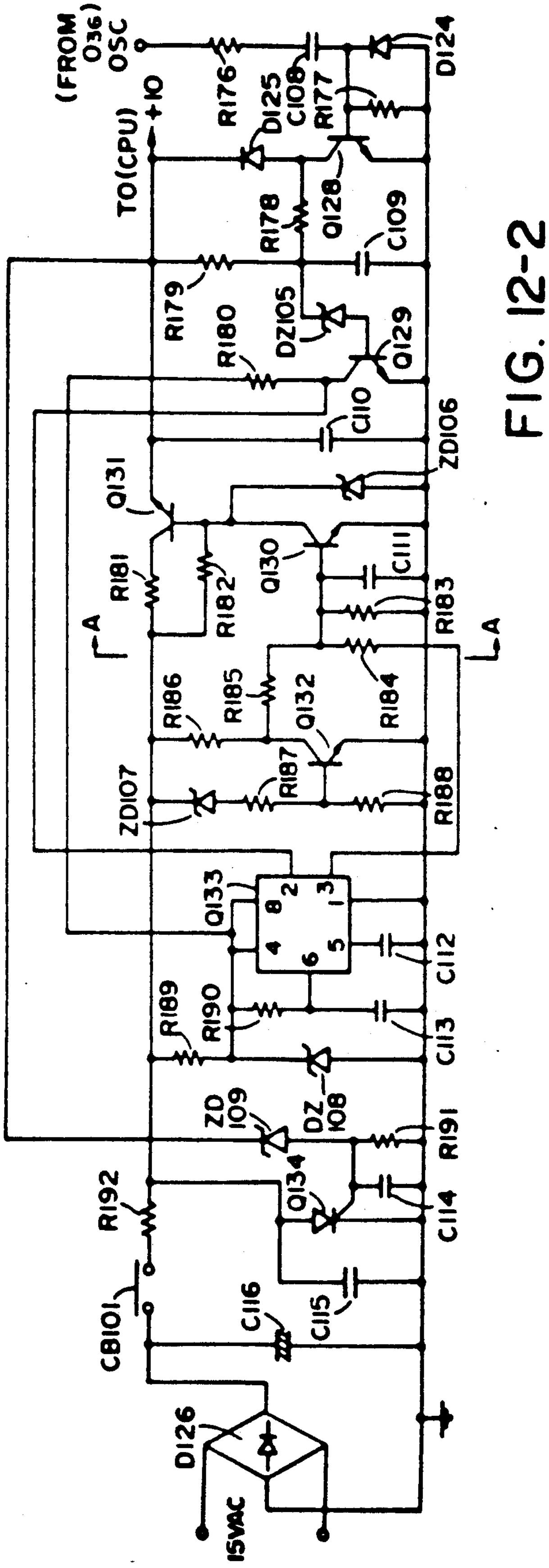
Figures 3, 12:
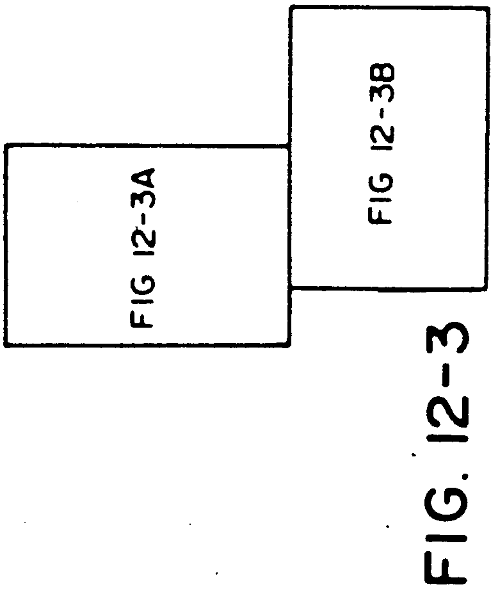

As described above, the surface temperature of fixing heater H1 is usually kept at 175° C. under the control of thermistor TH1 and DC controller. However, during stand-by and during jamming, for the purpose of saving electric power, the controlled temperature is switched down to 140° C. by a relay K102 provided in DC controller as shown in FIG. 12-1. Therefore, in this case, FSDR becomes 0 at the temperature of 140° C. to 175° C. When FSRD is "0", signal TEMP is introduced into CPU to make the indicator 23 flicker. But, in this embodiment, key entry and copying are allowed even when flickering. It is also possible to make copying unable when the temperature is below 140° C. By turning the main switch SW2 off (this position is shown in figure), the electric current to the heater H1 is cut off.

TEMPERATURE CONTROL AND SAFETY CIRCUIT

FIG. 12-1 shows a circuit for controlling fixing heater temperature and alarming breaking of wire.

K102 denotes a relay for switching set temperature of heater, VR101 a variable resistance for setting the temperature to 175° C., and VR102 a variable resistance for setting it to 140° C. These resistances constitute, together with TH1, R112 and R113, a bridge. Q103 denotes an operational amplifier for putting out signal FSRD, and Q104 an operational amplifier which issues an output when wire breaking of thermistor TH1 is detected. Occurrences of FSRD and wire breaking are indicated by the indicators LED 103 and 104 respectively. When the drum rotation signal DRMD is "1", the relay K102 is in the position shown in the drawing. In this position, the relay controls on-off of the operational amplifier Q103 on the basis of 175° C. so as to keep the temperature of heater H1 at 175° C. When signal DRMD of TH1 is "0", the contact of relay K102 is switched to set the temperature to 140° C. This characteristic curve is shown in FIG. 16-2.

If a wire breaking occurs in the thermistor TH1, the bridge including R114, 119 as elements gets unbalanced so that the operational amplifier Q104 is turned on. Transistor Q105 is turned on and FSRD becomes "0". Therefore, current to the heater H1 is cut off and trouble of overheat can be prevented.

ORIGINAL ILLUMINATING LAMP LIGHTING CIRCUIT

FIG. 11-6 shows a circuit for lighting the original illuminating lamp 43 and controlling the light of the lamp.

K301 designates a relay which cuts off the current to the lamp LA1 (43) when it is wrong. Signal "1" of timing output IEXP (cf. time charts in FIG. 9) from DC controller broughts the triac into operation to light the lamp.

In the shown apparatus, the density of copy is adjusted by changing the quantity of light emitted from the lamp LA1. To this end, there is provided a light control circuit which changes the quantity of light by controlling the phase of flow of current through the triac depending upon the shift (VR106) of density lever 30.

Also, for the purpose of safety, control is done in such manner that the original illuminating lamp is turned off whenever it gets in any of the following positions:

(1) When the lamp is on although the drum stands still.

(2) When the optical system forward clutch does not operate good after lighting of the lamp.

(3) When the forward clutch does not stop operating and fails to reverse the movement of the optical system (this trouble can be detected by the overrun detecting microswitch MS4).

(4) When any of the above abnormal positions could not be detected and the temperature around the lamp begins rising up abnormally (this trouble can be detected by temperature fuse FS2 which breaks fusing at 169° C.).

When the relay is in the position shown in the drawing, it makes the lever resistance VR106 control the quantity of light. When the relay is in the opposite position to the above, the quantity of light is adjusted to the same level as in the case of lever being 5. Using the standard exposure signal SEXP, light in this quantity of 5 is projected to the standard white plate and potential of light part (on the photosensitive drum) then produced is measured. Depending upon the measured value, bias voltage to be applied to the developing roller is determined so as to obtain the optimum developed image.

LAMP CHECK

Lamp checking operation is described with reference to FIG. 11-6.

When lamp-on signal IEXP from CPU is "0", 724 V is connected to ground and trigger signal to triac Tr is turned off to put the lamp LA1 off. Photo-coupler Q303 is turned off, Q302 is off, Q301 is on and exposure signal EXP is turned to "0". At this time, relay K301 remains out of operation. But, if lamp LA1 continues lighting, EXP is turned to "1" and Q301 is turned off. The output at 9 of Q305 becomes "1". On the other hand, drum drive signal DRMD becomes "0" and at the time of stopping of drum the output at 8 of Q305 becomes "1". As a result, output at 13 of Q305 becomes "0" and charging to C302 begins. Two seconds after that, Q306 is turned on and Q306 off. Flip-flop Q305 becomes "0" at port 1 and issues "1" from its output 3. Thereby Q304 is turned on and relay K301 on so that lamp LA1 is switched off. In this manner, when the lamp LA1 continues lighting at the time of the drum being standing still, the line to the lamp is forcedly cut off.

Normally, the optical system starts moving forward about one second after the lighting of the lamp. If no forward signal comes out even after two seconds' waiting time, the line to the lamp is cut off also in the same manner as above. Since the output at 8 of Q305 becomes "1" even when SCFW is "0", C302 is charged by exposure signal in the same manner as above and relay K301 is switched on two seconds after the start of charging. If SCFW becomes "1" within 2 seconds, then Q326 is turned on to discharge C302. Therefore, in this case, relay K does not operate.

By switching off the source switch SW2 after actuation of relay K 301 (as shown in Figure) the circuit can be reset. When the power source is connected again, Q305-5 continues to be "0" until charging to C303 finishes. Since the flip-flop is reset (Q305-5 is 0) at this time, Q304 and K301 are turned off so that relighting of the lamp becomes possible.

RECIPRO OVERRUN

When the optical system continues running forward beyond the reversal point and turns on the overrun detecting microswitch MS4, the latter operates in the opposite direction to that shown in the drawing and cuts off the power source line to the light control circuit for the original illuminating lamp. At the same time, the power line to the forward clutch CL2 is also cut off (FIG. 13-4). Preferably, MS4 is mounted on the end part of optical rail out of the overrun area.

Rising illumination of the lamp LA1 can be improved by providing such circuit in the light control circuit which makes triac Tr conductive to all waves of AC for about one second after the commencement of lighting of the lamp irrespective of the phase determined by VR106 and which returns to the phase set by VR106 after the elapse of said one second.

In the shown embodiment, voltage applied to the lamp must be changed through the steps of initial full power→power of light quantity 5→lever preset quantity. During repeating copying operation, full power-on can be made by the signal of HAL2' and changing to preset quantity can be made by the signal of HAL1.

Turning-on of MS4 makes the level "1" signal (stabilized at 154 in FIG. 15-6) turn on the driver 156 through gate 155. Thereby the relay K101 is actuated to light the jam indicator 15 on. The relay K101 is reset by switching the reset switch SW3 on manually after turning off of main switch SW2 and +24 V. When the main switch SW2 is switched on again, the backward clutch becomes on and continues to be on until the optical system reaches its stop position (until signal OHP). Thus, returning of the optical system to its starting position can be effected. It is also possible to actuate the backward clutch by on-off of the main switch SW2 without turning SW3 on.

POTENTIAL CONTROL $V_{L1}$, $V_D$ and $V_{L2}$ shown in FIG. 9 represent surface potential sensing timing signals. These signals are put out from the output port $0_{10}$.

A sensor motor provided in the potential sensing device rotates the rotor during the time of pre-rotation and chops the detected potentials. $V_{L1}$ and $V_D$ are used to sense such drum surface potential produced by on-off of the standard blank exposure lamp 70-1 (other blank lamps are lighting). Signal $V_{L2}$ is used to sense such drum surface potential produced by setting the exposure lamp LA1 to level 5 automatically (by signal SEXP) and exposing a standard white pattern 25 (FIG. 3) formed thereby. The exposure lamp LA1 puts light on when the copy key is depressed. After sensing, the illumination level is automatically returned to the level set by the lever 30 (FIG. 2). Then, scanning of original is started. The sensed light part potential and dark part potential by $V_{L1}$ and $V_D$ are compared with the predetermined reference values respectively and signals $V_p$ and VAC (FIG. 11-7) are issued. Signals $V_p$ and VAC are those signals which makes the potentials approach the respective aimed values determined by considering the differences between the detected values and reference values and also factors such as characteristics of photosensitive drum.

In FIG. 11-7, symbol Tc1 designates a DC-DC inverter for applying a high voltage DC to the primary charger 51 and ACS is a DC-DC inverter for applying a high voltage AC to the secondary charger 69. Tc2 represents a DC-DC inverter for superposing a DC component on the current of the charger 69 and keeping the superposed current constant. REC indicates a circuit for detecting DC component of corona current. AMP1 and AMP2 denote amplifiers for controlling the outputs of TC1 and TC2 using high voltage DC timing signal HVDC and high voltage AC timing signal HVAC together with the above described signals $V_p$ and VAC respectively. At the time of generation of HVDC, the corona charger 51 is discharged by an output voltage of TC1 determined depending upon the control signal $V_p$ which makes the primary corona approach to an aimed value. Also, at the time of generation of HVAC, the corona charger 69 is discharged by the output voltage of inverter ACS superposed by the output of TC2. The output voltage by which the corona charger 69 is made discharge, is determined by the above mentioned control signal VAC which sets DC component of the secondary corona to an aimed value. Corona current detected by resistance $R_{12}$ in TC2 is controlled by REC with respect of its DC component only in such manner that the DC component can be constant while comparing it with a predetermined value and then it is fed back to AFP2 through $Q_7$. In the same manner, the first corona current is detected by resistance $R_{11}$ in TC1, controlled and fed back to TC1 through $Q_5$ so as to make it constant. Thus, surface potential and discharge current are constant controlled together.

Signal ISP shown in FIG. 9-1A is a signal which sets $V_p$ and VAP for effecting initial discharging of the primary and secondary chargers each at a constant voltage prior to potential detection. Pre-rotation is repeated several turns and sensing and controlling of surface potential are repeated several times during this pre-rotation so as to make the surface potential approach to the aimed value as much as possible.

LIM 1 and 2 shown in FIG. 11-7 denote limiter circuits for lighting LED 30 and 31 on when $V_p$ and VAC are excessive in voltage and setting them to voltages determined by $VR_{30}$ and $VR_{31}$ respectively.

POWER SOURCE CIRCUIT

Figure 14:
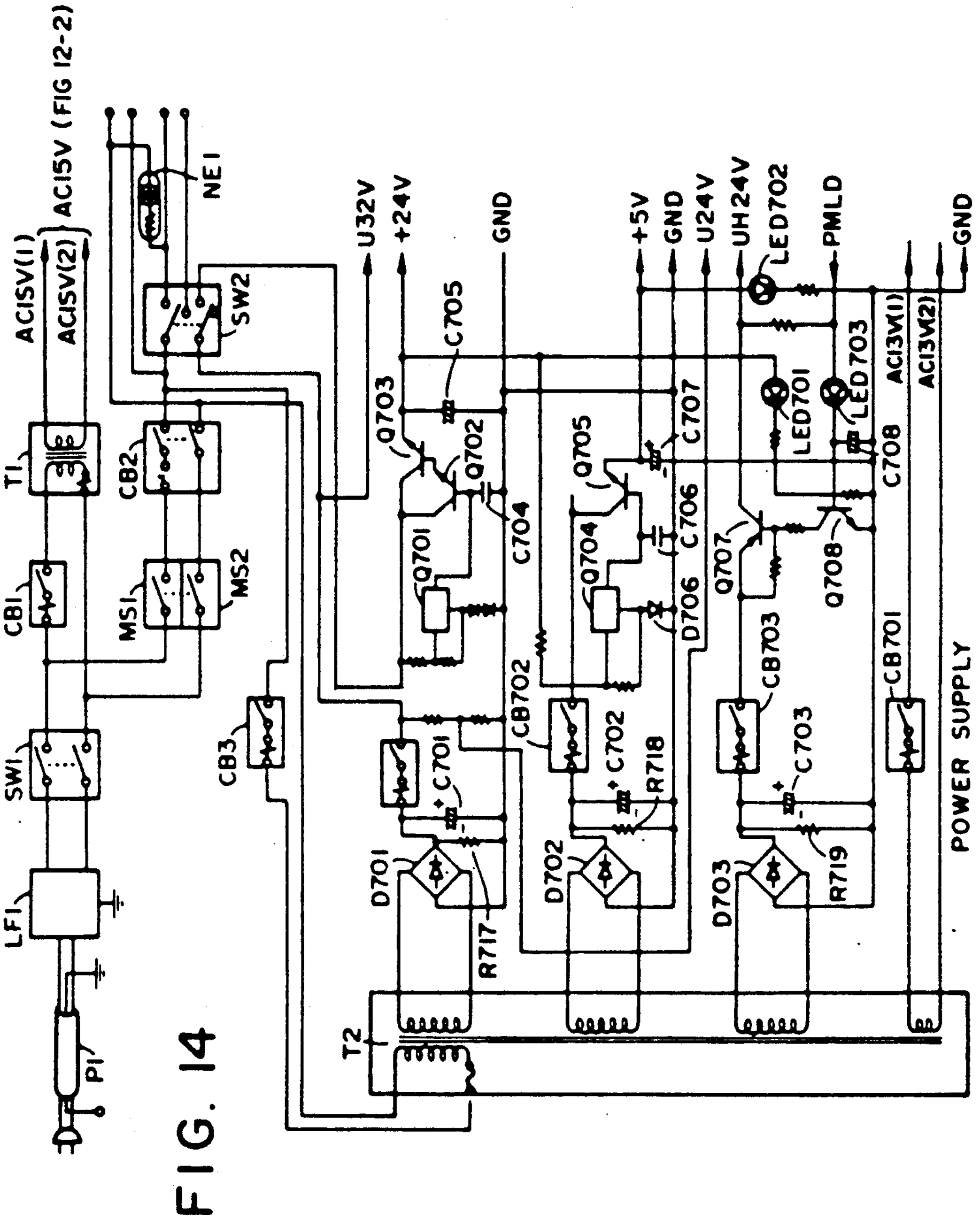
FIG. 14 shows a power source circuit.

FIG. 14 shows a circuit of power source as used in FIG. 7. 15 VAC issues 15 volts AC which was transformed only in voltage by transformer T1. This power source is transformed into 10 volts DC in the DC controller and then it is used as power source for microcomputer. Supply of power from this power source continues unless subswitch SW1 is turned off or power source plug P1 is drawn out. Denoted by +24 VDC is 24 volts direct current completely stabilized after rectification. When SW2 is turned off, its supply is cut off.

Denoted by +5 VDC is volts direct current completely stabilized after rectified. Since it receives input signal of Q704 from +24 VDC, supply of this current is cut off by switching off the power source switch SW2.

Designated by U32 V is 32 volts direct current only transformed and rectified without stabilization. It includes many ripple and its supply is not cut off only by turning the power switch off.

UH24 V denotes 24 volts direct current passed through a simple stabilizing circuit after rectification, which includes some ripple (voltage variation of about +5%). The supply of this current can continue even when the supply of +24 VDC is cut off by power switch off so long as PHLD (DRMD) is "1". It is cut off only when PHLD is "0".

Denoted by 13 VAC is 13 volts alternate current only transformed by transformer T2. It is not cut off only by power switch off.

Denoted by D701 to D704 are full-wave rectifiers, C701 to 703 smoothing condensers, Q701 to 708 elements constituting a known stabilizing circuit, and LED701 to 703 light emitting diodes for monitoring output state and PHLD. PHLD designates a signal generated synchronously with drum drive signal DRMD and PHLD is "1" when DRMD is "1". This serves to complete the post-rotation of the drum using UH24 V even when power source switch SW2 is switched off during post-rotation.

SELF CHECKING CIRCUIT

FIG. 12-2 shows a checking circuit for checking the operational state of CPU 111.

Designated by Q133 is a timer which starts operating when the input to the port 2 is "1" and which puts out level "1" from port 1 during its timing operation. Designated by Q130 is a transistor which is turned on by timer output. Represented by Q131 is a transistor for switching off +10 V computer power source. Represented by Q134 is a thyristor for shorting +10 V input line.

Since usually pulse signal OSC is issued repeatingly from CPU, timer is not brought into operation even when the transistor Q129 is on. When come-out of the pulse stops, Q129 is turned off and timing operation is started. Therefore, +10 V line is cut off by Q131. By time up after that turn-off, Q131 is again turned on. Thyristor Q134 becomes on through Zener-diode ZD109 when +10 V is excessive and it cuts off output.

Sequence and selfchecking operation of CPU are described in detail with reference to FIGS. 12-2 and 18-11A and 18-11B.

Figures 1, 18:
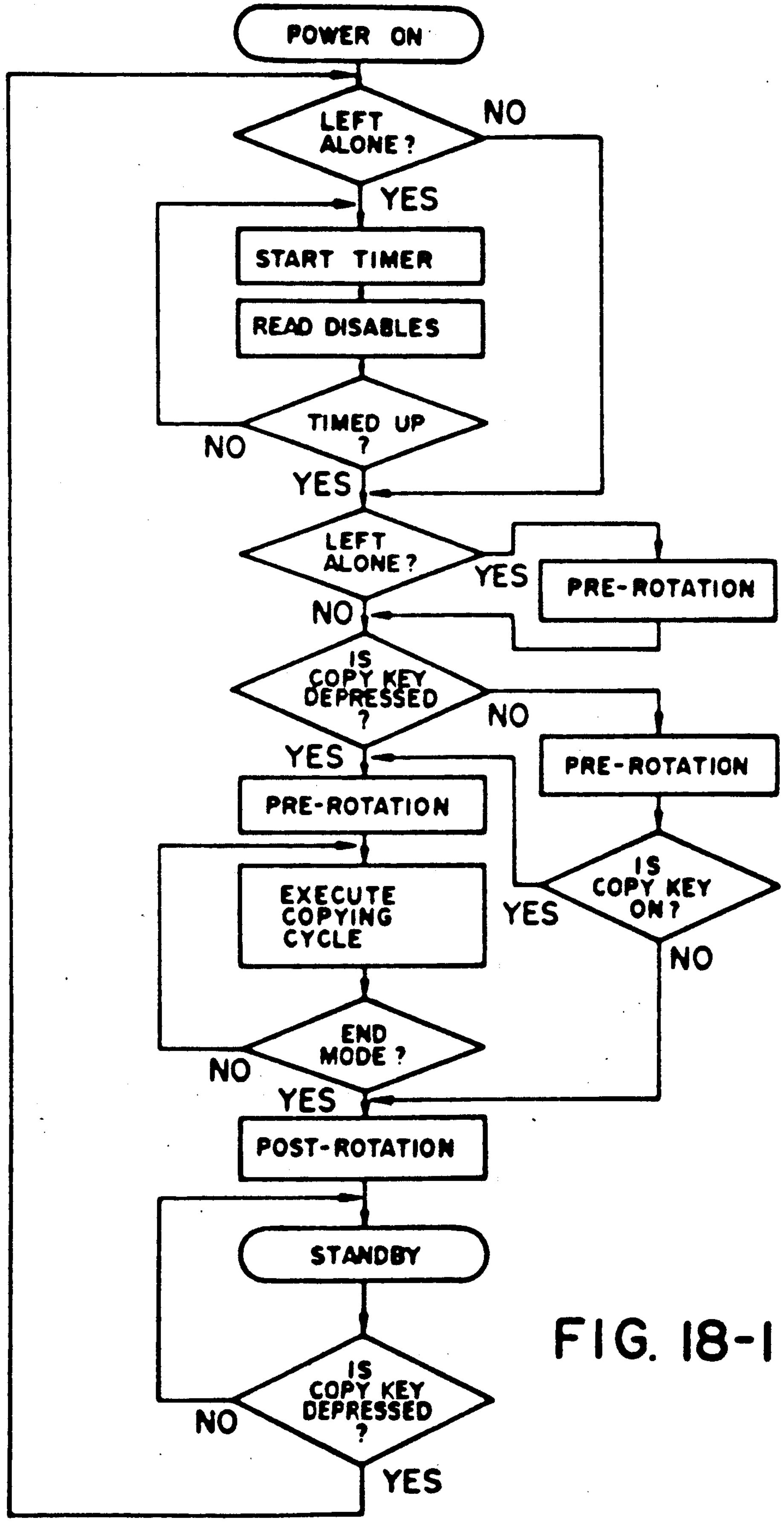
Figures 2, 18:
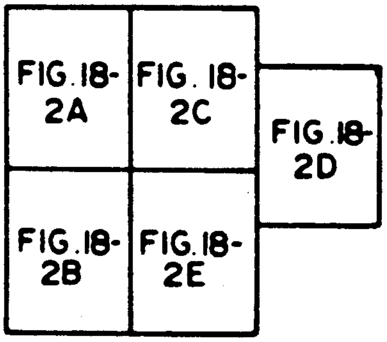
Figures 3, 18:
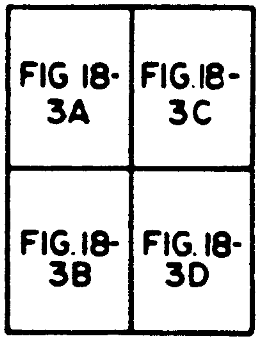
Figures 4, 18:
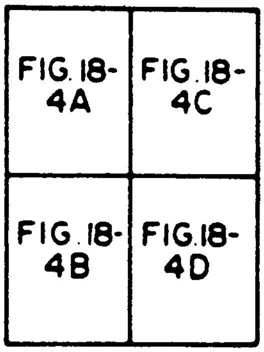
Figures 5, 18:
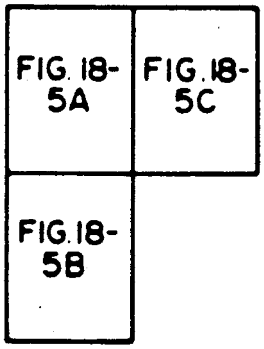
Figures 6, 18:
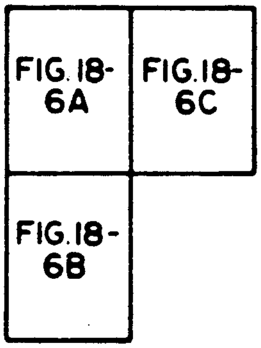
Figures 7, 18:
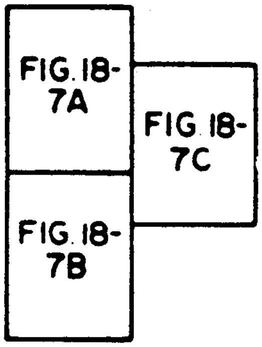
Figures 8, 18:
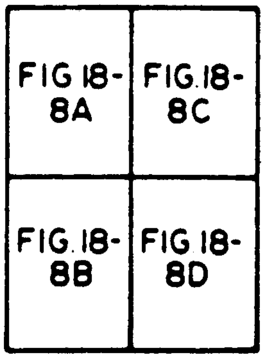
Figures 9, 18:
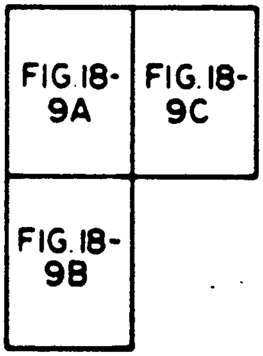
Figures 11, 18:
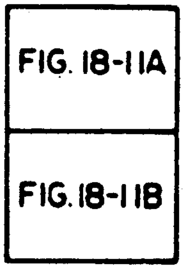
Figures 12, 18:
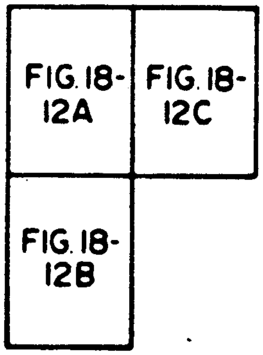
Figures 13, 18:
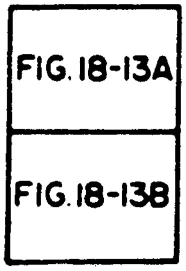
Figures 15, 18:
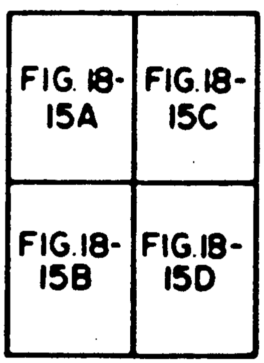
Figures 17, 18:
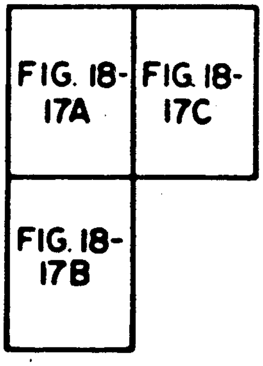
Figures 18, 19:
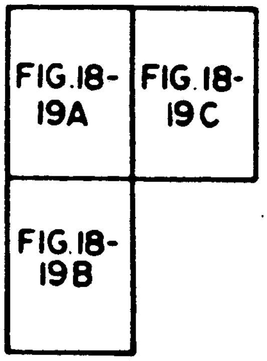
Figures 2A, 18:
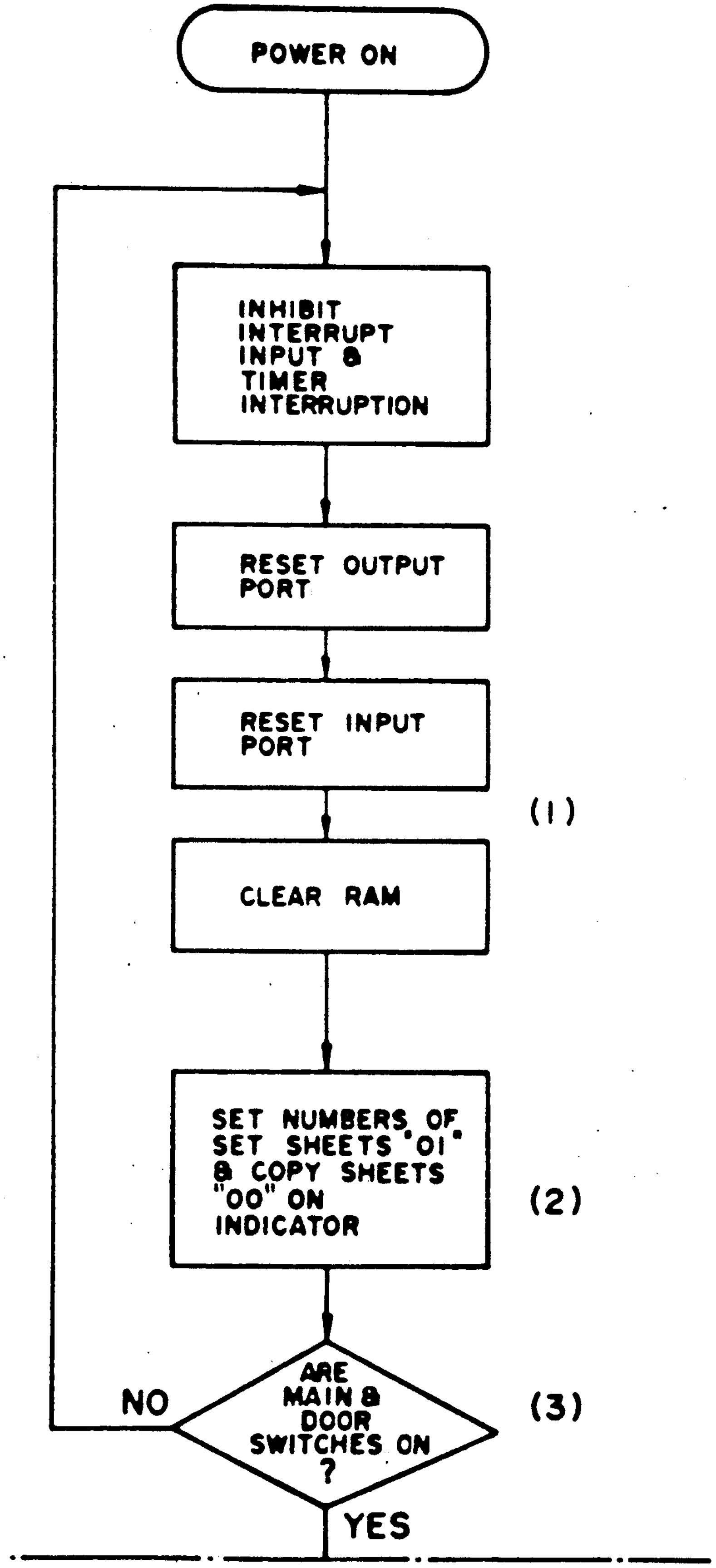
Figures 2B, 18:
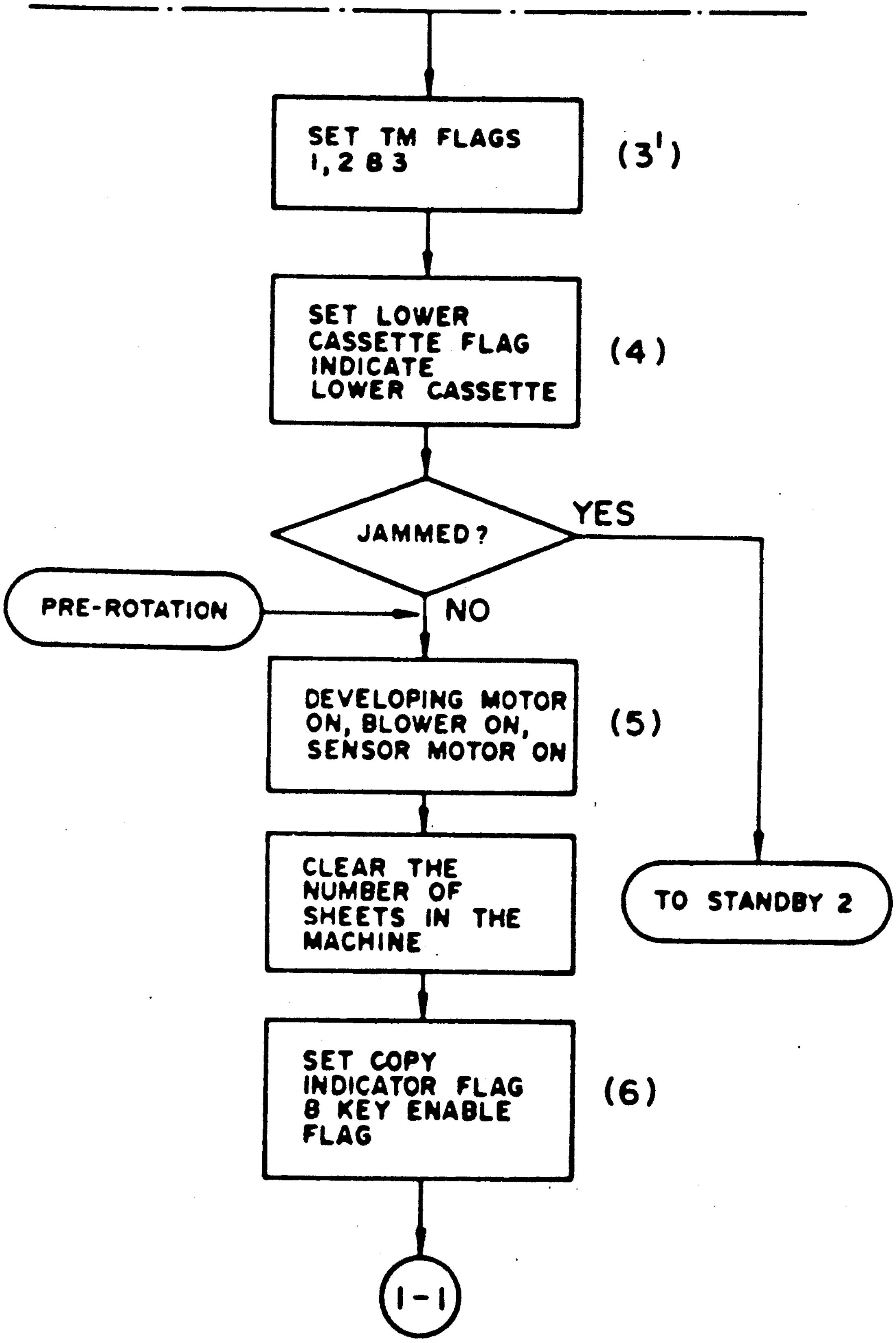
Figures 2C, 18:
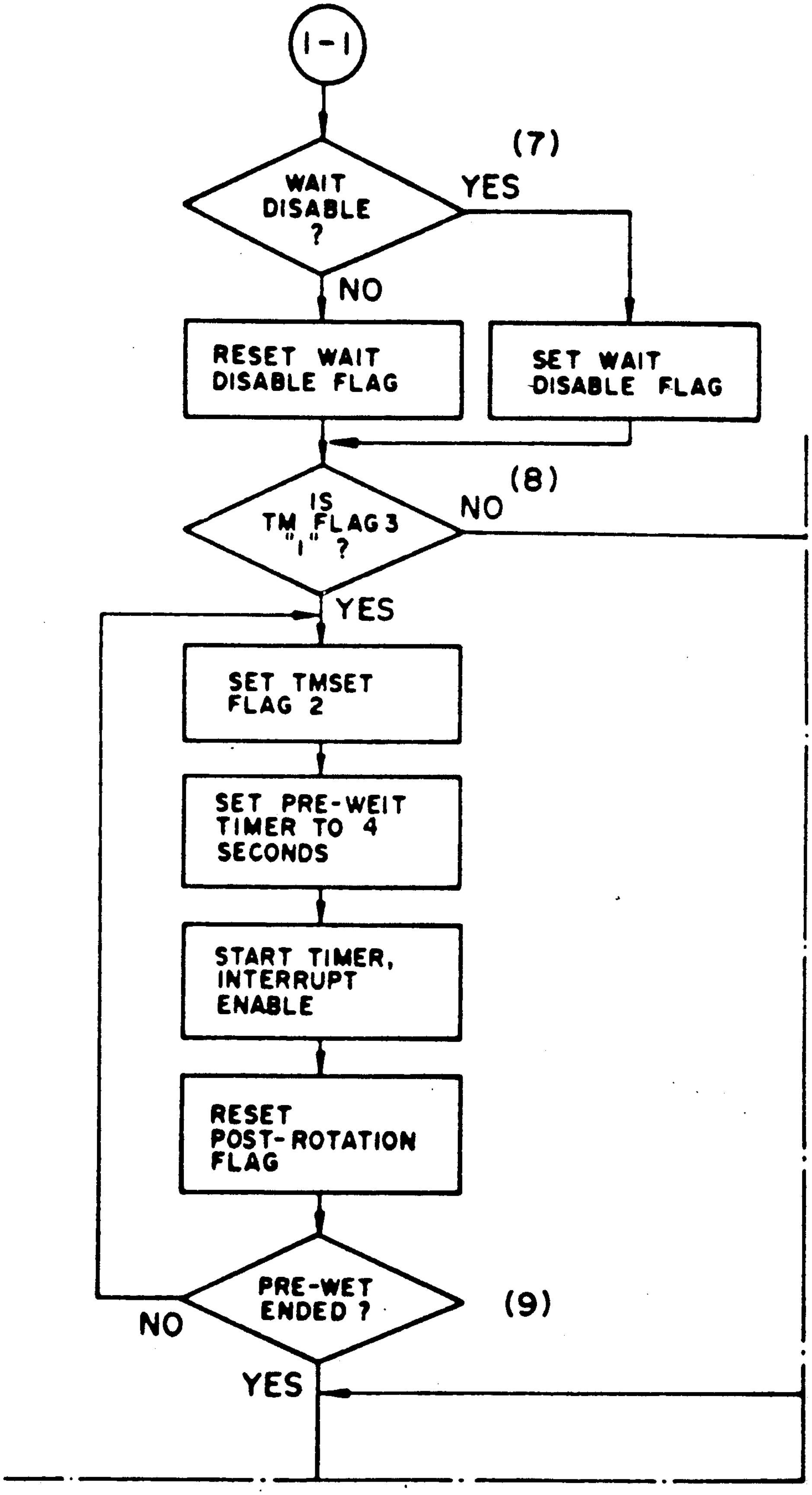
Figures 2D, 18:
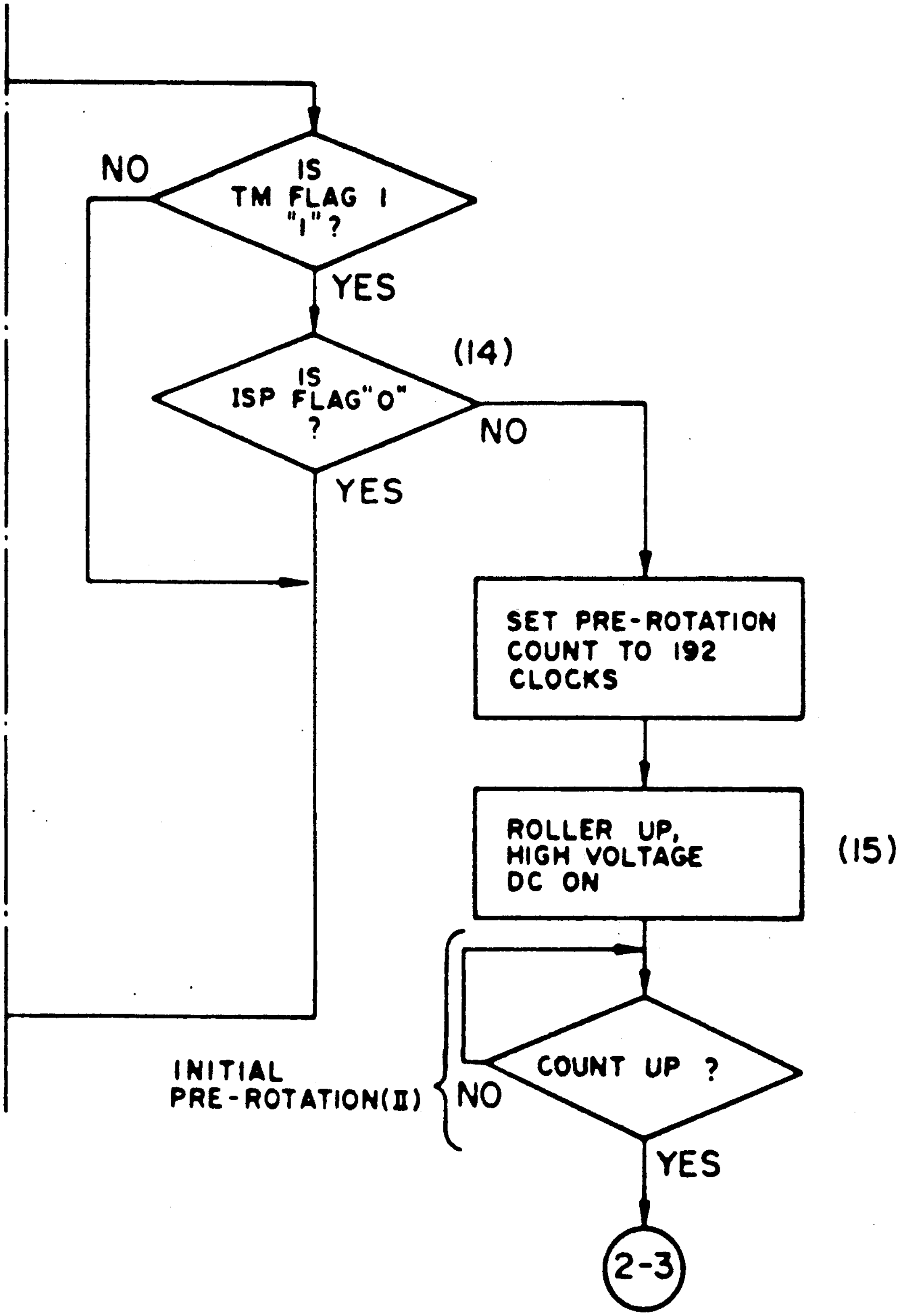
Figures 2E, 18:
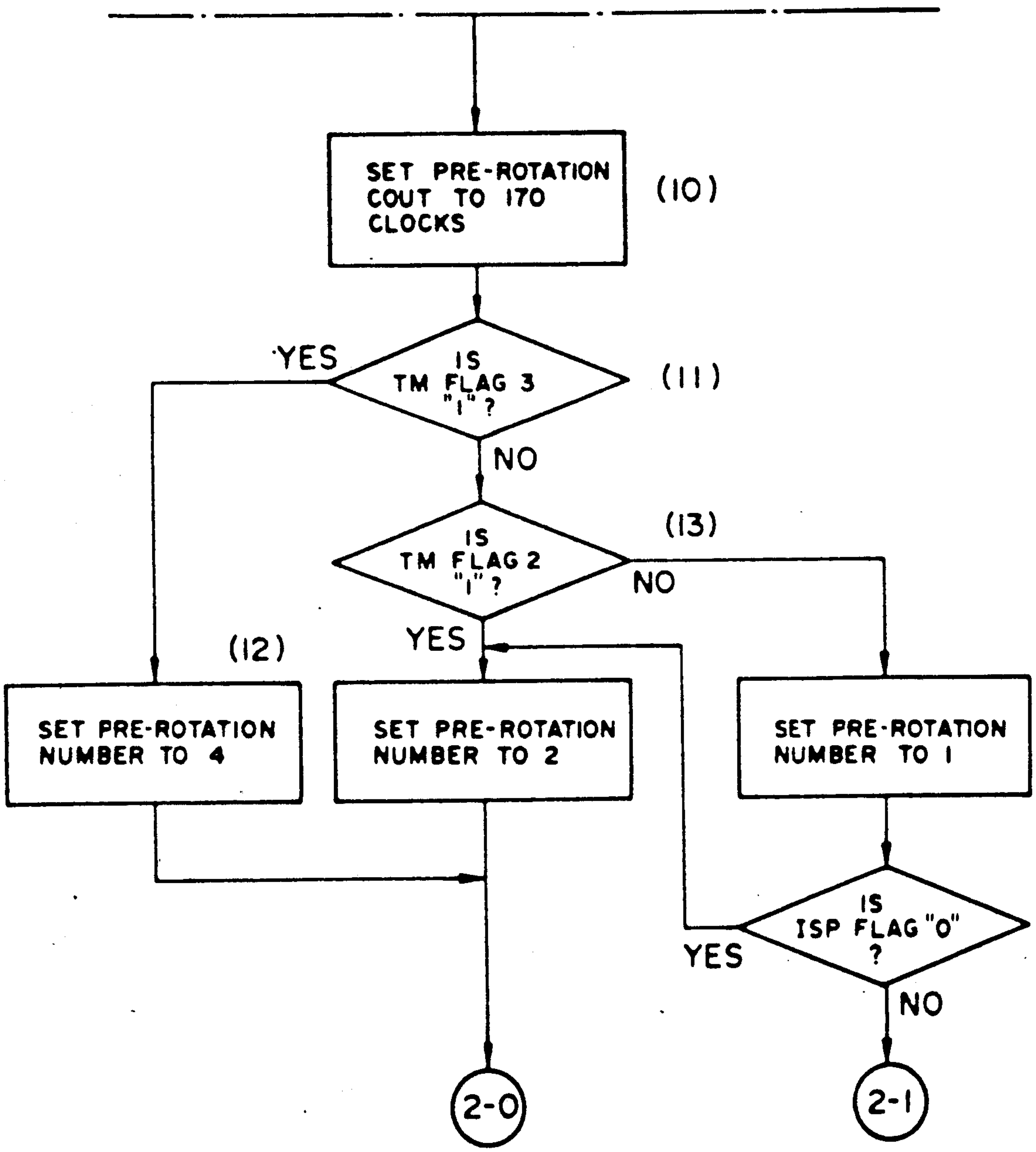
Figures 3A, 18:
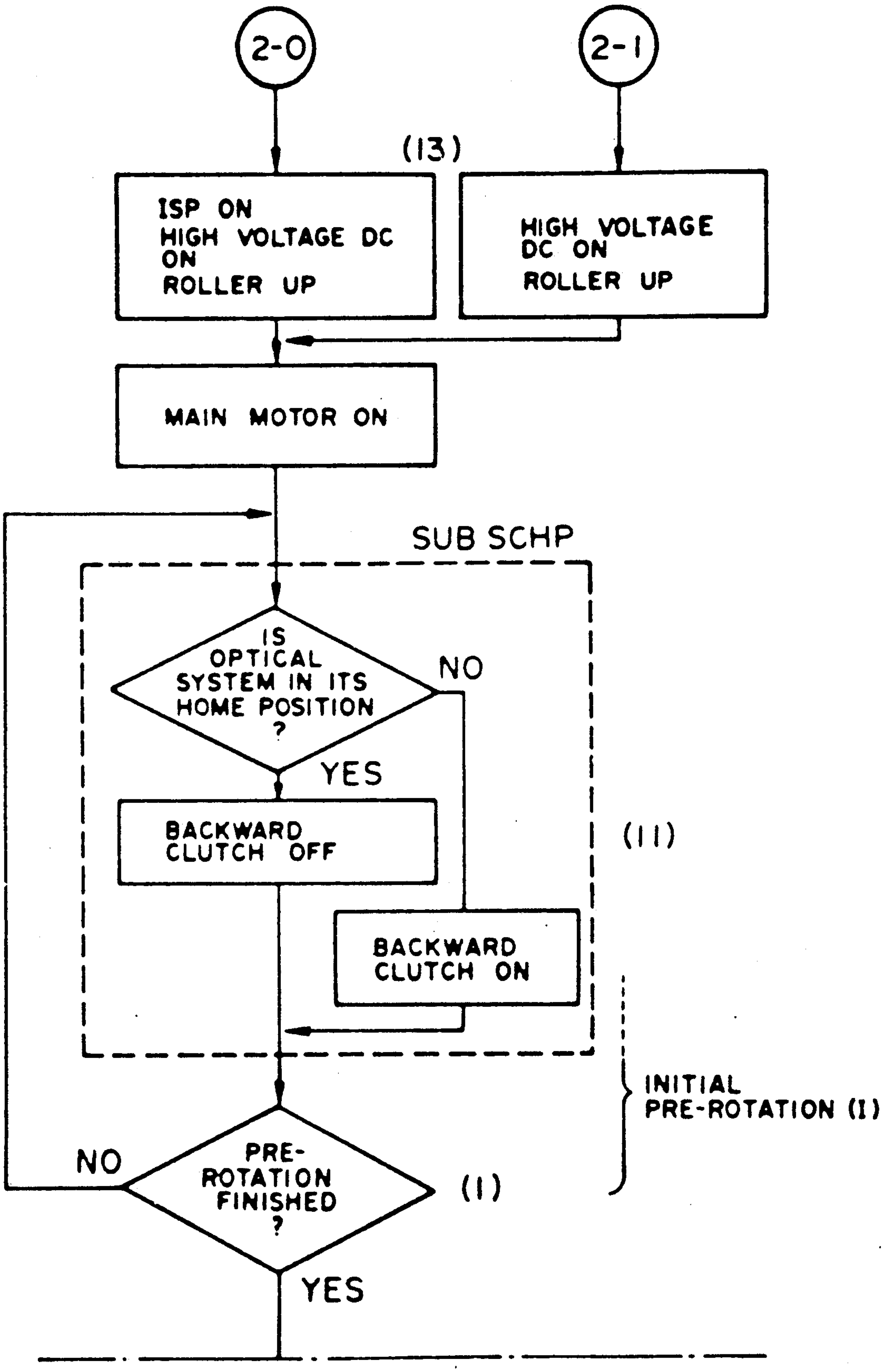
Figures 3B, 18:
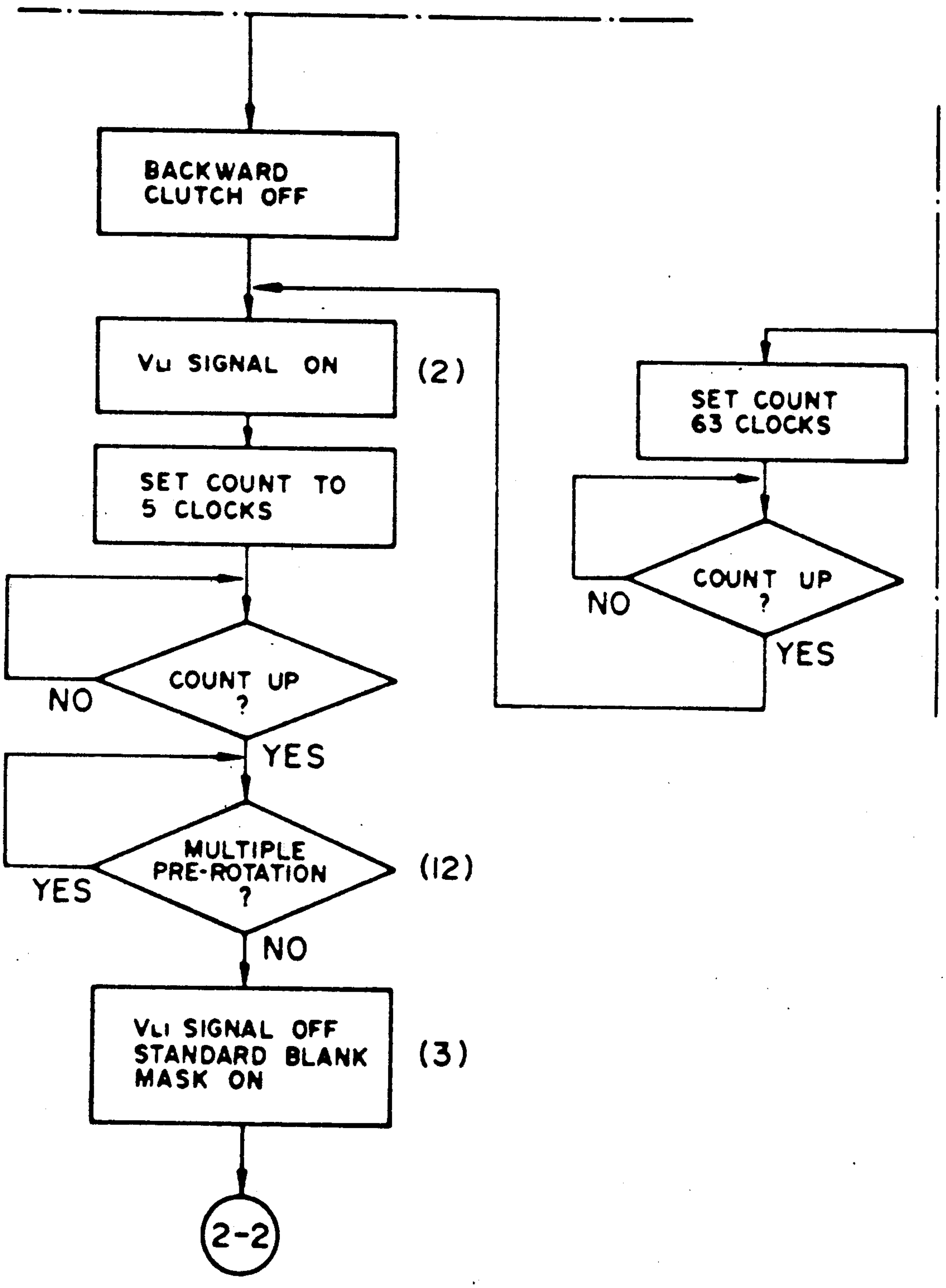
Figures 3C, 18:
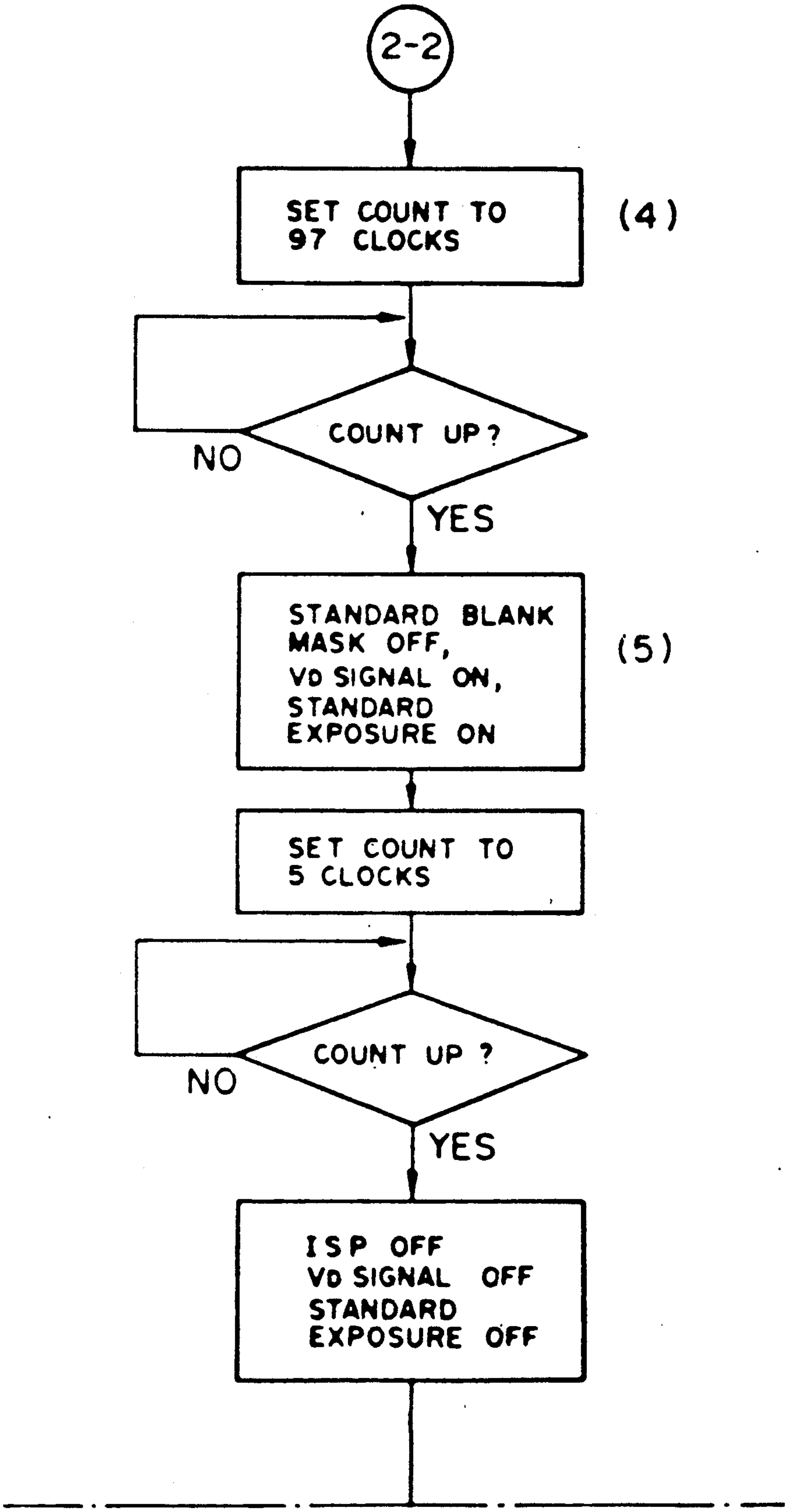
Figures 3D, 18:
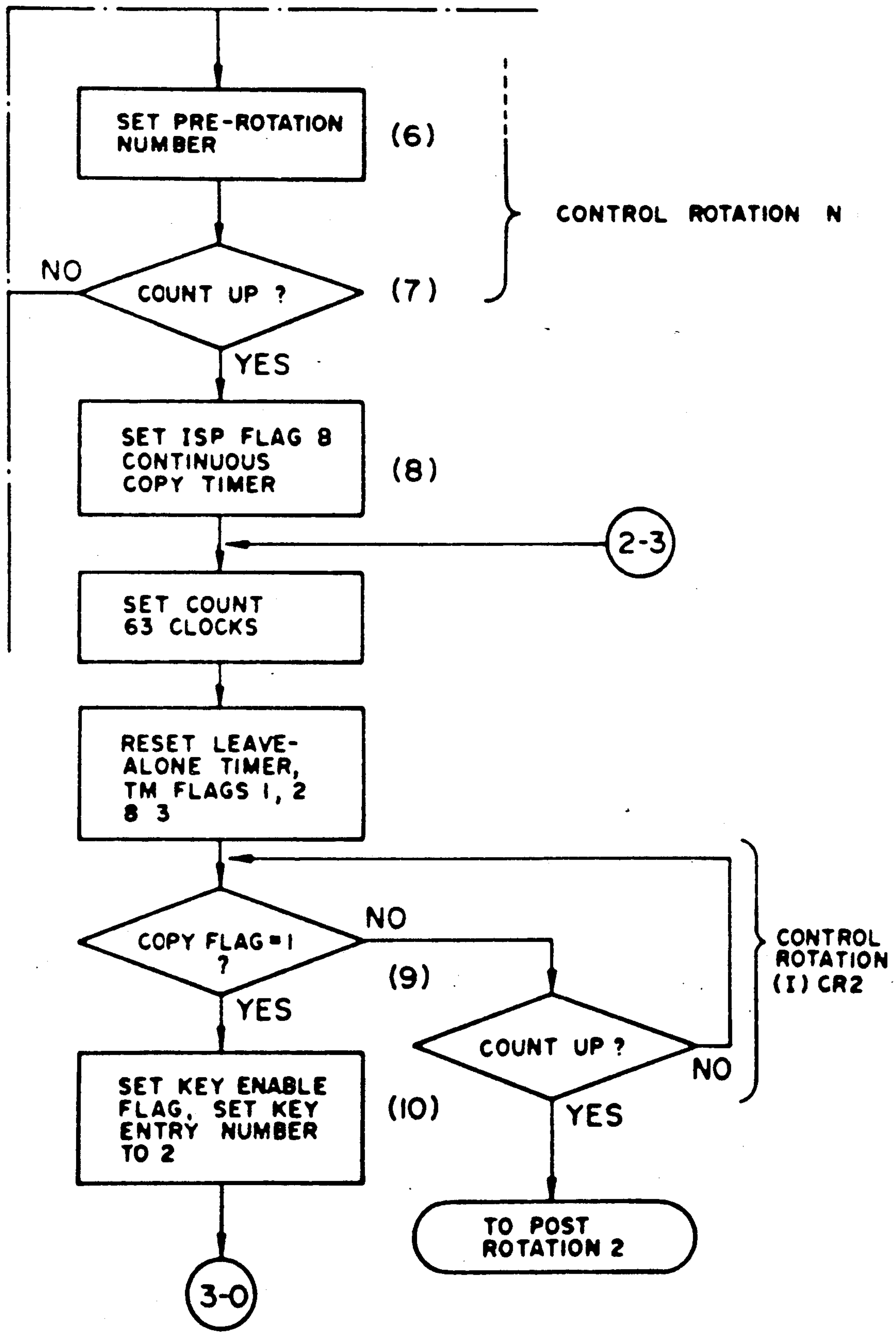
Figures 4A, 18:
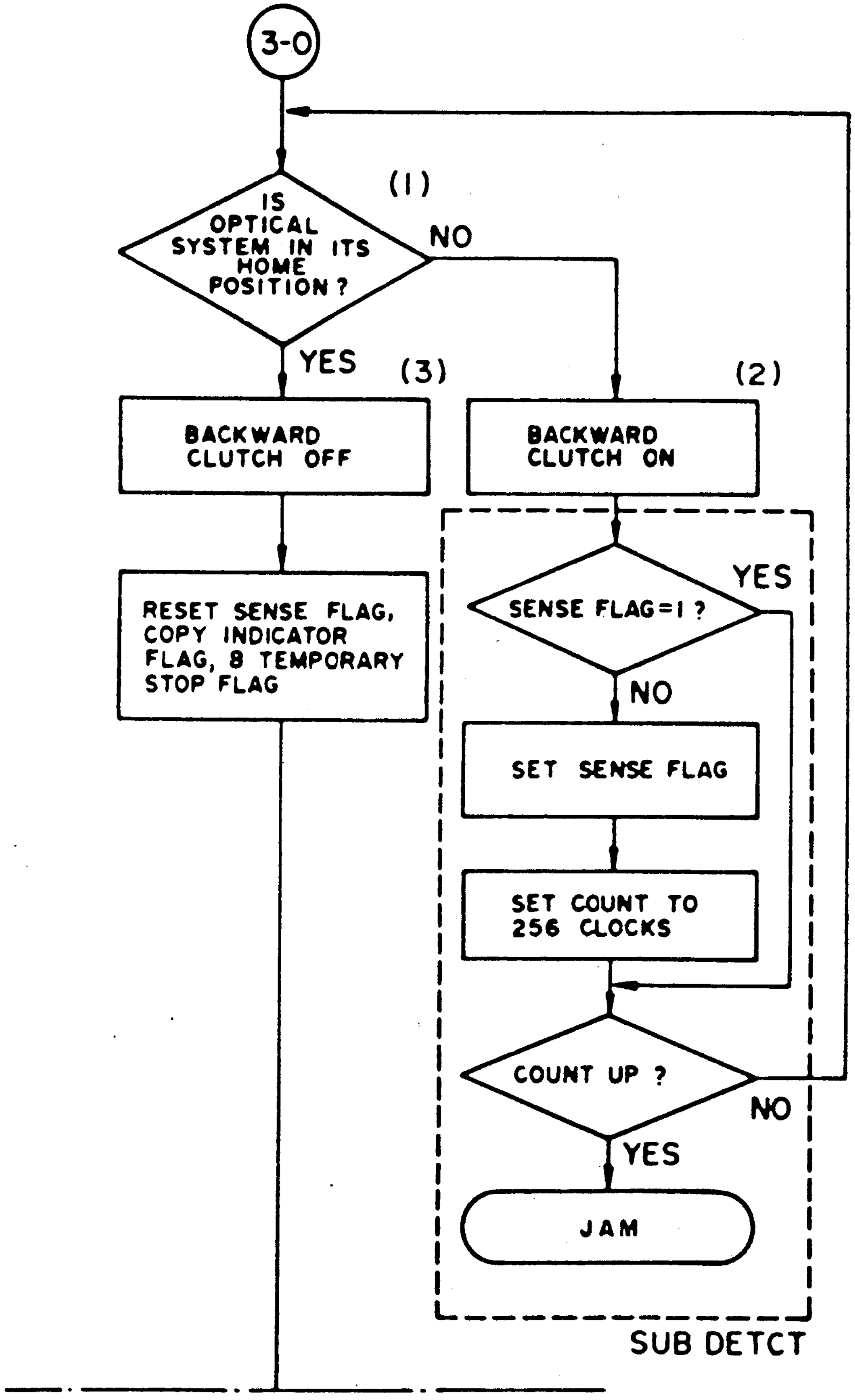
Figures 4B, 18:
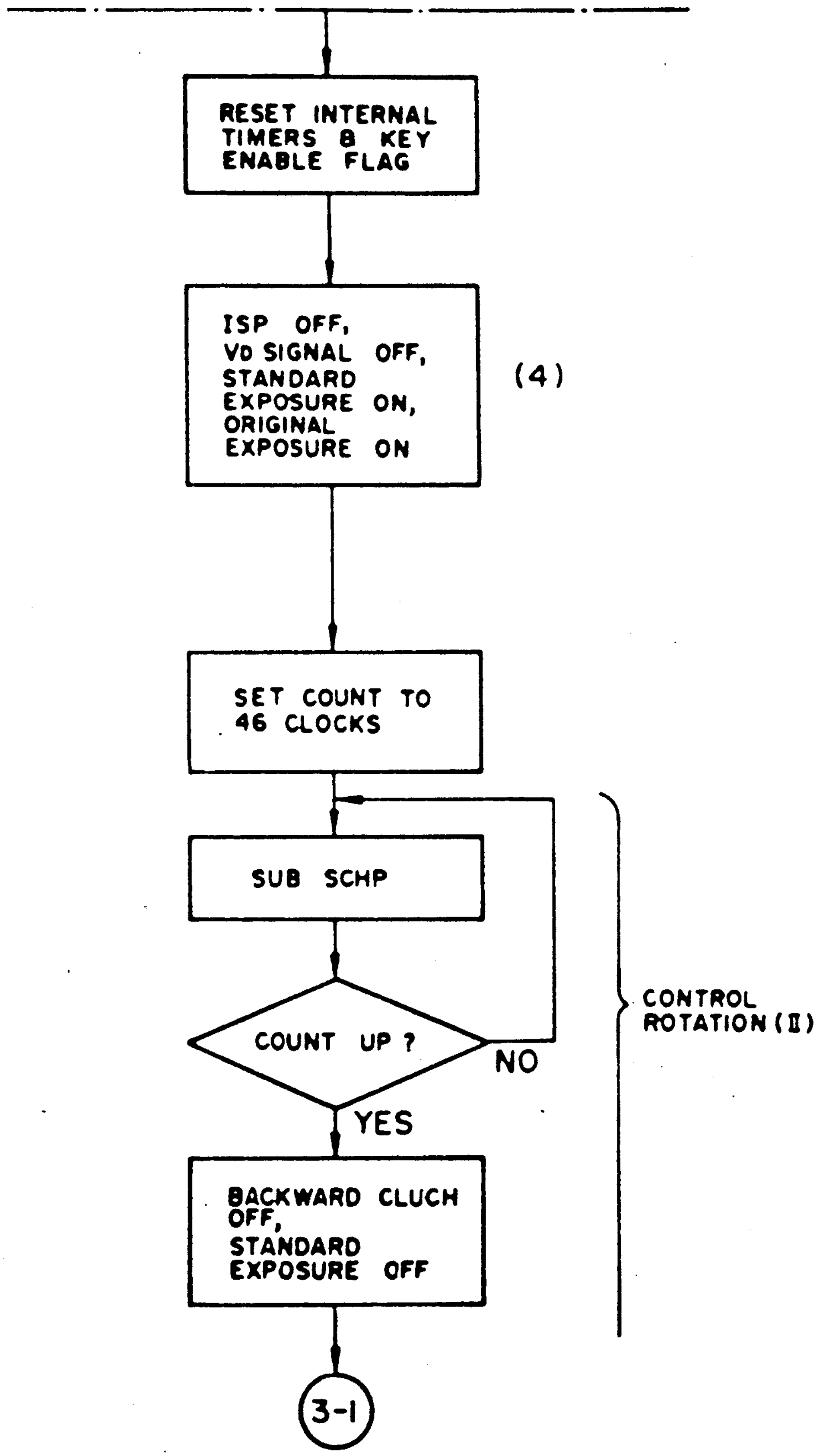
Figures 4C, 18:
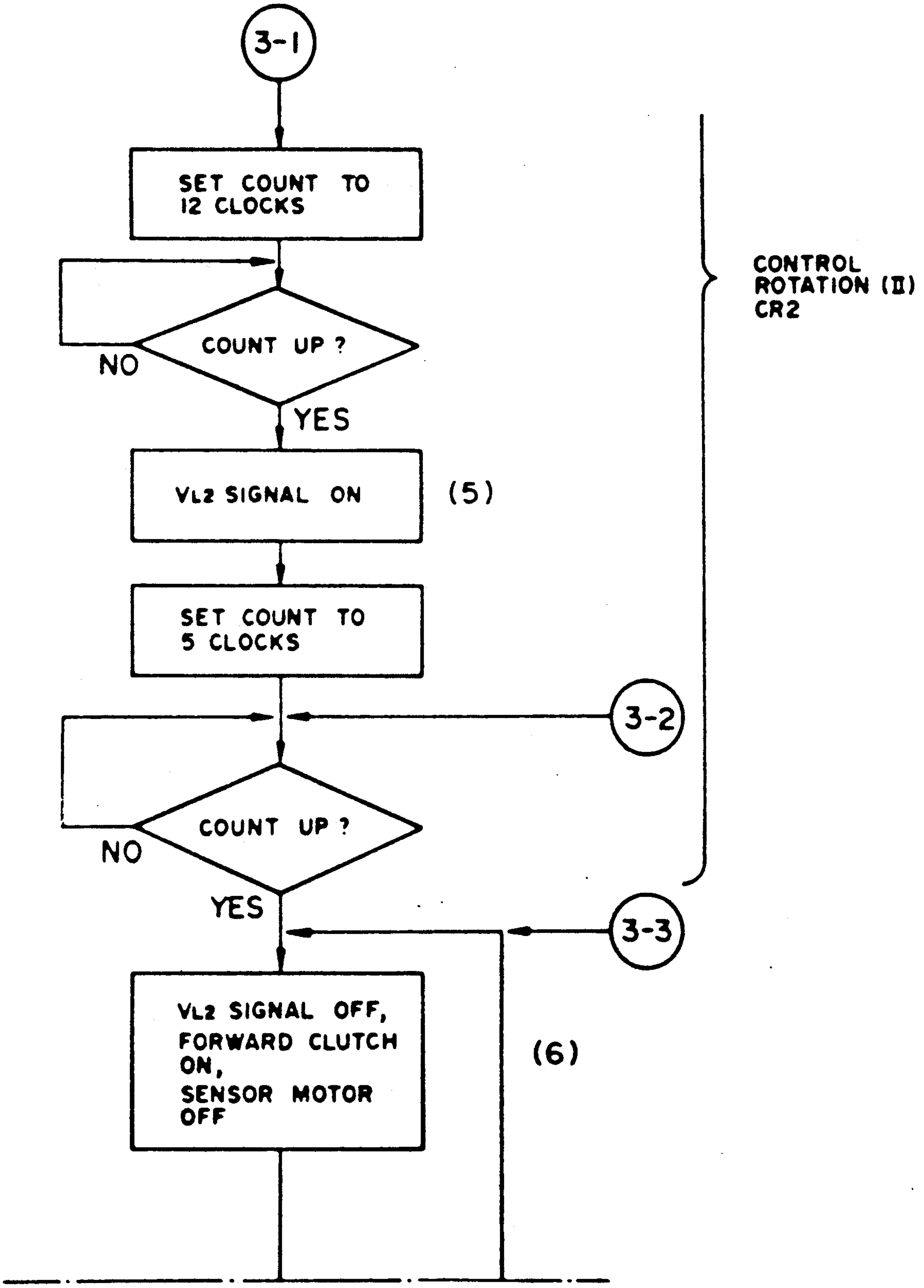
Figures 4D, 18:
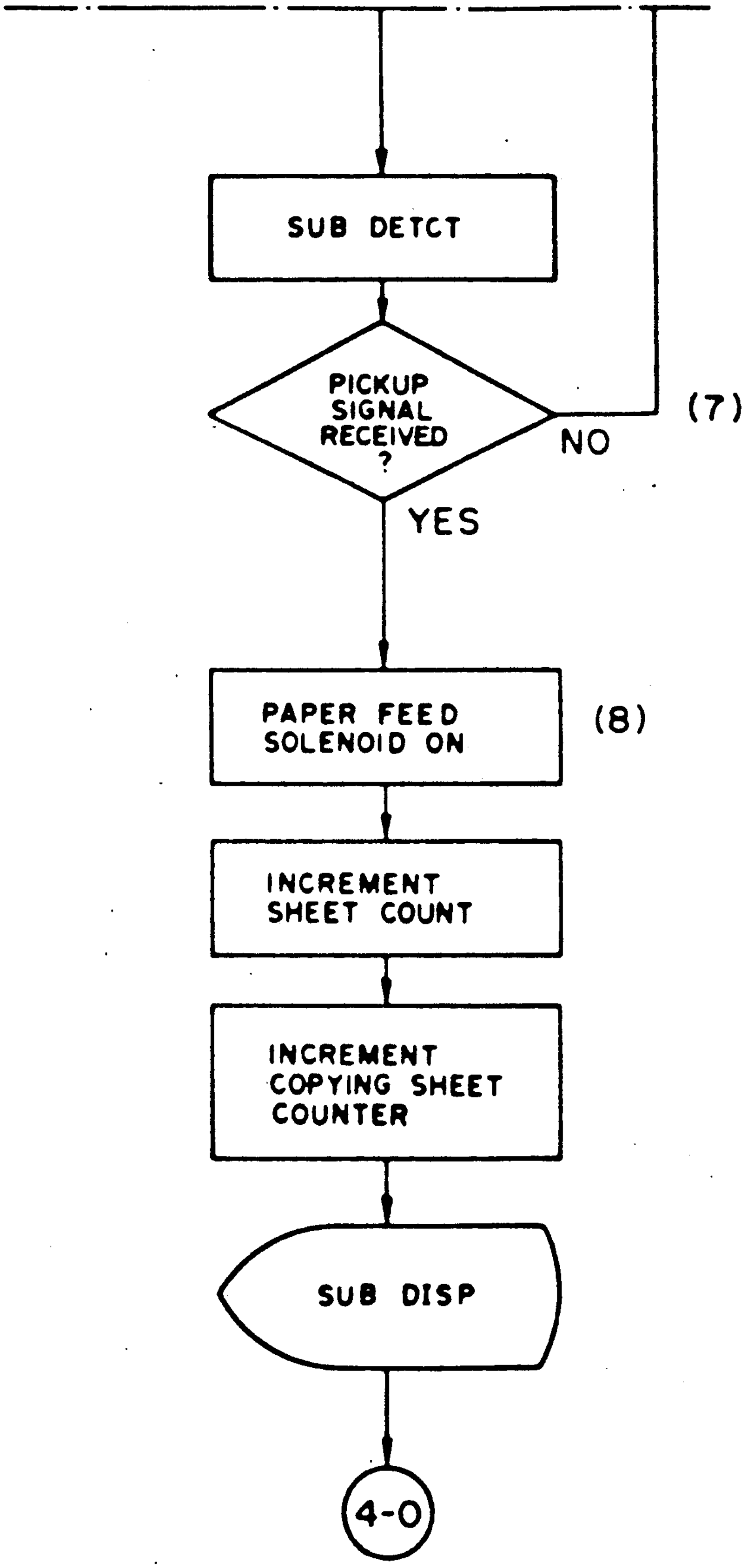
Figures 5A, 18:
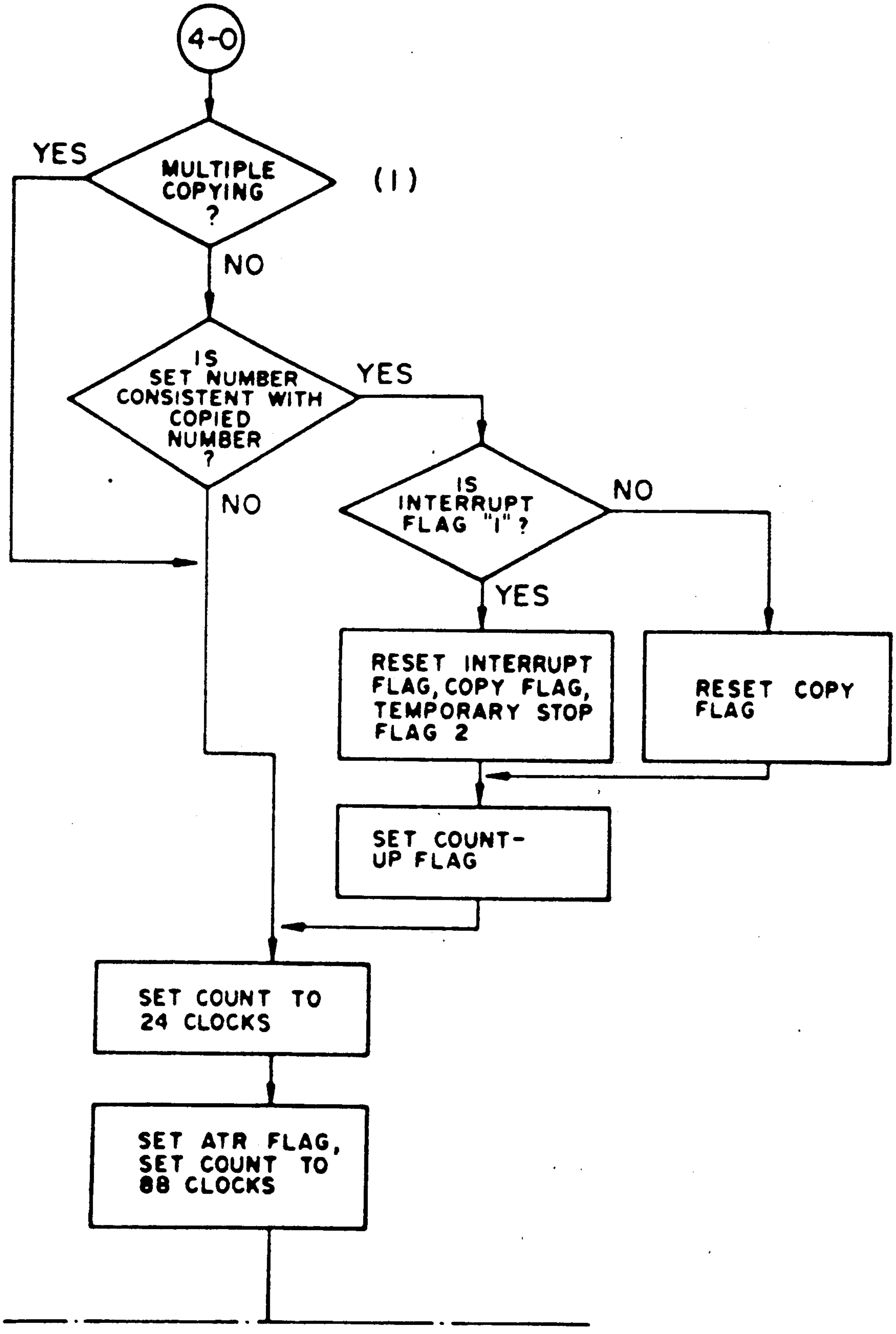
Figures 5B, 18:
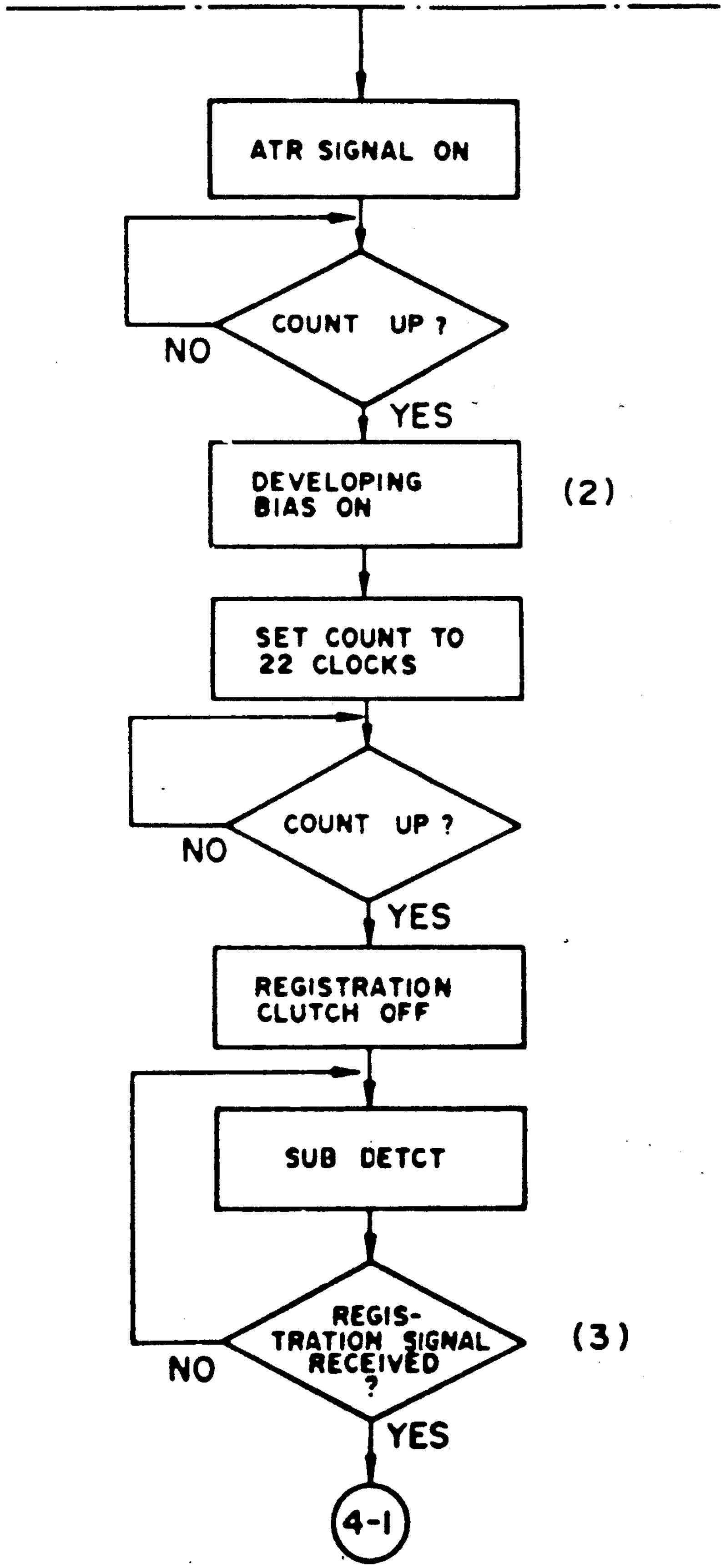
Figures 5C, 18:
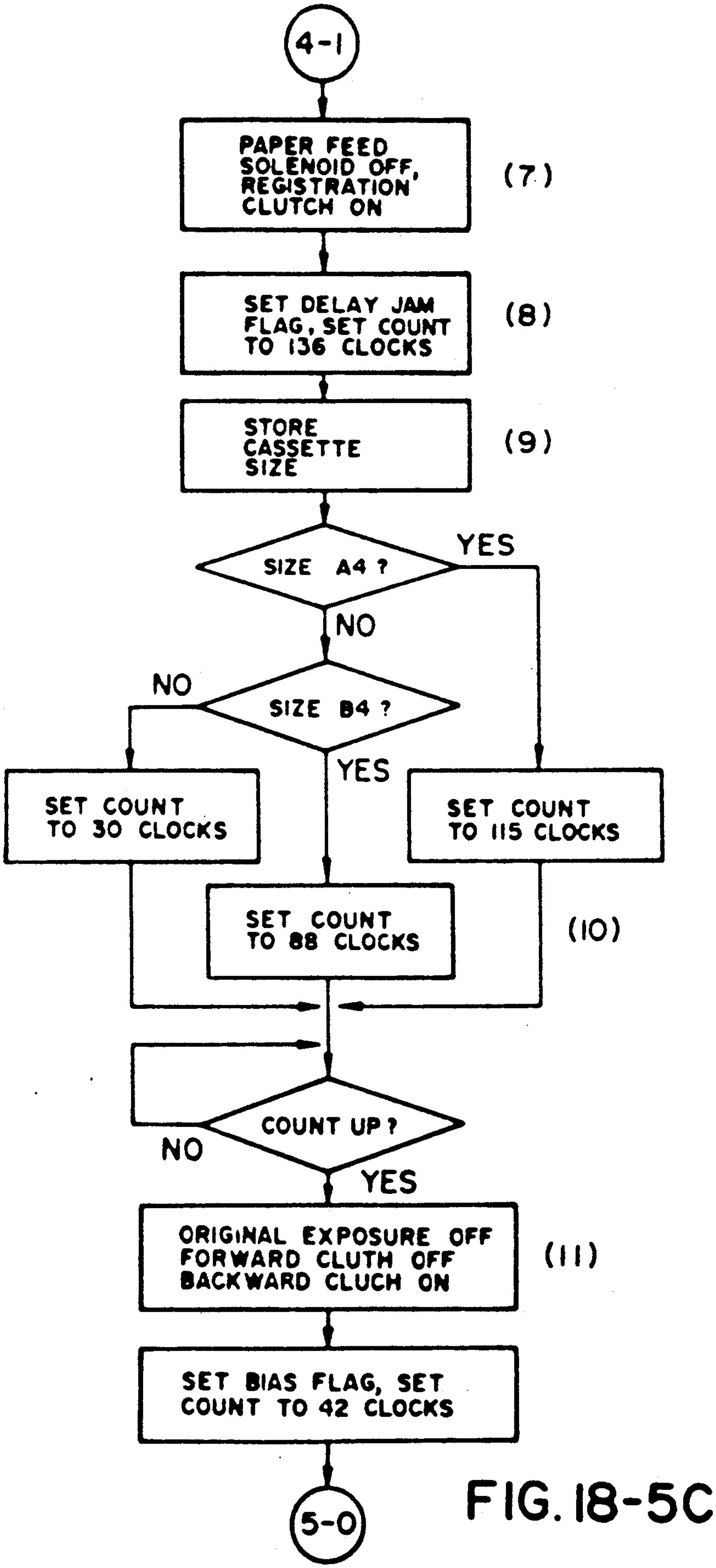
Figures 6A, 18:
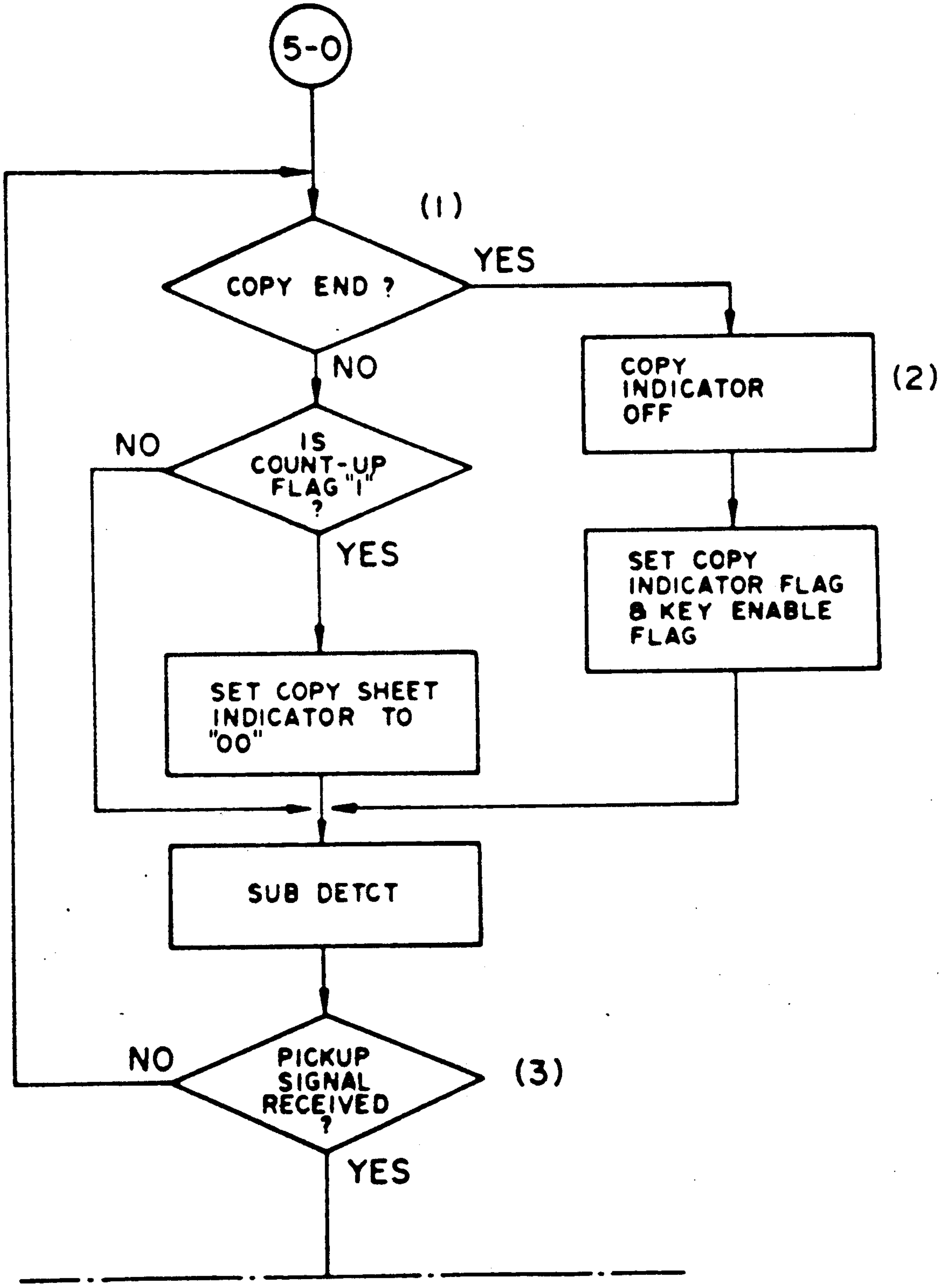
Figures 6B, 18:
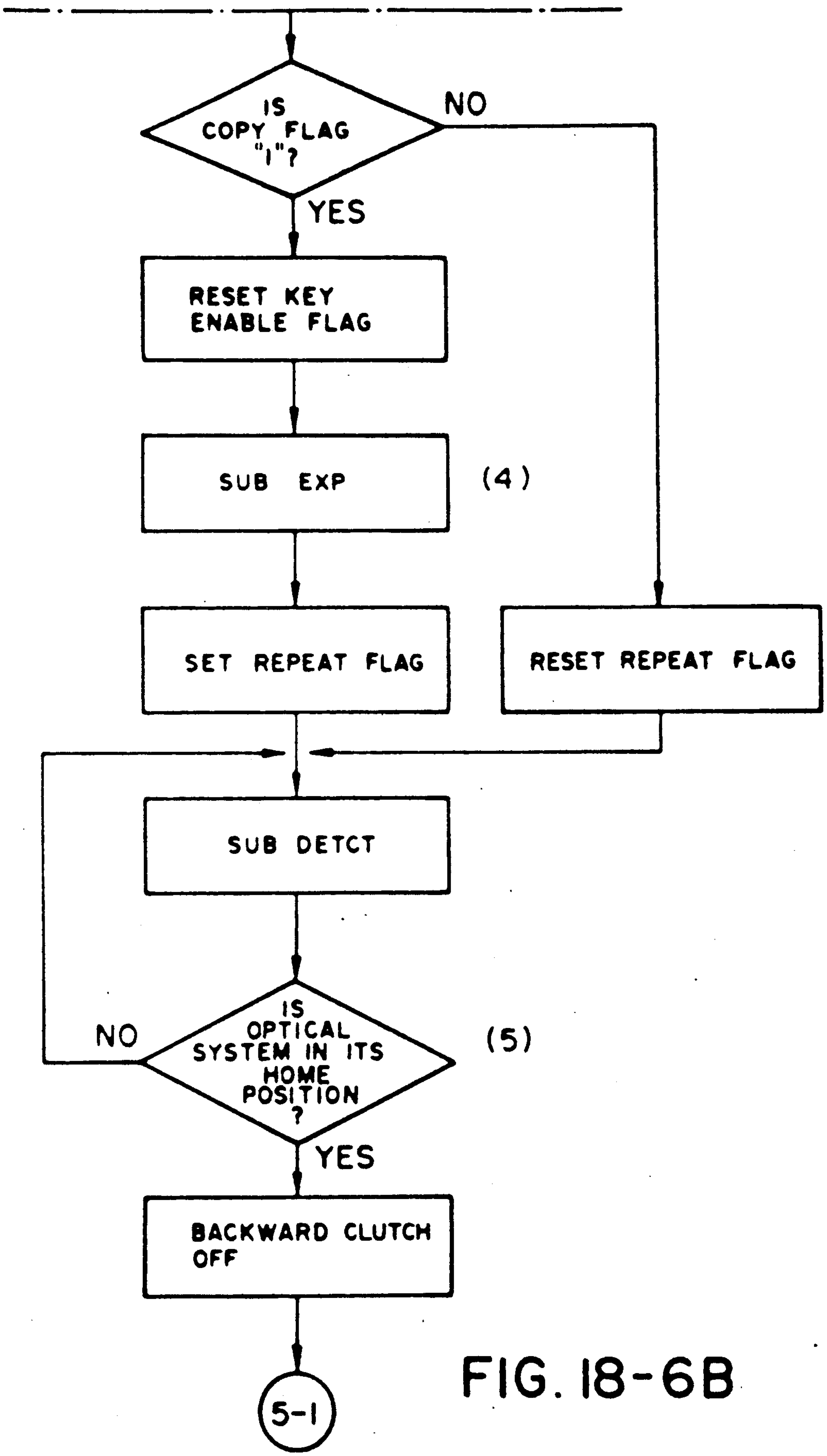
Figures 6C, 18:
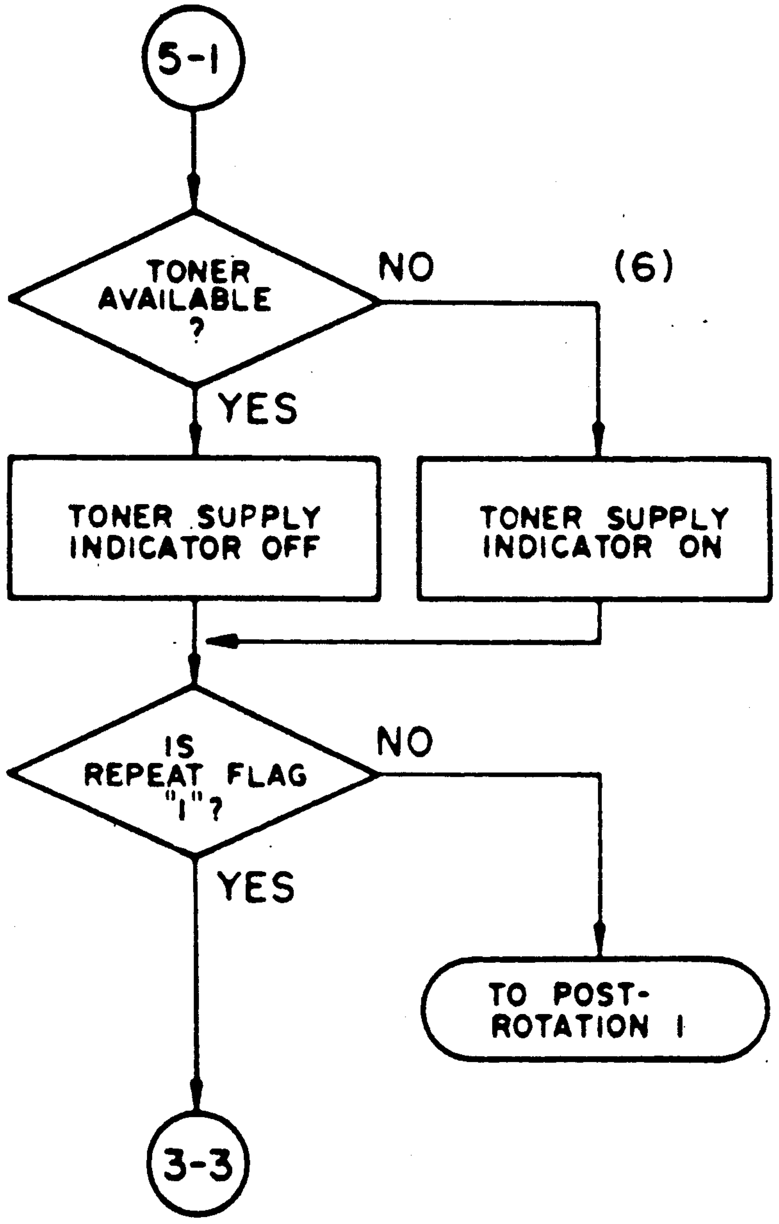
Figures 7A, 18:
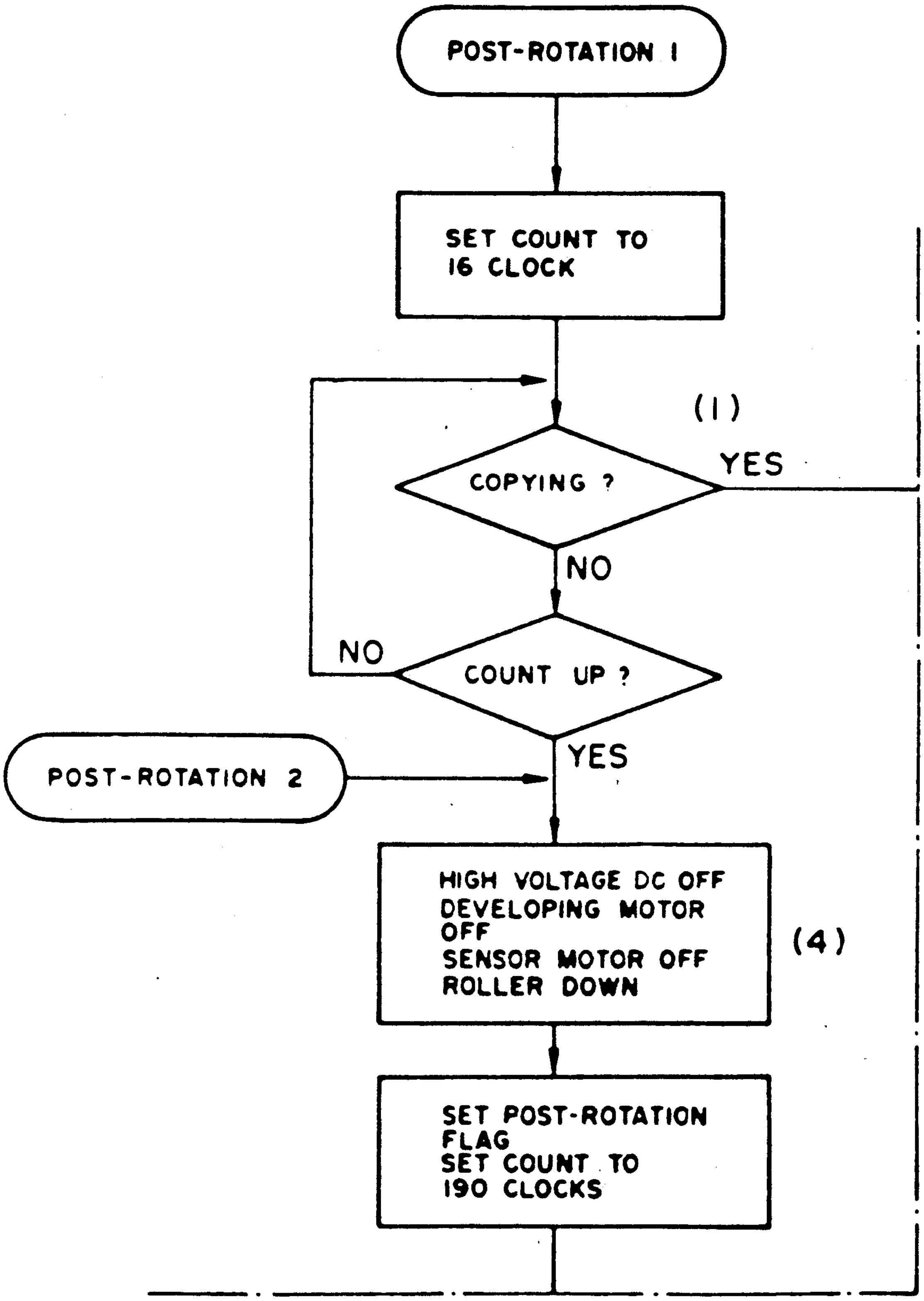
Figures 7B, 18:
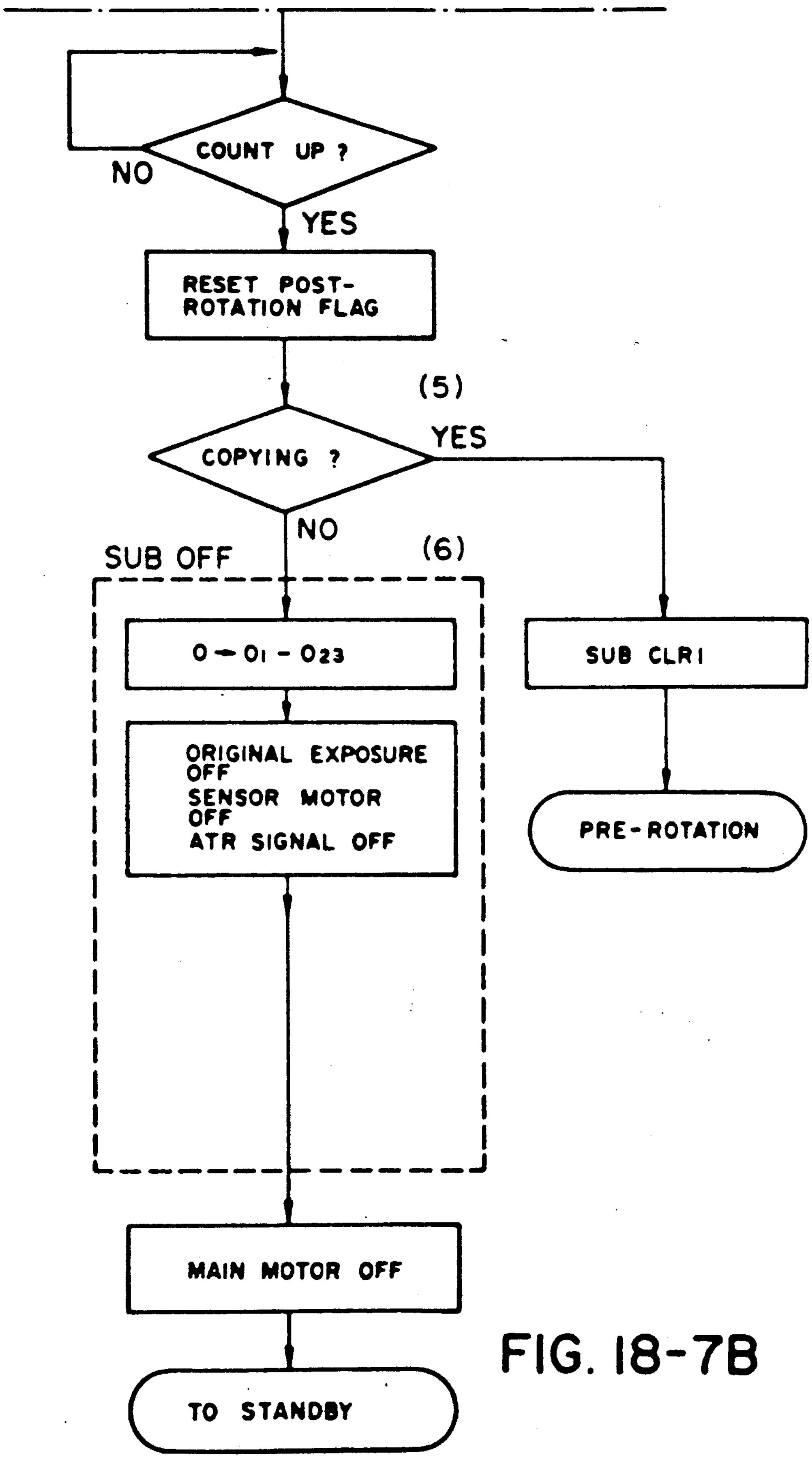
Figures 7C, 18:
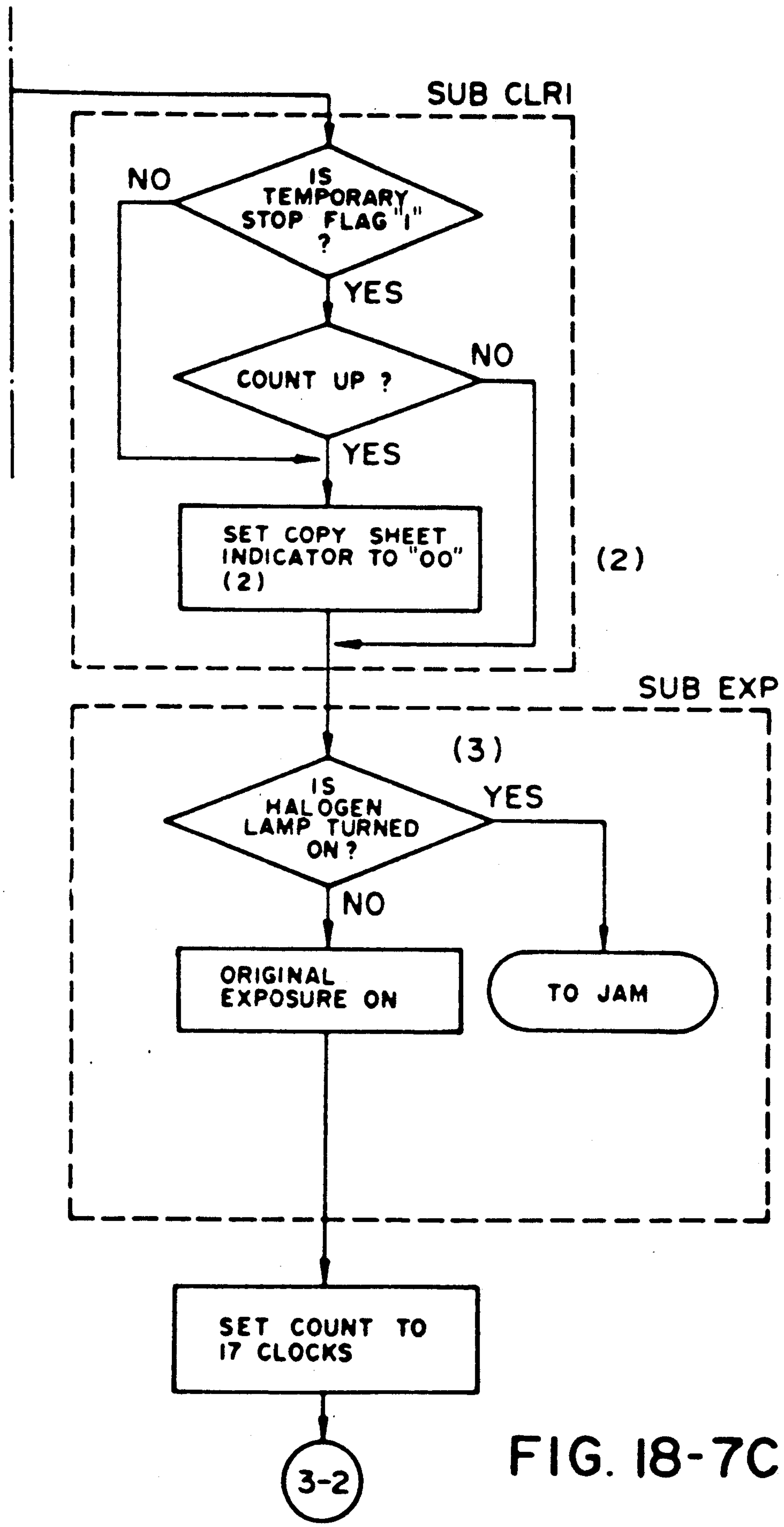
Figures 8A, 18:
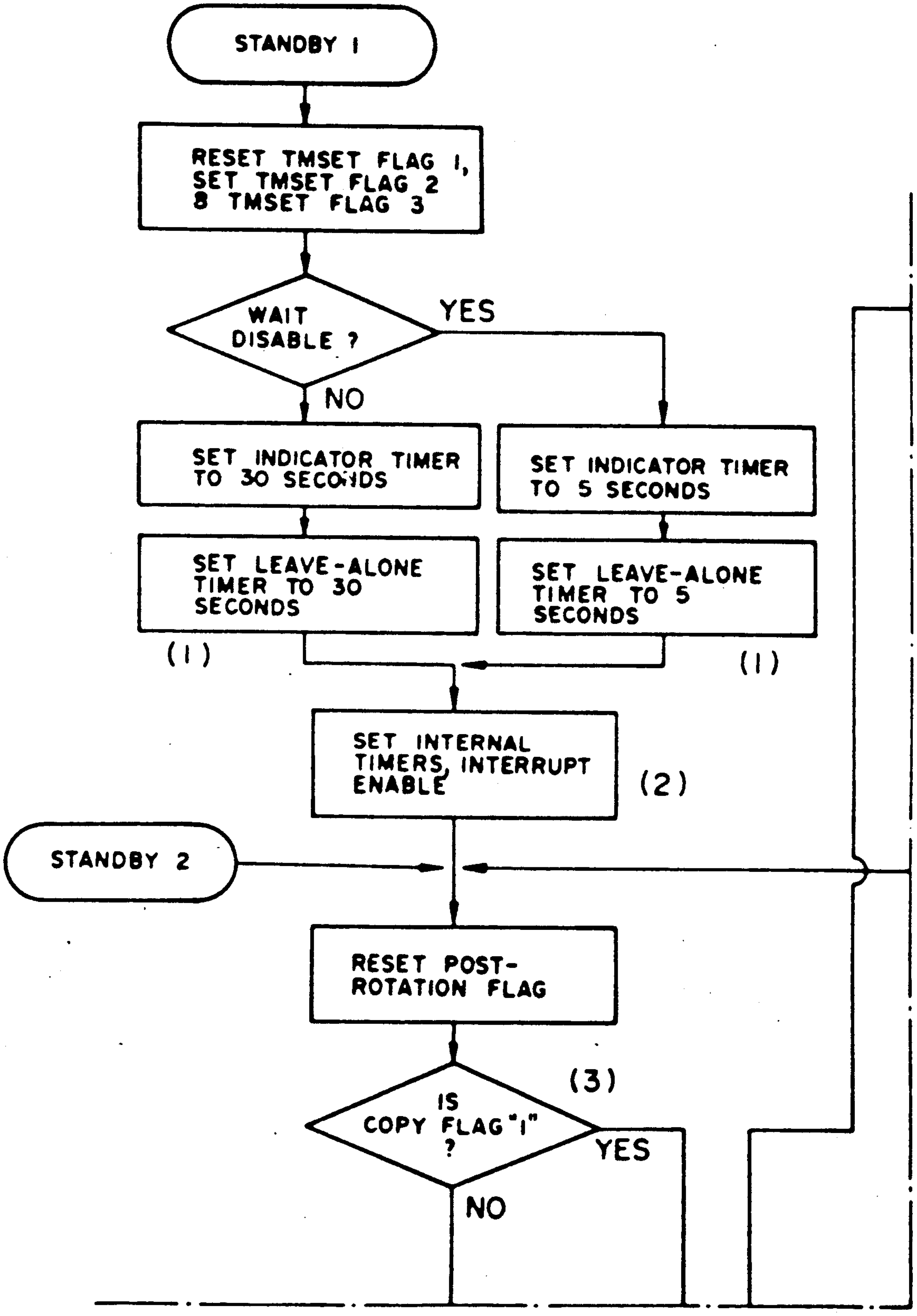
Figures 8B, 18:
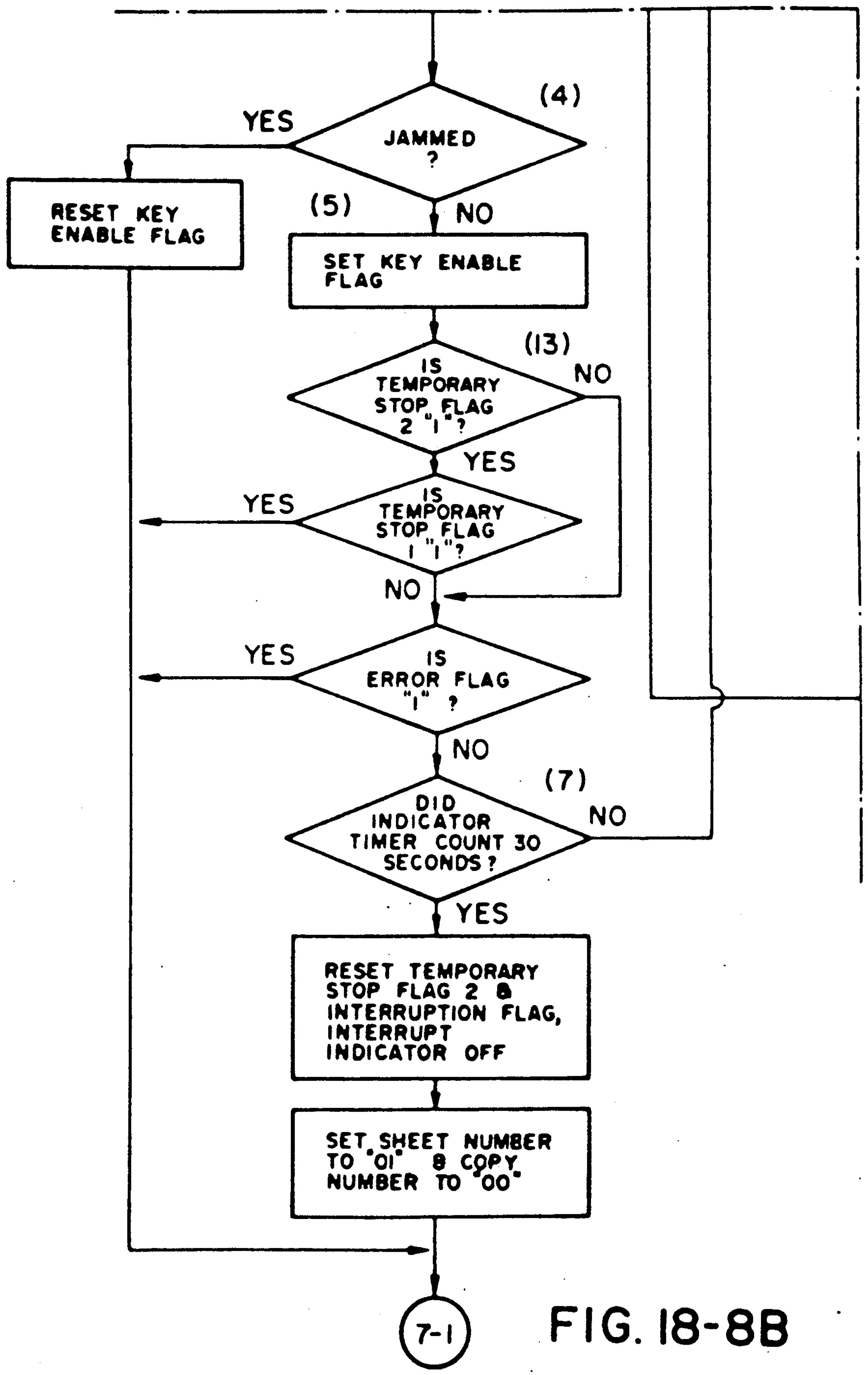
Figures 8C, 18:
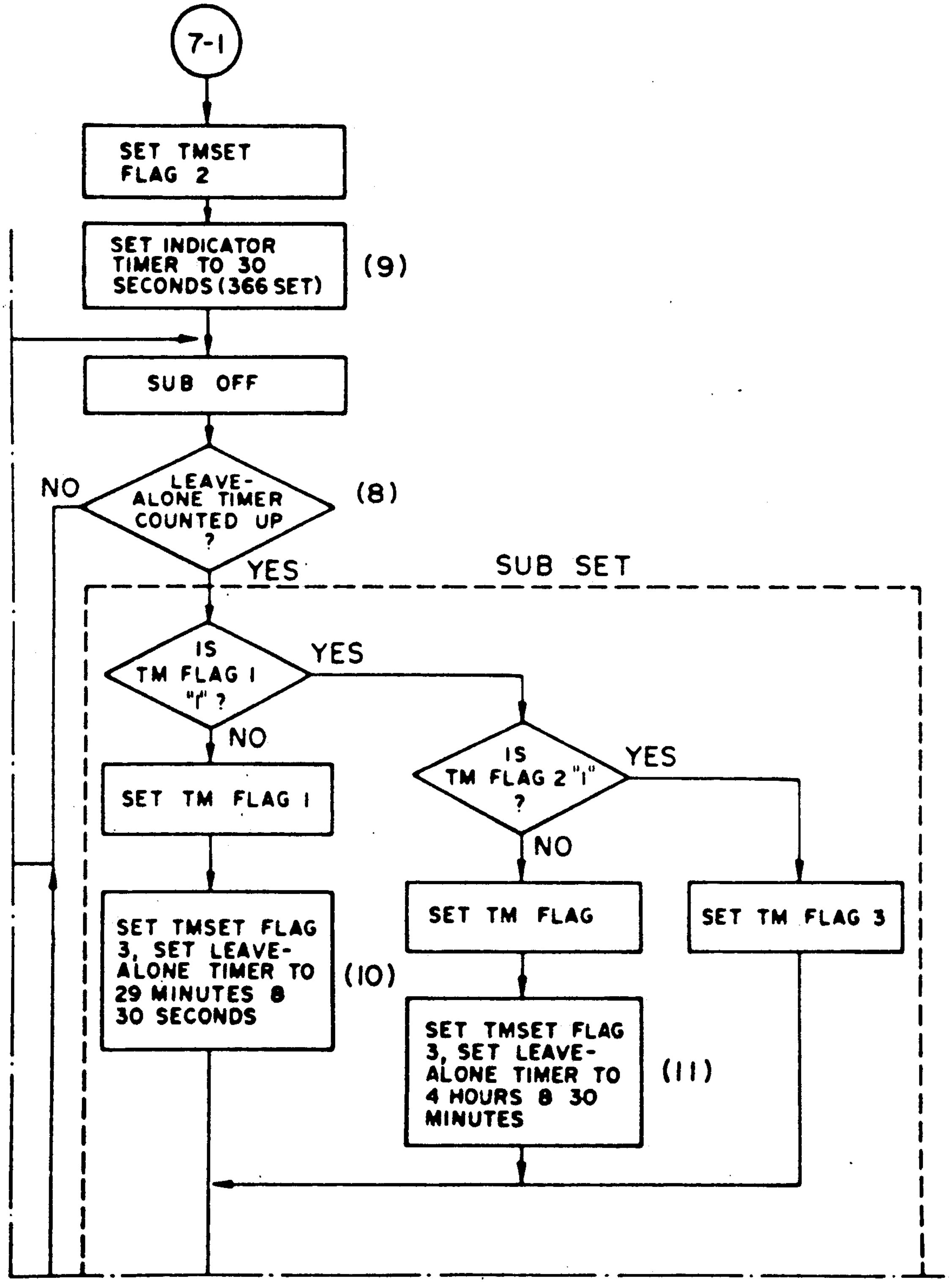
Figures 8D, 18:
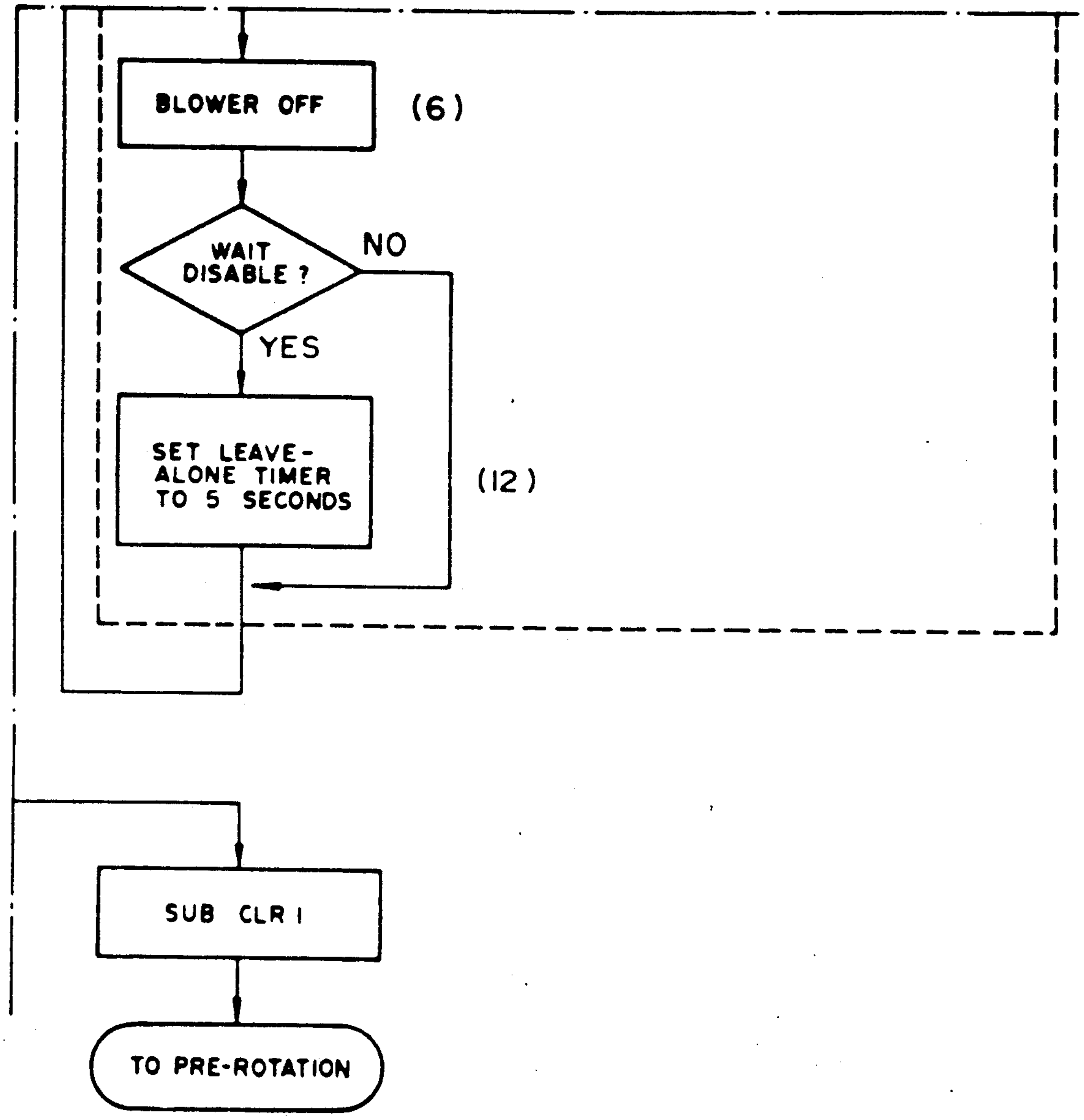
Figures 9A, 18:
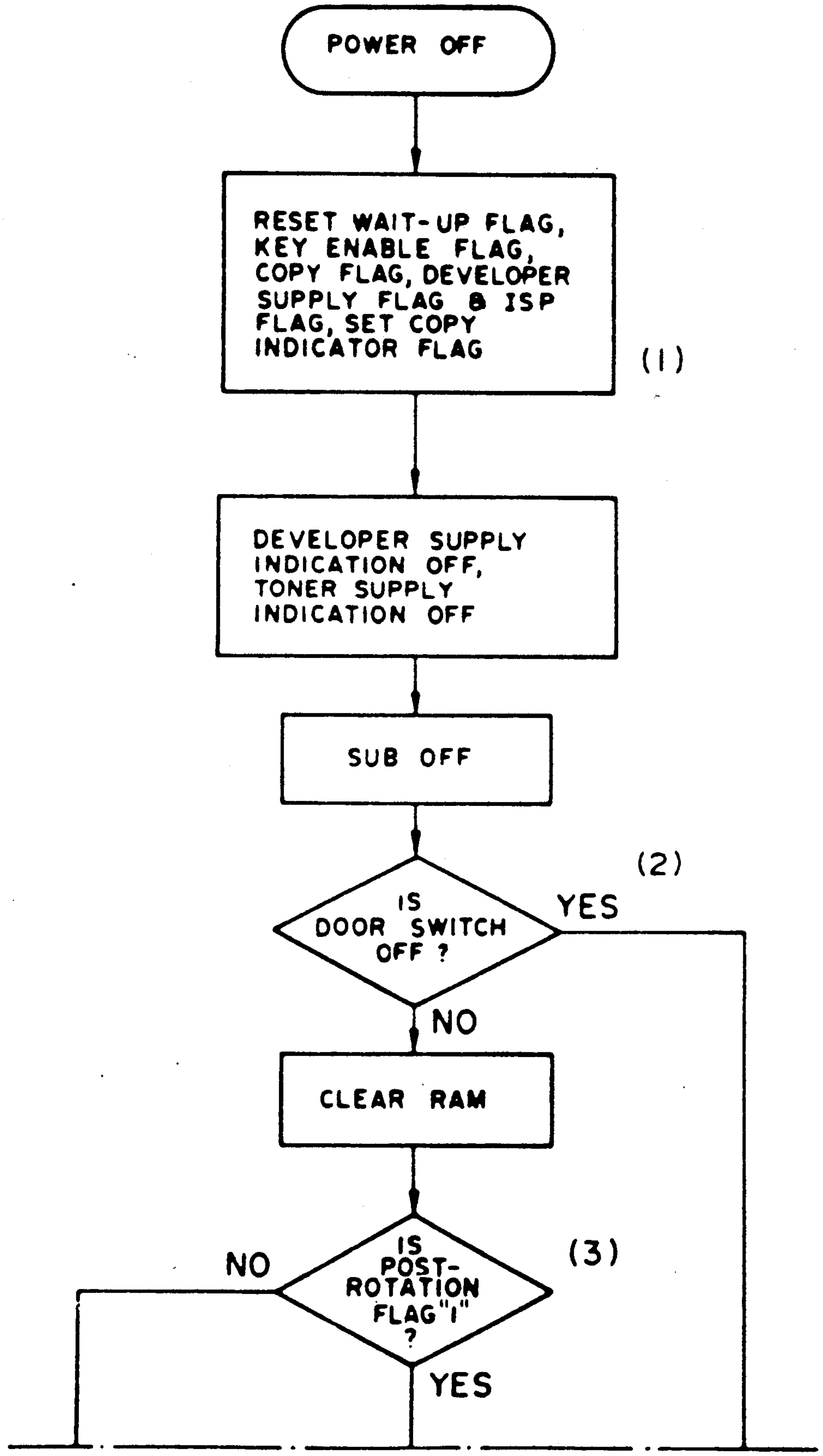
Figures 9B, 18:
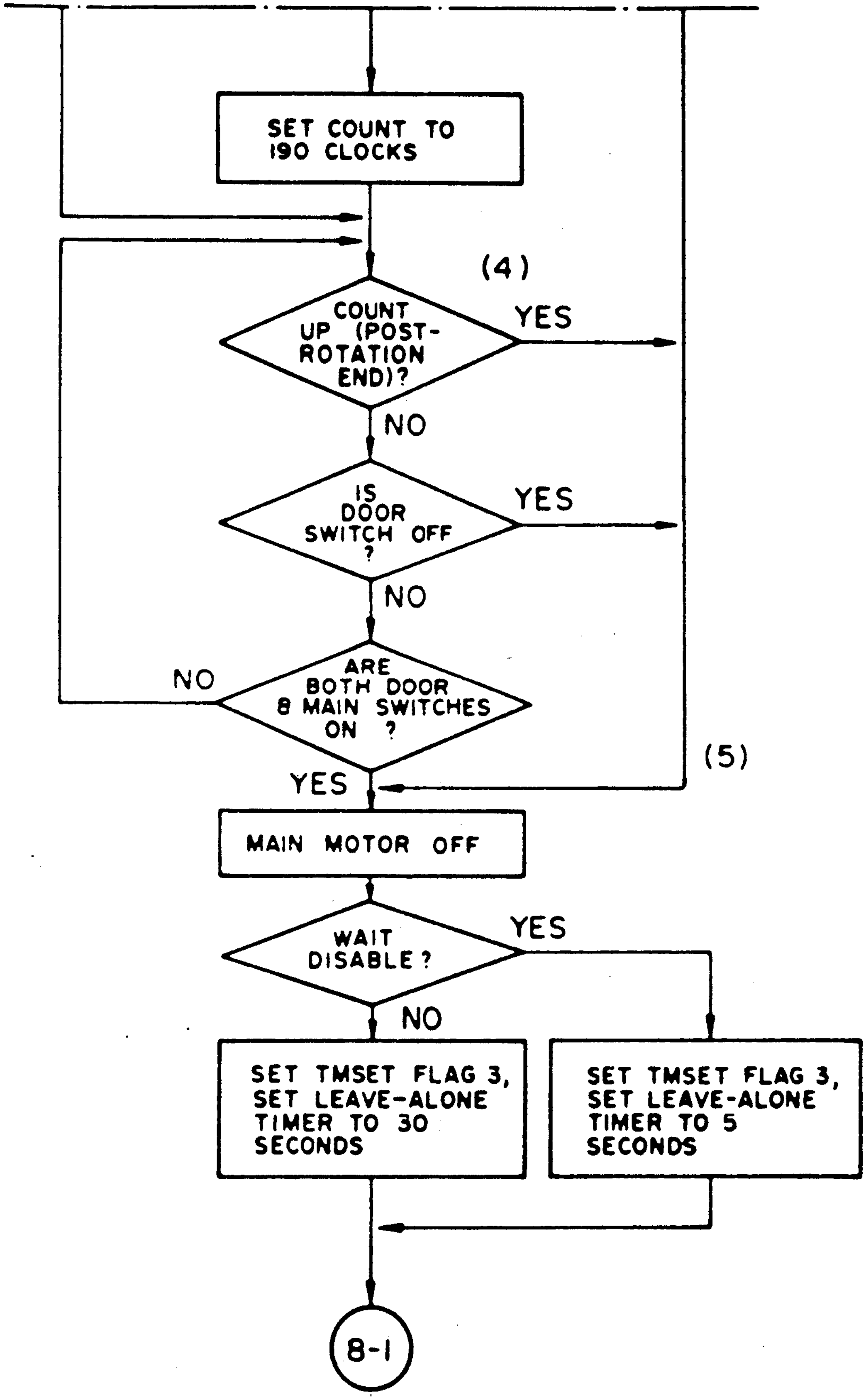
Figures 9C, 18:
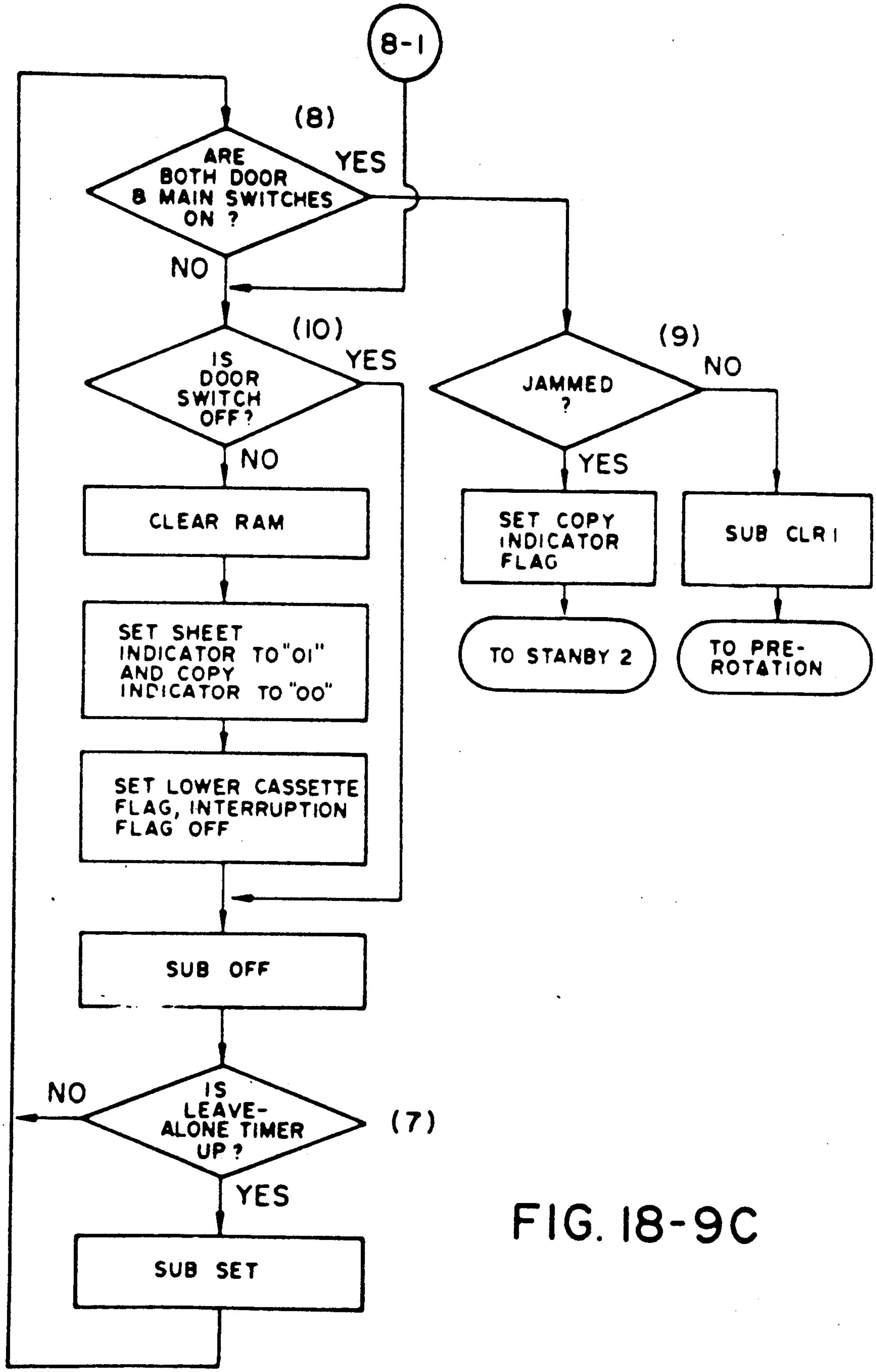
Figures 10, 18:
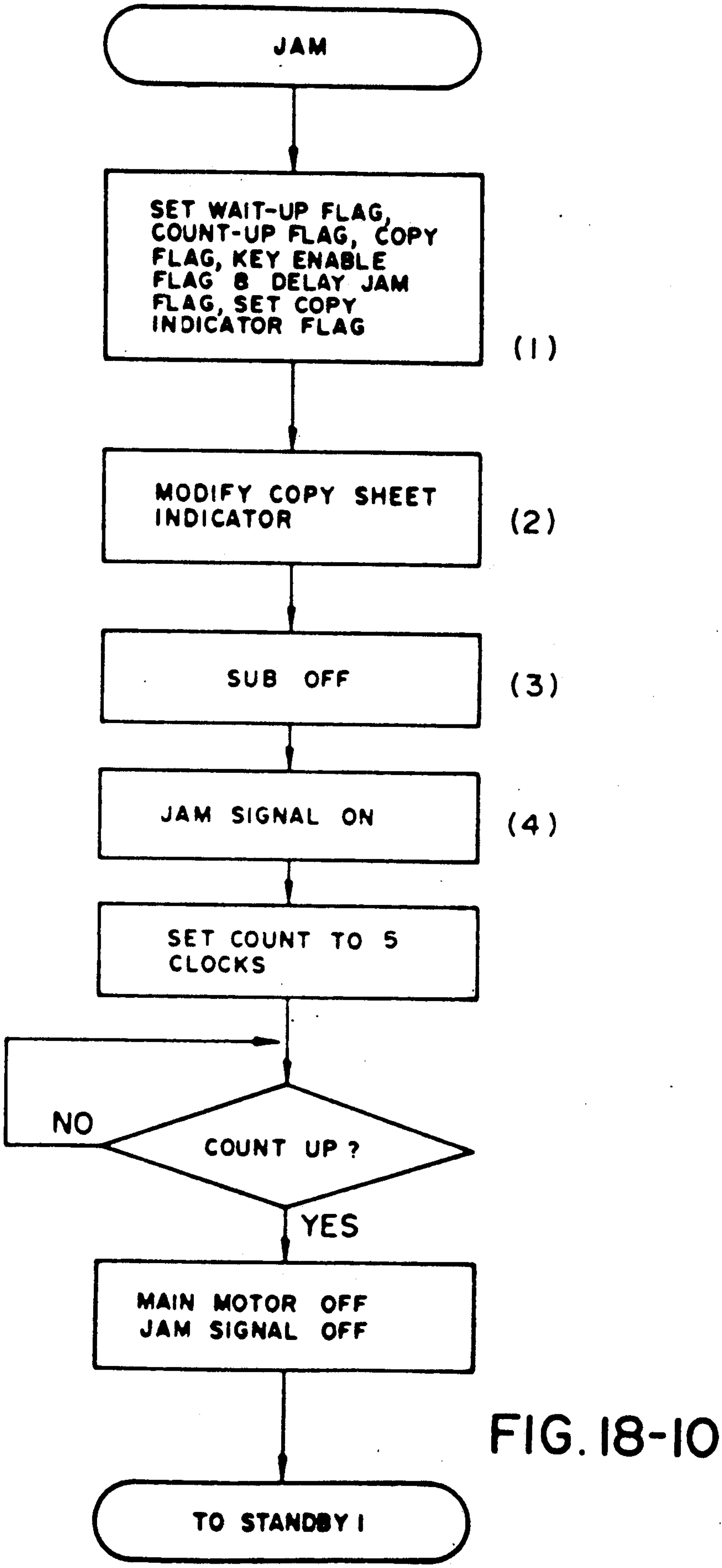
Figures 11A, 18:
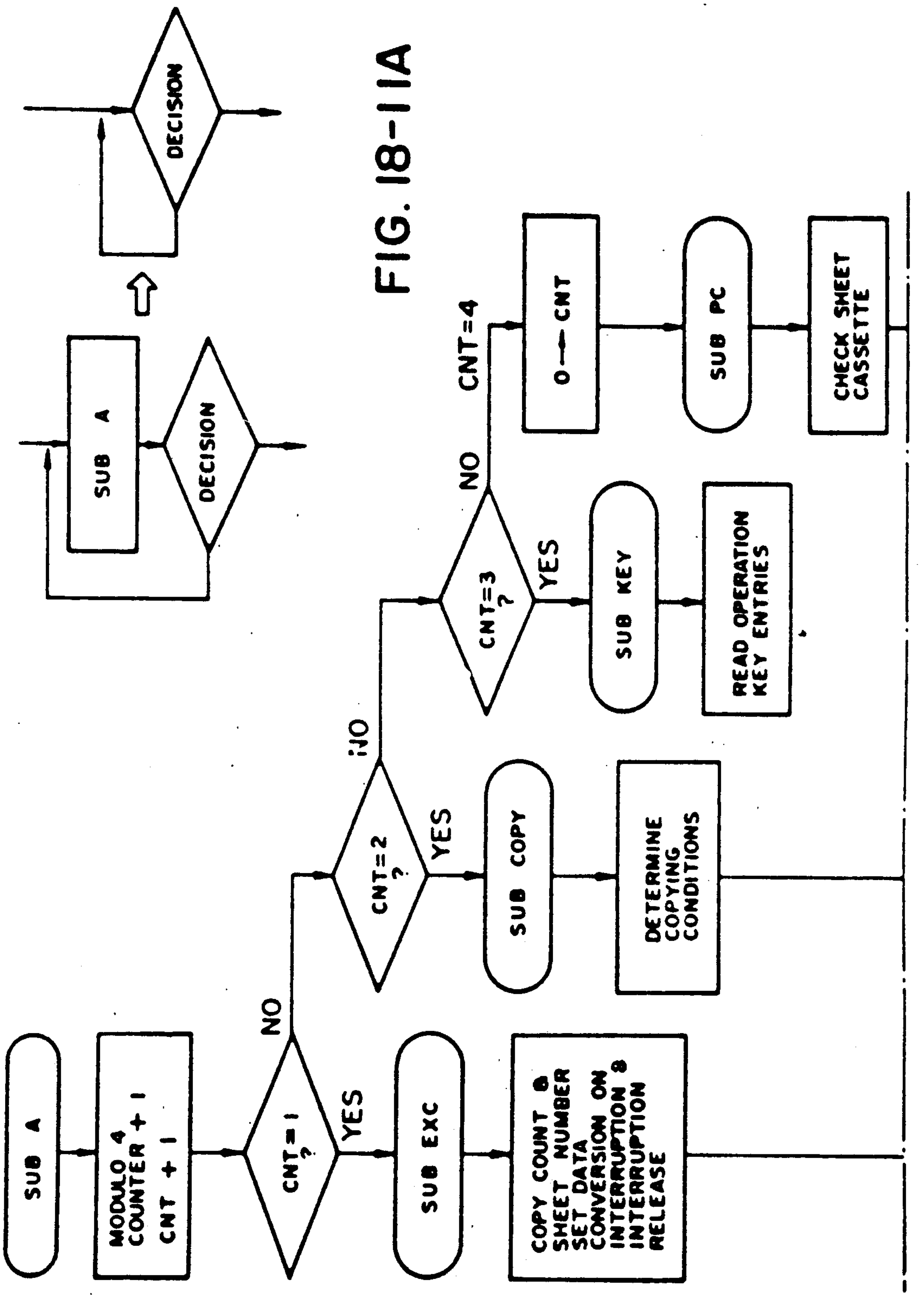
Figures 11B, 18:
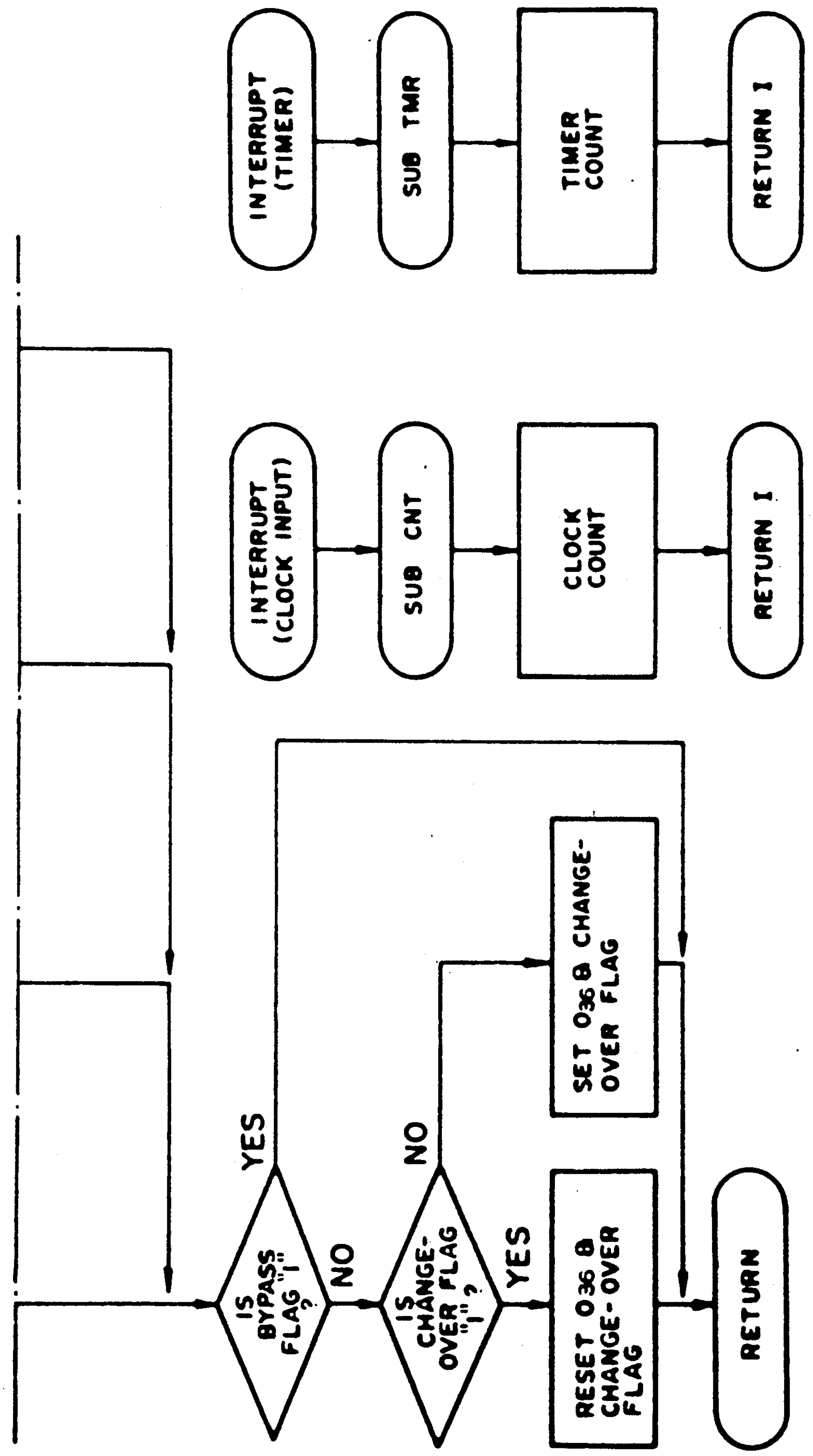
Figures 12A, 18:
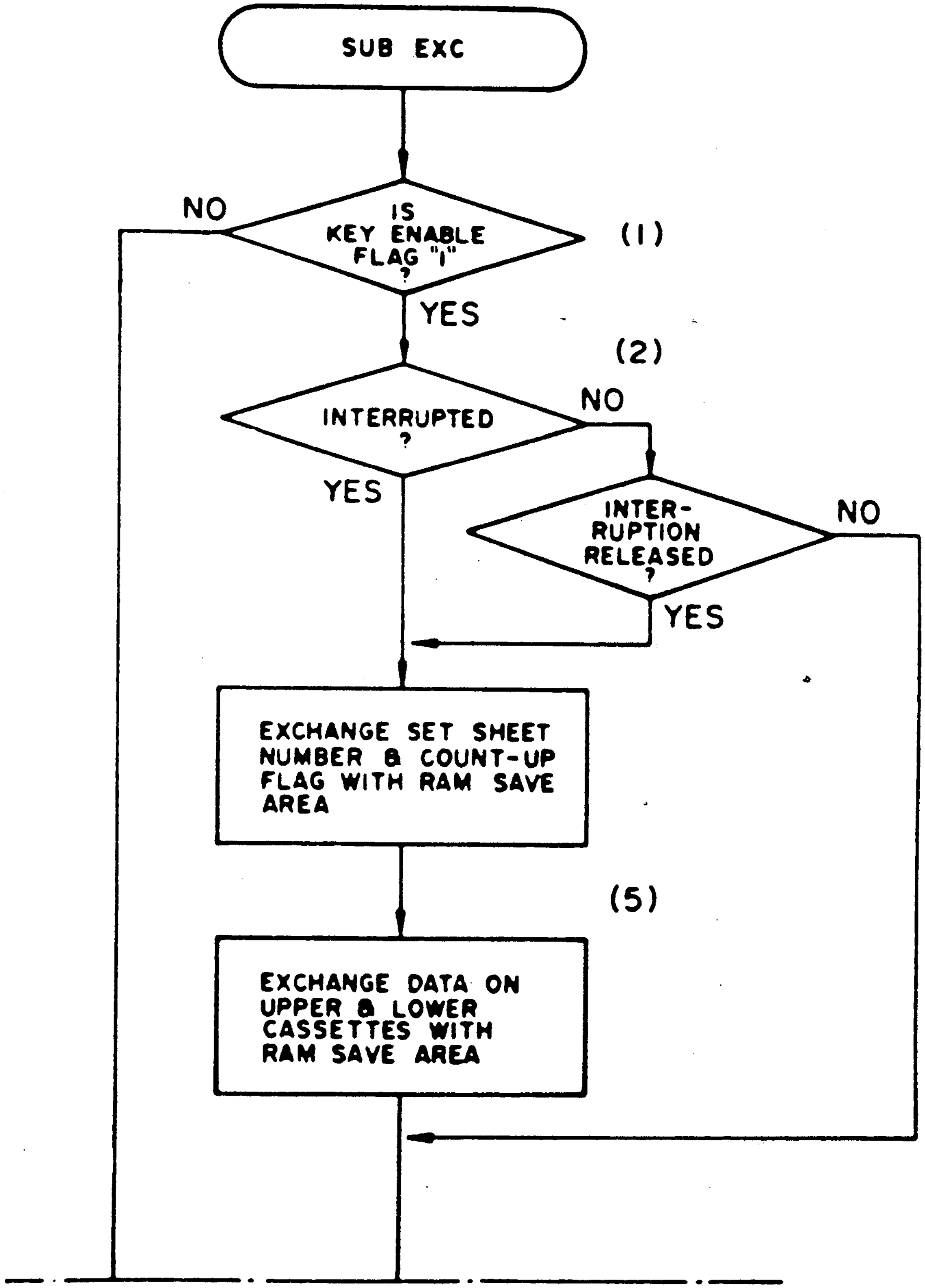
Figures 12B, 18:
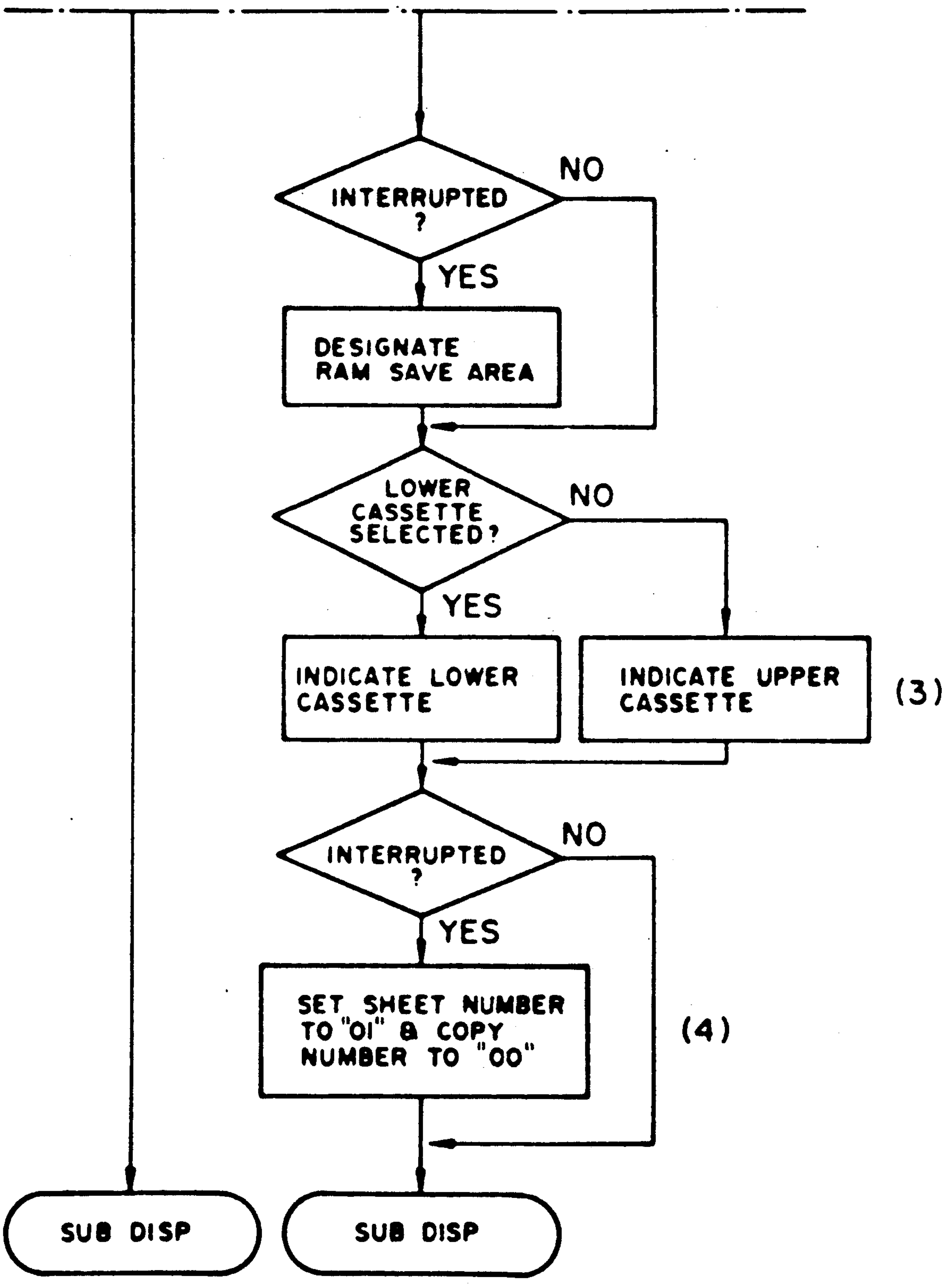

In FIGS. 18-11A and 18-11B, at the end of subroutine A there is provided a step for generating pulses for self check. When bypass flag enters the routine A, it is reset at the beginning of A. First entrance of the bypass flag into the routine A makes a bypass timer operate and after a certain time of timer (detection of abnormal condition) setting of the bypass flag is done. Thereby pulse from output port $0_{36}$ is stopped an abnormality detection signal is issued. The bypass timer is a timer of time during which decision routine (step from which the main flow chart having routine A is branched) can be executed more than predetermined times. Since timer is reset when the repeated execution of routine A has been completed within that time, bypass flag cannot be set.

Change-over flag repeats set-reset every execution of routine A and puts out pulses oscillatingly from output port $0_{36}$. Pulse from $D_{15}$ inverses 1 and 0 one time per 10 to 100 msec. As described above, when passed through the decision routine within a certain normal time, the bypass flag remains reset. Therefore, that oscillating pulse does not stop. When the normal time is over, the pulse stops and sets timer Q133 in the circuit shown in FIG. 12-2 so as to cut off power source line +10 V. A normal passage through the routine means, for example, that paper feed signal PF and registration signal RG could be detected correctly within a predetermined time length after the start of forward movement of optical system.

In FIG. 12-2, Q128 is on at the time of pulse oscillation from port 36 and does not charge the capacitor 109. But, when the pulse stops, the capacitor is charged to the potential of Zener diode ZD105 and Q129 is turned on. Then, Q129 applies the ground potential to the terminal 2 of timer Q133. Therefore, the timer is negatively triggered and it issues "1" from terminal 3 for a time of $T_1$ minutes determined by time constant of R190, C133. To transistor Q131 is applied about 15 volts of voltage rectified by full-wave rectifier 126 and smoothed by C116 through breaker CB101. Operation timing of the circuit is shown in FIG. 16-3.

The base of Q131 is connected to Zener diode ZD 106 and is at about 10.5 volts. Therefore, Q131 puts out stable direct current voltage of +10 volts.

Since Q130 is connected in parallel with ZD 106, when the timer Q133 issues "1" from its 3-terminal, Q130 is turned on, Q131 is off and +10 V current is turned to 0 volt. $T_1$ of time after the output of Q133 becomes "0" and Q130 is turned off. Therefore, Q131 is turned on and +10 V is again connected to CPU after $T_1$.

In this manner, when oscillating output from output terminal $0_{36}$ of the microcomputer stops oscillating, the power source to the microcomputer is cut off for a time of $T_1$. That time of $T_1$ after the power source is again cut in and the microcomputer is reset. At the rising time of power source, the microcomputer executes the program from the first address (FIGS. 18-2A through 18-2E) so that the content in RAM is cleared only by it. Without other operation such as jam removal, re-copying becomes possible. In this case, if such program is used according to which the flow is executed from the step 3 in FIG. 18-2B without clearing RAM, then re-copying can be started automatically.

When the programmed sequence of the microcomputer CPU or the sequence of the copying machine itself is broken, the power source becomes off irrespective of CPU being reset in the above described manner and reset and power-off are repeated only. Therefore, in this case, no oscillating pulse is issued from $0_{36}$. Instead, on-off of +10 V is repeated at the intervals of $2\times T_1$. As a result, various indicators on-off of which is under the control of CPU are also flickered repeating on-off at the same intervals, which gives the operator notice of occurrence of abnormal condition.

The microcomputer power source circuit shown in the drawing has, in addition, the following functions:

Firstly, it has a safety function against overvoltage. When the voltage at the emitter of Q131, that is, +10 V output rises up beyond Zener voltage of ZD109 that is about 11 volts for any reason, Q134 of SCR becomes conductive. Therefore, direct current from D126 increases through CB101 and R192 and thereby the breaker CB101 is opened.

Secondly, it has a function to shorten rising time of emitter voltage.

Since the rectified voltage coming from bridge diode D126 is smoothed by C116, the voltage applied to C116 at the time of power on has a long rise time. For this reason, the rising time of emitter voltage (+10 V) of Q131 is usually relatively long, which in turn may bring forth wrong operation of the microcomputer. To shorten the rise time as much as possible, voltage coming through R192 is firstly applied to the base of NPN transistor Q132 whose emitter is grounded, through Zener diode ZD107 and R187. Q132 is so formed that it is turned on only when the voltage applied thereto reaches the level of about 8 V determined by ZD107. When Q132 is off, the base of transistor Q130 is connected to R192 through R185 and R186. Therefore, Q130 is turned on and Q131 off by applying to the base of Q130 only a lower voltage of about 2 V through R192. This position continues until Q132 becomes on. This makes it possible that +10 V power source can rise up rapidly to about 8 V after rise-up of the rectified voltage up to about 8 V.

Also, in the shown embodiment, it is possible to trigger timer G133, when abnormal, by making oscillation on from port $0_{36}$ or making level "1" put out.

When +10 V to CPU drops voltage for any reason, there occurs sometimes latching-up which may make resetting of power source unable. In this case, the resetting of power source can be made possible by substituting the circuit shown in FIG. 12-4 for A circuit in FIG. 12-2.

It is also possible to check CPU without using $0_{36}$. To this end, serial pulses of scan signal issued from CPU for digit selection of indicators 20, 22 are introduced to the circuit as OSC in FIG. 12-2. In accordance to the pulse interval, the capacitor C109 is set. The same object may be attained also by using, as input OSC, any of pulses $0_{13}$ to $0_{16}$ issued for key entry.

INPUT CIRCUIT

Figures 1, 15:
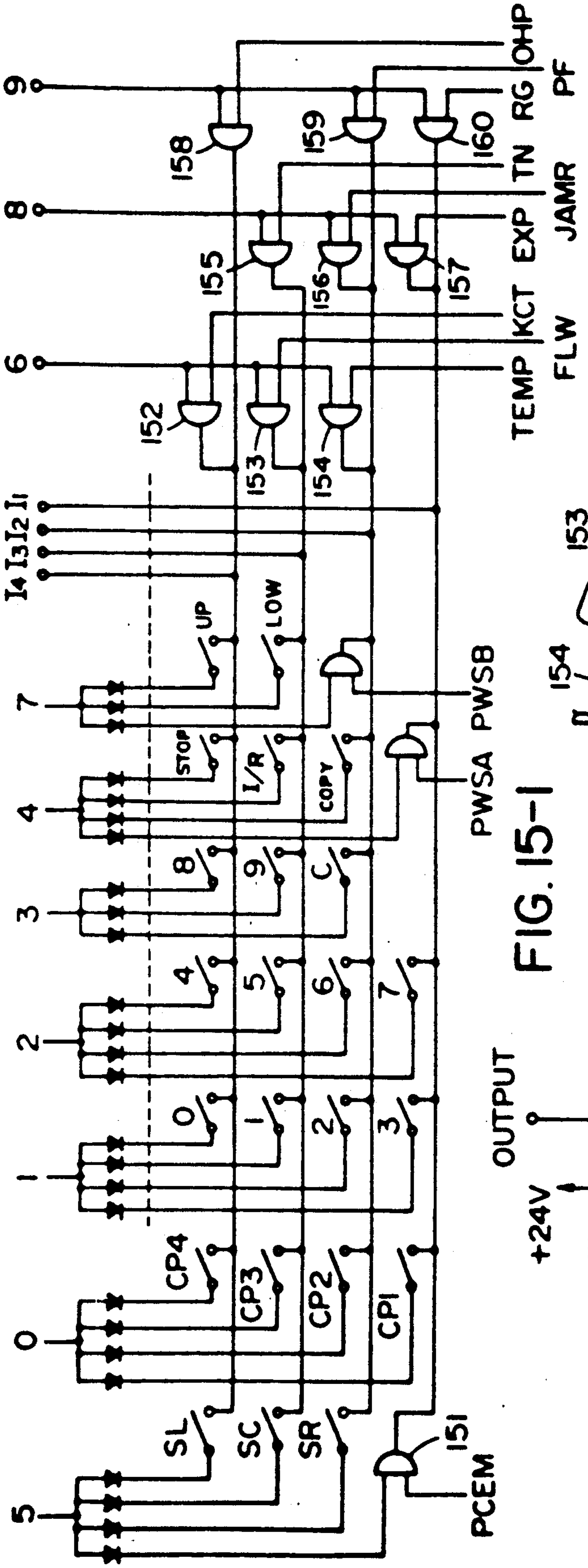
Figures 2, 15:
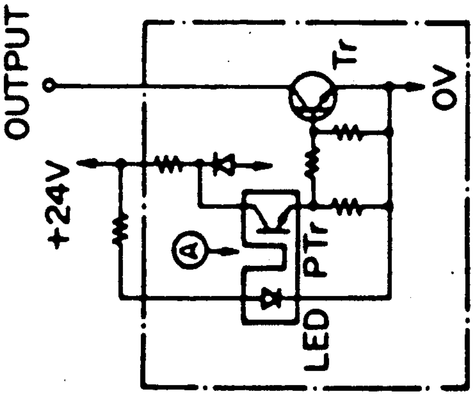
Figures 3, 15:
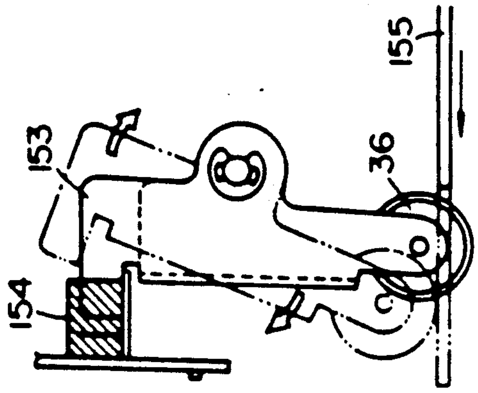
Figures 4, 15:
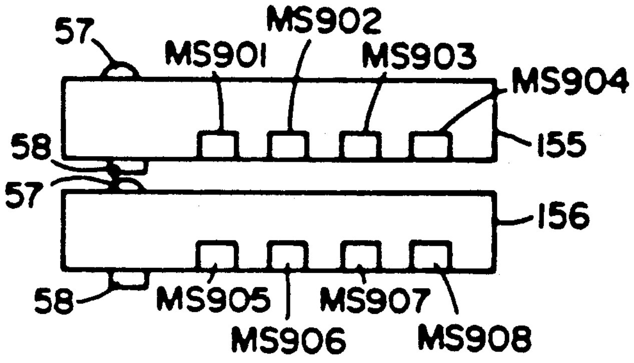
Figures 5, 15:
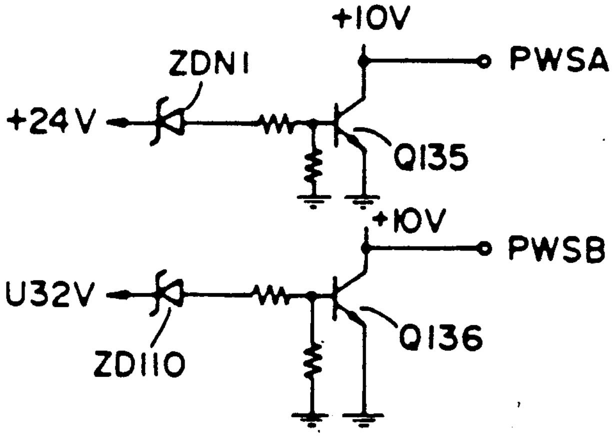
Figures 6, 15:
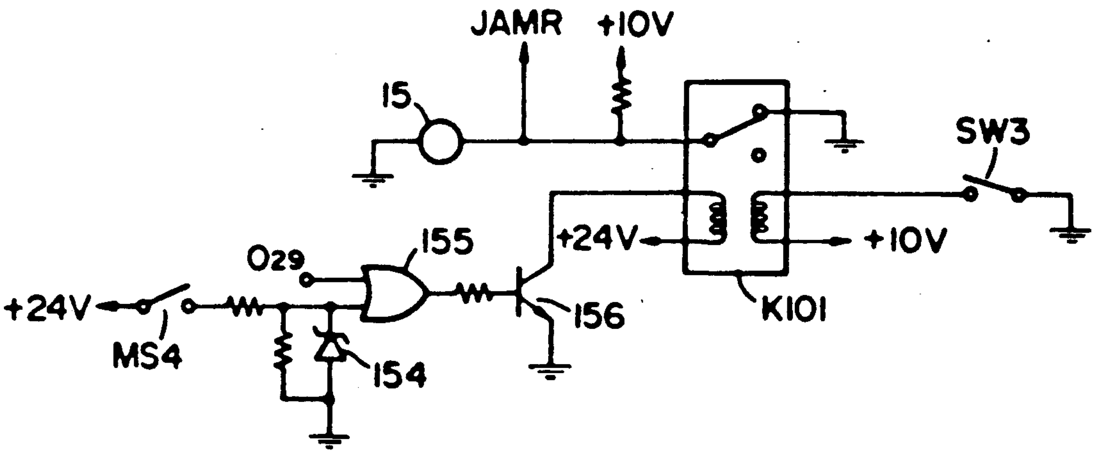

FIG. 15-1 shows a matrix circuit (multiplexer) for taking up touch key input signals into CPU.

Reference numerals 0 to 9 represent contacts of numeral keys, and C, STOP, I/R, COPY, UP, LOW contacts of clear key, stop key, interruption key, copy key, upper cassette selection key and lower cassette selection key, respectively. These contacts are closed by keying on.

CP1 to CP4 denote switches provided on the control base board. When the board is grounded, delay jam detection operation becomes inoperative (CP1), wait time is released (CP2), the number of drum rotations for surface potential sensing is made infinite (CP3) and multi-copy is made infinite (CP4).

SC, SL and SR designate signals issued from the microswitch which is actuated by insertion of cassette (FIG. 12-3). PCEM designates a detection signal informing of cassette empty. PWSA denotes a signal given by main switch on and PWSB a signal by door switch on (FIG. 15-5). TEMP, FLW and KCT represent detection signals informing of "fixing temperature OK", "liquid empty" and "key counter out" respectively. EXP indicates an original illumination lamp-on signal, JAMR a jam detection signal, and TN a too low toner concentration detection signal. RG designates a registration signal, PF per feed signal, and OHP stop position signal of the optical system.

Indications ⓪ to ⑨ correspond to probe output terminals from probe decorder 115 (FIG. 10). $I_1$ to $I_4$ correspond to input ports of CPU. 151 to 160 are AND-gates.

From ⓪ to ⑨ in DC controller are being issued oscillation signals of several KHz separately from each other in timing. For example, delivery of "1" to $I_4$ during the time of "1" being issued from ① means that key [3] of ten keys is depressed. In this way, the microcomputer reads every input signal and the necessary computing, storing and controlling are performed in the microcomputer.

SEGMENT INDICATOR

FIGS. 13-1 and 13-2 shows a seven segment LED indicator for indicating the set number of copies to be made and the number of copies already made.

LED 603, 604, 601 and 602 represent 7-segment indicators for the second digit of the number of copied sheets, the first digit of the same number, the second digit of the set number and the first digit of the same set number respectively. As shown in FIG. 13-2, each the indicator has seven segments a to g connected to signal sources ① to ⑨ respectively. Segments a–d are connected to digit selection probe signal sources. For example, in case that the set number of "7" should be indicated by LED602, three LED a, b and c of seven segments light on when ①, ② and ③ become 0 during the time of 1 being issued from a so as to display the number of "7". From a to d are put out oscillation signals of several KHz without any overlapping of a–d each other in pulse timing. Synchronously with it, ①~⑦ signals are issued. Since light in each digit flickers at a very high frequency, it looks as if it be lighting always.

These indicators operate in response to numeral key, start key, interruption key etc.

For example, in case that it is wished to make 23 sheets of copy, the indication of number is done in the following manner:

When power switch SW2 is switched on at first, the set number indicator 20 indicates "01" and the copy number indicator 22 indicates "00". Then, by keying on key 2 and key 3 in this order, there are indicated "02", "00" and "23", "00" in this order on the indicators respectively. When the copy start key is keyed on, the indicated numbers "23", "00" remain unchanged. When one sheet is fed into the copying station, the indicators indicate "23", "01". In this way, at the time of feed of n sheets, there appear "23", n on the indicators. When all of 23 sheets have been fed, the indicators indicate "23", "23". So long as the copy key is further keyed on before the end of copying, the machine stops copying and "23", "00" are indicated on the indicators. Thirty seconds after there are indicated "01", "00". However, if the copy key is further keyed on before the end of this copying operation, "23", "00" are displayed at the time point of keying on.

If the interruption key is keyed on during this copying and at the tenth sheet, then the indication numbers on the indicators change from "23", "10" to "01", "00". Further, by keying on the numeral key 5 there are displayed "05", "00" and with the start key the machine begins copying five sheets for the interruption copying ordered. When one sheet is fed, there appear "05", "01" on the indicators and when five sheets fed, indicators show "05", "05". Thereafter, the indication numbers are returned back to "23", "10". With every keying on of the start key after that, the indication advances further in the direction of "23", "11" . . . "23", "23".

If stop key 35 is keyed on during the execution of interruption copying of five sheets mentioned above, the interruption copying is stopped and there are displayed "23". "10" which were appearing on the indicators before the interruption. Thereafter, the machine begins copying the remaining part up to "23" firstly set. However, if keying of the stop key is done once more again, then the copying begins with "23", "00" at the time of the start key being keyed on. In other words, by keying on the same key two times, setting is renewed.

INPUT OPERATION

Firstly, the operator switches on the power switch 9. If the temperature of fixing heater is below the predetermined value (175° C.) at the time point, then "wait/in copying" indicator flickers. The operator opens the original table cover 5 and places an original on the glass plate with the original surface side down. Then, the operator aligns the original to the size mark.

The operator selects the cassette then used (upper or lower) by using any of cassette selection keys 28 and 29. In this connection it should be noted that if the operator switches the power switch off at first and then on, the lower cassette is automatically selected in the copying machine. Therefore, it is advisable that such cassette most frequently used among others be set on the lower cassette table.

In accordance with density of the original the operator sets the copy density lever to a suitable value (standard value is 5, and 9 is the highest and 1 is the lowest).

Then, the operator set the number of copies wished to make in the range of from 1 to 99 sheets by using ten keys 31. After confirming the set number of copies on the indicator 20, the operator keys the start key on. If the setting of the copy number can not be done even by pressing the ten keys or if the operator failed to set the copy number correctly, he has to depress the clear key and again to setting.

After starting copying and during the time period of from the lighting of original illumination lamp to the reversal of optical system for the last copy, no change of number and cassette selection once set is allowed even when clear key, ten keys and cassette selection key are keyed on.

When the cassette empty indication lights on and the copying operation is stopped, the operator sets copying papers in the emptied cassette and sets then it into the machine. By keying the copy start key, the remaining number of sheets are automatically copied. In this case, it is also possible to restart copying automatically by using detection signal of cassette set without keying the start key on.

When it is desired to stop copying during a continuous copying operation (multicopy) and stop key 35 or interruption key 33 is depressed by the operator, the machine stops after the completion of the copying in operation at the time point. When the copy operation is stopped by keying the stop key 35 on, the copy number indication stops with the number of copies made at that time point. When the copy start key is switched on, the copy number indication begins with 00 and papers in the set number are automatically copied.

When the copying machine is left alone for about 30 sec. after setting of the copy number by ten keys or the end of copying (drum stop), the set copy number on the indicators is cleared to "01", "00".

For interruption copying, operation and indication proceed in the manner previously described. The number of copies made just before the interruption, the set number of copies to be made and the data of selected cassette before the interruption are all stored in RAM of CPU by keying the interruption key. Therefore, the lower cassette indicator lights on. The operator opens the original table cover and changes the original for the wished interruption copy. Then, the operator sets the number of copies wished to make for this interruption copying by ten keys. At the same time, he selects the cassette size as desired by cassette selection key. The number and cassette size selected are indicated on the indicators. Upon the end of the interruption copying, the indication on the indicators is restored automatically to the original ones stored in memory RAM. Cassette size indicator indicates again the originally selected cassette (upper or lower) and the size thereof.

When the operator switches the copy stop key to stop the copying operation during a continuous copy, the copying machine stops when the end of the operation cycle which was proceeding at the time of the stop key being keyed on. When the optical system is in reversal point or reversed already, the indications on the set copy number indicator, size indicator and cassette selection indicator are restored at once to those as they were before interruption.

Further keying the interruption key during the execution of an interruption copy has no effect.

After restoration of the indication of the set copy number, i) another interruption copy may be started by depressing the interruption key;

ii) indication may be cleared to "01", "00" by depressing the clear key; and iii) indication of the set copy number remains unchanged even when the copy stop key is depressed, but the indication of number of copied sheets starts with "00".

DIRECT CURRENT LOAD

FIG. 13-3 shows a circuit for driving paper feed.

SL1 and SL2 denote solenoids for moving downward the paper feeding rollers for upper and lower cassettes respectively. UPUS and LPUS designate signals for initiating the downward movement of the upper and lower cassettes respectively. The output of each the signal is "1" and is issued from CPU in response to paper feed timing detection signal PF and cassette selection signal described above.

If the total counter is out of order for any reason (signal $\overline{\text{CNTD}}$ is "0"), then these signals can not be issued.

FIG. 13-4 shows a circuit for driving the optical system forward clutch.

CL2 designate an electromagnetic clutch, SCOV a signal which becomes "1" when the overrun detection microswitch MS4 is actuated, and SCFW a forward signal.

The forward clutch CL2 is actuated by the issuance of forward signal ($\overline{\text{SCFW}}$ is "0") when $\overline{\text{SCOV}}$ is "1".

If SCFW remains "0" and the optical system is not reversed at a given point, MS4 is actuated to make $\overline{\text{SCOV}}$ "0" (24 V is cut off). Therefore, CL2 is switched off although $\overline{\text{SCFW}}$ remains "0" at the time.

Backward clutch driving circuit is essentially the same as the above described forward clutch driving circuit with only the exception that CL2 is replaced by CL3, $\overline{\text{SCOV}}$ by +24 V and $\overline{\text{SCFW}}$ by $\overline{\text{SCRV}}$. Operation of the registration clutch corresponds to that of the latter mentioned backward clutch in principle.

DRUM PULSE

FIG. 15-2 shows a circuit of fundamental clock generator for generating CL signal.

When the power switch is on, LED is always lighting since +24 V is applied thereto. At this position, phototransistor PTr is on, transistor Tr is on and output OUTPUT is "0".

When a shield plate comes into the slit at part A shown in the drawing, the light of LED is cut off so that the output is turned to "1". Since the shield plate rotates in synchronism with the rotation of the main motor, issuance of output "1", "0" is cyclically repeated (88 clocks/sec.).

OUTLET DETECTION

FIG. 15-3 shows a paper detector provided in paper discharge station for generating signal JAMP.

Designated by 153 is a shield arm, 154 a light receiver in the same form as shown in FIG. 15-2, and 155 a sheet of paper. The sheet comes against the arm 153 and pushes the latter in the direction of arrow so as to allow the light to enter the light receiver 154. Thus, output "1" is developed.

CASSETTE DETECTION

FIG. 15-4 is a schematic view of the cassette size detector mentioned above.

As seen in the drawing, the cassette table is divided into two sections, that is, upper section 155 and lower section 156 each having four microswitches mounted thereon for delivering signals to DC controller. These signals are used for discrimination of cassette size and others.

Figures 4, 16, 17:
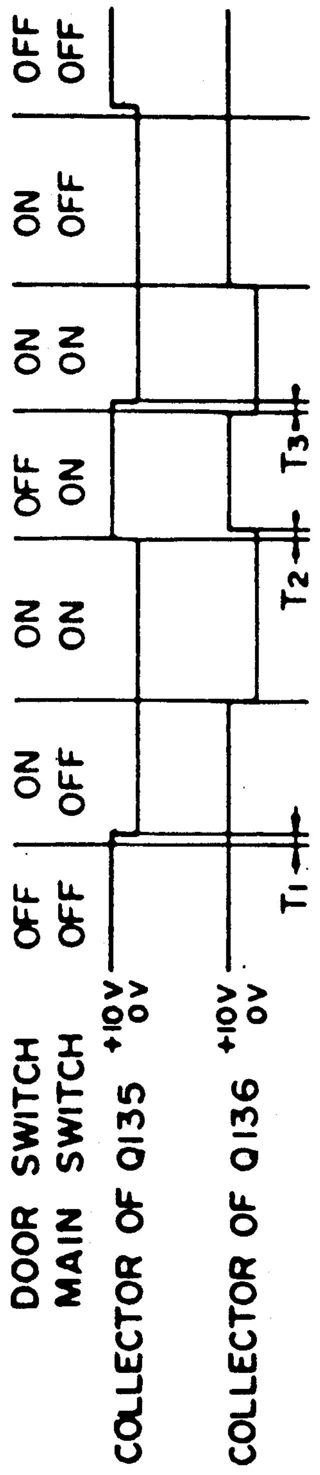

The relation between on-off of these switches and cassette sizes is seen in FIG. 17. Among these microswitches, MS902 and MS906 are used to check whether cassette is present or absent (in the case shown in FIG. 15-4, cassette is absent and therefore the output is "1").

The relation between cassettes and indication part is shown in FIG. 12-3.

By depressing the upper cassette selection key, a signal CSS "1" is issued from the DC controller to light LED629 on (indication of upper cassette selection). By the lower cassette selection key, CSS 0 is issued to light LED630 on (indication of lower cassette selection). If there is no cassette in the cassette table at this time, then the microswitches are not actuated. Therefore, for example, in case of selection of upper cassette, MS901, 903 and 904 all become "1". Thereby, signal PCEL "1" is issued from DC controller to put LED634 on (indication of paper/cassette supply).

Also, when the cassette is wrong, MS902 is not actuated so that it is indicated by lighting of the indicator in the same manner as above.

If there is no paper sheet in the cassette selected at the time (cassette empty), PCEL becomes also "1" through the circuit of CdS 58 to light LED634 on.

When a cassette of B4-format is inserted, MS901 and 903 are actuated and therefore both of MS901 and 903 become 0 and MS904 becomes "1".

At this time, an output of "1" appears at B4 port of DC controller so that LED 607 and 608 are put on.

POWER DETECTION

FIG. 15-5 shows circuits for putting into CPU a power switch-on signal PWSA and a door switch-on signal PWSB.

The circuit for PWSA is connected to +24 V line and that for PWSB to U32 V line. Indication on the indicators is held by these signals.

CONTROL FLOW

FIG. 18-1 schematically shows the flow along which the above described various controls are carried out.

When the subswitch and power switch are switched on, the program is executed in the following order: start of timer for pre-wet, reading of switch-on for jam enable and other enables, discrimination of on-position of the copy key after passing through the entry flow chart for numeral key input, and the pre-rotation step and the copy cycle step.

Figures 2A, 9:
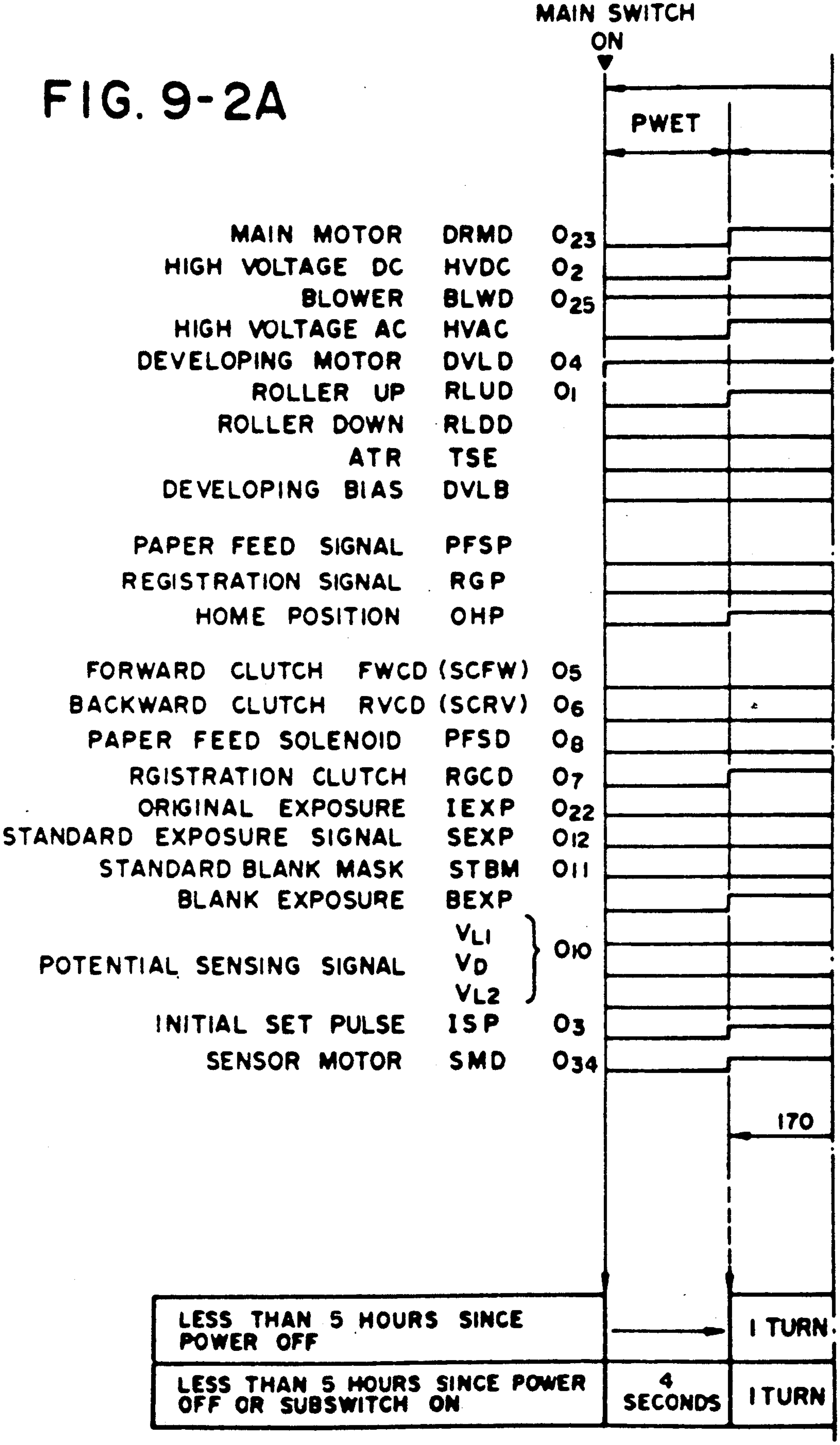
Figures 2B, 9:
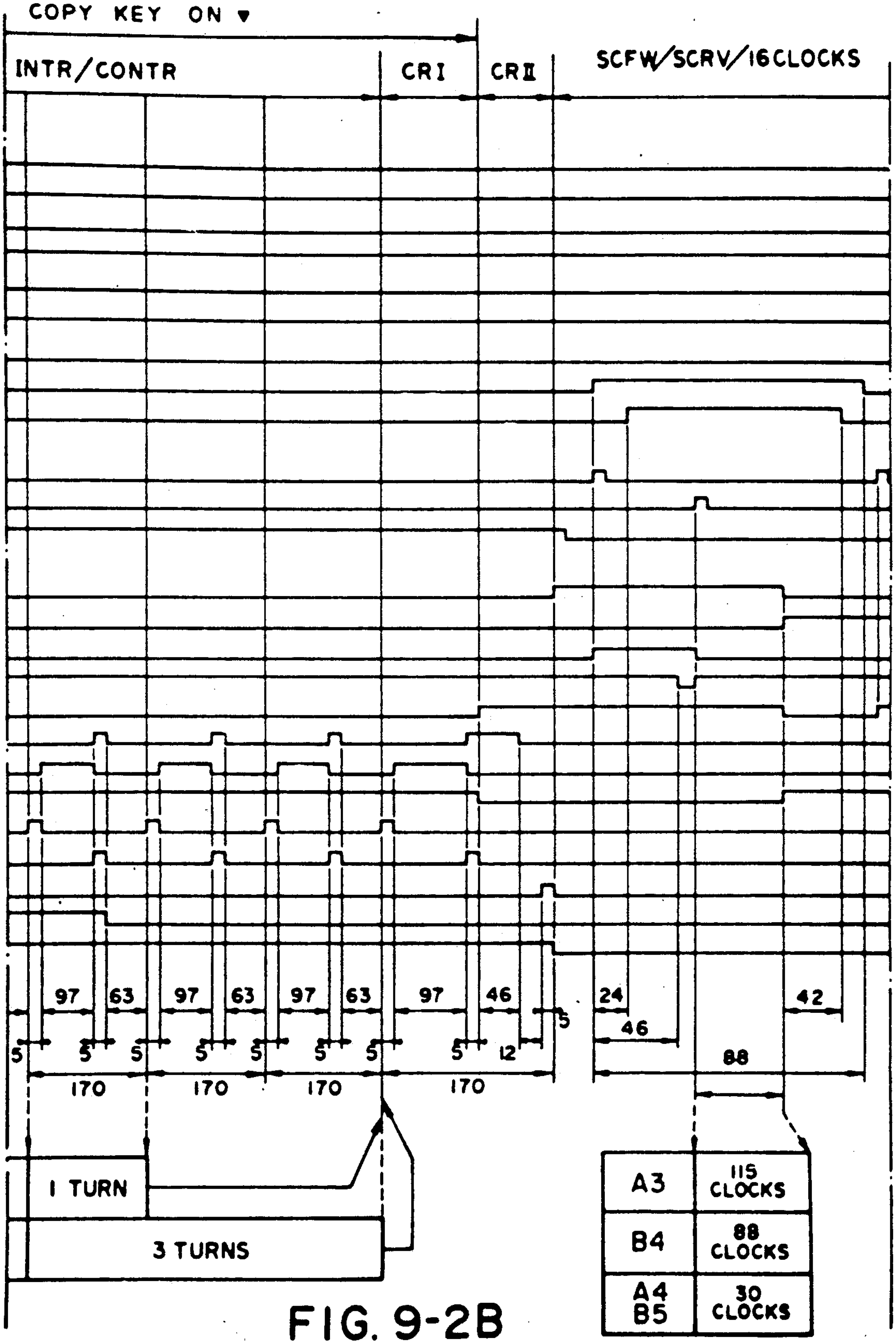
Figures 2C, 9:
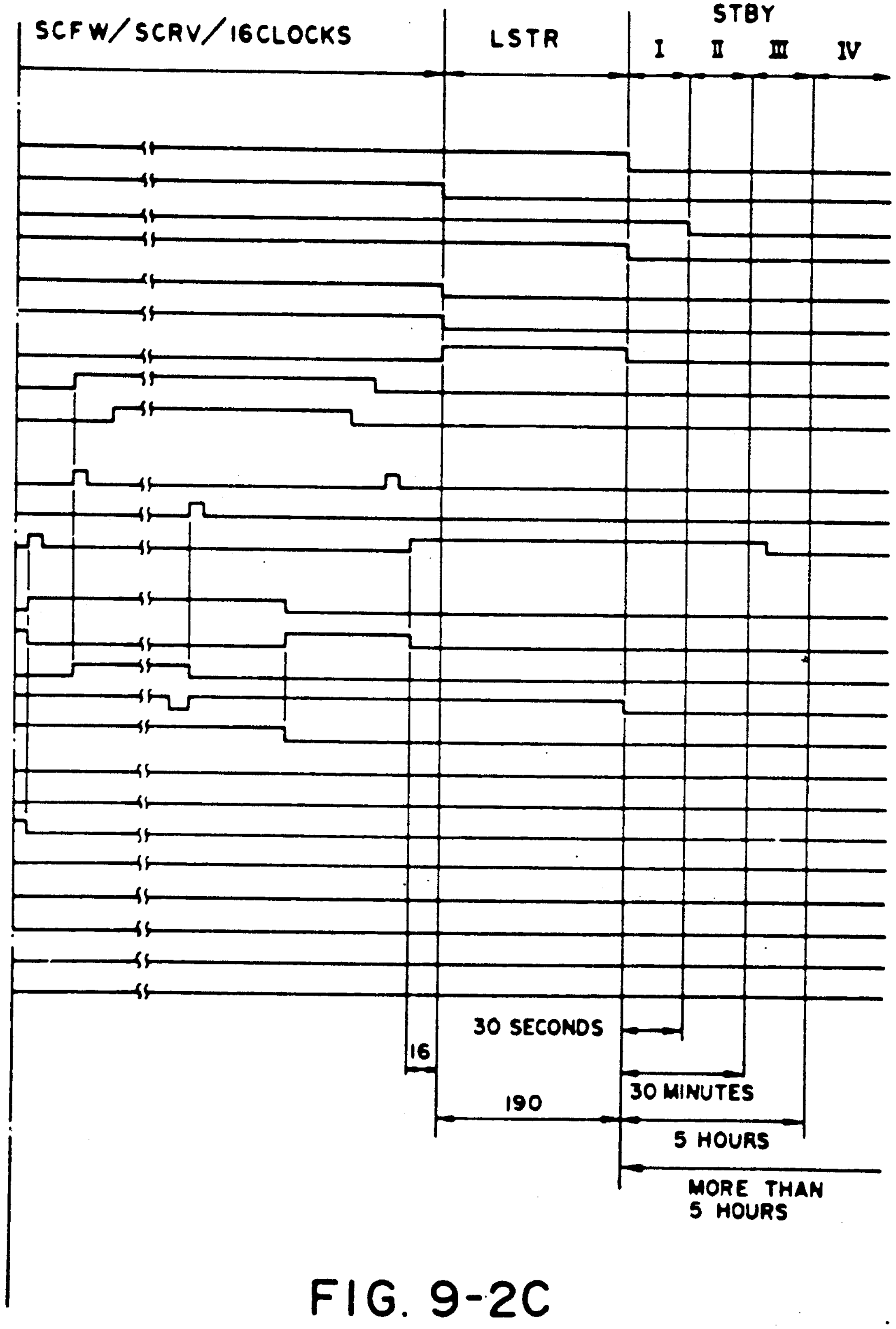

FIGS. 18-2A through 18-2E show a flow chart of program after subswitch-on.

With the switching on of the subswitch, CPU starts operating. When the subswitch is switched on, the computer CPU starts program processing ROM. At first, it inhibits interrupt input and internal timer interruption, resets output port and input port and clears RAM (1). Secondly, it sets numbers of set sheets "01" and of copy sheets "00" on the indicators respectively (2). However, since the indicator power source 24 V has not been cut in yet at this time point, the indication of the numbers set above can not appear on the indicators. Thirdly, it sets input ports $I_4$ and $I_3$, reads in input data PWSA and PWSB to check whether main and door switches are on or not (3). When neither of the switches is on. The above described steps are repeated. When both of them are on, the computer sets TM flags 1, 2 and 3, sets lower cassette flag and issues lower cassette signal CSS to indicate it (4).

Thereafter, it turns developing motor, blower motor and sensor motor on, clears the register storing the number of sheets in the machine and sets copy indicator flag and key enable flag (6). In the next step, it sets the input port $I_2$ and reads signal CP2 to check whether wait is disable or not (7). When yes, it sets wait disable flag to omit rotation and when not, it resets wait disable flag and checks whether 5 hrs. TM flag 3 is "1" or not (8). When five hours have not passed, it further discriminates whether 30 sec. TM flag is "1" or not. When 30 seconds have not passed yet, it enters at once control rotation $CR_2$. However, since TM flags 1, 2 and 3 have been set, it sets a timer set flag 2 for execution of pre-wet, sets the timer to 4 sec. and then executes the timer operation for executing the pre-wet. After the elapse of 4 seconds, it sets pre-rotation count to 170 clocks in the predetermined area of RAM (10). And it advances further to switch the main motor on for pre-rotation.

FIGS. 18-11A and 18-11B show a sub-routine A for key entry, signal entry and indication. This sub-routine A is to be provided at the decision step of the main flow charts shown in FIGS. 18-2 to 18-10 so as to execute the program at the decision step. It detects key-on and input signals in the matrix circuit shown in FIG. 15-1 and controls the processes and indications described above.

SUB EXC, -PC, -KEY and -COPY shown in the sub-routine A are further shown in detail in FIGS. 18-12, 13, 14 and 15 respectively.

Figures 12C, 18:
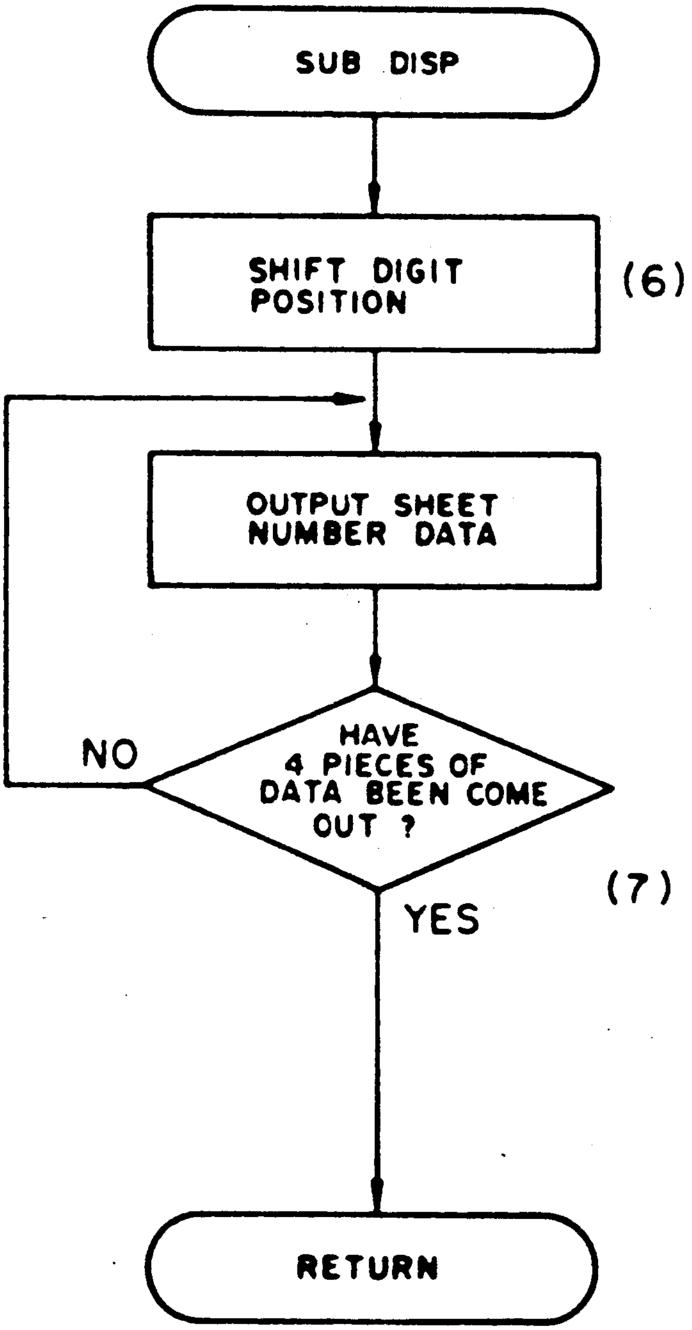
Figures 13A, 18:
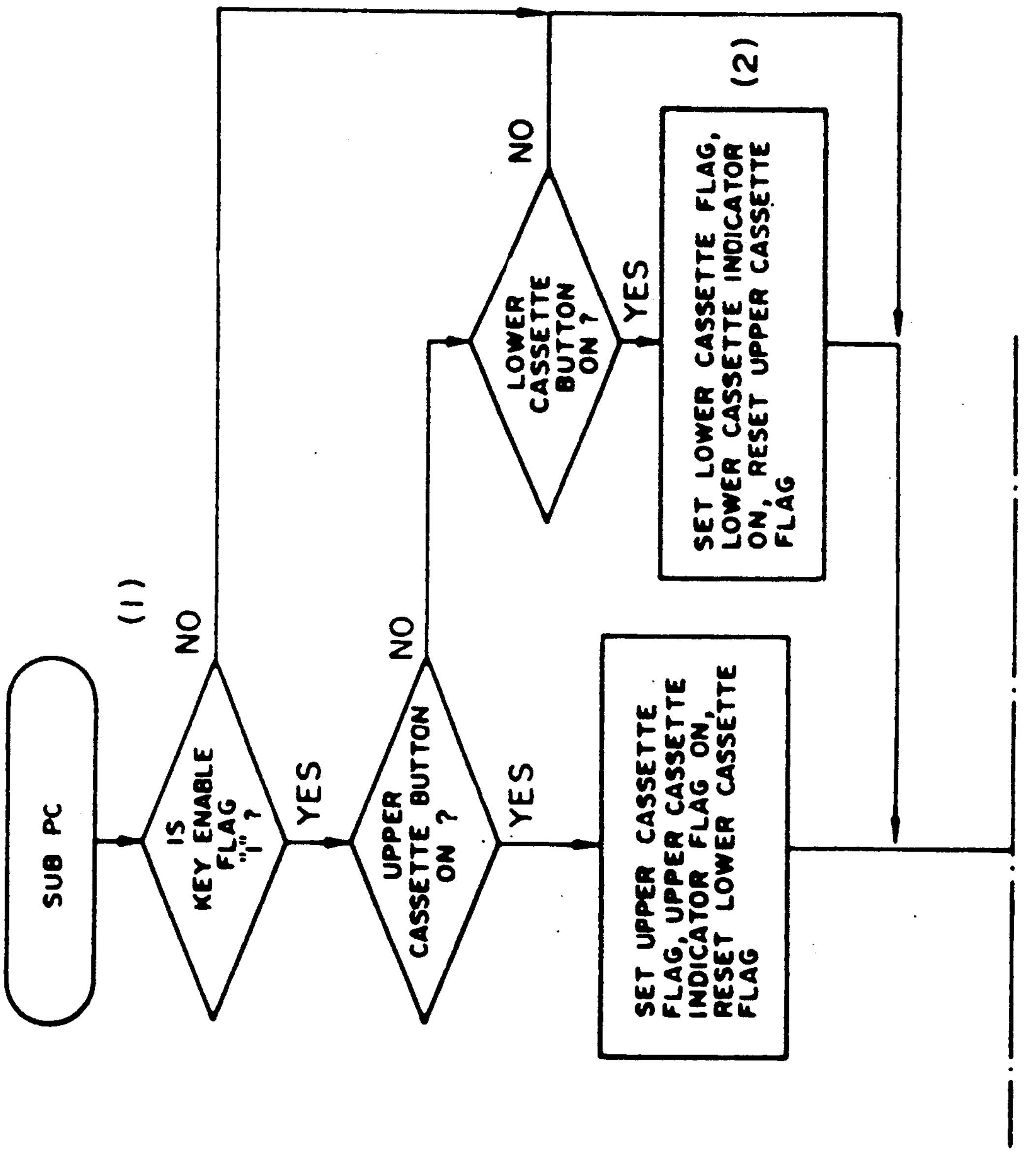
Figures 13B, 18:
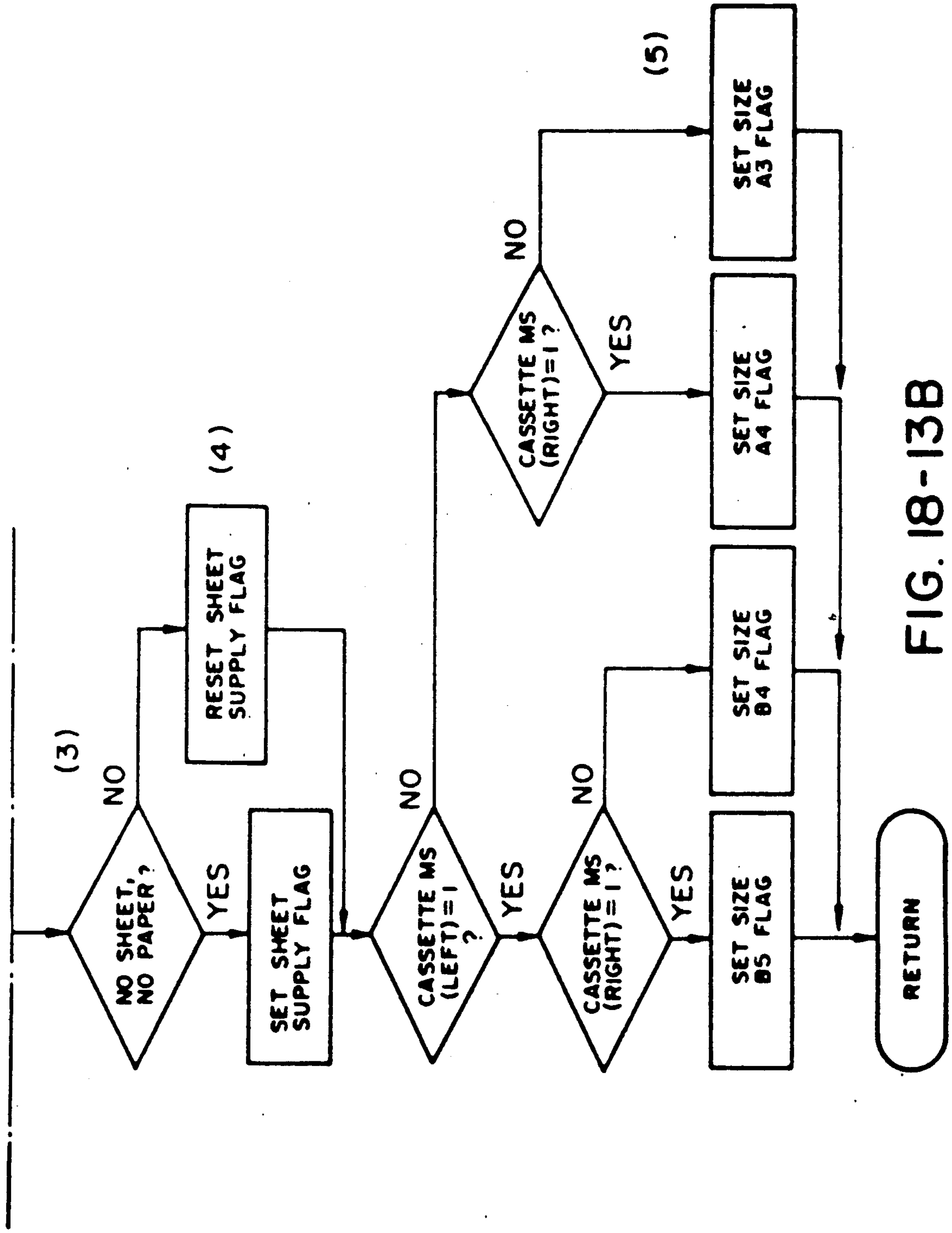
Figures 14, 18:
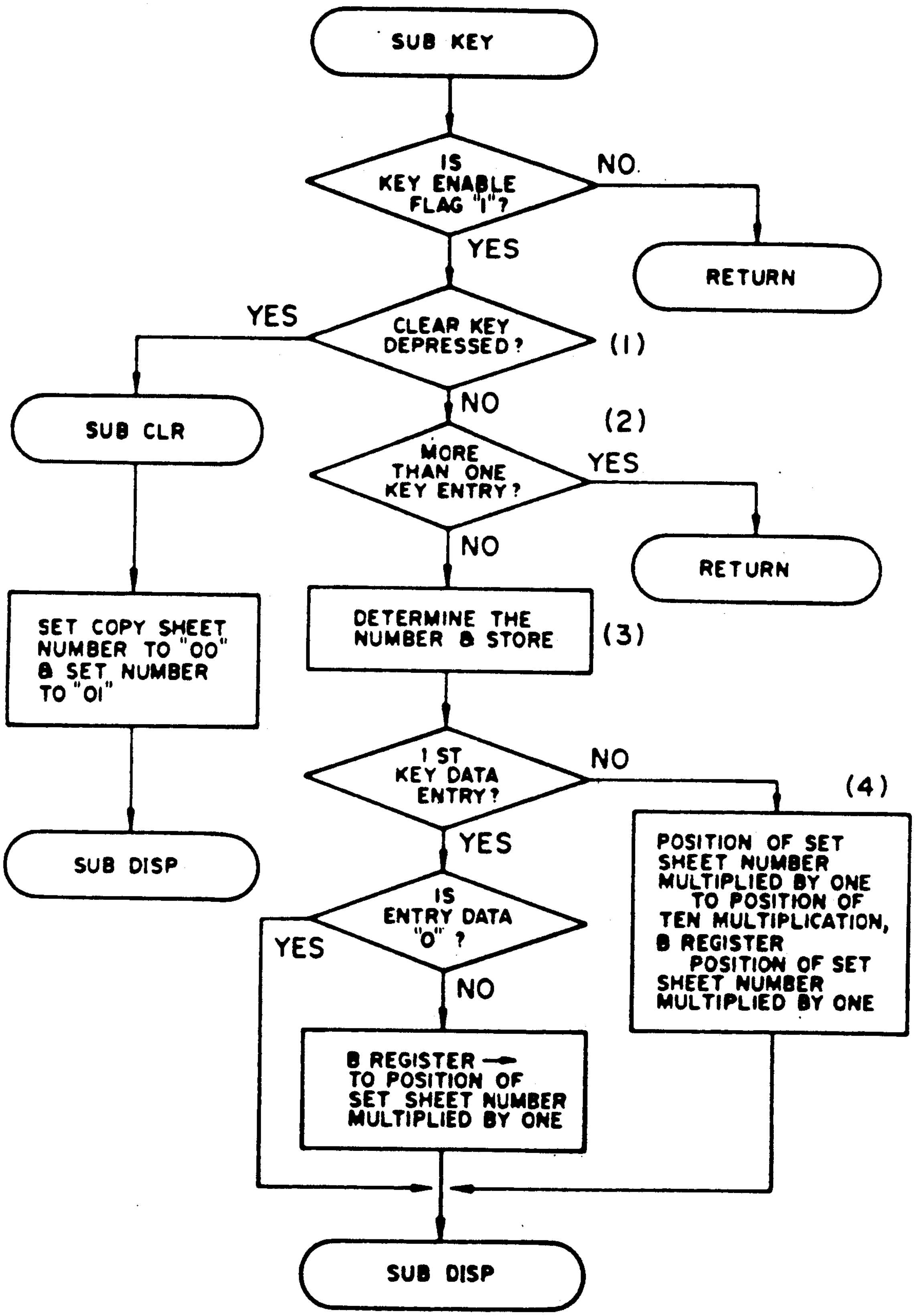

In FIGS. 18-13A and 18-13B, key enable flag can not be "1" when both of main and door switches are off, when jammed and when copying is in operation. When this flag is not "1", the sub-routine does not respond to the keying on of cassette selection key 28 or 29. At the time, upper and lower cassette flags remain unchanged. Reading is carried out only when the key enable flag is "1". This program routine works one time per 10 to 100 msec. during the execution of the main flow and therefore each flag is set and stored in a moment after the depression of the above mentioned selection key. After that, the program advances into other reading routine of the sub-routine A.

Each the flag may change in response to signal other than key-on of the selection key.

When either of door and main switches is turned off, the sub-routine rotates in the program loop 7→8 shown in FIG. 18-9 and continues rotating in the loop until pre-rotation is started by switching on of both the door and main switches. In this loop, so long as decision is that door switch is off although the main switch is on, the position is regarded, in case of the shown embodiment, as a copy interruption. Therefore, flags are not reset and cassette flag also remains unchanged (10). However, in case that the main switch is off, the lower cassette flag is set. Therefore, after SW2 being switched on again, the lower cassette is selected at first.

Sub-routines for reading and releasing of interruption copy are shown in FIGS. 18-12A through 18-12C and 18-15A through 18-15D, respectively.

Data of conditions for the ordered interruption copy such as the number of sheets and a selected cassette can be held even when the door switch is turned off. This is very convenient to the next operation. Also, for interruption copy, the set sheet number and copy sheet number are cancelled by depressing the stop key twice and "1" and "0" are indicated respectively. Furthermore, it is possible to make data on the indicators such as data of selected cassette saved in the memory by instruction of interruption copy and to recall the saved data by stop key or by the end of the interruption copy. Even when the door switched is opened and power becomes off by occurrance of jam during an interruption copy cycle, data on the interruption copy are not cleared but remain stored. When the power becomes on again (the door switch on), indications on the indicators restore the original positions in which they were just before the power-off and the machine is released from the interruption by keying on the copy key. It is also possible to continue indication during the interruption of operation in case of such door switch-off.

When it is wished to release the interruption manually, it is accomplished by pressing the stop key in accordance of the program shown in the drawing. It is also possible to clear completely by depressing the stop key only one time during interruption copy and make the indicators 20 and 22 indicate "1" and "0" respectively. On-off of the main switch can perform this function.

Referring to FIG. 18-15 (SUB COPY), interruption flag and indicators are reset by depression of stop key at the time of interruption flag being "1" (during interruption copying). At this time, data of the copy number are indicated which belongs to the copy operation before the interruption. To continue copying from the position after the end of the interruption copy, "temporary stop flag 2" is set (12). This flag is to be used at step 2 in FIG. 18-7C and at step 13 in FIG. 18-8B.

Since this part of routine is also repeated at the interval of 10 to 100 msec., the temporary stop flag 2 is made reset (5) and the position to continue the original copying operation is made released by depressing the stop key once more after releasing it once. This is because both of the release of interruption copy and the stop of copying operation can be made only by depressing the same stop button 1. Automatically, the stop button is used properly. After pressing the stop key, numbers on the indications may be cleared to "1" and "0" by the clear key.

At the time of interruption copying and at the time of the release thereof. Data exchange is carried out in SUB EXC shown in FIGS. 18-12A, 18-12B and 18-12C.

At the time of interruption, data of whether the copy sheet number is counted up or not, data of other conditions and data of cassette selected are all shifted from the memory part of RAM for indication to the memory of RAM for saving data to store the data in the RAM save memory for the time being. At the time of the release of the interruption, the stored data are shifted from the save memory area to the memory area for indication (exchanging of data). Therefore, at the time of release of the interruption, the position including that of cassette restores its original position as it was before the interruption.

For interruption copy, the same cassette as that used before the interruption is used so long as another cassette is not selected at the time of the interruption. And copy number starts with "0". It is possible for interruption copy to automatically set such cassette which is most frequently used for interruption copy.

In the shown embodiment, it is also allowed to set an interruption by keying on the interruption key even when copying is being interrupted by the stop key.

FLAG

The input terminals $I_5$ and $I_6$ in CPU 111 are ports for interrupting the program being proceeding at that time by input signals to the ports and executing another particularly determined program (interruption). Of the two ports the former $I_5$ is engaged in interruption by drum clock signal (CP) and the latter $I_6$ is by sheet detection signal (JAMP). Cl denotes a pulse oscillator of $1\mu$ sec. of pulse duration for running CPU 111, and +10 V a port for applying to CPU 111 the output voltage of power source shown in FIG. 12-3. Designated by G is a port for grounding CPU111.

In ROM of CPU there are stored programs programmed according to the flow charts shown in FIGS. 18-1 to 18-19 and in RAM there are flags alloted to respective addresses which flags are listed up in the following table, Table 1. When set these flags become "1" and when reset, they become "0". By discriminating between "1" and "0" in position, the proceeding of the program is controlled.

TABLE 1

| Flag Name | Function |
|---|---|
| Copy Flag | When copy button is keyed on, this flag is set so long as copy conditions are all OK. When all of the conditions are not OK or when copying is completed, it is reset. |
| Key Enable Flag | During this flag being set, key entry is possible, but during reset, entry impossible. At the start of copying this flag is reset and at the end of copying it is set. |
| Copy Indication Flag | During copying, this flag is in the reset position and at all other times it is in the set position. In the reset position, this flag inhibits OFF-ON switching of copy lamp. |
| Interruption Flag | This flag is set by interruption key and reset by the end of the interruption copy or by stop key. When set, interruption processing is executed. |
| Count-Up Flag | When the set sheet number and the copy sheet number coincide with each other, this flag is set. When counted up, this flag makes counting start with "00" again. |
| Error Flag | When key entry data are read in, this flag is set and when key comes off, it is reset. During the time of the flag being in the set position, it rejects entry by other keys. |
| Stop Key Error Flag | This flag is set by stop key and is reset when the key comes off. This is provided to treat chattering of the stop key. |
| Upper Cassette Flag | This flag is set by upper cassette selection key and is reset by lower cassette selection key. |
| Lower Cassette Flag | This flag is set by lower cassette selection key and is reset by upper cassette selection key. |
| Developer Supply Flag | When no developer, this flag is set a certain time after that. This flag is never reset unless power source is cut off. In the set position, this flag inhibits copy operation. |
| Developer Timer Flag | When no developer, this flag is set but it remains reset so long as developer is available. When it is set, developer timer starts operating. |
| Sheet Supply Flag | This flag is set when copy paper or cassette is not inserted. |
| Pre-rotation Flag | When this flag is in the set position, pre-rotation is carried out, at the end of the pre-rotation, this flag is reset. |
| Stop Flag | This flag is set when the stop key is keyed on and is reset when the |

TABLE 1-continued

| Flag Name | Function |
|---|---|
| | copy key is keyed on. |
| Sense Flag | This flag actuates a counter for jamming when a predetermined input signal failes to come in within a certain time period |
| Wait-up Flag | This flag is set when fixing temperature reaches a certain set value. During the time of this flag being in the reset position, copy lamp flickers to indicate "wait". |
| I.S.P. Flag | This flag functions to determine whether I.S.P. signal be issued or not. This flag is set when continuous copy CNT is brought into operation and is reset at the time of count-up or at the time of power-off. |
| Flow Change-over Flag | This flag functions to change over the flow of program being proceeding. |
| Wait Disable Flag | This flag is set by wait disable input. When this flag is set, copying operation is always allowed even when no paper cassette, no developer and no key counter. The time of leave-alone timer is shortened also. |
| ATR Flag | This flag actuates ATR CNT and is set at the time of issuance of ATR signal. It is reset with count-up of ATR CNT. |
| Sequence Flag | This flag actuates sequence CNT. It is set at the time of count setting and it is reset at the time of counter-up. |
| Bias Flag | This flag functions to actuate bias CNT. It is set simultaneously with count setting and it is reset with count-up. |
| Delay Jam Flag | This flag actuates delay jam CNT. |
| Jam Flag | This flag actuates jam CNT. |
| TMSET Flag 1 | This flag actuates a timer for flickering copy lamp. It is set when fixing temperature reaches a certain set value. |
| TMSET Flag 2 | This flag actuates a timer for pre-wet or clear setting of indicators. |
| TMSET Flag 3 | This flag actuates leave-alone timer. (30 sec., 30 min., 5 hr.) |
| TM Flag 1 | This flag checks the elapsed time of leave-alone. When 30 seconds have passed in the position of stand-by, this flag is set and is reset by start of copying. |
| TM Flag 2 | This flag checks the elapsed time of leave-alone. When 30 minutes have passed in the position of stand-by, this flag is set and is reset by start of copying. |
| TM Flag 3 | This flag checks the elapsed time of leave-alone. When 5 hours have passed in the position of stand-by, this flag is set and is reset by start of copying. |
| Temporary Stop Flag 1 | This flag is set when no sheet, no cassette, no developer or jamming. At all other times, it is reset. |
| Temporary Stop Flag 2 | This flag is set at the end of interruption copying or at the time of machine stop during copying. It is reset by start of copying. |
| By-pass Flag | This flag is reset when self checking pulses are to be oscillated and is set when the pulse oscillation is to be stoped. |
| Repeat Flag | Function of this flag is to form the self checking pulses. |

CLUTCH CHECK

Check on the backward clutch is described with reference to FIGS. 18-4A through 18-4D in which SUB DETCT is a routine for checking the clutch.

When the optical system is not in its home position after the detection of switching-on of the copy key and before exposure scanning (1), it turns the backward clutch on (set "1" at port $O_6$) (2). When the optical system reaches its home position within a predetermined number of clock counts, it turns the backward clutch off (3) and advances toward the step for switching the original illuminating lamp on. If the predetermined time is over, then the backward clutch is regarded as in trouble and the flow enters the jam routine (FIG. 18-10). Relay k101 (FIG. 15-6) is turned on to set the jam.

Since the above-described home position checking routine has, at its decision steps, each one checking sub-routine shown in FIGS. 18-11A and 18-11B, CPU generates a pulse for self checking and can check whether the flow of routine has already passed through the home position checking routine or not.

LAMP CHECK

Check on lamp is described with reference to FIGS. 18-7A, 18-7B and 18-7C in which SUB EXP is a routine for checking abnormal lamp lighting. This routine is executed before lamp-on.

At first, it checks whether the start key (copy flag) is set or not (1). When set, it sets the copy sheet indicator to "00" and thereafter checks whether the lamp is lighting or not (3). The check on lamp is done using a lighting signal (EXP) coming from the lamp lighting detection circuit shown in FIG. 11-6. The signal (EXP) is read in CPU through the gate 157 of the matrix circuit shown in FIG. 15-1 by the timing signal of ⑧. When the lamp is lighting (EXP is "1"), the jam alarming routine shown in FIG. 18-10 is executed. In case that the lamp is not lighting, then level "1" is put out from the output port to light halogen lamp on, the forward clutch is turned on and reexposure scanning is started (FIG. 18-4). This lamp checking sub-routine is also provided in the routine shown in FIG. 18-6B as (4). For other loads, also, malfunction can be detected by checking, before their operation, whether or not their positions are the same as expected.

JAM DETECTION

The manner of jam detection is as follows:

Pulse count sub-routine CNT shown in FIGS. 18-17A, 18-17B and 18-17C executes the detection steps starting from the step (1) while counting a predetermined number of drum pulses CL. The pulse number to be counted for this purpose is a little larger than that corresponding to the time normally required to move the sheet from the feed position to the outlet detection roller 36.

The delay jam flag and this pulse number are set at the time of sheet feed (step 8 in FIG. 18-5C). From the setting time point, the number is deducted by decrement of "−1" every issuance of pulse CL (OUT of photo-interruptor in FIG. 15-2). When the number is deducted up to "0", checking of sheet at the outlet 36 is made by checking whether jam disabled or not (3). When not disabled and when a sheet has not got to the outlet, the routine enters Jam routine (FIG. 18-10) and becomes stand-by.

When the sheet has got, reduction is made on the sheet counter of sheets in the machine by "−1" and it is transferred to jam check routine shown in FIG. 18-18. This routine executes checking whether the sheet has properly passed the roller 36 or not, while counting clock pulse in the same manner as above. However, since the count time varies depending upon the size of sheet, a jam count is set to a number determined by the size of the sheet as shown in the drawing of FIG. 18-17C (4). In the same manner as above, deduction is made from the set number by decrement of "−1" (5). When the count is counted up, check on sheet is done again. When sheet is in the outlet (6), the routine advances into the jam routine after increasing the counter number by "+1". When sheet is not detected, the routine is returned to FIGS. 18-17A, 18-17B and 18-17C to do the count operation for another purpose.

Jam routine is shown in FIG. 18-10 through which the routine enters STAND-BY 1 in FIGS. 18-8A through 18-8D.

In the jam routine, at first the flags shown in the drawing are reset, the wait-up mark is flickered and the copy indication is turned off (1). Then, the number on the copy sheet indicator 22 is modified by subtract from the indication number the number of sheets left within the machine (2). Thereafter, SUB OFF routine including turning-off of the halogen lamp, etc. (FIGS. 18-7A, 18-7B and 18-7C) is executed (3) and a jam signal is issued from port 29. This signal actuates relay K 101 (FIG. 15-6) so that jam mark 15 is indicated (4). This relay K101 remains on until reset switch SW3 is manually released. Also, output "1" by this relay K101 is put in the input port of CPU as JAMR. After 5 clocks of pulse CL being counted, main motor signal DRMD is turned to "0" so that the drum stops rotating and gets in stand-by.

STAND-BY

The stand-by routine is shown in FIGS. 18-8A through 18-8D. So long as the start key is not keyed on, leave-alone time is measured.

In the stand-by routine, at first TMSET flags 1, 2 and 3 are set, checking is made as to whether wait is disabled and indication timer and leave-alone timer are set as shown in the drawing (1). The function of the indicator timer is to determine the time passed until indication clearance and that of leave-alone timer is to determine the minimum pre-rotation time.

To measure the set time times, internal timers of CPU are started (2). When the start key is keyed on prior to the count-up of each the timer (3), then the routine is switched over to the prerotation step with the minimum time. However, when jammed (check whether the signal JAMR at the input port is "1"), any key entry is inhibited (5) and time measuring routine SUB SET is repeated at least until the time point at which the above mentioned relay K101 is released. SUB SET is a routine programmed to measure 5 hours, 30 minutes and 30 seconds by the leave-alone timer and set the corresponding flags.

When the time of 30 seconds is timed up at step 8, it sets 0 at the corresponding output port to switch off the fan (blower) (6). In accordance with the measured leave-alone time, the number of pre-rotations to be initiated by keying-on of the start key after the release of jam is determined.

When the time of 30 seconds preset on the indication timer is measured and 30 seconds are counted up (7), interruption indicator 33 is turned off and interruption is released. Also, a sheet number and a copy number on the indicators are set to "01" and "00" respectively, and the halogen lamp is turned off again. These are done at the time when interruption copying is completed, when copying is interrupted by the interruption key or stop key or when the set number of copying is completed, excepting the cases of jam, no sheet and no developer.

Since the leave-alone timer is also counted up at the same time, routine advances into SUB SET (8). In the above mentioned cases, when the numeral key is keyed on, an error flag is set. Therefore, step 9 is carried out and the indication timer is set to 30 seconds once more again so that indication can be cleared automatically in the sammer as described above even when the machine is left alone after the key-on.

The manner of checking on the operations of main key $SW_2$ and door switches MS1,2 will be described in detail hereinafter.

POWER SWITCHES

For copying machines hitherto known, it was a common knowledge in the art that when the power source is cut off, copying must be stopped at once or only a delay of copy interruption can be obtained by holding power source for the necessary time.

In the apparatus according to the invention, however, the operational position of each the power source switch is positively taken up as signal PWSA ($SW_2$) and signal PWSB (MS1,2) and in accordance with the positions of the switches, control conditions are changed and modified, memory is held and other suitable measure is adopted. This feature is clearly seen in various places of the flow charts shown in FIGS. 18-1 to 18-19.

At first, description is made with reference to FIGS. 14 and 15-5.

In FIG. 14, the AC power source, when introduced, generates microcomputer source voltage (+10 V) on one side. On the other side, it is supplied to power source transformer $T_2$ through the door switches (MS1, MS2) and from the secondary side thereof there comes out about +32 V rectified and smoothed by D701 and C701. Further, +32 V is introduced into transistor Q703 through the main switch and is stabilized to +24 V. U32 V and +24 V are applied to ZD 111 and ZD 110 and then to the bases of transistors Q135 and Q136 through divider resistances respectively. Therefore, on-off of the main switch and door switches produces output waveforms at the collectors of Q135 and Q136 as shown in FIG. 16-4. U32 V and +24 V have respective rise and fall times determined by C701 upon the time of on-off of the main and door switches. In the shown embodiment, ZD110 is turned on by application of 4 V whereas ZD111 is turned on by 22 V so that Q135 and Q136 have different responses from each other. In the shown embodiment, $T_1$, $T_2$ and $T_3$ are 100 msec.

Collector signals of Q135 and Q136 are indicative of positions of the main and door switches. When both of the collector signals are "0", it is considered to show that both of the main and door switches are on. On the contrary, when the signals are "1", at least one of the main and door switches is off. Thus, signals PWSA and PWSB informing of the positions of the switches are put into CPU through the matrix circuit shown in FIG. 15-1 and are used to read the respective positions of the switches as shown in the flow charts. In FIG. 14, the reference symbols CB 1 to 3 and CB 701 to 703 are breakers and $LF_1$ is a low-pass filter.

The manner of control to be made when the main switch $SW_2$ is turned off during a copy cycle, is described with reference to Power Off sub-routine shown in FIGS. 18-9A, 18-9B and 18-9C.

When the main switch is turned on during a copy cycle, according to the sub-routine, the drum is stopped after a predetermined post-rotation time has passed and the machine is stopped after the completion of jam check on the sheet already fed into the machine at the time of power-off. This assures that the machine can come into the position of stand-by with the surface of the photosensitive drum being adjusted to its proper condition. Therefore, the effective life of the photosensitive member is extended as compared with that of conventional copying machines. Further, since the machine is never left alone with a sheet jammed being left within the machine, a very smooth restart of the machine is assured.

POWER OFF AND POST-ROTATION

If a signal informing of power-off caused by switching-off of the main switch or door switch is detected (FIG. 18-15A, Step 1) during execution of a copy cycle (after keying-on of the start key and before completion of a post-rotation), the flags shown in FIGS. 18-9A through 18-9C are reset (1) and check is made as to whether the door switch is on or off (2).

When the door switch is on whereas the main switch is off, checks are made as to whether post-rotation is proceeding or not (3) and as to whether the post-rotation has been completed or not (4). If post-rotation has not yet been started, then post-rotation timer is set to 190 clocks to start the post rotation. If the drum is in its post-rotation, the remainder of the post-rotation is executed. When the post-rotation comes to end, the drum is stopped rotating (5) and the leave-alone timer is set (6). In case of "wait disable", the timer is set to a short time, that is, 5 seconds and in other case it is set to 30 seconds. Sheet indication memories are set to "01" (number of sheets to be copied) and "00" (the number of copies already made). And the lower cassette is selected. If the power source to the indicators 20, 22 is not cut off in this instance, the indicators can continue lighting. When this main switch-off takes place during execution of an interruption copying, the machine is brought into the position of waiting after cancellation of the indications related thereto such as the interruption copy mode and copy number.

In case that the door switch is off, the above described post-rotation is not carried out and the leave-off timer is set in the manner described above. After checking whether the leave-alone timer is timed up (7), the machine enters the position of waiting passing over pre-rotation number setting routine.

Only when both of the door and main switches are turned on (8), advance to the next step, that is, stand-by step (jam) or pre-rotation step (no jam) is allowed (9).

POWER OFF-ON JAM CHECK

Since clock pulse generated by drum rotation continues to be issued also during post-rotation, the port 15 is triggered even after the main switch is turned off during a copy cycle. Therefore, clock count sub-routine CNT shown in FIG. 18-17 is executed and the delay jam checking routine continues running. When there is a jam, the jam routine shown in FIG. 18-10 is executed so that jam relay K101 is latched.

Also, even when the main switch is turned off after the delay jam flag has been set to "1" (check starts), jam detection operation is continued unless the flag is reset. This jam flag cannot be reset even when input of clock pulses is stopped (for example, when the door switch is turned off). Therefore, when the door switch is turned from off to on again and the drum starts rotating, jam detection is done again in response to clock pulses to check whether or not the sheet left within the machine has got to outlet (9).

PRE-ROTATION MULTIMODE

In the shown embodiment, pre-wet and pre-rotation time is controlled depending upon the stand-by time or off-duration time of the main switch $SW_2$. However, in case that sub-switch $SW_1$ is turned off for the purpose of machine adjustment or for any other reason or in case that 10 V power source to CPU is repeatedly cut off as a result of operation of the above described self check function, copying operation is started after a predetermined time of pre-wet and premultirotation is over.

Referring to FIG. 18-2, the program begins always with power-on and leave-on timer flags 1, 2 and 3 are set at the step (3') when sub-switch $SW_1$ and CPU power source are switched over from off to on. That all the leave-alone flags 1, 2 and 3 are set means that the machine has been left alone over 5 hours. Therefore, at the step (8) for checking the leave-alone time over 5 hours, there is set pre-wet and the set pre-wet is carried out. Then, at the step (11) there is given a decision on the number of pre-rotations and at the step (12) the pre-rotation number is set to the maximum value, that is, 4 to execute the necessary pre-rotation (terminal 2-0).

In this connection, it should be noted that when routine advances from stand-by to pre-rotation it enters (8), (11) passing through (5). When the leave-alone time at stand-by is more than 30 minutes and less than 5 hours, TM flag 3 is "0" and pre-rotation number is set to 2 according to the decision at step (13). When the leave-alone time is less than 30 minutes, pre-rotation number is set to "1". But, even when the leave-alone time is less than 30 seconds, there is a case where pre-rotation number is set to "2". This is such case in which ISP flag is reset after continuous copying timer is timed up, that is, after a long and continuous copying operation. When the ISP flag which is set prior to start of copying is reset, step (15) is carried out and a copy cycle begins after an initial pre-rotation.

Other flow charts shown in FIGS. 18-1 to 18-19 are explained hereinafter briefly.

Figures 3A, 12:
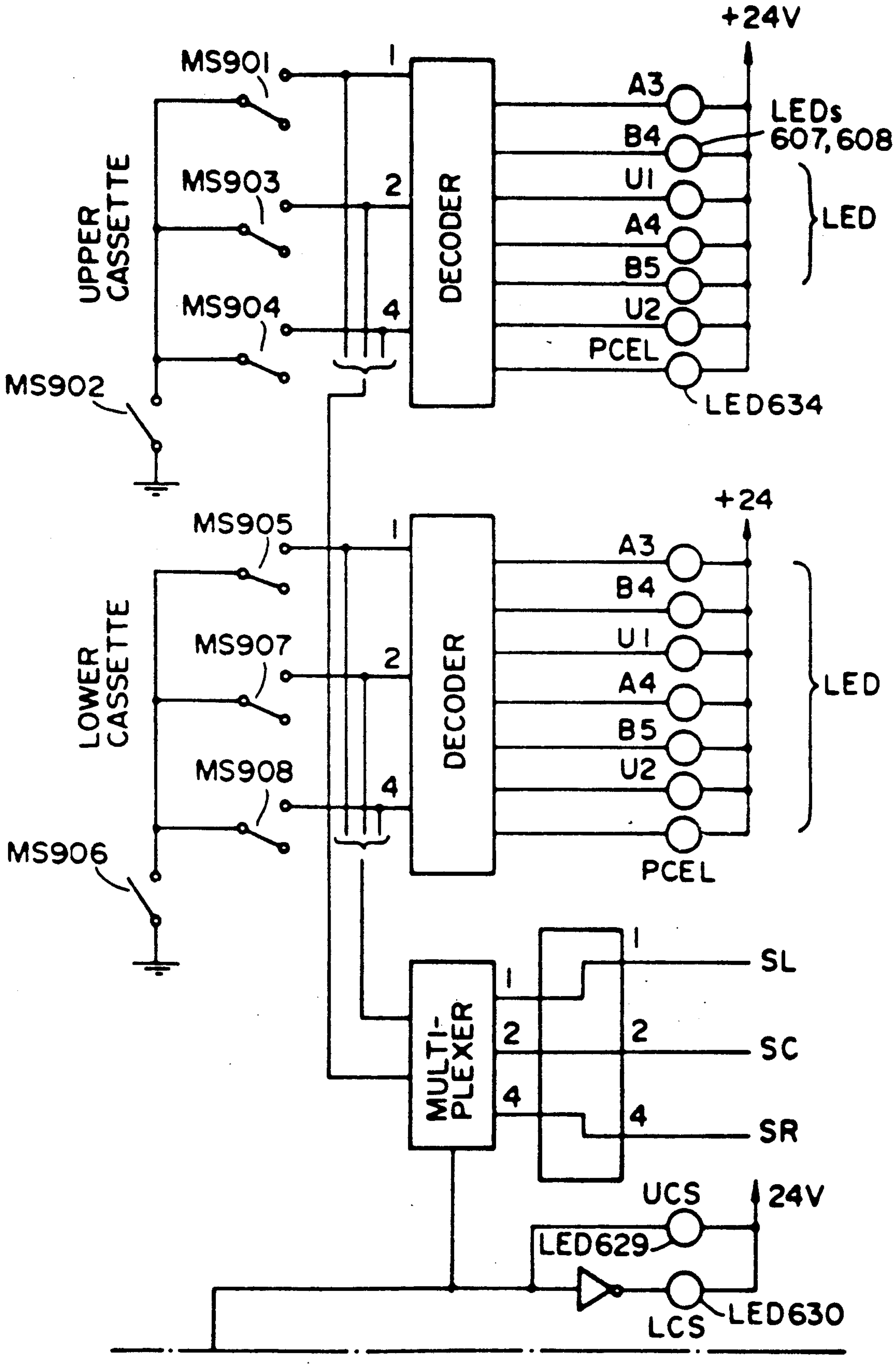
Figures 3B, 12:
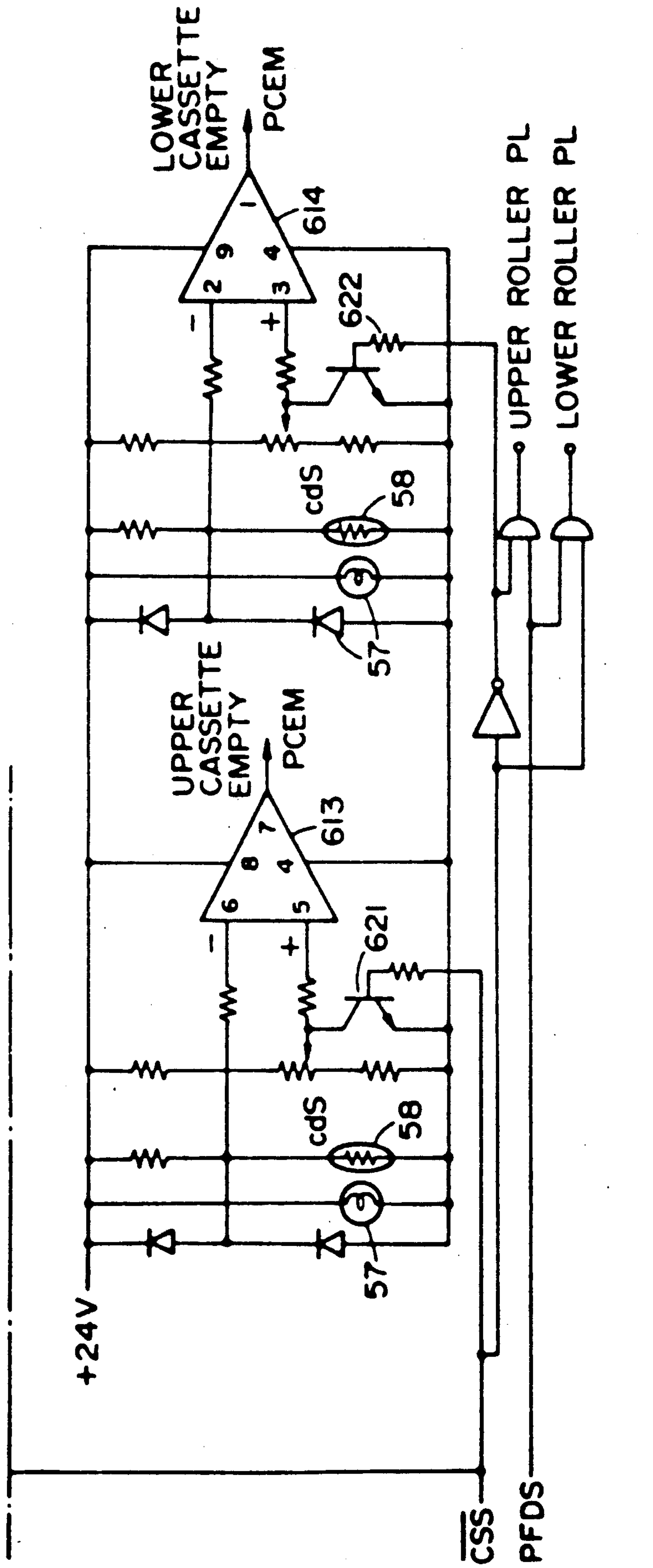

In FIG. 18-3A, ISP-on (13) makes port $O_3$ set and high voltage DC, AC put out initial potential. "On" and "Off" referring to FIGS. 18-1 to 18-19 means that the corresponding port puts out "1" and "0" respectively. Therefore, for the sake of simplification of description, the name of port is omitted hereinafter.

The main motor is turned on to execute the first pre-rotation (initial) (1) and the end of the pre-rotation is checked using drum clocks (the sequence counter is used which is shown in FIGS. 18-17A, 18-17B and 18-17C and described later). During this pre-rotation, optical system is returned to its home position (11). Then, measurement and control of potential on the drum surface are carried out during rotation of the drum.

At first, light part potential is measured by the previously described standard blank exposure lamp 70-1 and high voltage control is carried out (2). Thereafter, if signal $CP_3$ at the input port is on, then rotation is continued to repeat measuring and controlling on the light area (12). Otherwise, the blank exposure lamp is turned off (3) and then measurement and control of dark part potential is carried out (5) on the same drum surface when it enters the position of sensor (4). This control of surface potential is carried out by the external circuit shown in FIG. 11-7 and previously described. In this manner pre-rotation is repeated plural number of times preset for this purpose. Whether or not the pre-rotation has been finished is checked at (7) and when finished, ISP flag and the continuous copy timer are set and the leave-alone timer is reset (8). At the next step (9), the copy flag (which is set by entry of copy key) is checked. After that, it is allowed to enter control rotation II of the copy preparation cycle. If no entry of copy key, then routine enters post-rotation mode through control rotation I.

In FIG. 18-4, checking DETCT is carried out as to whether the optical system is in its home position or not in the manner previously described. Then, the original illuminating lamp is turned on and SEXP is set to "1" (4) to adjust the exposure light to standard exposure light. Potential on the exposed surface is sensed (3) to determined bias voltage. Entry of keys other than that of the stop key or interruption key is inhibited at the time immediately before the step (4). After the second control rotation, the forward clutch is actuated to move the optical system forwards (6). In the course of the forward movement, paper feed signal PF is checked (7). When PF is not received even after waiting for a long time, it is regarded as a jam by SUB DETCT.

When PF is received, paper feed solenoid is actuated (8) and the paper feed roller is lowered to effect paper feeding. At this time, addition of one (+1) is made to the counter (register) for counting the number of sheets within the machine and also to the copy number counter, and the content of the latter is indicated by the copy number indicator 22 (SUB DISP). This SUB DISP is provided at every step in FIGS. 18-2 to 18-19.

In FIG. 18-5A, at (1) check is made as to whether input port $CP_4$ is on or off. By turning $CP_4$ on, a multiple (repeating) copying is carried out independently of the set copy number. Herein, "on" of $CP_1$–$CP_4$ means that level "1" is put in by switching on.

When $CP_4$ is on or when the set number and the copy count number are different from each other, 24 CL are counted and a developing bias whose voltage level has been determined at the previous step is applied to the developing roller (2). At the same time, ATR counter for determining the timing of developer supply (hereinafter described) is brought into operation. Thereafter, registration signal RG is checked and the registration clutch is turned on. Again in this step, if the signal RG is not detected for a long time, it is regarded as a jam by SUB DETCT.

In case that $CP_4$ is off, the copy flag is reset only when the set number is consistent with the copy count number (the number of copied sheets) and when there is no interruption flag. When there is an interruption flag, the copy flag and interruption flag are reset. By this resetting the machine is brought into the position ready for post-rotation. Control on bias and registration is carried out on the machine. To check any delay jam, count is set to a certain number of clocks after turning on the registration roller (8). Then, signal SL (left) or SR (right) coming from the corresponding cassette switch is put in the input port (9). Selection of the cassette switch is made by signal CSS (upper or lower). After reading the size of the cassette then selected, a reversal time point for the optical system is set (10) which varies within three different points depending upon the cassette size.

Discrimination of one cassette size from another is done by reading the positions of "1" and "0" as shown in FIG. 17.

When the number of pulses CL set for the reversal point is counted up, the original exposure and forward clutch are turned off to end an exposure scanning and instead backward clutch is turned on (11). After counting 42 clocks corresponding to the time required to move from charger 69 to roller 65, bias is switched over from positive to negative. Counting of drum pulses in FIGS. 18-2 to 18-16 is carried out by the interruption program of SUB CNT shown in FIGS. 18-17A, 18-17B and 18-17C.

In FIG. 18-6A, the copy flag is checked at (1) which can be reset by stop key or the like. At (2), copy indicator 23 is turned off when the machine is at a stop. Number indicators 20 and 22 remain unchanged and key entry is allowed. When the machine is not at a stop, the count up flag is checked and copy number indicator 22 is set to "00" while keeping the indicator 20 unchanged. During backward movement, check is made as to whether or not false paper feed signal PF' is received which is issued by HAL2 (3). Also, the above-described long time check DETCT is carried out. Thereafter, the copy flag or copy key is checked.

When the answer is no copy key or the copy flag is reset, check is made as to whether the optical system is in its home position HAL 1 and also long time check related thereto is carried out (5). Then, the backward movement is stopped and toner check (when developer density is under the second level) is carried out (6). When no toner, the indicator 18 is put on and post-rotation is carried out.

However, when the set copy number is not counted up and the copy flag is "1" or the copy key is on, the above-described lamp check at step 4 is carried out while inhibiting key entry and check of the position of optical system (5) is carried out. Then, the routine shown in FIG. 18-4 is executed. The optical system is moved forwards again and a repeating copying is carried out.

Figures 7A, 11:
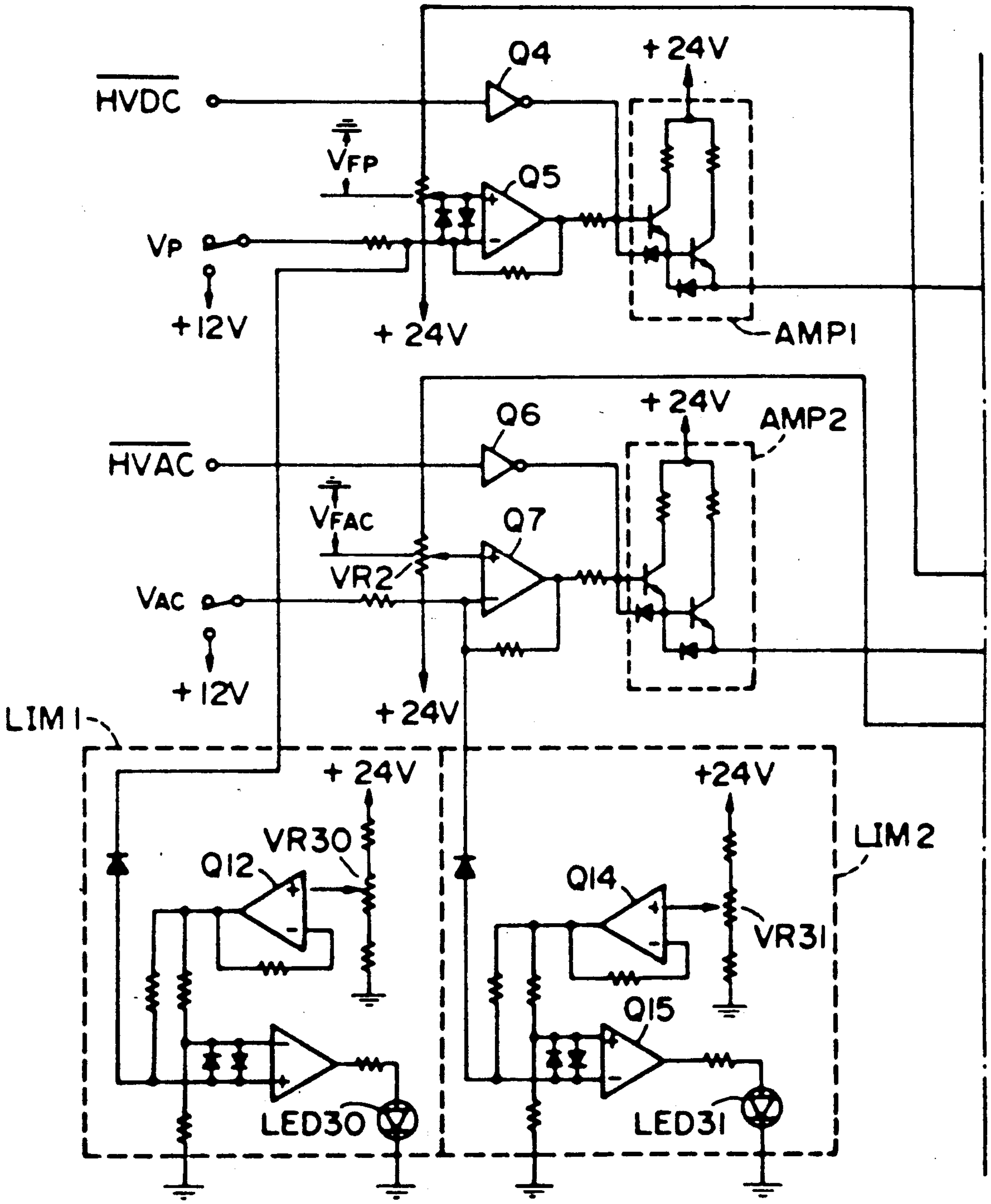
Figures 7B, 11:
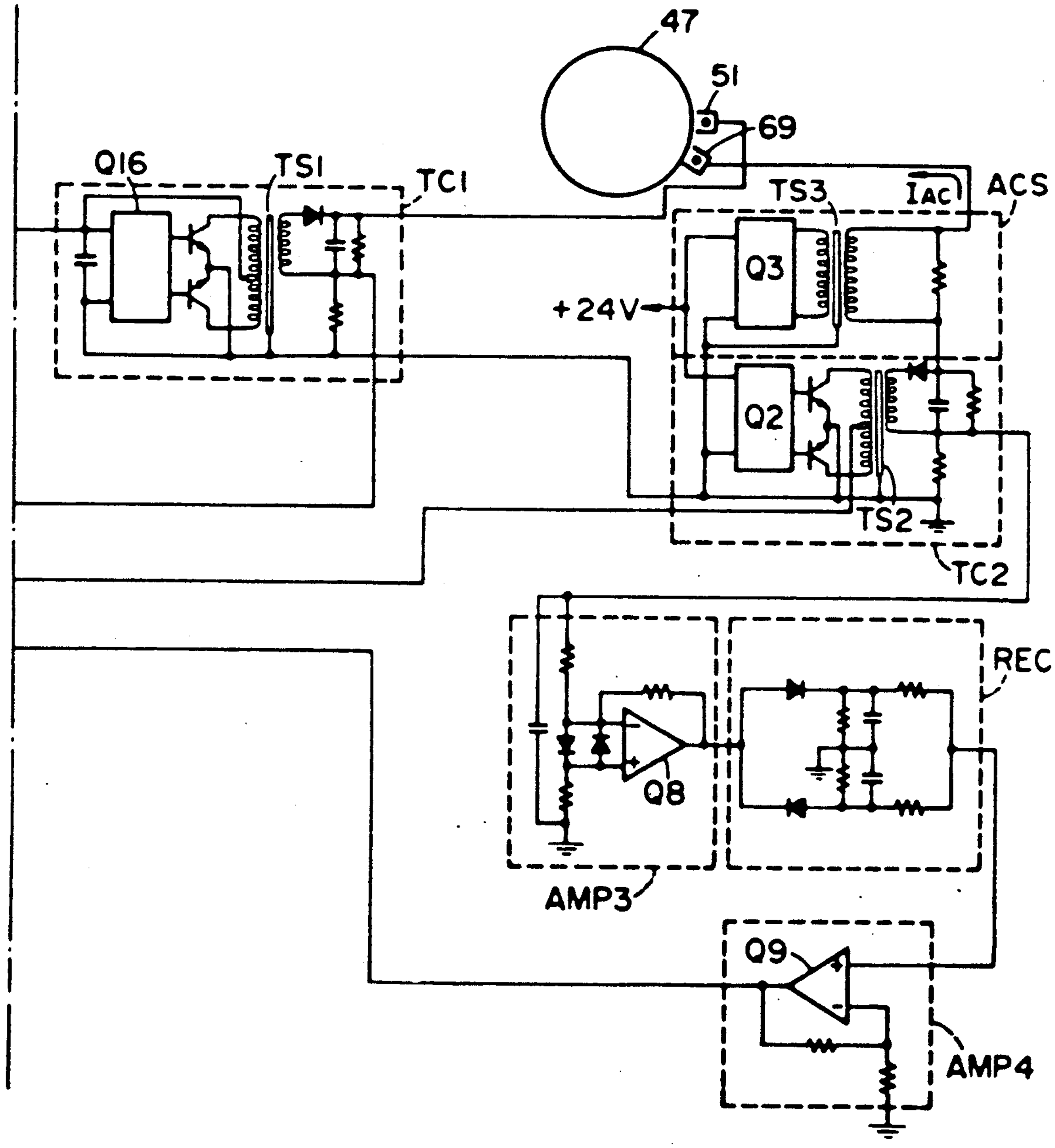

In FIG. 18-7A, with the start of post-rotation, the copy flag is checked again (1). When the copy key is on or when the top key is keyed on twice during interruption or when the copy number is counted up, the copy sheet number indicator is set to "00" (2), the above-described over lighting of lamp is checked and the exposure lamp is put on to start exposure. However, when the copy key is not keyed on, high voltage DC, the developing and sensor motors are all turned off. The developing roller is lowered (4) and then a further post-rotation of 190 clocks is carried out. After the end of this post-rotation, the copy flag is checked (5). When the copy key is on at the time, the copy sheet number indicator 22 is cleared and the above described pre-rotation is carried out. Then, copying is started.

If the copy key has not been keyed on yet, signal "0" comes out from a certain determined output port to make the loads, such as the exposure lamp and sensor motor off (6). Since the level of power current to the fixing heater is changed at this step, there is a possibility of the wait-up flag being reset. Therefore, this flag is checked and when it is reset, the copy indicator is flickered. After turning off the main motor, the routine enters Stand-by.

In FIG. 18-8A, whether wait is disabled is checked by checking the flag set by the input of $CP_2$.

Timing of the 30 sec. timer for measuring leave-alone time and that of the 30 sec. timer for automatic clearance are thereby shortened as shown in the flow chart (1). When no copy start (3) and no jam (4), numbers on the indicators 22 and 22 are cleared to "01" and "00" respectively at the time of 30 seconds being counted up by an internal timer. At the same time, interruption flag and interruption indicator 21 are turned off (7). Data of selection of the cassette does not change. However, when no sheet or no developer at the time of key-on of stop key 35 or interruption key 33, the above described data clearing control on indication is not carried out.

It is possible to automatically set after time-up of 30 seconds the selection of the cassette to such a cassette as used most frequently. But, in the shown embodiment, upper and lower cassettes are used at equal frequency and therefore it is not preferable to adopt the automatic clearance.

When TM flag 1 has not been set yet, the flag is set and the timer is set to 29 minutes and 30 seconds (30 min.-30 sec.). Thereafter, check is made repeating the count of the leave-alone timer (8) and after the count-up of the set time, TM flag 2 and TM flag 3 are set in this order as shown in the flow chart. The above-described control such as clearance of indication is done even when the machine is left alone for 30 seconds after the entry of numeral key.

As to the power-off routine shown in FIGS. 18-9A, 18-9B and 18-9C and the jam routine shown in FIG. 18-10, description has already been made. The loads are turned off simultaneously with the step (1) in FIG. 18-9.

In FIGS. 18-11A and 18-11B showing subroutine A, SUB EXC designates a routine for data exchange on interruption and interruption release, SUB COPY a routine for determining copying conditions related to start key, SUB KEY a routine for reading operation key entries and SUB BPC a routine for checking sheet cassette. In the sub-routine A, these various routine are executed in the order shown in the flow chart. This subroutine A serves also as a step for generating CPU self checking pulses. To this end, it includes an internal modulo 4 counter whose count is increased by increment of "+1" every execution of the routine passing through the four subroutines one by one. After passing four times, the routine is repeated from beginning.

In FIGS. 18-12A, 18-12B and 18-12C, at first it is checked whether key entry is allowable or not (1) and the check is made for the interruption flag (2) and momentary stop flag 2 (8). The key enable flag is "1" excepting the cases of in-copying, in-jamming and the like.

When neither interrupted nor interruption released, the lower cassette flag is checked and the selected cassette is indicated, and signal CSS is turned to "0" (3). Then, number indication routine SUB DISP is executed. In the case of interruption copy, memory contents of the set sheet number and counter contents of the copied sheet number are saved in different save areas of RAM and when the interruption is released, they are recalled from the RAM save areas (5).

The cassette is selected (3) and, in the case of interruption, number indicators 20 and 22 are set to "0" and "00" respectively. In the number indication routine, shift of lighting digit positions is carried to make a so-called dynamic indication. In synchronism with the digit shift, every digit data on the indicators 20 and 22 is come out from the output port one by one (7).

In FIG. 18-13, at first it is checked whether key entry is allowable or not and then output of cassette key signal CSS is determined (1). At the next step (2), indication and flag control relating to the cassette key are carried out. When it is determined by no paper signal PCEM and cassette signals SL, SC, SR that no paper and no cassette available (3), the flag is set and indication is made on the indicator accordingly (4). Then, by reading switch signals SL and SR coming from cassettes, one of four different size flags is set (5).

In FIG. 18-14 (SUB KEY), it is at first checked whether the key entry is allowable or not and then whether the clear key is depressed or not (1). When the answer is yes, the indication numbers on the indicators are cleared by the clear key to "01" and "00". When the clear key is not on, numeral keys 0-3 are read in the input circuit shown in FIG. 15-1, then keys 4-7 are read by setting port 2 and lastly keys 8, 9 are read by setting port 3 (3). Signals at input ports $I_1$-$I_4$ serve to check numerical data or other input data. Check is made by putting in 4 bits at one and determining "1" or "0" of the respective bits.

Any key entry three times or more cannot be read in (2). Data given by the first keying-on is indicated in the first digit position of the set number indicator 20 unless it is "0". Data by the second keying-on shifts the first data from the first digit position to the second one on the indicator and register and then the second data is indicated and stored in the first digit position.

Figures 15A, 18:
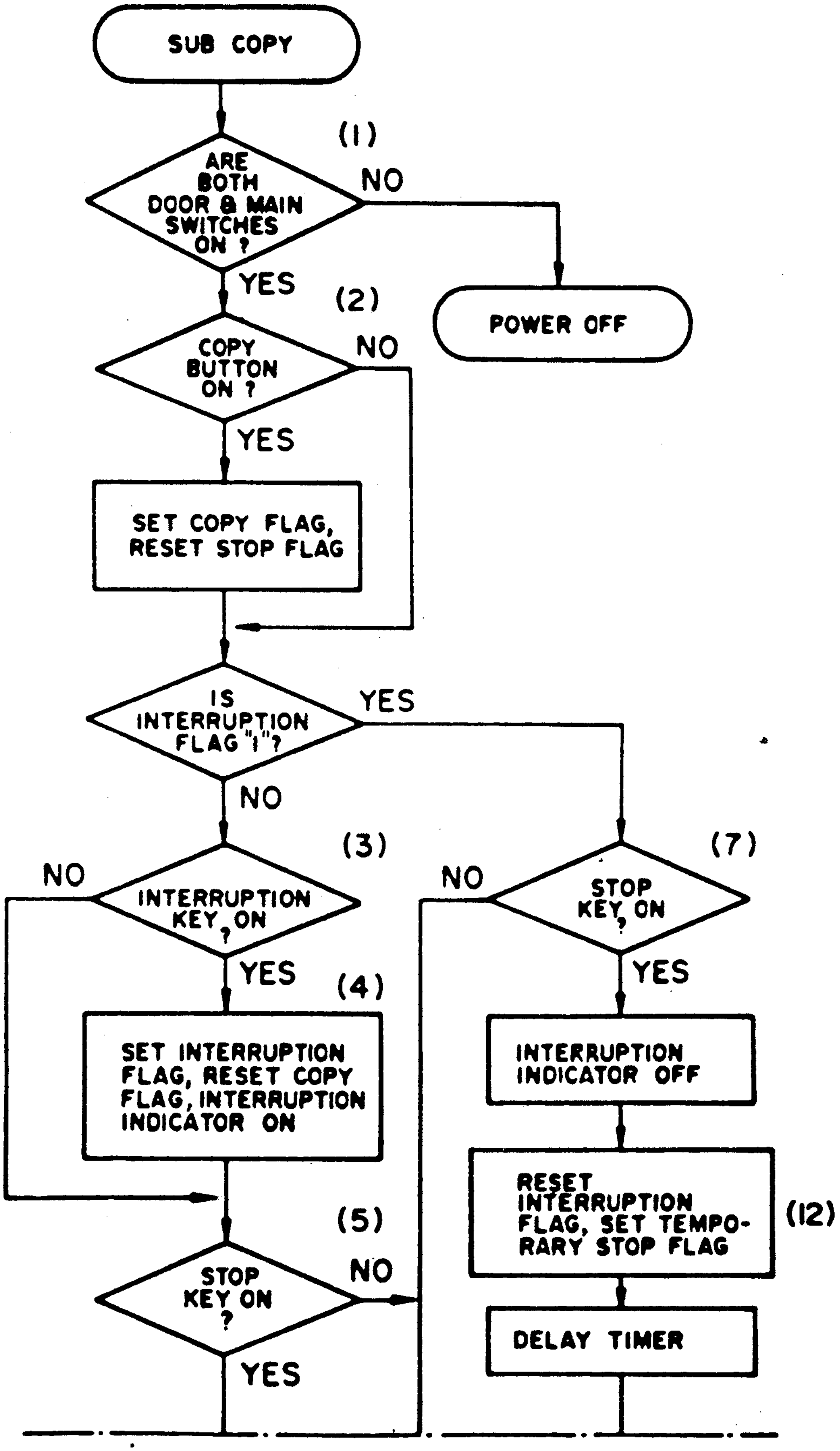
Figures 15B, 18:
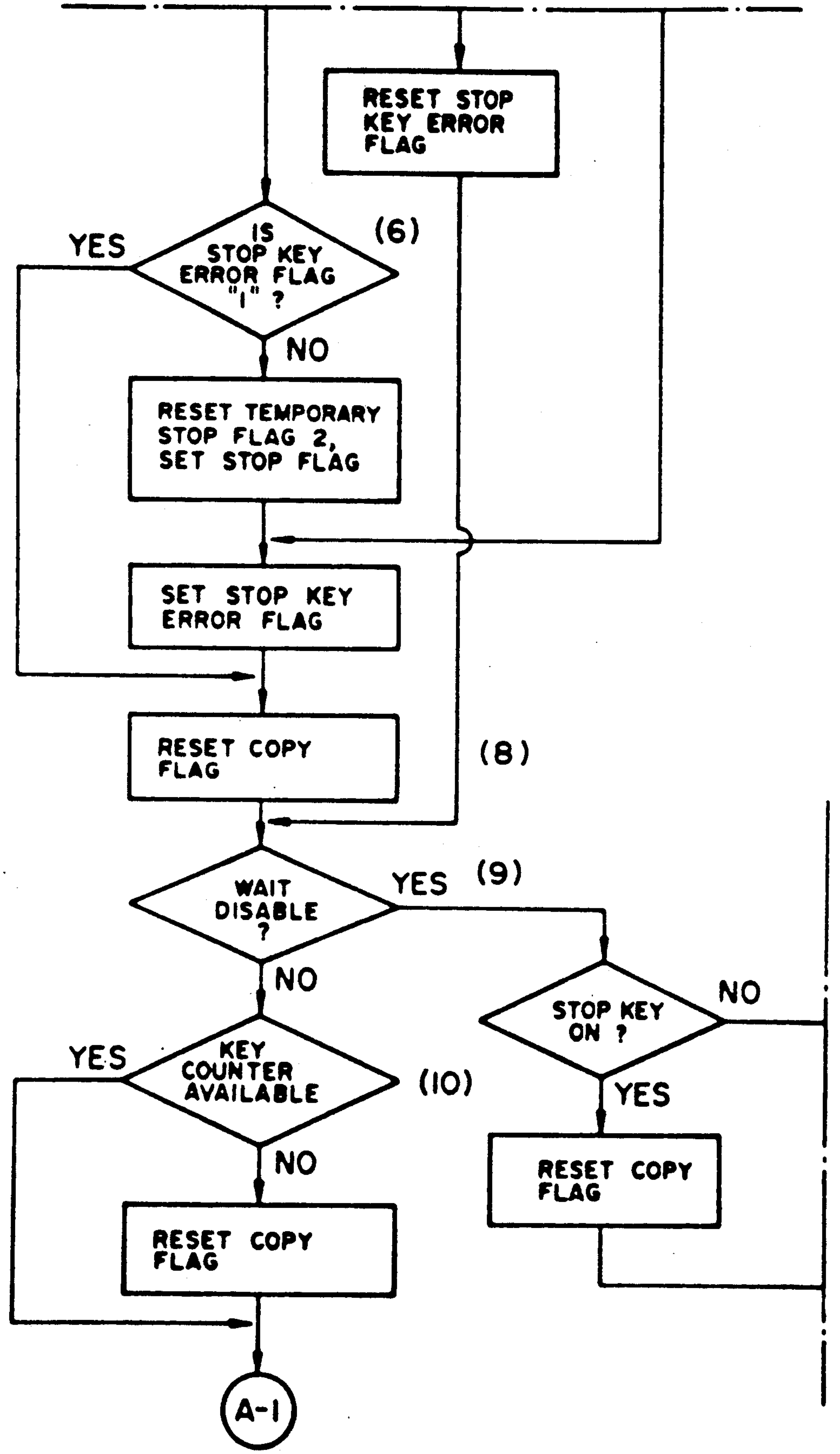
Figures 15C, 18:
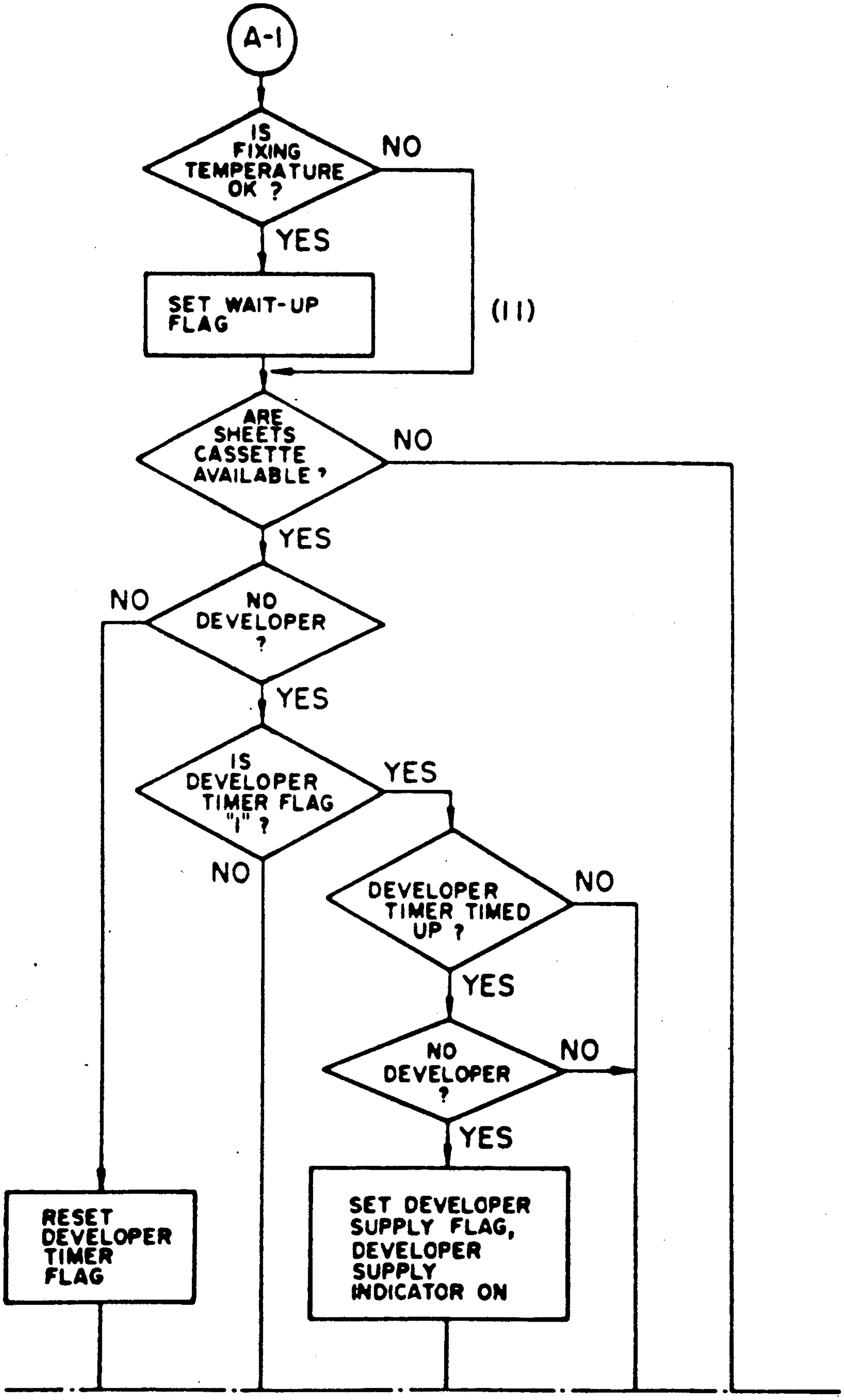
Figures 15D, 18:
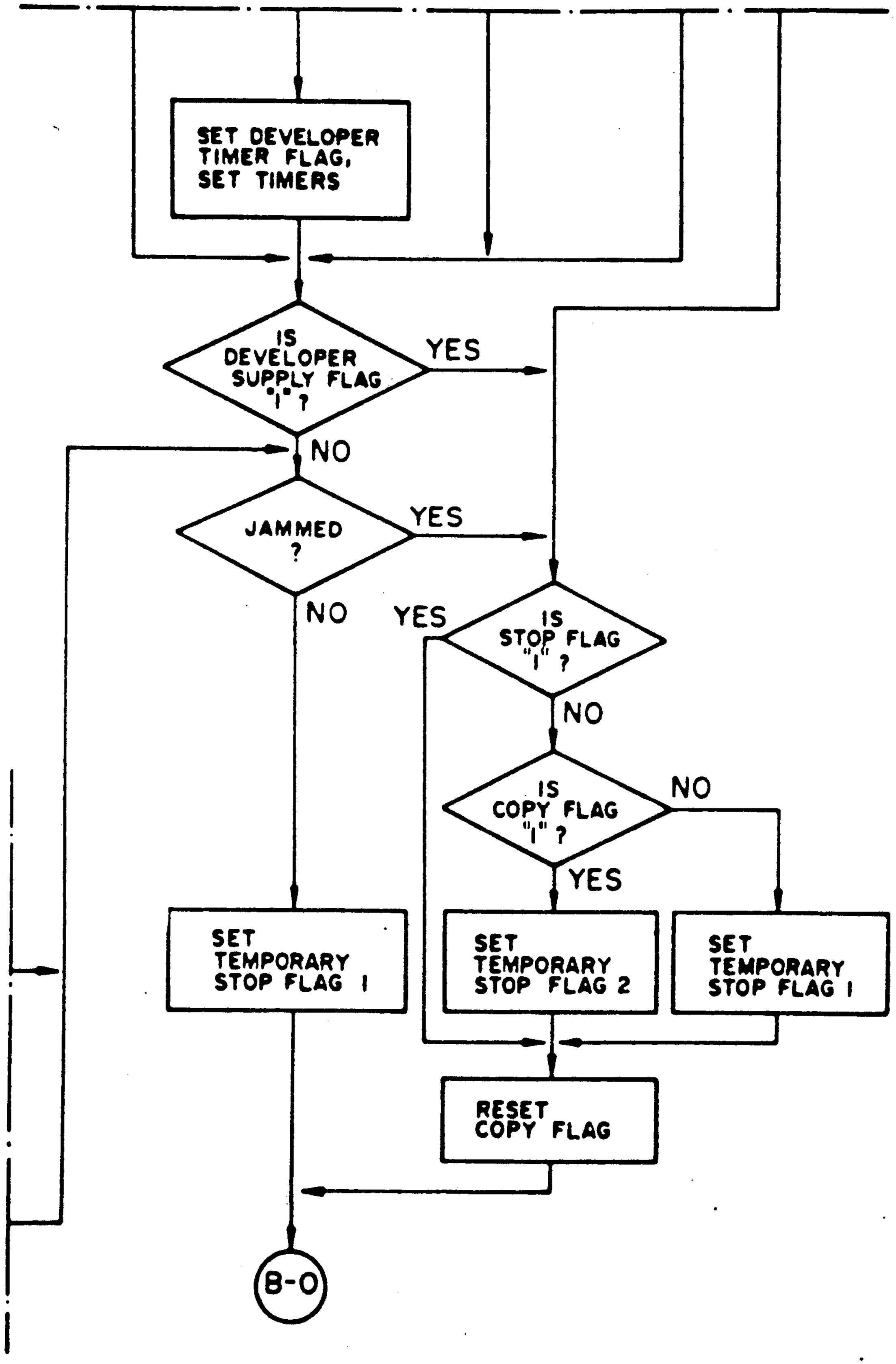
Figures 16, 18:
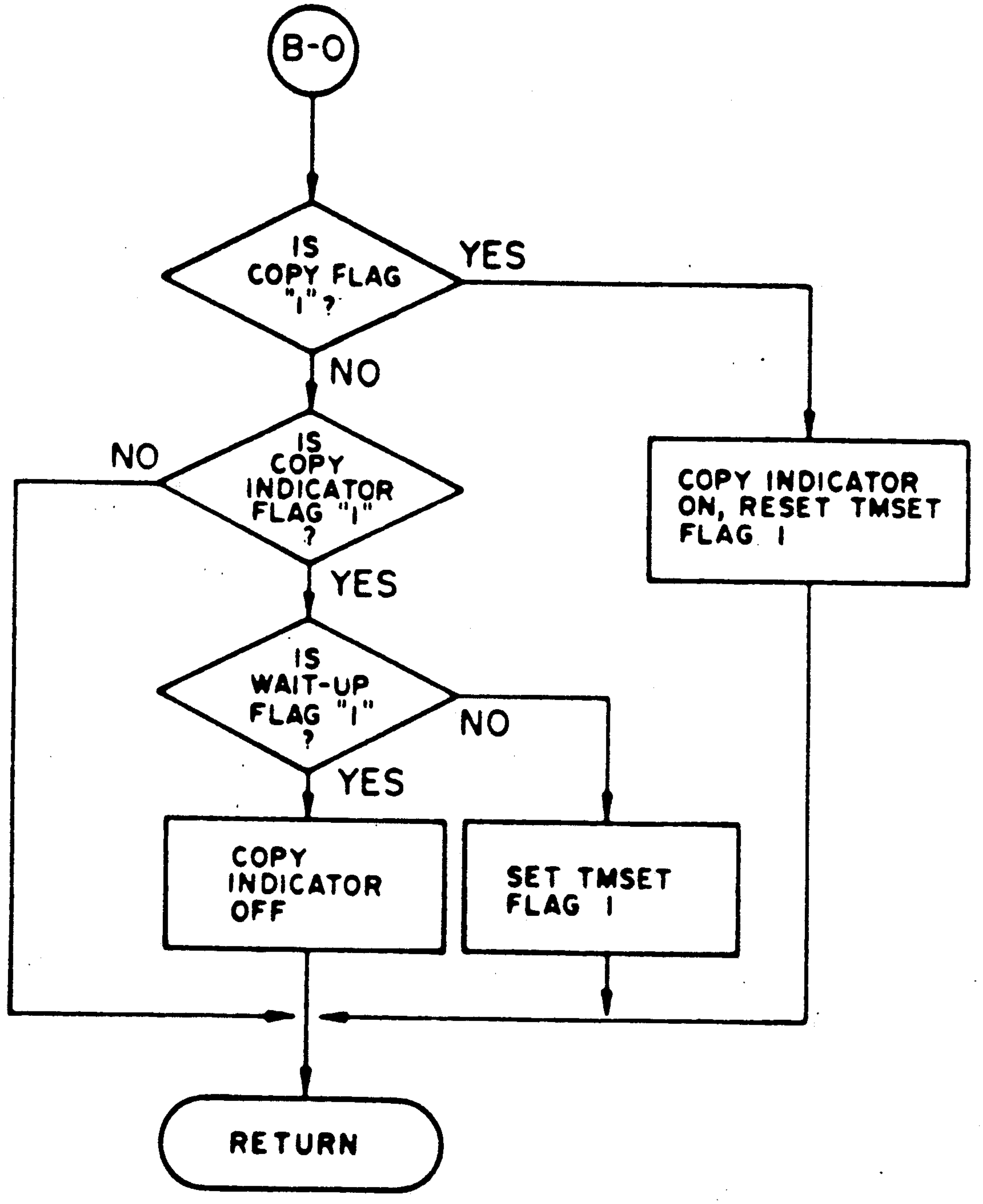
Figures 17A, 18:
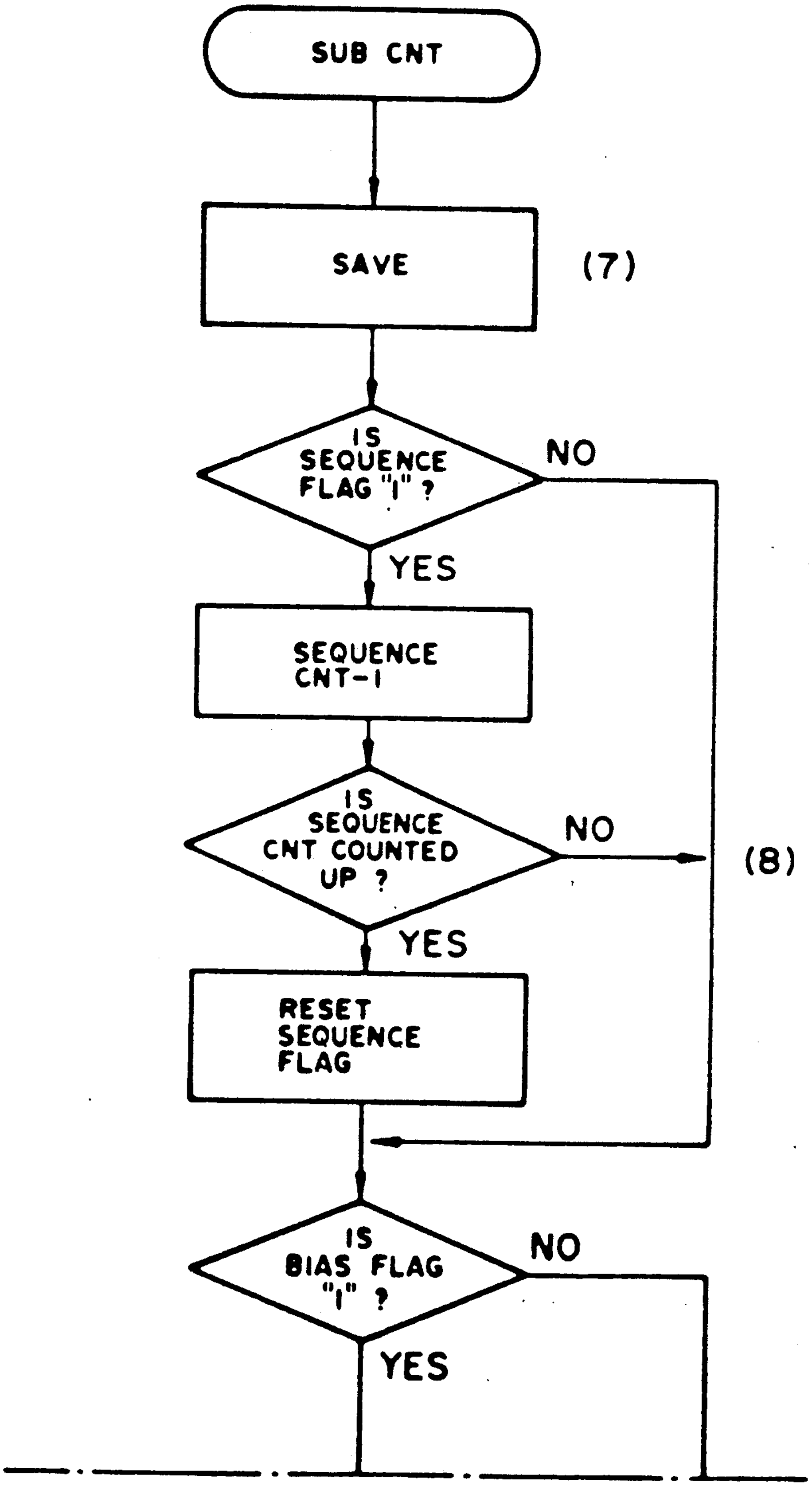
Figures 17B, 18:
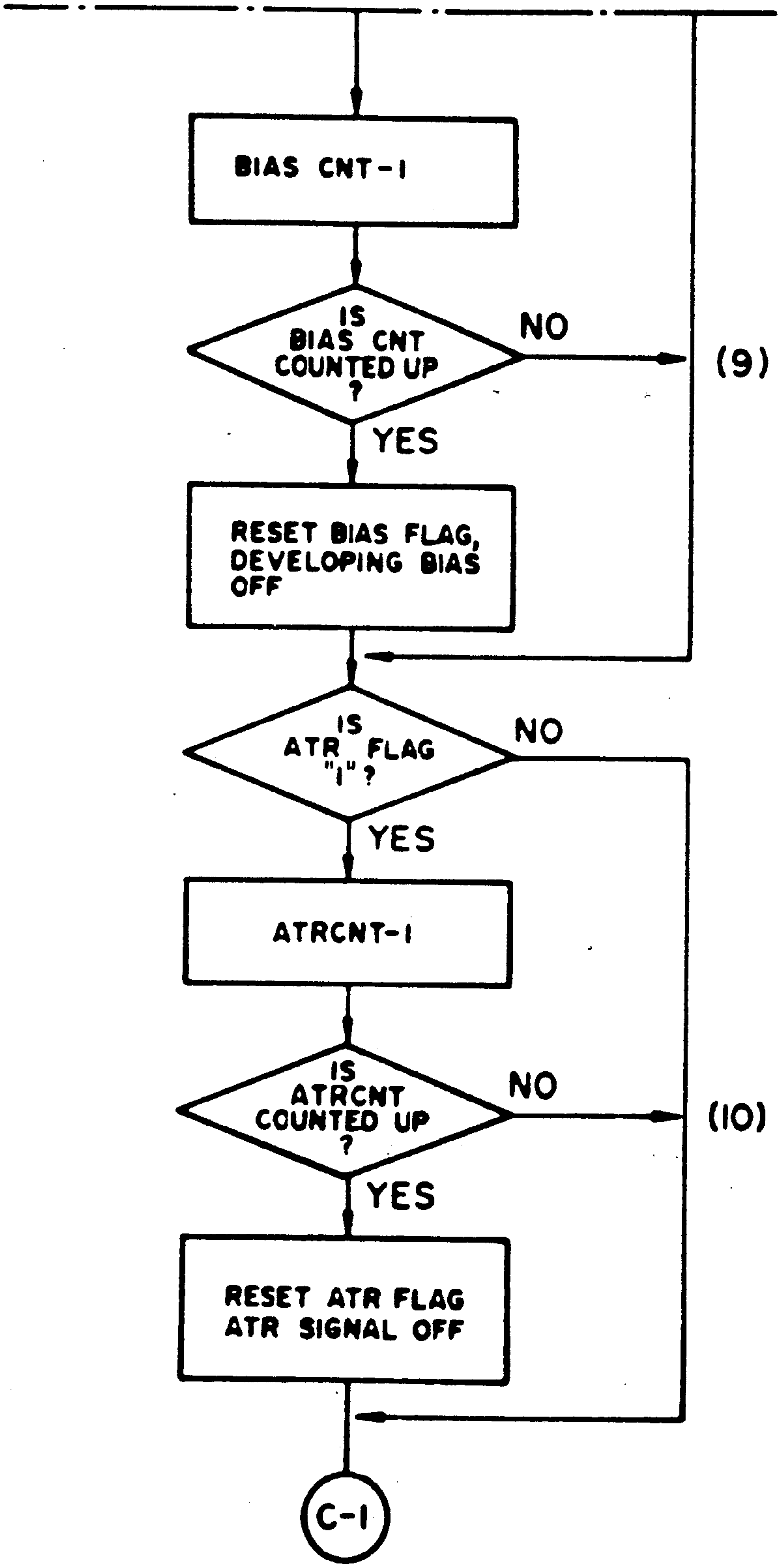
Figures 17C, 18:
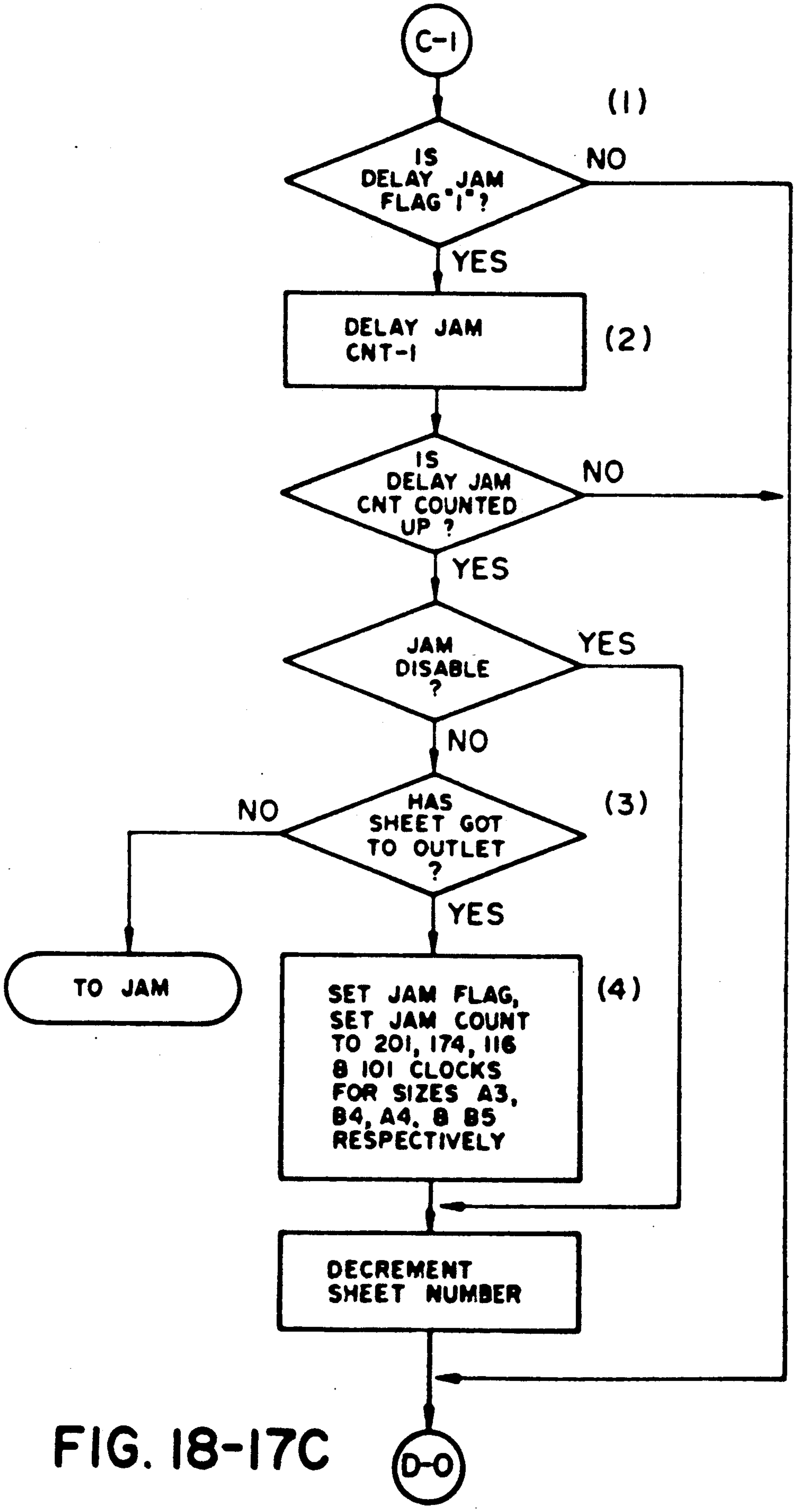
Figure 18:
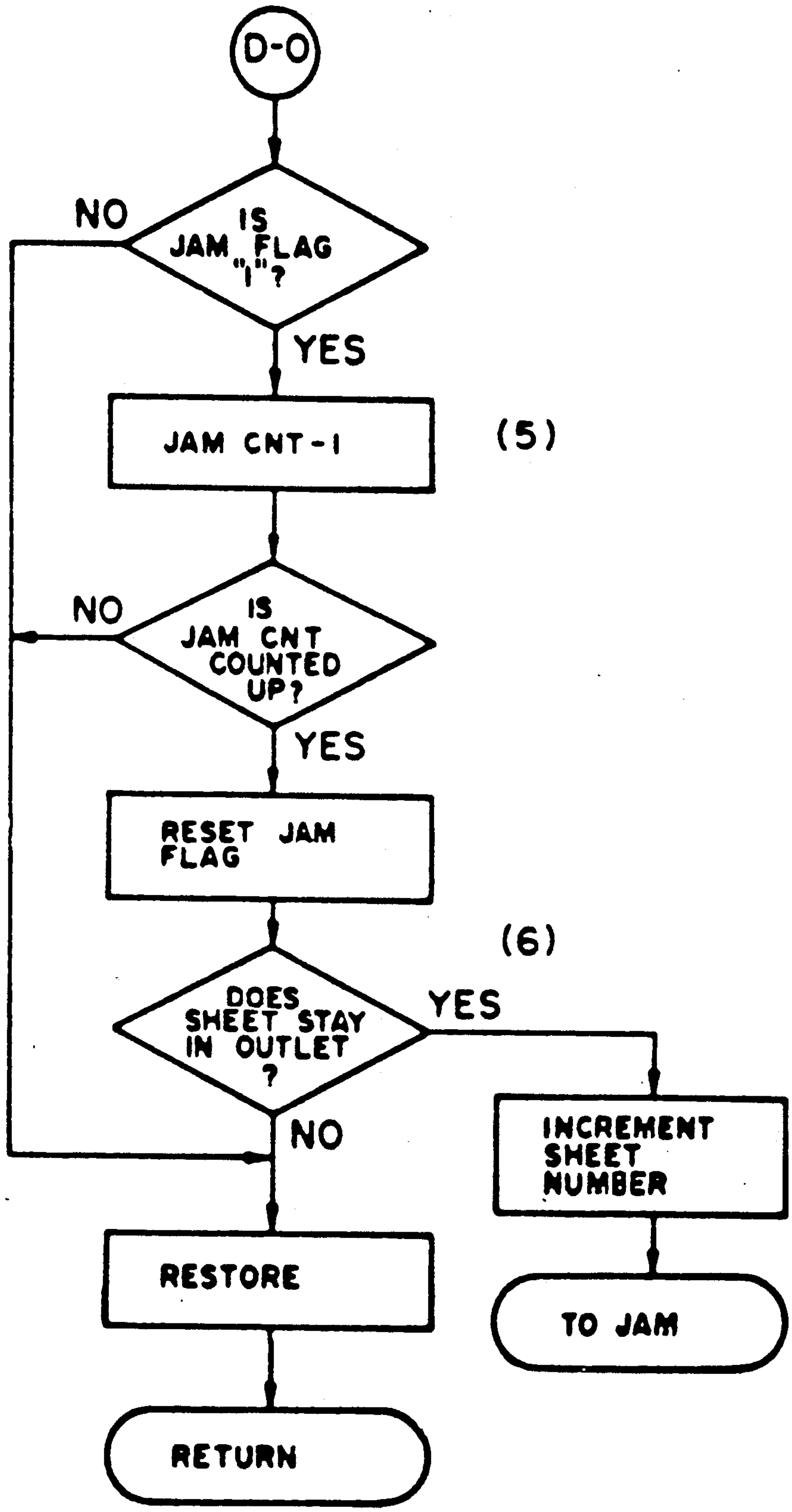
Figures 18, 19, 19A:
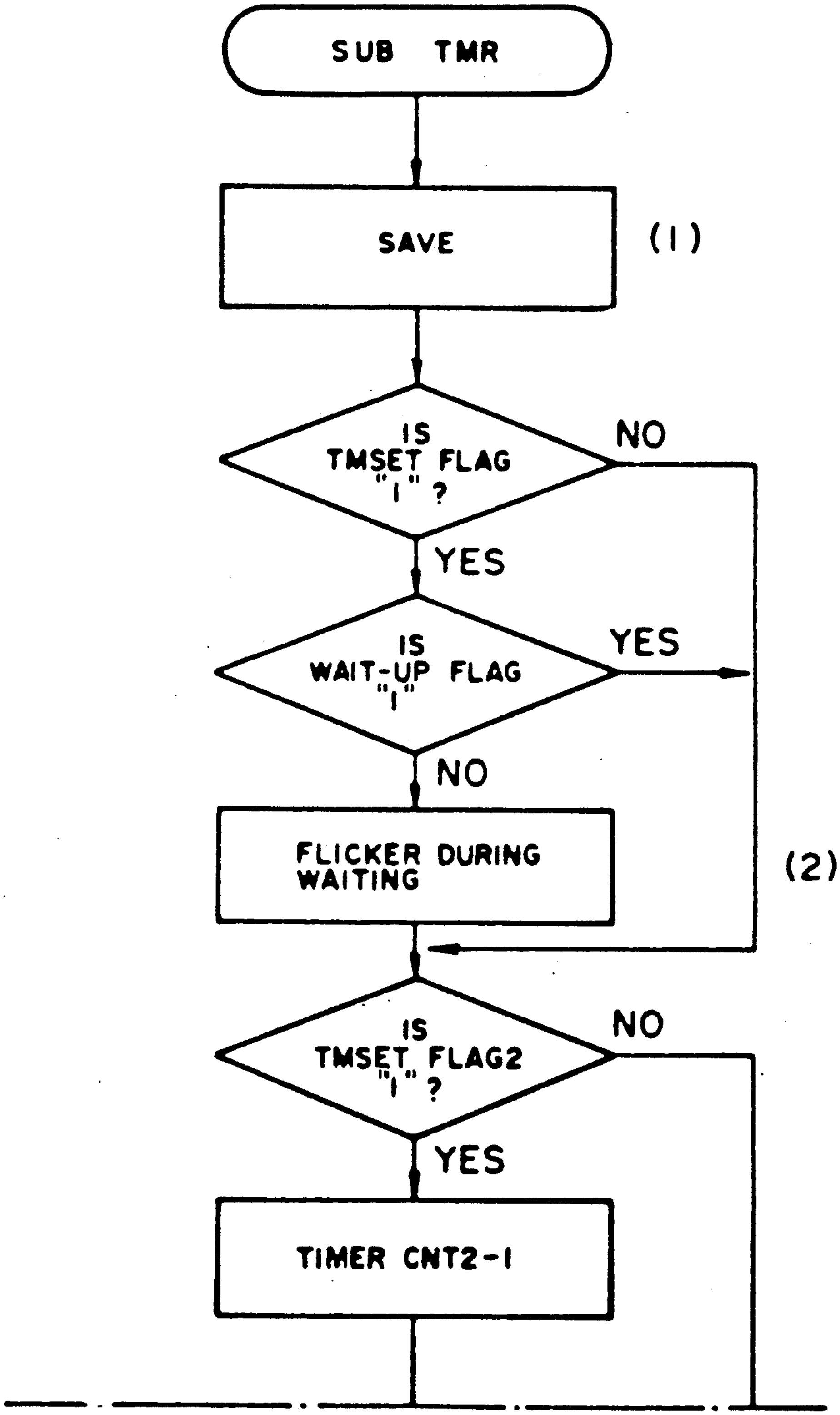
Figures 18, 19, 19B:
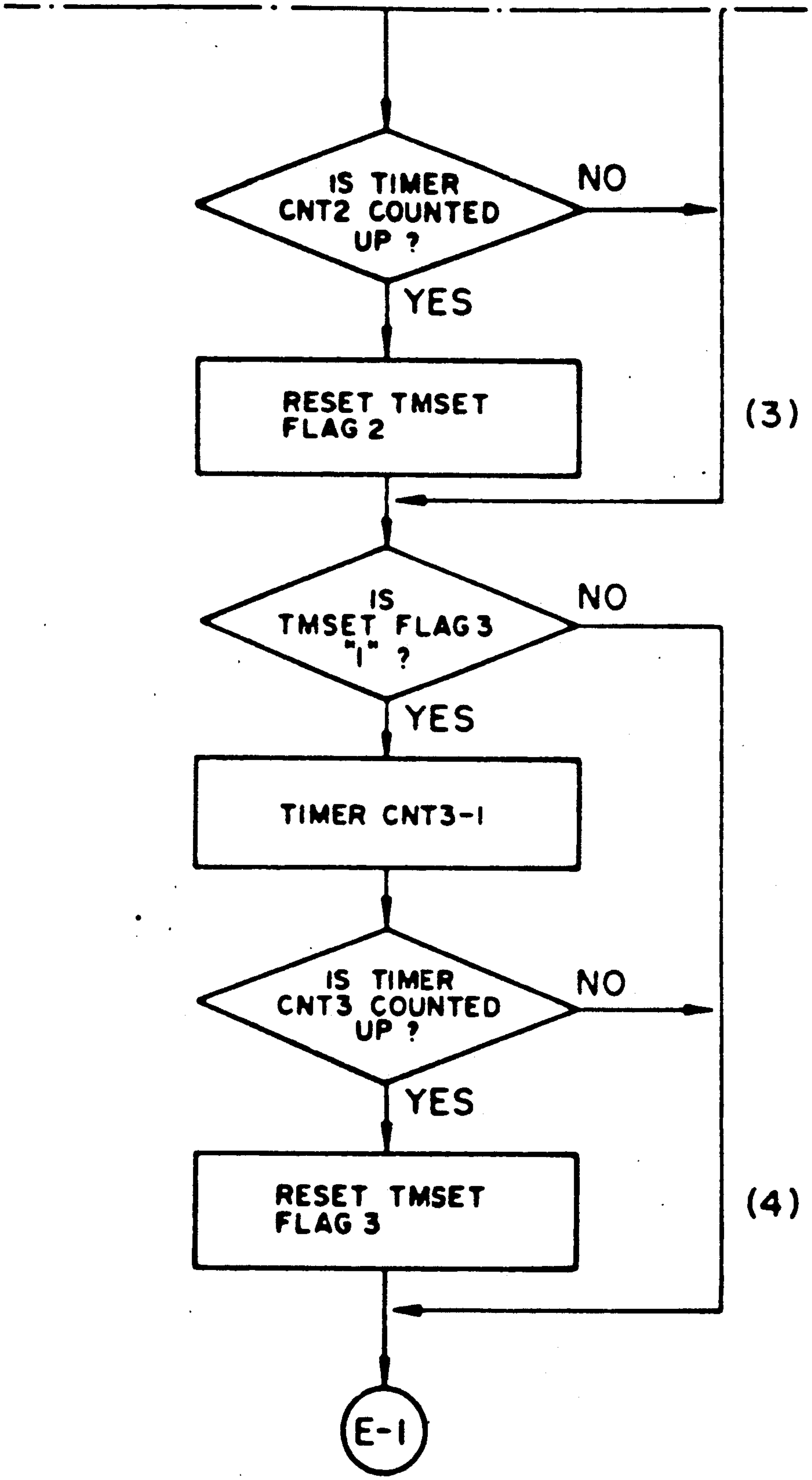
Figures 18, 19, 19C:
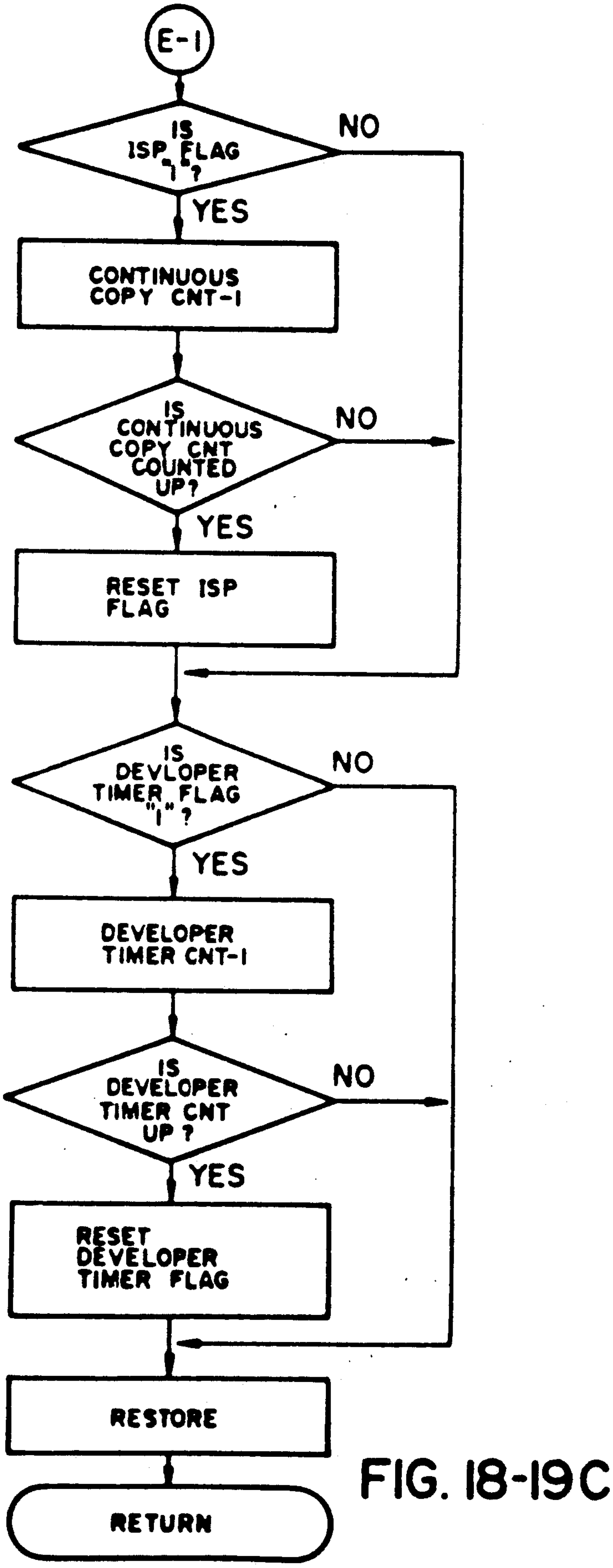
Figure 19:
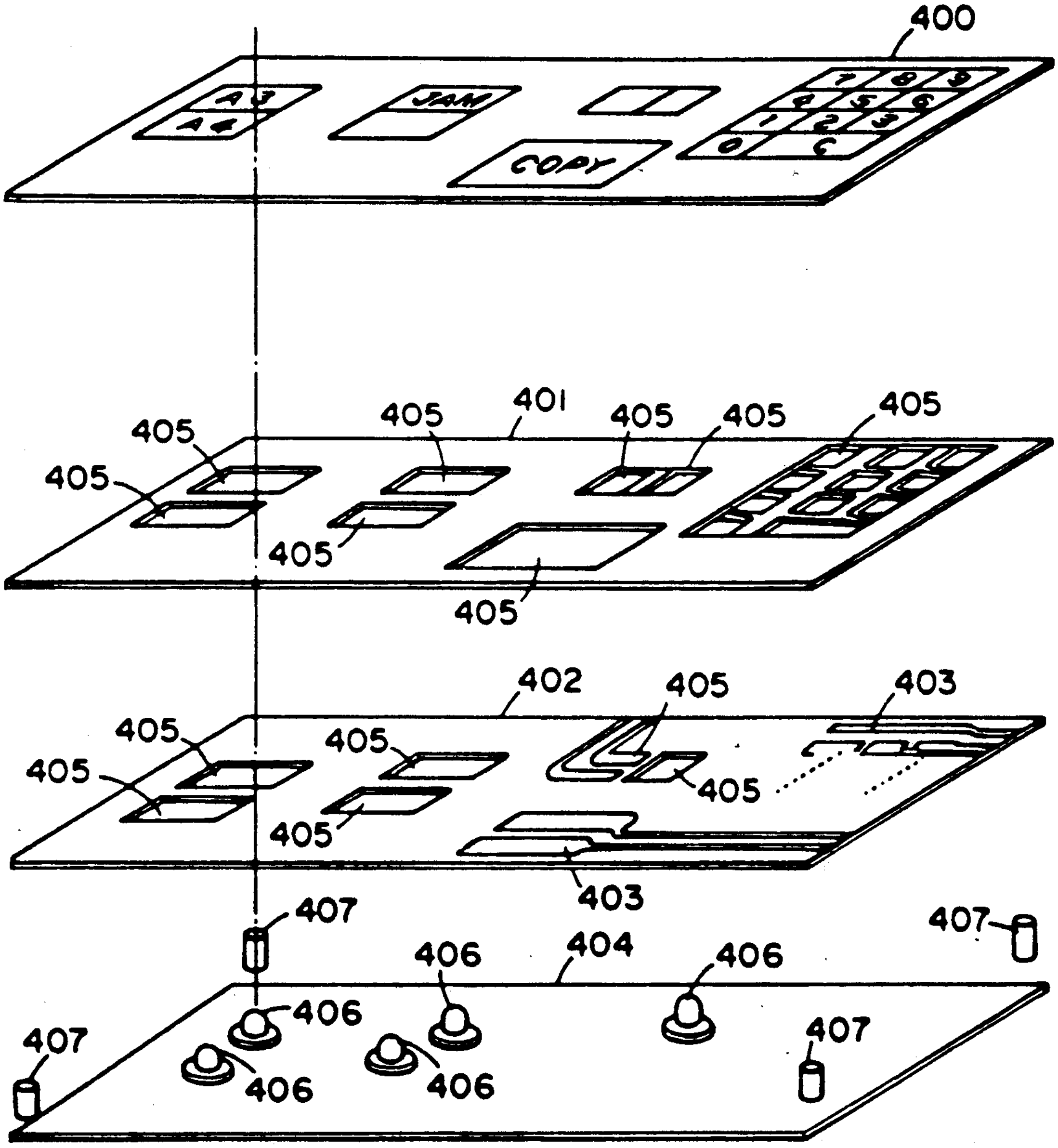

In FIGS. 18-15A through 18-15D (SUB COPY), when both of the door and main switches are on (1), it is checked whether the copy key is on (2). The copy flag is set by the copy key and copy-on is indicated (FIG. 18-16) provided that there comes out no input signal of the interruption key, stop key, no developer, jam or the like.

When the interruption key is on, the interruption indicator 21 is turned on and the interruption flag is set (4). Step (6) prevents malfunction caused by key chattering when the stop key is keyed on during a copy operation. Thereafter, the copy flag is set. As to the operation of the stop key during interruption keying, description has been made already. The copy flag is reset when the stop key is on under wait disabled position, when the key counter is out (10) and when no sheet, no cassette, no developer or jam.

Counting operation of the developer timer is controlled by SUB TMR.

In FIGS. 18-17A, 18-17B and 18-17C, SUB CNT is a routine for determining the timing or operations of loads such as a lamp to execute program interruption by input of port $I_5$. To this end, the register data in CPU are saved in RAM save area (7) making use of rise time of pulse CL which is counted to determined the timing.

The sequence flag is set by the main flow at the start of counting. Checking the flag the set number of counter (RAM) is decreased by decrement of "−1" every pulse CL (8). The same reduction of "−1" is also made on the bias counter for determining the timing of developing bias application (9) and on ATR counter for determining the timing of toner supply at the time of low density. On count-up of each the counter, output "1", "0" is issued from the corresponding output port of CPU so as to control the operations of loads.

As to the jam counter description has already been made.

In FIGS. 18-19A, 18-19B and 18-19C, SUB TMR is a routine for an internal timer which counts pulse CL used to make the computer CPU run.

This routine is executed according to the interruption process of the program enabled at step (2) in FIG. 18-8A. At first, data of the register in CPU are saved in RAM (1) and then time interval at which the indicator 23 has to be flickered during the wait is set. Flickering is done when the heater temperature drops (2). The pre-wet timer is set to 4 seconds, automatic resetting of the indicators is effected for 30 seconds (3), the leave-alone timer is brought into operation (4), the continuous copy timer is brought into operation (for several ten minutes) (5) and the developer timer is brought into operation (6) which issues a delay signal when no developer.

In the above-described sub-routines, the symbol RETURN should be understood to mean that the routine is to be return back to the decision routine of the main flow in which the routine A has been executed.

ISP flag in FIG. 18-2A through 18-2E serves also to set a rotation number when the main switch SW2 and door switch $MS_{1,2}$ are once turned off and then turned on again. SUB CLAR 1 shown in FIG. 18-7C serves to clear number indication to "0" when the stop key is keyed on twice or when the set sheet number is counted up. Step (9) in FIG. 18-9C is a step for setting holding time after leave-alone. Checking and clearing indication of the leave-alone timer are carried out at (7). Time reduction on the leave-alone is effected by modifying the time set at (10), (11) to 5 seconds at (12) and setting TM flags 1, 2 and 3 with elapse of 5 seconds set at (1) and further elapse of the time mentioned above.

Features relating to holding and clearing numeral indication and other indication in the shown copying machine are summarized as follows:

When the door switch is turned on with the main switch being on, RAM and indications can be held although the drum is stopped at once.

When the machine is left alone for 30 seconds after the door switch being turned on, indicators 20 and 22 are cleared (automatic clear).

When the main switch is turned off, a portion of RAM and indication are cleared at once although the drum is stopped after completion of a post-rotation. The memories relating to the leave-along timer, clock counter and jam counter and register are remained uncleared.

When jammed, numbers on the indicators are modified and held.

When the stop key is keyed on, usually indications appearing on the indicators just before the key-on are held and automatically cleared.

When the set sheet number is counted up, count indicator 22 is cleared to "0" and the indicator 22 is automatically cleared.

In the case of no developer, no sheet or no cassette, the indication can be held.

When the interruption key is keyed on the indication is cleared. The above is also applied to the modes during interruption with the exception of the stop key.

OPERATION PART

The operation panel part 8 is composed of a base plate of polyester on which the indication and key operation sections are arranged.

As shown in FIG. 2, the various key marks, pictorial indication symbols and lines showing the outlines of keys and indicators are printed on the polyester base plate. Alarm signal section 15-23 is so disposed that it is normally invisible.

Line l encloses the range in which the variable density lever 30 is movable and the line is opened.

Under the polyester plate there are provided a spacer and a switching substrate each having the same shape as that of the polyester plate. By depressing slightly any key area of the polyester plate there is obtained an switching operation on the substrate. At the same time, the corresponding pictorial symbol printed on the polyester plate is clearly displayed in the indication section. This arrangement of operation/indication panel makes switching operation very simple and also makes it easy to monitor positions and conditions of the copying machine totally. It is possible to minimize the overall size of the panel part 8 and to make it flat. No dust and no dirt are allowed to enter between the body and operation keys and between the body and indicators. Therefore, trouble of blocking can be eliminated. It has a very smart appearance and also a hygienic structure. This type of panel may be advantageously used also in cooking apparatus such as electronic oven and the like. It prevents such troubles that electric contacts are damaged or lost by adhesion of oil and other matters.

Structure of this panel part is described in detail with reference to FIG. 19. Printed patterns of the keys and indication part are shown in a simplified form for the purpose of illustration.

In FIG. 19, reference numeral 400 designates a flexible polyester film of about 125 μm in thickness (first layer) on which the key marks and pictorial symbols are printed. Numeral 401 designates a polyester film of about 180 μm in thickness (second layer) constituting a spacer. This second layer 401 has openings corresponding to the outlines of keys and indicators marked on the first layer 400. Numeral 402 denotes a phenol print substrate of 1.6 mm in thickness having openings disposed corresponding to the indicator outline marks on the first layer and conductive patterns printed with electrically conductive material 403 (third layer). Numeral 404 represents a support plate on which a number of light emitting diodes (generally called LED) 406 are mounted. These LED are so positioned as to correspond to the indicator marks on the first layer 400. Numeral 407 represents a supporting and spacing member for fixedly supporting an assembled sheet comprising the above mentioned first, second and third layers with a space equal to the height of LED between the sheet and the LED support plate 404.

The conductive patterns on the print substrate 402 are printed in such manner that when key section on the surface of the first layer (for example COPY key) is depressed, there is effected a switching for current conduction, namely a switch-on operation in the direction of the shown arrow.

The manner of operation of the panel part is described with reference to FIGS. 20-1 and 20-2 which are cross sections of the panel part shown in FIG. 19.

Designated by 399 is a thin transparent polyester film covering the first layer for protecting the printed surface of the latter.

Figures 1, 20:
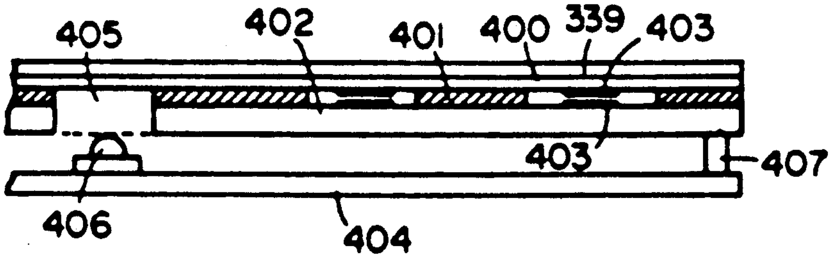
Figures 2, 20:
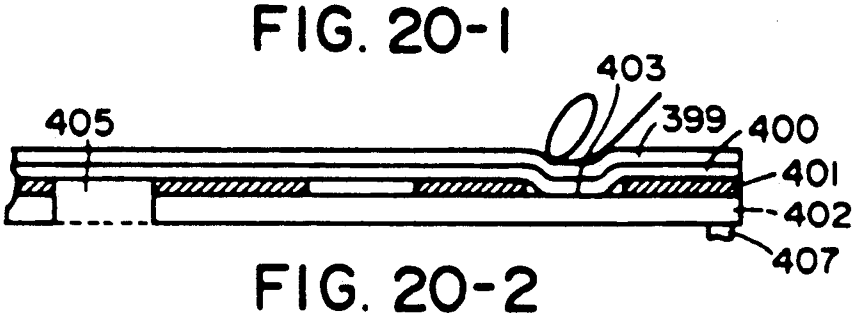

FIG. 20-1 shows the panel part in the position where no key switch is keyed on and FIG. 20-2 shows the same in another position where one key is keyed on. By applying a pressure in the range of from 50 to 100 gr. to the panel surface, the first polyester layer is deformed at the opening of the spacer 401 as shown in FIG. 20-2, which results in contact between the conductor (electrode) provided on the first layer 400 and the conductor (electrode) on the print substrate 402. Thereby, there is produced an operation of "switch-on".

When the pressure is removed, the first layer is released from deformation and restores its original position as shown in FIG. 20-1. By this switching action, switching of a relatively large current (mA) can be effected with a small pressure. Since switching can be performed in a sealed condition, the life of key switch is extended.

When LED lights on, the light illuminates the polyester layer on which the key mark has been printed, through the space 401 and print substrate 402 to display the printed pictorial symbol.

If the openings in the spacer 401 and print substrate 402 are filled with blue smock material (semitransparent film), the pictorial symbols in the first layer become visible only when LED lights on.

As will be seen from FIG. 2, touch key area may be very small in size. For example, the size of numeral key is 12 mm×12 mm, that of the clear key is double the size and the copy start key is 4 times larger than the numeral key. The indication part is almost equal in size to the numeral key. Therefore, the overall size of the operation panel can be reduced to the minimum.

The copy start key is distinguished from other keys by its largest size. In accordance with the large size of the copy start key, the opening on the spacer 401 and the corresponding conductor on the substrate 402 are also made wide and large so that the copy start key may be switched on by depressing any portion of the key. This copy start key can be switched on with a smaller pressure than other keys. But, it is possible to make the copy start key in such manner that it can be switched on by a larger pressure than other keys. Openings provided in the spacer 401 and substrate 402 corresponding to the indication part may be shaped to have such size corresponding to the size of pictorial symbol printed on the first layer 400.

In FIG. 2, the copying sheet size indicators have size marks (A3, A4 . . . ). Each size mark faces two LED arranged on the LED support plate and each size mark corresponds to each one opening formed in the spacer.

Figures 1, 21:
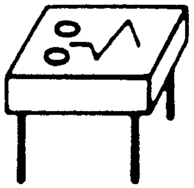
Figures 2, 21:
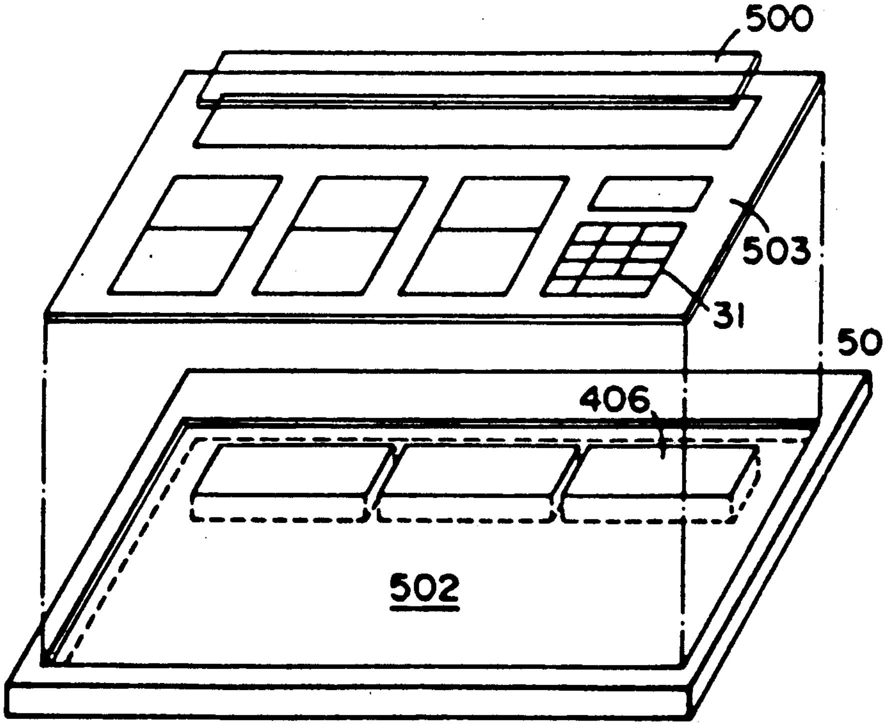

According to another embodiment, on the first layer are printed only outlines of the indicators and as LED 406 there are used such pictorial LEDs as shown in FIG. 21-1. The pictorial LED has a pictorial symbol. These pictorial LED are set on the LED support plate 404. The 7-segment numeral indicators 20 and 23 shown in FIG. 2 are made in this manner using such LED for each segment of the indicator.

An example of a panel part using the above mentioned pictorial LED is shown in FIG. 21-2. Designated by 503 is a flat key board, 406 a pictorial LED set on the support plate, 500 a smock material as mentioned above, and 501 frame member enclosing the key board 503 and LED support plate. Numeral 502 designates a member for supporting the key board 503 within the frame member 501.

As will be understood from the foregoing, the panel assembly according to the invention is small in size, easy to operate and enables to monitor the copying machine totally. Since touch keys and indication part are provided on one and same top layer, switching and indication are effected at the same time by one keying action. This operation panel assembly contributes to further miniaturization of copying machine.

As the touch key, an piezo-electric device also may be used. In this case, piezo-electric devices are disposed between a substrate and a printed layer and are keyed on by pressing the surface of the printed layer. LED can be mounted on the substrate.

The application of the above-described operation panel is never limited to the operation part of the copying machine only. It is applicable for other apparatus.

While the invention has been particularly shown and described with reference to preferred embodiments thereof, it will be understood by those skilled in the art that the foregoing and other changes in form and detailes can be made therein without departing from the spirit and scope of the invention.

We claim:

1. An image forming apparatus comprising:
- plural storage means for storing a number of sheets;
- a selection key for selecting one of said plural storage means;
- means for performing image forming processing to a sheet fed from the selected storage means;
- a memory for storing data for selection of said storage means by said selection key;
- first switch means for manually controlling turn on and off of a power supply for the apparatus;
- second switch means, operable with opening and closing of a cover member, for controlling a part of the apparatus; and
- control means for selecting said storage means based on the data in said memory,
- wherein said control means is operable, in response to an operation of the power supply by said first switch means, to store specific data for selection of a predetermined one of said storage means in said memory, and to maintain the specific data for selection of said storage means stored in said memory, without regard to operation of said second switch means.

2. An image forming apparatus according to claim 1, wherein said control means is a microcomputer.

3. An image forming apparatus according to claim 1, wherein said data for selection of said storage means is flag data.

4. An image forming apparatus according to claim 1, wherein said specific data is data for selection of storage means which takes priority of use.

5. An image forming apparatus according to claim 1, comprising detection means for detecting opening and closing of said cover member, wherein said control means senses an output state of said detection means and performs control for the image forming processing in accordance with a determination result.

6. An image forming apparatus according to claim 5, wherein said detection means includes a switching element for outputting a signal representing a state of opening and closing of said cover member in accordance with the condition of said part of the apparatus.

7. An apparatus according to claim 1, wherein said control means is operable, in response to operation of said second switch means but not operation of said first switch means, to maintain the data stored in said memory for selection of said storage means.

8. An image forming apparatus comprising:
- processing means for performing image forming processing;
- first and second supplying means for supplying sheets to said processing means;

a selection key for alternatively selecting either said first supplying means or said second supplying means;

a memory for storing data for selection of said supplying means by said selection key;

first switch means for manually controlling turn on and off of a power supply for the apparatus;

second switch means, operable with opening and closing a cover member, for controlling a part of the apparatus; and control means for selecting either said first supplying means or said second supplying means based on the data in said memory, wherein said control means is operable, in response to an operation of the power supply by said first switch means, to store data for selection of a predetermined one of said first supplying means and said second supplying means in said memory, and to maintain the data in said memory, without regard to operation of said second switch means.

9. An image forming apparatus according to claim 8, wherein said control means is a microcomputer.

10. An image forming apparatus according to claim 8, further comprising detection means for detecting opening and closing of said cover member, wherein said control means senses an output state of said detection means and performs control for the image forming processing in accordance with a determination result.

11. An image forming apparatus according to claim 10, wherein said detection means includes a switching element for outputting a signal representing a state of opening and closing of said cover member in accordance with the condition of said part of the apparatus.

12. An apparatus according to claim 8, wherein said control means is operable, in response to operation of said second switch means but not operation of said first switch means, to maintain the data stored in said memory for selection of said supplying means.

* * * * *

UNITED STATES PATENT AND TRADEMARK OFFICE
CERTIFICATE OF CORRECTION

PATENT NO. : 5,043,864

DATED : August 27, 1991

INVENTOR(S) : Tsuneki Inuzuka, et al.

It is certified that error appears in the above-identified patent and that said Letters Patent is hereby corrected as shown below:

On the title page item:

[57] ABSTRACT

Line 5, "first director" should read --first detector--.

[60]

"Jul. 3, 1904" should read --Jul. 3, 1984--.

SHEET 12 OF 80

Figure 10B:
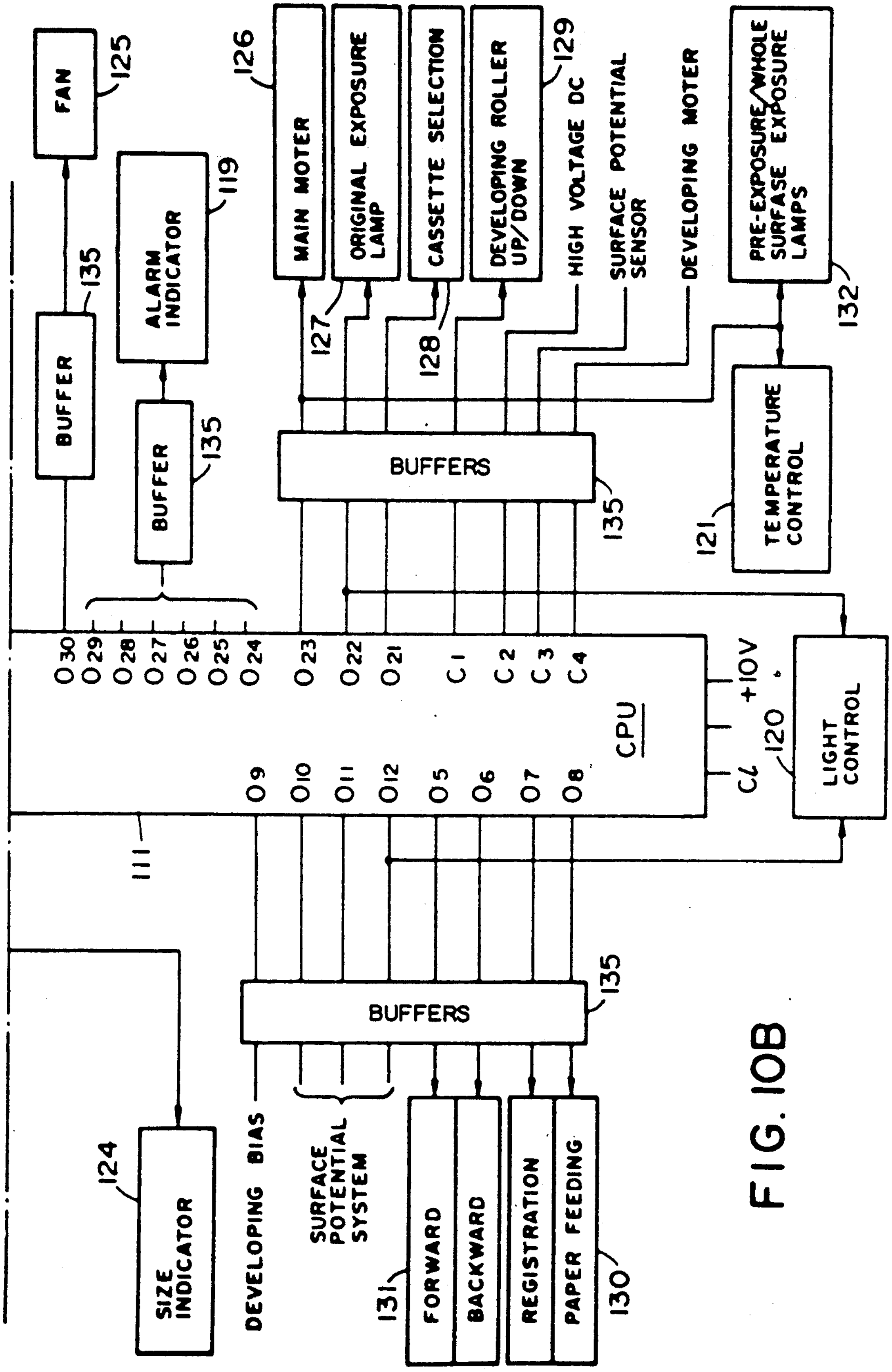

Figure 10B, "MOTER" should read --MOTOR--.

SHEET 44 OF 80

Figure 18-5C, "CLUTH" should read --CLUTCH--.

SHEET 57 OF 80

Figure 18-9C, "STANBY 2" should read --STANDBY 2--.

SHEET 63 OF 80

Figure 18-12C, "BEEN" should be deleted.

COLUMN 1

Line 18, "1. Field of the Invention" should read
--1. Field of the Invention
The present invention relates to an image forming apparatus such as a copying machine and printer.--

UNITED STATES PATENT AND TRADEMARK OFFICE

CERTIFICATE OF CORRECTION

PATENT NO. : 5,043,864
DATED : August 27, 1991
INVENTOR(S) : Tsuneki Inuzuka, et al.

It is certified that error appears in the above-identified patent and that said Letters Patent is hereby corrected as shown below:

COLUMN 2

Line 8, "occurrance" should read --occurrence--.
Line 53, "develope" should read --develop--.
Line 60, "complicate" should read --complicated--.
Line 64, "remained" should read --remaining--.

COLUMN 5

Line 42, "does" should read --denotes--.
Line 43, "does" should read --denotes--.
Line 49, "tranportation" should read --transportation--.
Line 50, "does" should read --denotes--.

COLUMN 6

Line 9, "pictorical" should read --pictorial--.
Line 29, "pluged" should read --plugged--.

COLUMN 7

Line 21, "preexposure lamp 50" should read --preexposure lamp 50-1--.
Line 46, "coinside" should read --coincide--.

COLUMN 8

Line 5, "sticked" should read --stuck--.

UNITED STATES PATENT AND TRADEMARK OFFICE
CERTIFICATE OF CORRECTION

PATENT NO. : 5,043,864

DATED : August 27, 1991

INVENTOR(S) : Tsuneki Inuzuka, et al.

It is certified that error appears in the above-identified patent and that said Letters Patent is hereby corrected as shown below:

COLUMN 11

Line 5, "unfavourable" should read --unfavorable--.
Line 21, "being" should read --is--.

COLUMN 12

Line 65, "hall IC" should read --Hall IC--.

COLUMN 13

Line 8, "hall element" should read --Hall element--.
Line 41, "stabolize" should read --stabilize--.

COLUMN 14

Line 14, "on it" should read --it on--.

COLUMN 15

Line 44, "lamp L1(68)" should read --lamp FL1(68)--.

COLUMN 16

Line 3, "hall elements" should read --Hall elements--.
Line 18, "decorder 117" should read --decoder 117--.
Line 34, ""WAITE"" should read --"WAIT"--.

UNITED STATES PATENT AND TRADEMARK OFFICE
CERTIFICATE OF CORRECTION

PATENT NO. : 5,043,864

DATED : August 27, 1991

INVENTOR(S) : Tsuneki Inuzuka, et al.

It is certified that error appears in the above-identified patent and that said Letters Patent is hereby corrected as shown below:

COLUMN 18

Line 35, "developing lower." should read --developing roller.--.

COLUMN 20

Line 6, "Numeral 138" should read --Numeral 139--.

COLUMN 21

Line 39, "broughts" should read --brings--.

COLUMN 22

Line 24, ""Q306" should read --Q326--.
Line 40, "relay K" should read --K301--.

COLUMN 24

Line 39, "many" should read --much--.

COLUMN 25

Line 22, "an" should read --and--.
Line 45, "port 36" should read --port $O_{36}$--.

UNITED STATES PATENT AND TRADEMARK OFFICE

CERTIFICATE OF CORRECTION

PATENT NO. : 5,043,864

DATED : August 27, 1991

INVENTOR(S) : Tsuneki Inuzuka, et al.

It is certified that error appears in the above-identified patent and that said Letters Patent is hereby corrected as shown below:

COLUMN 27

Line 28, "PF per feed signal" should read --PF paper feed signal--.
Line 48, "LED603" should read LEDs603,--.
Line 52, "the" should be deleted.
Line 63, "each" should read --with each--.
Line 65, "be" should read --is--.

COLUMN 29

Line 12, "sets then" should read --then sets--.
Line 40, "wished" should read --desired--.
Line 41, "wished" should read --desired--.

COLUMN 30

Line 10, "each the" should read --each--.
Line 25, "SCFW" should read --SCFW--.

COLUMN 31

Line 64, "on. The" should read --on, the--.

COLUMN 32

Line 42, "the" should be deleted.

UNITED STATES PATENT AND TRADEMARK OFFICE

CERTIFICATE OF CORRECTION

PATENT NO. : 5,043,864
DATED : August 27, 1991
INVENTOR(S) : Tsuneki Inuzuka, et al.

It is certified that error appears in the above-identified patent and that said Letters Patent is hereby corrected as shown below:

COLUMN 33

Line 3, "occurrance" should read --occurrence--.
Line 14, "of" should read --with--.
Line 41, "thereof. Data" should read --thereof, data--.
Line 67, "being" should be deleted.

COLUMN 34

Line 11, "alloted" should read --allotted--.
Line 13, "set these" should read --set, these--.

COLUMN 37

Line 1, "got," should read --got to the outlet,--.
Line 24, "subtract" should read --subtracting--.

COLUMN 38

Line 15, "sammer" should read --same manner--.
Line 28, "each the" should read --each--.

COLUMN 41

Line 24, "sensed (3)" should read --sensed (5)--.
Line 62, "resetting the" should read --resetting, the--.

UNITED STATES PATENT AND TRADEMARK OFFICE

CERTIFICATE OF CORRECTION

PATENT NO. : 5,043,864
DATED : August 27, 1991
INVENTOR(S) : Tsuneki Inuzuka, et al.

It is certified that error appears in the above-identified patent and that said Letters Patent is hereby corrected as shown below:

COLUMN 43

Line 16, "on" should read --of--.
Line 42, "routine" should read --routines--.
Line 67, "carried" should read --carried out--.

COLUMN 45

Line 46, "leave-along" should read --leave-alone--.

COLUMN 47

Line 14, "space 401" should read --spacer 401--.
Line 49, "pictorial LED" should read --pictorial LEDs--.

COLUMN 48

Line 1, "an" should read --a--.
Line 13, "tailes" should read --tails--.

Signed and Sealed this

Nineteenth Day of July, 1994

Attest:

BRUCE LEHMAN

*Attesting Officer* *Commissioner of Patents and Trademarks*